US012462277B2

(12) United States Patent
Karmarkar

(10) Patent No.: US 12,462,277 B2
(45) Date of Patent: Nov. 4, 2025

(54) GAMIFIED DIGITAL COMMERCE MARKETPLACE

(71) Applicant: Jayant S Karmarkar, Aptos, CA (US)

(72) Inventor: Jayant S Karmarkar, Aptos, CA (US)

(*) Notice: Subject to any disclaimer, the term of this patent is extended or adjusted under 35 U.S.C. 154(b) by 0 days.

(21) Appl. No.: 18/445,742

(22) Filed: Jan. 10, 2024

(65) Prior Publication Data
US 2025/0166020 A1 May 22, 2025

Related U.S. Application Data

(60) Provisional application No. 63/629,638, filed on Nov. 16, 2023.

(51) Int. Cl.
| | | |
|---|---|---|
| *G06Q 30/02* | (2023.01) | |
| *G06Q 30/0201* | (2023.01) | |
| *G06Q 30/0273* | (2023.01) | |

(52) U.S. Cl.
CPC ..... *G06Q 30/0275* (2013.01); *G06Q 30/0201* (2013.01)

(58) Field of Classification Search
CPC .............. G06Q 30/0275; G06Q 30/0201
See application file for complete search history.

(56) References Cited

U.S. PATENT DOCUMENTS

| | | | |
|---|---|---|---|
| 5,809,481 A | 9/1998 | Baron | |
| 6,443,843 B1 * | 9/2002 | Walker | ........... G06Q 20/20 705/16 |

(Continued)

FOREIGN PATENT DOCUMENTS

| | | |
|---|---|---|
| CN | 101918966 A | 12/2010 |
| CN | 11796524 A | 2/2020 |

(Continued)

OTHER PUBLICATIONS

"Gamification, the ultimate call to action?" (Aengeveld, Jordy: published Sep. 6, 2019 at https://www.coupontools.com/en/blog/110/gamification-the-ultimate-call-to-action) (Year: 2019).*

(Continued)

*Primary Examiner* — James M Detweiler

(57) ABSTRACT

A digital commerce networked (e.g., Protocols: TCP/IP, BECKN, . . . ) marketplace for buyer-consumer-Players and seller-merchant-players, particularly micro-small-medium enterprises, coordinated by interconnected regional-provider-auctioneers.

Each seller-merchant-player in said marketplace has product-service-activity-attraction offerings, which are analytic-algorithm searched, by each buyer-consumer-players, on said network to select product-service-activity-attraction, based on each buyer-consumer-player's needs-wants and placed in said buyer-consumer-player's shopping bag of icons.

Each buyer-consumer-player's icon game dashboard enables earning a discount coupon prize, thereby reducing the published list-price. Prior performance (sales, coupons, . . . ) dashboards, enable each seller-merchant-player to periodically wager on time-of-day slots, to place iconized multimedia up-cross sell advertisements of product-service-activity-attraction, bidding against other seller-merchant-players, who have related product-service-activity-attraction recommendations, which said buyer-consumer-player's analytic search could have discovered.

Each regional-provider-auctioneer's dashboard enables coordination of: (1) buyer-consumer-player's conversion-to-purchase, including a "discount coupon" transaction and (2) accounting of (a) seller-merchant-player's product-service-activity-attraction inventory and bag of advertisements and (Continued)

(b) buyer-consumer-player's need-wants icon shopping bag(s) and earned prize coupon bag(s).

20 Claims, 44 Drawing Sheets

(56) References Cited

U.S. PATENT DOCUMENTS

| | | | |
|---|---|---|---|
| 6,540,609 B1* | 4/2003 | Paige | G07F 17/34 463/20 |
| 8,090,629 B2 | 1/2012 | Storch | |
| 8,123,618 B2 | 2/2012 | Karmarkar | |
| 8,572,198 B2 | 10/2013 | Jhanji | |
| 8,655,746 B1 | 2/2014 | Mussman | |
| 9,589,535 B2 | 3/2017 | Pool/Paypal | |
| 9,996,869 B2 | 6/2018 | Munjal | |
| 10,181,238 B2 | 1/2019 | Hate | |
| 10,380,682 B2 | 8/2019 | Kundu | |
| 10,540,693 B1 | 1/2020 | Monsowitz | |
| 11,157,937 B2 | 10/2021 | Ezra | |
| 11,250,514 B2 | 2/2022 | Khan/Omnyway | |
| 11,263,531 B2 | 3/2022 | Warde-Farley et al. | |
| 11,341,810 B2 | 5/2022 | Washington | |
| 11,734,735 B2 | 8/2023 | Brown | |
| 11,790,383 B2 | 10/2023 | Intelligence | |
| 11,915,288 B2 | 2/2024 | Clark | |
| 2002/0004753 A1 | 1/2002 | Perkowski | |
| 2004/0140352 A1* | 7/2004 | Walker | G06Q 30/0236 705/14.65 |
| 2005/0021393 A1 | 1/2005 | Bao | |
| 2006/0063580 A1* | 3/2006 | Nguyen | G07F 17/3267 463/16 |
| 2008/0097842 A1 | 4/2008 | Tirumala | |
| 2008/0097843 A1 | 4/2008 | Menon | |
| 2008/0262907 A1 | 10/2008 | Broady et al. | |
| 2008/0288362 A1 | 11/2008 | King | |
| 2009/0062008 A1 | 3/2009 | Karmarkar | |
| 2009/0307079 A1 | 12/2009 | Commerce | |
| 2010/0211431 A1* | 8/2010 | Lutnick | G06Q 30/0255 705/14.1 |
| 2012/0089466 A1 | 4/2012 | Froloff | |
| 2012/0197753 A1 | 8/2012 | Kalm/Etsy | |
| 2012/0245990 A1 | 9/2012 | Agarwal | |
| 2012/0253949 A1 | 10/2012 | Ammar | |
| 2013/0041740 A1 | 2/2013 | Tyler | |
| 2013/0204713 A1 | 8/2013 | Snedekar | |
| 2013/0218671 A1 | 8/2013 | Khan | |
| 2013/0231999 A1 | 9/2013 | Emrich | |
| 2014/0136308 A1 | 5/2014 | Gopalan | |
| 2017/0293984 A1 | 10/2017 | Goldberg | |
| 2018/0189857 A1* | 7/2018 | Wu | G06F 40/30 |
| 2019/0279240 A1 | 9/2019 | Ditmeso | |
| 2019/0281030 A1 | 9/2019 | Isaacson | |
| 2020/0372569 A1 | 11/2020 | Lahiri et al. | |
| 2021/0110014 A1 | 4/2021 | Turgeman/Biocatch | |
| 2022/0261848 A1 | 8/2022 | Cooper/Kwikclick | |
| 2023/0035712 A1 | 2/2023 | Sharma | |
| 2023/0162286 A1 | 5/2023 | Lanier | |
| 2023/0169532 A1 | 6/2023 | Grove/NCR | |
| 2024/0046318 A1 | 2/2024 | Muriqi | |

FOREIGN PATENT DOCUMENTS

| | | |
|---|---|---|
| EP | 3047444 A1 | 7/2016 |
| EP | 3732585 A2 | 11/2020 |
| KR | 10118476131 | 9/2012 |
| NL | 1005614 C1 | 9/1998 |
| TW | 200907845 A | 2/2009 |
| TW | 200941375 A | 10/2009 |
| WO | WO200000033163 A3 | 10/2000 |
| WO | WO20022011108 A1 | 2/2002 |
| WO | WO2001082178 A3 | 9/2002 |
| WO | WO 2004008275 A3 | 5/2004 |
| WO | WO2009050546 A1 | 4/2009 |
| WO | WO2013157996 A2 | 10/2013 |
| WO | WO2018213224 A1 | 11/2018 |
| WO | WO2019093912 A1 | 5/2019 |

OTHER PUBLICATIONS

"Digital Slot Machine Coupon" (webpage captured on Feb. 3, 2023 using Internet Archive WaybackMachine and retrieved on Mar. 14, 2025, published at https://clearline.me/service/slot-machine-coupon/); (Year: 2023).*

"BeeLikied Slot Machine" (webpage captured on Oct. 7, 2022 using Internet Archive WaybackMachine and retrieved on Mar. 14, 2025, published at https://www.beeliked.com/product/promotion-types/slot-machine)/ (Year: 2022).*

U.S. Appl. No. 60/699,071, filed Jul. 13, 2005, Peter Kelley.

U.S. Appl. No. 60/858,038, filed Nov. 9, 2006, Doug DeAnglis.

U.S. Appl. No. 61/293,430, filed Jan. 8, 2010, Jason Knapp.

C.Y.KAO & H.E. Chueh, A real-Time Bidding Gamification Service of Retailer Digital Transformation, SAGE Open, Apr.-Jun. 2022:p. 1-13 (Fig 1 3 4 7).

U.S. Appl. No. 13/068,146, filed May 2, 2011, Walt Froloff.

U.S. Appl. No. 12/924,839, filed Oct. 6, 2010, Walt Froloff.

U.S. Appl. No. 12/850,360, filed Aug. 4, 2010, S Das.

http://chozan.co/blog/china-company-create-engaging-social-gaming-2023/ (Nov. 17, 2023).

https://www.globalbankingandfinance.com/influencer-marketing-in-fashion-driving-brand-engagement-through-social-media-analytics (Jan. 22, 2025).

http://www.wsj.com/articlesinfluencer-startup-shopmy-raises-77-5-million-to-expand-into-new-ad-categories-5ef297c4 (Jun. 24, 2025;Katie Deighton).

https://lasvegasthenandnow.how-las-vegas-casinos-make-money/ (Feb. 12, 2024;Jake Hoffman).

http://rankred.com/biggest-malls-in-america/ (Jan. 1, 2025; Bipro Das).

https://www.linkedin.com/pulse/addressing-root-cause-retails-inventory-glut-three-strategies/ (May 31, 2023; MoVista).

https://fitsmallbusiness.com/omnichannel-statistics/ ("41 Omni-Channel statistics for retailers in 2024," M Borphy & A Aviso; Sep. 4, 2024.

Https://fitsmallbusiness.com/how-to-start-an-online-store/ ( "How to start an online store: a beginner's guide," M Borphy & A Aviso ; Jun. 25, 2024.

* cited by examiner

EXAMPLE MERCHANT BIDDING (24HR) GRID (POLAR)
(MERCHANT SELECTABLE RESOLUTION, 1 HOURS DOWN TO 2.5 MIN SUB SECTORS)

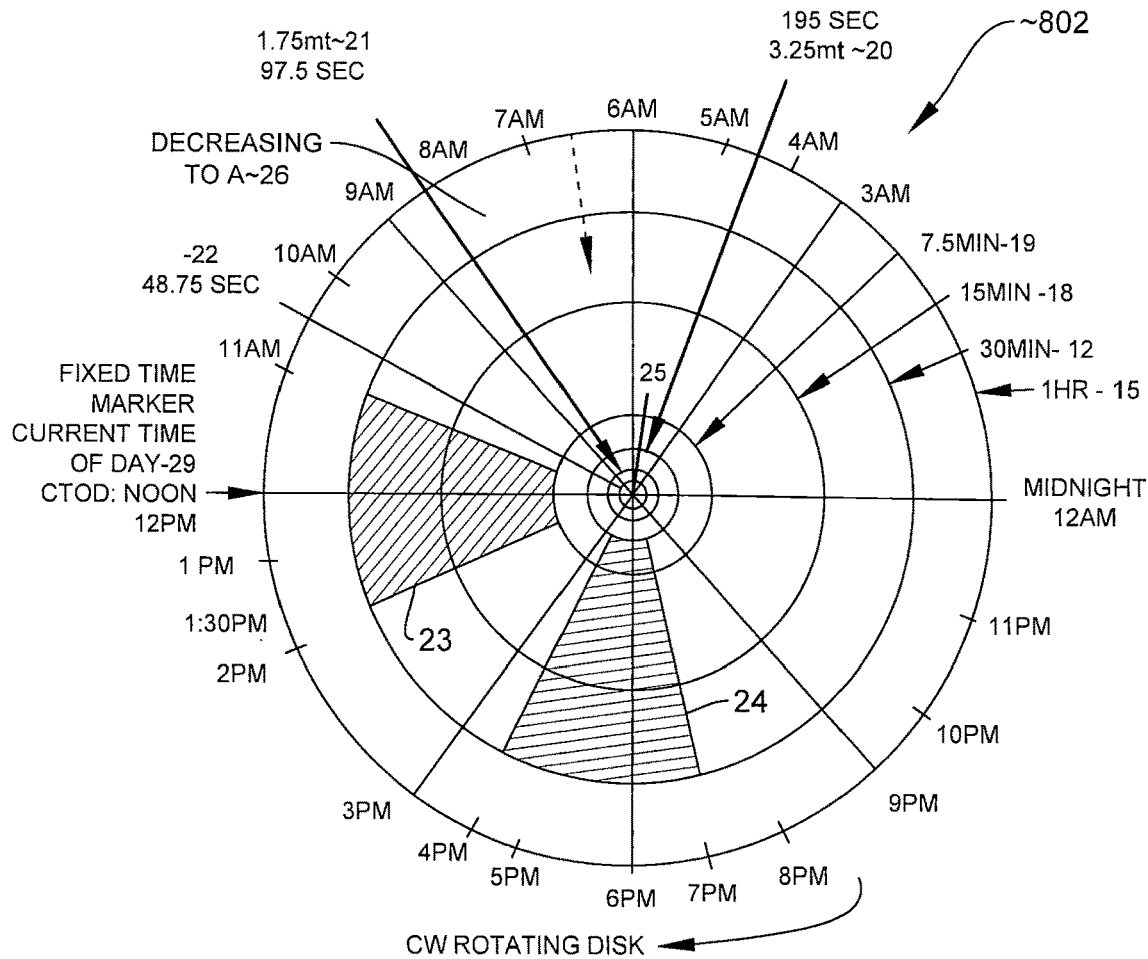

NOTATION ; TOTAL QUALIFIED CONSUMERS (TQC)
SECTOR HEIGHT = # OF QUALIFIED CONSUMERS/SUBSECTOR
SECTOR COLOR = BID AMOUNT LEVEL

TOD SUBSECTOR = 1.5 mt (FOR EXAMPLE) ; 10 HRs MERCHANT DAY = 400 DTOD (~98) BID SLOTS

EVOLVING CLOCK TIME (TOD ~27) ; TIME OF ARRIVAL (TOA~26)
eg, TOA (i +1) = TOA (i)/2

NOTATION; BID ~140 ; EXAMPLE COLOR CODING -38:

R = 1000 UNITS (red)
G= 100 UNITS (green)
B = 10 UNITS (blue)
P= 1 UNIT (purple)

FIG. 2

EXAMPLE COLOR CODED BIDDING ON (6) CARTESIAN LINE SEGMENTS REPRESENTING 6 FACETS

Fig._13

VIRTUAL ROULETTE WAGERING TABLE

Fig_16  THIRD PARTY AD NETWORKS AND AUCTION ENGINE CONNECTED TO MERCHANT BID MGMT SYSTEM

Fig._17

COMMUNICATION CLOCK TIMING DIAGRAM

FIG. 21

EXAMPLE OF MERCHANT 'i' AD # (TEXT, AUDIO, VIDEO) AND BID AMOUNTS AS A FUNCTION OF TOD BASED ANTICIPATED CONSUMER ATTRIBUTES (~209)

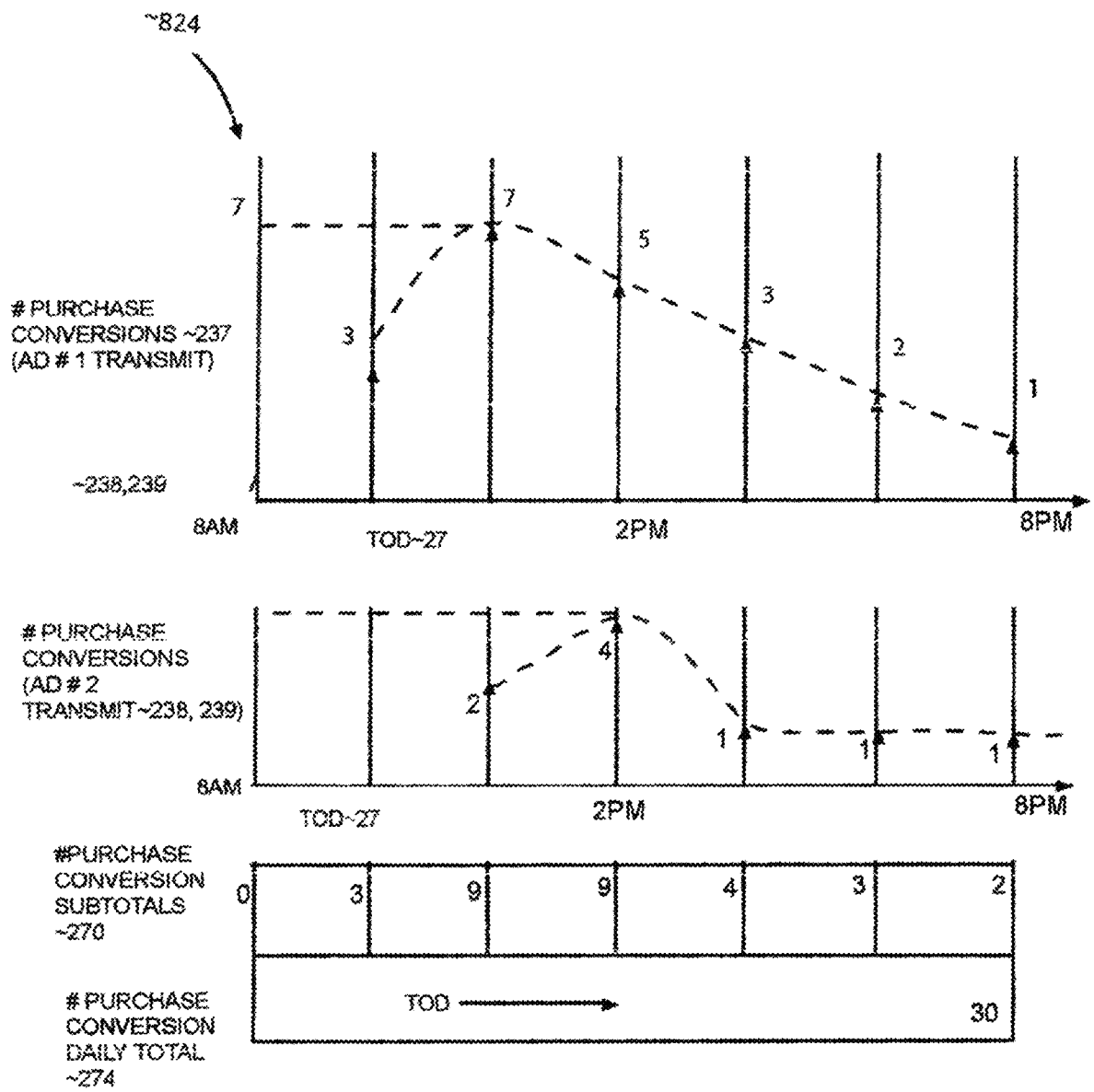

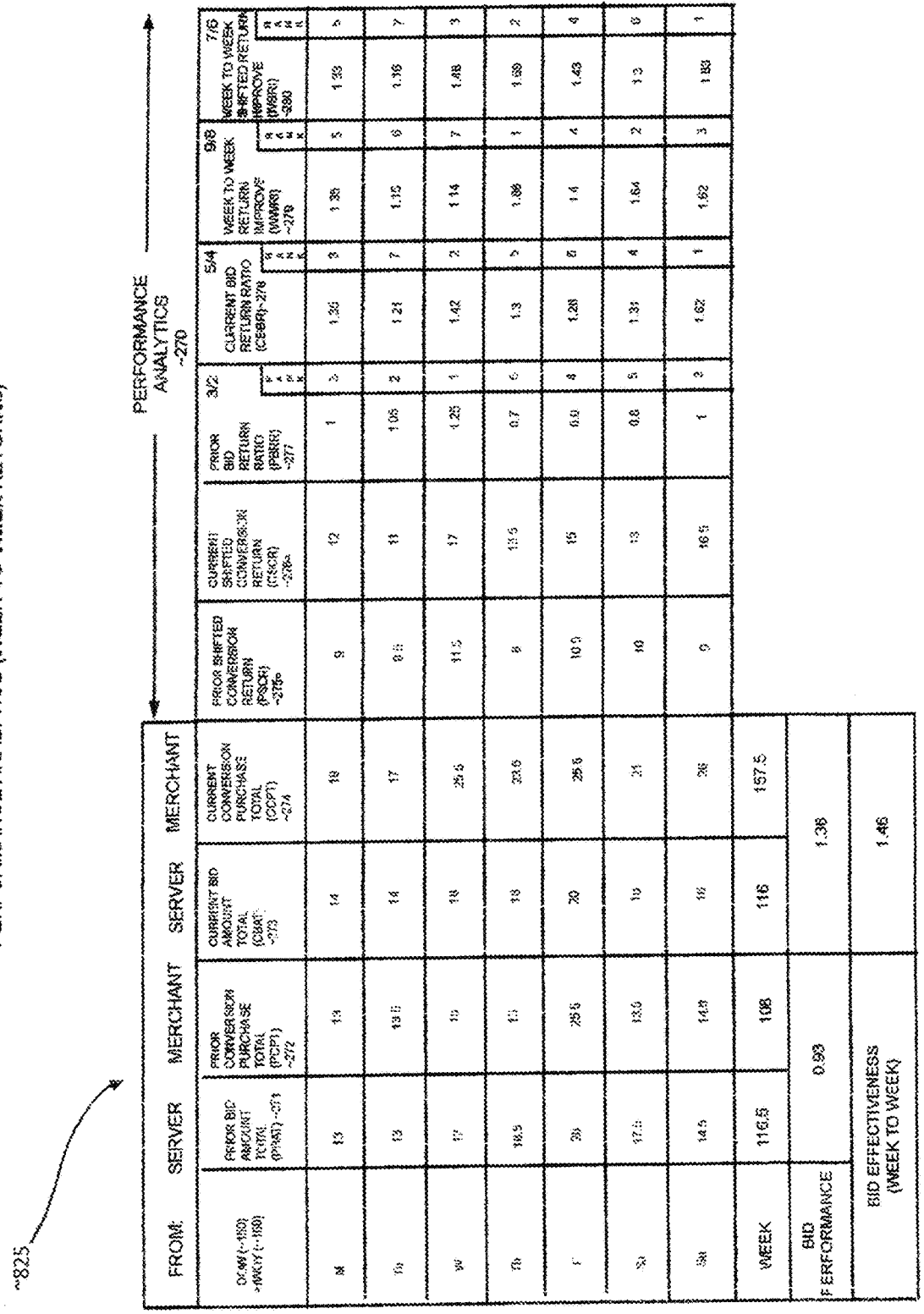
FIGURE_25
PERFORMANCE ANALYTICS (WEEK-TO-WEEK RETURNS)

Fig. 26

EXAMPLE "ESKAPD" CARD DECK (F- FEMALE; M- MALE; SF- SPANISH F, AM- ASIAN M; A- AGE; I - INCOME)

| EMOTION ICONS | ACTIVITIES ICONS | DEMOGRAPHIC ICON | PRODUCT ICON | SERVICES ICON | KEYWORD ICON |
|---|---|---|---|---|---|
| ~111 (1) | ~112 (4) | ~113 (6) | ~114 (5) | ~115 (2) | ~116 (3) |
| ANGRY | WET | MA:<18 | APPAREL | DRY CLEAN | DIRTY |
| BORED | SPORTS | MA:18-39 | TRANSPORT | REPAIR | RATTLE |
| DETERMINED | DIG | MA:40-75 | SHOVEL | WORKMAN | TOOLS |
| EXHAUSTED | SITTING | MA: 75+ | MEDS | MD | WELLNESS |
| LONELY | DRIVING | FA<18 | MOVIE | CABLE | ENTERTAIN |
| DEPRESSED | WORK | FA:18-29 | MAKEUP | MAKEOVER | COSMETICS |
| ANXIOUS | WAIT | FA:30-45 | PHONE | CALL- IN | CHILD |
| PAINFUL | CHAT | FA:46-65 | DOCUMENT | ATTY | DISPUTE |
| FEARFUL | HOME | FA:66-80 | ALARM | RESCUE | FIREMAN |
| CONFUSED | WALK | FA:80+ | PHONE | PSYCH | MD |
| HELPLESS | AIRPORT | SF: 19-29 | MAP | HELP DESK | WHERE? |
| SAD | PRAYER | SF: 30-45 | BIBLE | PRIEST | LOSS |
| EXASPERATED | TRAVEL | AM: 18-29 | TOWEL | MOTEL | REST |

~826

~828

EXAMPLE: GAME EMBODIMENT OF PROMOTIONAL COMMERCE WITH WAGERED ADVERTISING INSERTS

Sightseeing from Amsterdam

Marken, Volendam & Windmills Tour (5 Hours) - $89
Visit canals and windmills, and pass by wooden houses while driving along the coast to Marken and Volendam, stopping en route to learn about cheese making.

Charm of Holland Small Group Full Day Tour - $109
Scenic landscapes dotted with windmills, picturesque canals, villages with charming streets, locals dressed in traditional costumes, tasty Dutch specialties, and much more awaits.

Grand Holland Full Day Tour - $129
This comprehensive tour includes Rotterdam, the Delft Pottery Factory, The Hague, and Madurodam, known for its displays of miniature versions of the country's well-known sights.

Grand Train Tour of Switzerland

Days 1-3: Zurich & Interlaken
Arrive into Zurich and check in to your hotel. Travel by train to Interlaken and head up to the highest railway station in Europe as you approach the Jungfraujoch with views over the Aletsch Glacier.

Day 4: Montreux
Continue along the Golden Pass to Montreux along the shores of Lake Geneva. You've crossed into the French speaking part of Switzerland. The quaint lakeside villages offer relaxation and stunning views.

Days 5-6: Zermatt
Travel to the ski resort town of Zermatt at the base of the Matterhorn. The car-free town center has helped preserved its unique character. Go for a ride up the Gornergrat via one of the highest cogwheel trains for outstanding views of the surrounding mountains.

Sightseeing in/from Avignon

Van Gogh in Provence
Half Day Tour - $105
See where the famous artist once lived and worked before visiting several real-life locations that he painted. Departs Mon., Thu., Sat. & Sun.

Best of Austria

Day 1: Arrive in Vienna
After collecting your luggage and clearing customs, meet your driver in the arrivals hall for your private transfer to your hotel. Explore Vienna on your own.

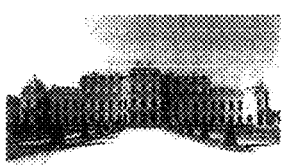

Days 2-3: Vienna
Enjoy breakfast at your hotel before your morning city tour. Learn about the former Hapsburg capital rich with art, architecture, and culture. The highlight of the city is Schönbrunn Palace and its perfectly manicured gardens.

Days 4-5: Salzburg
Take the train to Salzburg and make your way to your hotel. Located deep in the Alps, the Old Town is picturesque with stunning views from the hilltop fortress and is simply enchanting with beautiful palaces.

Highlights of Germany

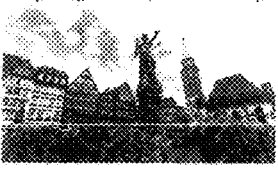

Day 1: Arrive in Frankfurt
Collect your luggage, clear customs and meet your driver in the arrivals hall for private transfer to your hotel. Explore Frankfurt on an easy hop-on/off city tour to take in the main sights.

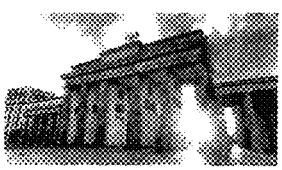

Days 2-3: Berlin
Take the train to Germany's capital and learn about the dynamic city with a private walking tour. Have a first-hand look at the stark remnants of the Cold War era as your guide shows you key historic sites.

Day 4: Dresden
Head to Dresden and visit Saxon palaces and numerous museums. Destroyed during WWII, the city was reborn as the country's cultural center with operas and orchestras attracting visitors from all over the world.

Arles, Les Baux & St. Remy
Full Day Tour - $179
Learn about how the Alpilles countryside and the city of Arles inspired the painter Vincent Van Gogh during his stay in Provence.

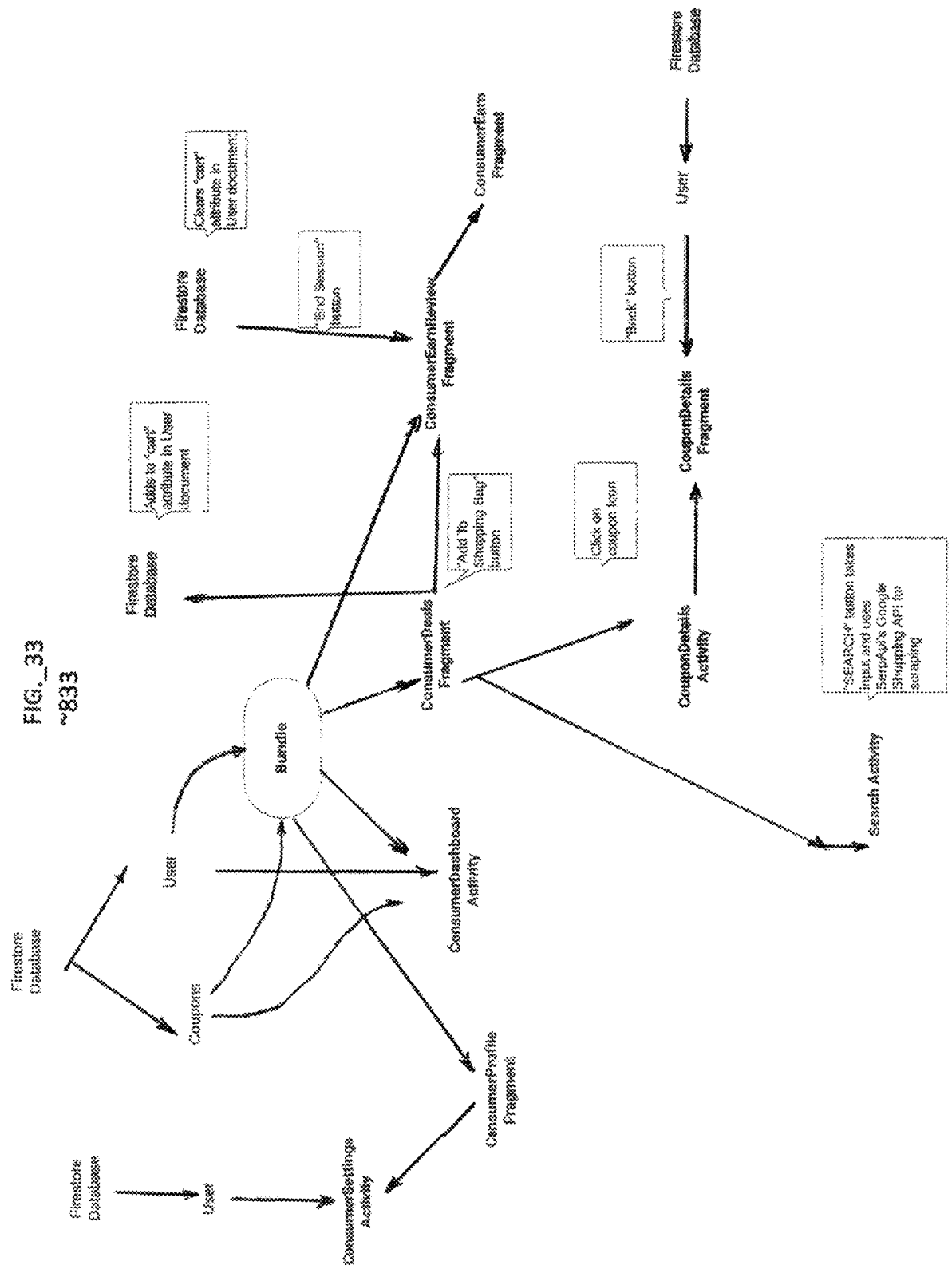
FIG._33
~833

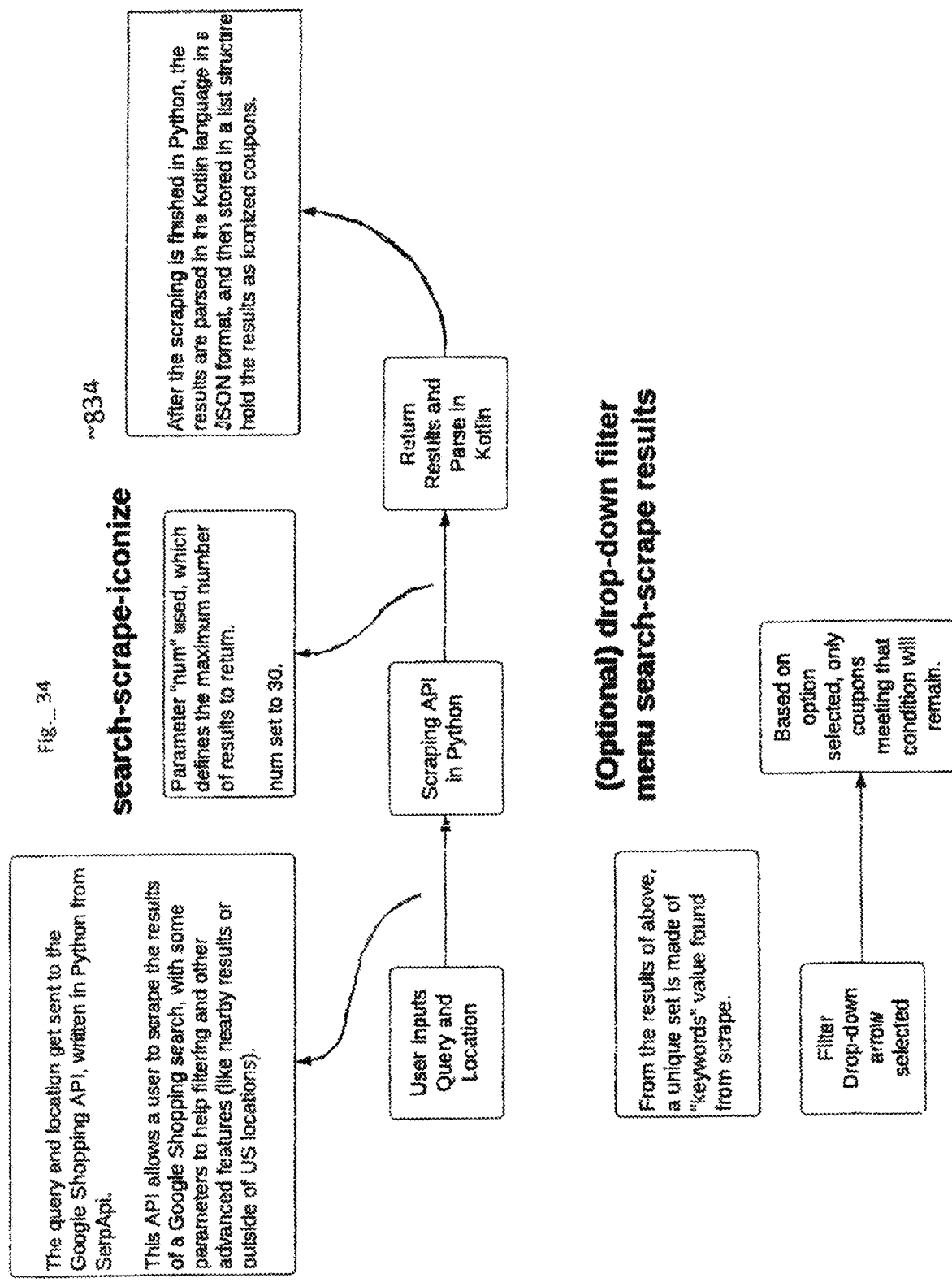

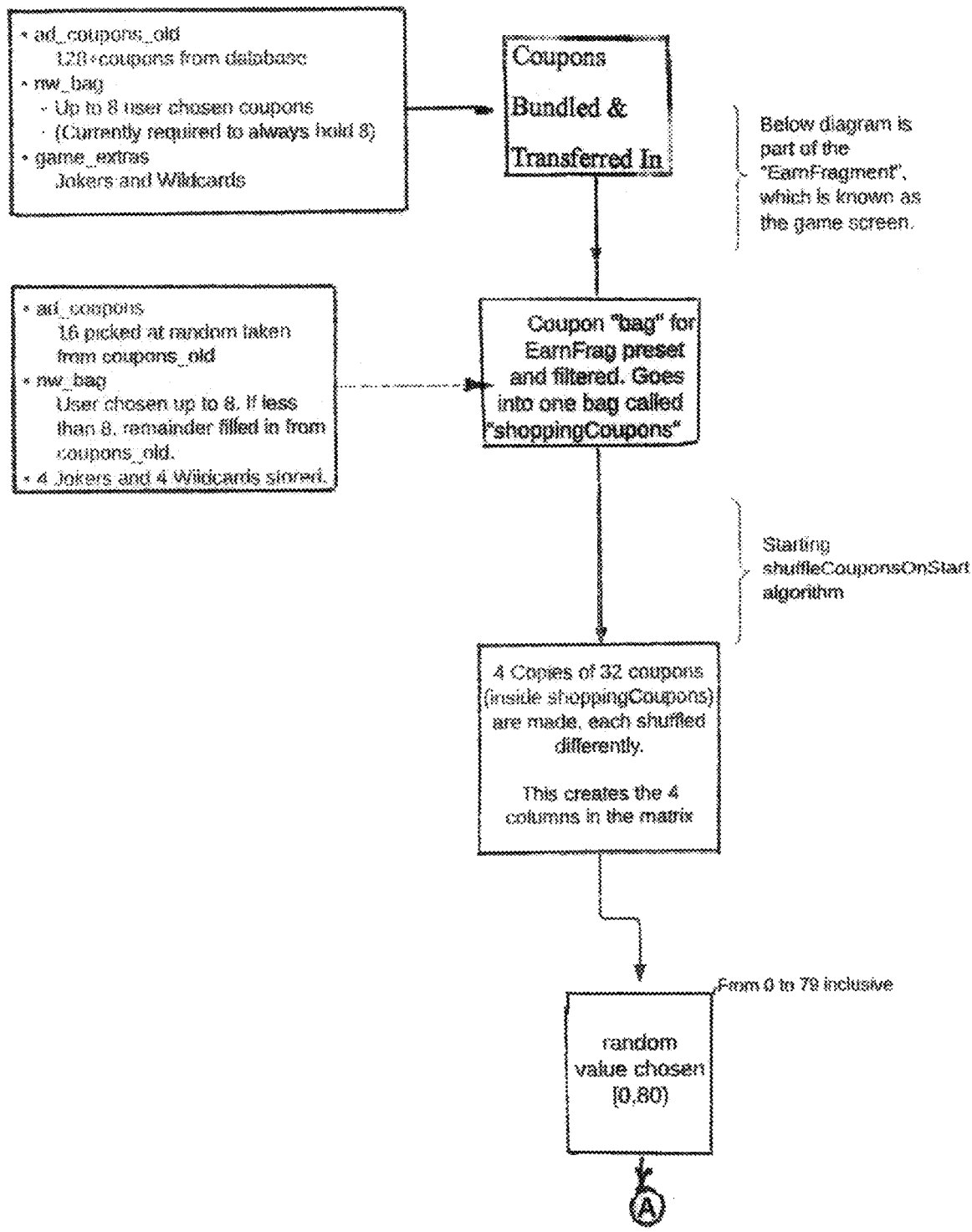
Fig._36A
~836A

Fig._37
~837

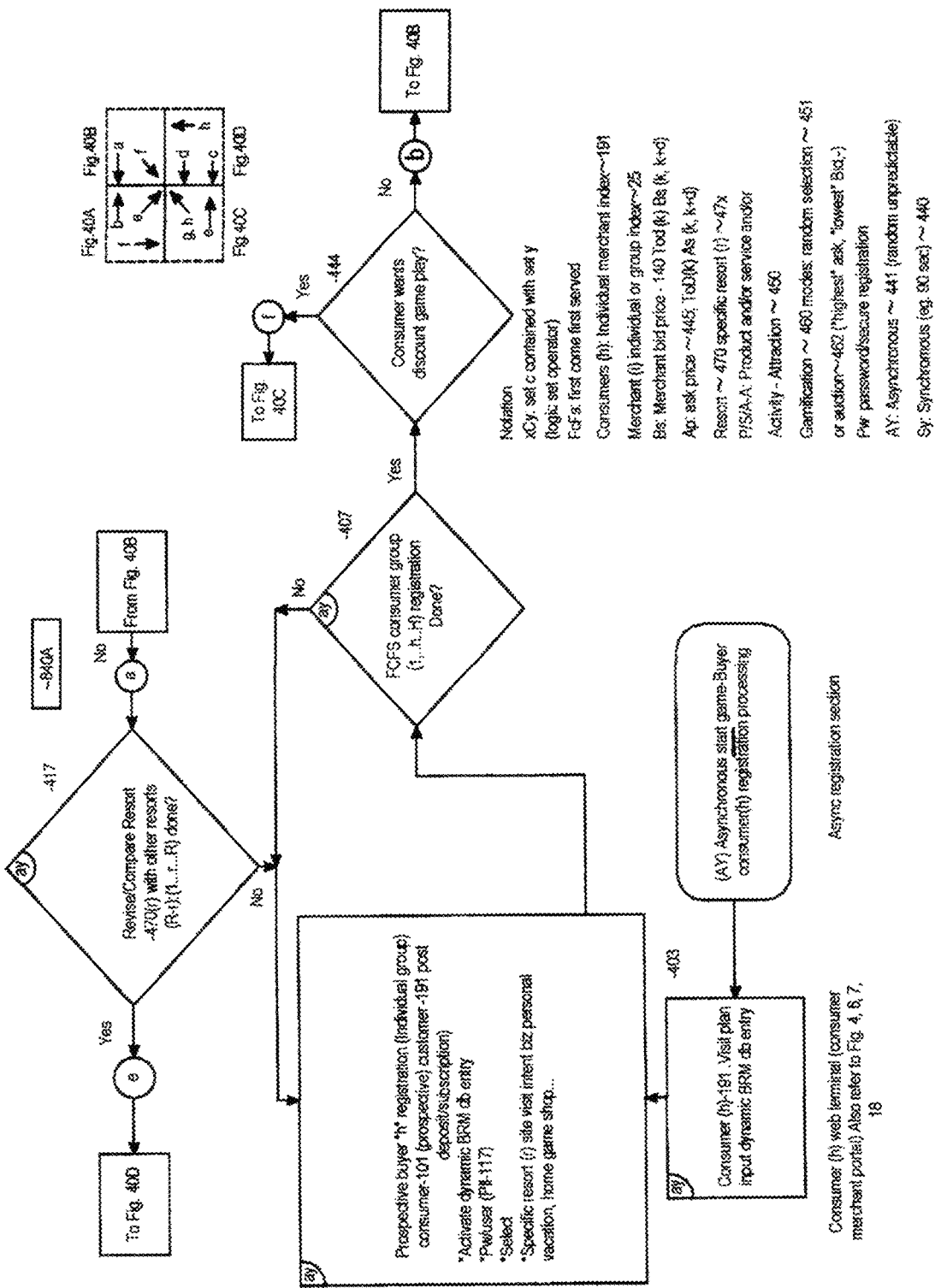

GAMIFIED DIGITAL COMMERCE MARKETPLACE

BACKGROUND OF INVENTION

Field of Invention

The present invention discloses Systems and Methods for "Timely Exciting Gamification of Online Sell-Bid (Wagering) for Advertising (Ad placement—Time, Discount, . . . ) related Marketing (Ad effectiveness) Analytics" (TEGOBAMA), by competing seller-merchant-players focused on timely multi-channel: Mobile, IOE, Signage, TV, Kiosk, personal Devices (MISTKD) based on programmatic: Emotion, Services, Keywords, Activities, Demographics (ESKAPD) Ad delivery, excluding privacy sensitive consumer opt-out segments (COOS), to consumer display devices. Gamification-based "excitement" is directed to decreasing the drudgery & tedium of current seller-merchants advertising graphical user interfaces (GUIs), to facilitate a novel sticky (recurring visits) merchant-consumer (friendly) user experience (UX), for timely Bid-Ask (i.e., seller-buyer) gamified bid management, including efficient periodic bid optimization based on timely feedback analytics of the online advertising, marketing, selling and purchasing processes, including time-limited discounted product-service-activity-attraction (PSAA) promotional Ad offers, particularly to persuade buyer-consumers (BCs) to brick-mortar (BM) micro-small-medium enterprises (MSMEs) and large-significant-enterprises (LSEs). The disclosed digital networked portal-based facility is seamlessly extended to include competing seller-merchant-player Bid-Ad placement game with buyer-consumer-Player ask (discount game) to "earn" PSAA (e.g., NAICS categories) price discounts (digital coupons), thereby facilitating at-home and vacation-travel planning commerce to "Destinations Resorts."

PRIOR ART

USA has a significantly large services economy. Seller-Merchants (SM) include those offering products-services (PS) of all types, particularly by brick-mortar (BM) business enterprises. In this context, the merchant is sometimes the user, and in-turn bidding on "buying" the attention (e.g., eyes, ears) of qualified consumers, typically procured by advertising and promotion of merchant's products and/or services (PS) in the most efficient/cost-effective fashion. The service economy in developed countries is mostly concentrated in financial services, hospitality, retail, health/wellness, leisure/entertainment, personal services, information technology and education (e.g., NAICS). Virtually every product today has a service component associated with it. (So my use of the word "merchant" also applies to the purveyors of all services). Many service professionals, would avail themselves of online advertising services, if only these services were intuitively obvious (e.g., simple, easy to understand & use) and return-on-investment (ROI) was rapidly (e.g., in quasi-real-time, timely) measurable and actionable (i.e., informative feedback with adequate time for corrective action available).

The online advertising community understands a "sticky" (i.e., stay on site longer, come back frequently and/or repeatedly) user experience (UX) is a major online client "magnet." It is generally accepted that "all else being equal," the better (e.g., timely informative analytics) the MSME advertiser's user experience (UX), the better the ability to target 'qualified" consumers, the greater the likelihood of their subsequent conversion-to-purchasing (CTP) the products and/or services (PS). Creation of a custom channel for targetable Ad placement by merchants requires many steps and many decisions. Currently, this is accomplished through a very challenging (user-unfriendly) website-interface resulting in a tedious user experience (UX) from an expensive campaign. Indeed, the user experience (UX) for online merchant advertising, particularly for micro-small-medium sized (USD 1M to 100 Million gross income) business enterprises (MSMEs) has not received adequate innovative effort, as these user interfaces (UIs) tend to be plain, mostly fill-in-the-box type of user experience (UX). Hence identifying and attracting merchant clients, in need of advertising campaigns is easier done through direct enterprise marketing, which is mainly to large corporate and large brand clients. The needs of advertising MSME products and services (PS) online, by providing a user experience (UX) that is "friendly" (i.e., easily & intuitively usable, germane & narrowly targeted Ad delivery, cost-effective) are substantially unaddressed.

Moreover, in current online Ad placement, any misrepresentation or mistakes in performing the Ad placement, will cause the merchant's advertiser to lose bids for a particular (time, demographics, . . . ) placement. Depending on the severity of the misrepresentation, merchant may also lose the ability to place Ad, may have payment adjusted, or have their account disabled. It is in the merchant's best interest, to be savvy in operating the user interface (UI) provided by the Ad publisher. This requires more work by the merchant and hitherto the merchant is likely to simply give up on diligent online Ad placement or seek expensive outside expert help to do it.

The following outlines the state-of-art in: (a) Ad targeting & placement, (b) account management, (c) blind advertising, (d) real-time bidding, (e) performance analytics including CTP attribution, (f) sensor-based advertising networks, (g) Programmatic multi-screen Placement & Privacy Regulations, (h) Gamification of ROI, (i) Habit formation (j) Coupon Rewards based CRM, (k) Vacation-travel planning & buying, (l) Generative Artificial Intelligence (GAI), (m) Artificial Intelligence (AI) Semantic Search (AISS), (n) Web site Scraping (o) URLs & Publications, (p) Terminology and ends with a (q) Unmet Need summary motivating this invention disclosure.

Advertising (Ad) Targeting and Placement (a)

An Ad placement is a specific group of "units" on which a merchant's advertiser can choose to place their Ads using targeted placement. Ad placements can be as broad as an entire website or as specific as a single Ad unit. Placements are made visible to advertisers in three ways: (1) Each publisher's website in the network is made available to advertisers as a "placement" where they can target their ads. Currently, when advertisers target this type of placement, their Ads may appear anywhere on the website, (2) Merchants have the ability to define their own Ad placements using alternate custom channels. Merchant choose to group together specific Ad units on a site where advertisers will be able to target. Common ways include grouping Ad units into custom channels are by topic, Ad format, or location on a page. When advertisers target publisher-defined ad placements, their Ads may only appear in the specific Ad units the publisher has selected, and (3) Banner Ads are placed based on selected placement parameters: demographics, topics, Geo-fencing, Ad format, click-through-rate (CTR), etc. W.

Froloff has disclosed a method for displaying of stackable mobile banner ads to save limited display space on the mobile phone. This is akin to a topical rolodex or deck of cards with user notes. W. Froloff has also discloses an activity based mobile Ad delivery system. Here the mobile consumer's app activity is determined by software running in the background. Then, ads are presented based on consumer's app driven activity.

Merchant Ad Account Management (b)

To help merchant clients with the complexity of building and managing Ad publisher models, publishers issue accounts to businesses, so that Merchants can order advertising through search engine key words/phrases, such as, Ad-words™ and display their Ad content. Fundamentally, these are "complex bets" (e.g., wagers with uncertain hunches & outcomes), which allocate the available advertising budget, in the hope of gaining future business benefits i.e., positive ROI (return-on-investment). Marketing/Ad agencies and consultants offer account management, as a business service. This has allowed MSME businesses, without advertising expertise to reach US & global consumers online. Indeed, one large advertiser started an Advertising Professionals program to certify agencies and consultants, who had met specific qualifications and passed an exam. They also provide account management software, to facilitate the creation and selecting of web Ads.

Other user interfaces (UI) feature that Ad providers offered is access to a dashboard summary of several, potentially concurrent (Omnichannel) accounts (online, radio, TV, newspaper, . . . ), which allowed Merchants financial movement between these accounts, without the need for logging into each account category. These Ad serving/Ad targeting/Analytics/Measurement/Optimization provider entities include, 65 Sense, Adobe Experience, Crazy Egg, Google Analytics, Hot Jar, Marketo, Mintigo, TrippleLift, AppNexus, DoubleClick, LiveIntent, Bizible, Drift, Distillery, Dynamic Yield, Evidon, Facebook, reCAPTCHA, Outbrain, Yahoo!, Linkedin, YouTube, Adsense, Fonts, Twitter, Tag Manager, OpenX, Pubmatic, Iponweb, jsDelivr, MedisMath, NextRoll, Taboola, . . . (also review [0019])

To date, the bulk of the user experience (UX) for merchants is acquired by learning the complexity of web Ad marketing or hiring a professional. Most MSMEs (micro small and medium enterprises) Merchants cannot be expected to take time out to master the ever-changing complexity either. In fact, about 85% of MSMEs in the USA do not use these web based Ad placement services, because they cannot afford to hire expensive professional help.

Blind and "not-so-Blind" (Targeted) Ad-Word Based Advertising (c)

Over 150 years ago, the advertising maven, John Wanamaker observed: "Half the money I spend on advertising is wasted; the trouble is I dont know which half." This endemic inefficiency continues to cause significant losses even today, even though there are many more channels of advertising and marketing. Blind advertising (Ad) networks typically disseminate merchant product and/or service (P/S) advertising, via: (a) Newspapers/Web pages/Text messaging/Billboards, (b) Radio, (c) Television, (d) Digital Signage, or (e) internet-of-everything (IOE), in-home appliances, automobiles, to whoever is: (1) reading, (2) listening, or (3) both viewing & listening.

Using key words (e.g., Ad-words), a number of Internet service providers (e.g., Google, Yahoo, AoL, Amazon, Beyond, . . . ) & mobile network operators (MNOs) (e.g., AT&T, Sprint, Verizon, . . . ), mobile virtual network operators (MVNOs) and their SME merchant clients, who are able to insert Ads for display on a supplementary panel, on the electronic display screen, based on search terms being used by the potential consumer, to ensure relevance. Several companies (e.g., Adobe) assist merchants optimize purchase & optimize use of these key words to execute marketing campaigns, which are typically expensive (~$100K+) for most small and medium sized businesses enterprises (MSMEs). However many MSMEs and large significant enterprises (LSEs) do buy Ad-words from Google to get their ads included in Google's on-line search facility, for example. Moreover, there is a plethora of advisory entities performing search engine optimization (SEO) by cleverly and carefully selecting a collection of key words to overcome the more than 150 relevance criteria used, by search engines (e.g., Google), or by paying more per Ad impression, for example, to get the merchant's Ads ranked high enough to get the potential consumer's attention, in terms of the time-duration of consumer (e.g., mobile phone, static display, . . . ) eyeballs-on-screen & ears-on-speakers. Current keyword based Ad networks have a higher consumer click-through-rate (CTR), to motivate the consumer viewing a detailed offer or purchase decision, compared to "blind" newspaper and radio based networks. However, both categories tend to have a relatively low "conversion-to-purchase" (CTP) rate (<10%) to an actual purchase in a reasonable time (e.g., <1 week). The purchase conversion event is sometimes correlated to Ad placement in the case of a click-through (CT) Ad/coupon offer and acceptance, but that correlation is not typically included in the analytics.

Real-Time Bidding (RTB)—(d)

RTB is a cost-effective approach for merchants to identify, target, bid and buy placements on a budget. Every time an Ad (placement) slot associated with a consumer becomes available, due to a new consumer prospect opening a mobile app or web page, a RTB exchange makes that Ad impression slot available for merchant bidding. The RTB exchange (e.g., Fiksu) delivers the ad to the auction winner within milliseconds. Note that slot availability is a random occurrence and typically consumer demographics are known, subject to legally "fluid" privacy issues (e.g., use of PH-personally identifiable information) and liabilities arising therefrom. Many technically feasible Ad targeting concepts are legally and emotionally frowned upon by consumers. Violating these consumer sensitivities may result in adverse (media) publicity and consumer hostility toward many in the product/service (PS) value chain, thereby negating the costs & anticipated beneficial effects of placing the corresponding Ads, often within a few milliseconds (see Rocket Fuel). Current RTB offerings & technology demand that merchants engage in high-speed bidding using fast very Ad placement servers & merchant-provider communication. I disclose an alternative system & method (S&M) herein, in sharp contrast to these prior S&Ms, but superior in attaining the ultimate interest of both Merchants & Consumers, namely, timely & efficient targeted consumer conversion-to-purchase (CTP).

Performance Analytics: Web and Mobile (e)

Many entities, big and small, provide big-data (size, velocity, . . . ) performance analytics tool suites and dashboards, including Adobe, Pentaho, etc. Typically, the dashboards have to be customized to meet each customer's performance feedback requirements. This customization adds yet another layer of complexity for the typically novice advertiser-user (e.g., MSMEs), because of the steep learning curve, caused by the typically un-friendly Ad placement UI.

Emerging Intelligent Sensor Advertising Networks (f)

Recently, more intelligent advertising networks have been and are being implemented using: (1) location-based systems (LBS), (2) time-based system (TBS), (3) demographics-based system (DBS), (4) complex-event-coincidence (CEC) based systems, (5) Activity Based Systems (ABS), and (6) Emotion Based Systems (EBS). However, the efficient & easy management of these systems in an integrated merchant user-friendly manner is glaringly absent, resulting in adoption resistance.

These sensor-based advertising networks use one or more of the following parameters: (1) current (global positioning satellite (GPS) or cell tower timing-triangulation based) Geographic location (GLO) & accelerometer/gyro sensor-based velocity (SBV), (2) in-store RF beacons, (3) time-of-arrival (TOA) & proximity, (4) current consumer activity (CCA), (5) activity/emotion inferred (AEI) or expressed (AEE) have been hinted at, qualitatively. Some of these concepts have been deployed, whereas, others are still in early development. Moreover, some have hitherto been used for complex event coincidence (CEC) based targeting of Ads to consumers. However, there ae few, albeit expensive, cohesive integrated systems & methods, enabling SMEs, to cost-effectively utilize these emerging technology, in a user-friendly manner, without a prohibitively steep learning curve & recurring cost.

Current Geographic Location (GLO) & Sensor based velocity (SBV) are now available from a variety of sensors & algorithms incorporated in the smart-phone, for example. Measuring this information and using route mapping data (e.g., Google, Apple, Microsoft, . . . ), and current average transportation rates (e.g., 3 minute range: walking-300 ft, jogging/rollerblading-1500 ft, bicycling-3000 ft, motorcycle/automobile-6000 ft, . . . ), enabling time-of arrival (TOA) to be estimated. Consumer can either directly (express: text, voice, . . . ) or indirectly (sensor data, apps being used, . . . ) disclose their current consumer activity (CCA). Versions of an "App launcher" or remote-test utility are available to do this monitoring, for example. Finally, context based consumer's intended activity can be inferred (AIl) implicitly (e.g., sensor data, texting apps, voice input being used) or activity can be explicitly expressed (AEE). Thus the consumers intended sequence of activities could be "predicted" by currently available technology but this has not been done, to date, in an integrated end-to-end manner.

Ad agencies and brokers generally use the web interfaces provided by the Ad publisher, to place the Ads in the Ad network. As with traditional Ads, good feedback on Ad effectiveness is not inexpensive or easy, but has improved through the use of analytics, which is another technology with a user interface that requires training & expertise, and hence becomes an additional cost (initial, recurring) to the merchant.

Furthermore, the consumers are irritated by the unacceptably large number of irrelevant Ads they are repeatedly bombarded with. This irritation is further exacerbated by a repetition of the Ad, even though the PS being advertised has already been converted to a purchase (CTP) by the consumer. The blind and even premium blind networks are not intelligent enough to target their Ads to any granularity smaller than the demographics purchased. Hence the merchants suffer, as they need their products and services (PS) impressions to be delivered one-on-one only to those in need of them, not everybody else. But the methods of placing Ads are both tedious and require extra knowledge in marketing-sales demographic jargon and expertise, which the average merchant lacks. The average merchant, typically operating on a thin margin, is concerned with running their enterprise day-to-day, and the currently complex world of online marketing is not something they have time or inclination to learn. Hence what is needed is an online user interface (UI) and user (friendly) experience (UX) for merchants, whereby particularly the frugal MSMEs & LSEs with business savvy, can quickly make common sense Ad placement decisions and receive timely feedback result of their advertising placement decisions in a visually simple and quick way.

An element that all these current systems have in common is their unacceptably weak, tedious user experience (UX) for the Advertising placement entity. Moreover, the efficient management (input, output, feedback) management of these systems in an integrated merchant user-friendly manner is glaringly absent, resulting in adoption resistance.

According to the American Advertising Federation, 23% of the $88 billion spent on advertising in 2022 was wasteful, misdirected, and a scam. This means that approximately $20 billion was wasted on advertising that did not reach its intended audience or was not effective in generating sales. There are a number of reasons why advertising can be wasteful. Some common causes include: (a) Poor targeting: Advertising that is not targeted to the right audience is likely to be ineffective. For example, an ad for a new sports car that is only seen by senior citizens is unlikely to generate sales. (b) Creative that does not resonate: Advertising that is not creative or engaging is likely to be ignored by consumers. For example, an ad for a new detergent that is simply a list of features is unlikely to be memorable or effective. (c) Misplacement: Advertising that is placed in the wrong media channel is likely to be ineffective. For example, an ad for a new clothing line that is only seen in a business magazine is unlikely to reach consumers who are interested in fashion. In addition to these common causes, there are a number of scams that can result in wasted advertising spending. Some common scams include: (a) Fake clicks: Scammers can create fake clicks on ads, which can make it appear as though the ad is more effective than it actually is. (b) Click fraud: Scammers can use bots to click on ads repeatedly, which can drive up the cost of the ad and make it difficult for the advertiser to reach their target audience. (c) Misrepresentation: Scammers can misrepresent the effectiveness of their advertising services, which can lead to advertisers wasting their money on ineffective campaigns.

Programmatic Placement, Contextual Ads & Privacy Regs (g)

By measuring Ad response using GPS location tracking of consumers to merchant's "front door" some digital Ad placement providers (DAPPs), such as, xAd, Rocket Fuel, etc. are able to estimate consumer Ad response (CAR). Using programmatic targeting (algorithmic Ad buy strategies), using on a variety of data sources, including cookie tracking, DAPP's can estimate response improvement (e.g., Turn), using Ad repetition rate (ARR), to promote brand recognition and loyalty. For instance, this consumer targeting process is made more effective, using near real-time cross-device ID/profile data correlation, for example, enabled by Facebook (FB) and its partners, using analytics to identify & track individual preferences; however, many find such a PII data based system to be alarmingly intrusive.

In the domain of buying TV Ad commercials from providers like Cox, which also handles inventory for DishNetwork and SuddenLink, programmatic tools from Clypd are used by Google, BrightRoll, dataXu, Accordant Media, Tube Mogul, Turn, Collective, The Trade Desk, etc., to identify targets and track campaign data. For example, a buyer can place an order for million men in their 20s and the commercial will be shown, if/when profile matches. Moreover, because consumers with mobile phones, who go back-forth among retailers, need a seamless experience, Stylr enables shoppers to find clothes. Walmart, acquiring Stylr notes that 65% customers use smartphones, rising to over 80% for under age 35. Furthermore, Smartphone usage exceeds TV watching.

Multi-Channel/Omni-channel Ad presentation strategies is often an aspirational attempt (e.g., Chapman Cubine Adams & Hussey) to maximize performance of each Ad channel, regardless of consumer experience. Whereas, Omni-channel Ad presentation strategies aspirationally attempt (e.g., Enlighten) to enhance consumer experience across multiple channels seamlessly. Capital allocation strategies to provide a seamless consumer experience require as yet uncertain case-by-case analytics (e.g., eClerx). However, these emerging merchant-focused algorithmic Ad buy technology applications enable Ad delivery, often at the expense of intrusive consumer privacy (PII) tracking. Moreover, conventional Ad placement (buy) agencies are becoming increasingly obsolete, because the merchants are shifting over to DAPPs (Digital Ad Placement Providers) and making Ad buys in-house, except for non-digital static Ad display channels (e.g., newspaper, billboard). Consumers are increasingly upset by unwanted/unauthorized personal tracking and responsive legislators are passing laws to deter privacy intrusion.

Gamification for Return-On-Investment-ROI (h)

It is widely understood that DAPPs need to engage & entertain & delight consumer-buyers (e.g., CPC Strategy). However, timely, exciting and entertaining User Experience (UX) is critical to promoting enthusiastic repeated participation by merchant-players by reducing the drudgery & tedium in the unavoidable activities associated with the timely business decision-making of digital advertisement placement (e.g., when, where, how, cost). Design processes need to primarily optimize human motivation, engagement and/or feelings (e.g., delighted, satisfied, accomplished), relegating functionality and efficiency to secondary level of attributes, as many successful game and gaming industry products are designed and implemented to do. Generally accepted "core drivers" include goal-meaningful, skill-development, action-creativity, wealth accumulation-mastery, social reward accolades, scarce timely payoffs, unpredictability, risk reduction. Each participating merchant-player needs to progress through discovery (i.e., why), onboarding (i.e., rules, tools), Scaffolding (i.e., action repetition sequence proficiency), and Maven retention. Generally merchant-players come with differing "mindsets" (e.g., Socializers, Explorers, Achievers, Masters). In the present context, merchant-players need to be motivated to continually improve their ROI, to survive and thrive, thereby making this an inherently evergreen (i.e., never ending, eternal) gamification end-game opportunity (Yu Kai Chou).

Habit Formation Mechanisms (i)

A related issue is the fostering of habit formation modeling by Nir Eyal, based on providing a closed-loop comprised of trigger, action, (varying) reward and motivate (by provide informational feedback of current performance) to further (Ad) investment. In contrast, this disclosure is focused on enabling Merchants to "enthusiastically" participate in executing timely Ad placement, to recursively improve their performance (e.g., CTP: cash-flow reward, building brand recognition/loyalty, gaining consumer behavioral insights, . . . ), thereby practically embodying gamification concepts, outlined in (h). Over a relatively short period of time (e.g., weeks) such a periodic (e.g., daily) "wagering bid" ritual has a strong likelihood of becoming a habit.

Coupon Rewards & Customer Relationship Management (CRM)—(j)

A few of the LSEs do provide a web interface to consumers, such as, Groupon, Living Social, etc. to give consumer-buyers a coupon discount for products concurrently selected by many buyers, typically on a daily basis. Moreover, all these entities pretty much lack motivational techniques, for buyers to freely, expressly, or inferentially, disclose several products/services (PS), including their needed/wanted (NW), activities & attractions (AA) to the array of selling merchant entities.

Commercially available off-the-shelf CRM tool suites are noted in the survey URLs. Selection parameters include, Ease of use, Contact-management features, Lead-generation tools, Sales and marketing tools, Employee-tracking capabilities, Customization options, Automation capabilities, Third-party integration, Reporting and analytics, Mobile access. In the present context, customization features such as, $3^{rd}$ party application programming interfaces (APIs) is critical to avoid "reinventing the wheel," while facilitating customization. Specifically, available Customer Relationship Management (CRM) tool-suites have to be narrowly re-focused on buyers, thereby enabling the seller to cater the player's expressed & inferred needs-wants (NW), in a just-in-time (JIT) manner, promoting a broad range of PSAA conversion-to-purchase (CTP), to increase revenue and providing a superior customer-player responsive experience, leading to repeat buying customer. Entities, such as, Harrahs Corp. has implemented a version of CRM with a focus on casino gaming players, to manage Casino property holdings. But, Harrahs' concept is not broadly applicable "as is" to generic buyer-consumers (BCs), who together with generic seller-merchants (SMs) are, the focus of this disclosure.

Vacation Travel Planning & Buying (k)

Vacation travel planning & execution is a time consuming process for the individual or group of individuals based on shared "affinity" (e.g., wineries, golfing, historical landmarks, social-cultural-athletic events, . . . ) and associated travel modalities (e.g., airlines, cruise lines, trains, buses, automobiles, bicycles, boats, . . . ), to sequence through the prioritized NW activities & attractions (AA), in a timely manner. The planner has to reserve and pay, in part or whole, for AA and overnight accommodation at appropriate hotel-casino resort property. Conventional brick-mortar (BM)

travel agencies are evolving into agencies that hire outside (independent contractor) travel agents, who are in-fact self-planning vacation-travel buffs, motivated by discounts offered.

Generative Artificial Intelligence (GAI)—(l)

Analytic processing algorithms such as, Machine Learning (ML) & Neural Networks (NN) technology has progressed to the point of what is now referred to as Generative AI. The usage of deep neural networks with billion plus nodes, which can be trained on large language models (LLM), to generate responses to user queries in a more organized manner. However, these computer generated responses tend to be biased by training data anomalies (Hallucinations). Generative AI, as yet, cannot "think outside-the-box." But it can "regurgitate" in a somewhat "superficially" convincing manner what it has been fed and "trained on," as "ground truth." The inferences that GAI can arrive at are based on the foundational data, albeit in very large (Gigabyte, Terabyte, . . . ) amounts, which it has been trained on. GAI can "reconcile" alternative opinions and provide a reasonable sounding analysis, but it cannot discern the "facts" or "causality" linkages yet, particularly if the input data is significantly fuzzy or "polluted." GAI relies on "maximum likelihood estimation," or modifications thereof (eg, Fuzzy logic), which can often be adequate, because it lacks the ability to understand & make "causal" linkages. Correlation does not necessarily imply causality.

However, the results of GAI are still substantially impressive compared to conventional data analytics and are very likely to affect a number of subjective PSAA marketing & sales activities, although a large quantity of data needs to be processed (correlated), which is quantitively difficult for humans to do. McKinsey consultants has identified a number of use cases, such as: (1) market lead identification (real time, trending), (2) Marketing optimization (A/B testing, Search Engine Optimization), (3) Personalized responses (Chatbots), (4) Dynamic content generation (marketing Ads), (5) Up-Cross selling (usage patterns), (6) Success Analytics (churn modeling), (7) Marketing Analytics (dynamic targeting), (8) Sales Analytics (Predictive pricing), (9) Marketing Campaigns (Personalized), etc.

Major entities with product offerings in GAI include, Open AI (ChatGpt4, etc), Anthropic, Cohere, Runway (MLOPs-workflows), Jasper, Replit, Inflection, Stability, Glean (Adaptive/Deep learning LLM), etc. Other emerging entities that provide data driven insights include, Data iku (Churn, Predictive Analytics), OxyLabs (Web/Ecommerce scraping API), FedML (Octopus cross-server), SensX/Warp script (API library). Recently, Wolfram has released a version of Alpha, coupled to ChatGpt4 to enable numerical computations, thereby augmenting text-voice-pictures generation by other AI vendors.

The practical AI processing sequence typically begins with a "prompt" input to a "narrow AI" large language model (LLM), which is a pre-trained & fine-tuned version of a (narrow knowledge domain) foundational LLM. The output of narrow AI is "Actionable Intelligence," being sought by the user.

The typical Deep RNN (Recurrent Neural Network) based AI processing pipeline (LLMOps) is (1) Ingest & vectorize data source input, (2) ensure dataset consistency, (3) execute Deep NN Pipeline, (4) Generate Large Language Model, (5) Perform Model Training & Compression (6) Input New Queries & response, (7) assess Performance Statistics (8) feedback to DRNN to modify RNN weights.

Open source LLM code is available from Big Science (Bloom), Stability AI (Stable Diffusion), Google (FlanT5), Eleuther AI (Pythia). The "Narrow AI" system generated by training "foundational LLM" with domain specific "prompt & result" examples have to be evaluated by products, such as, HoneyHive and Langchain. "Opera one" has integrated prompts with ChatGPT, empowering the user with AI-powered suggestions & assistance, while surfing the web. "Prompt engineering" is applied LLMs to efficiently extract germane information rapidly.

AI Semantic Search (AISS) for Real-Time E Commerce Search Personalization (m)

Semantic search based analytic processing has been successfully used by many entities including Google, Pinterest, Alibaba, Amazon, eBay, Taobao, JD, Baidu., for personalized E-Commerce. One candidate strategy is to match, pre-rank, rank, re-rank. But, how to effectively retrieve the most relevant products to meet consumer's Needs-Wants (NW), in terms of privacy limited historical behavior & query semantics, still remains a challenging task. However, prompt engineering can accelerate the automation of this search for buyer-consumers (BCs)

Current foundational LLM development methodology is based on Bayes network based Maximum Likelihood algorithms, which are unsuited to performing "cause-effect" reasoning required for semantic search. Causal AI models are able to capture cause-effect relationships, leading to more sophisticated reasoning and decision-making. But algorithms and API (application program interface) are still under development.

Website Scraping (n)

Typically "scraping" of a seller-Merchant (SM) website is done to extract all the PSAA being offered by said SM. This is accomplished by a set of APIs. Various 3' party entities (e.g., OxyLabs, . . . ) provide such scraping services. However, the entire website is scraped and data is extracted, which is costly & unnecessary & privacy infringing in the context of this disclosure.

Terminology (o)

Citations are provided for Advertising terminology dictionaries applicable to: Internet/Web (e.g., WhatIs), Mobile (e.g., DM corp.), Signage (e.g., Gerba), and Casino gaming & social game industries (e.g., U.S. Pat. No. 8,123,618). In case of contradiction, more recent publications prevail. However, the lexicon & illustrations of this disclosure resolve conflicting alternatives and have interpretation priority.

Need Summary Motivating this Disclosure (p)

What is needed are simpler, but not dumbed-down, cost-effective merchant-friendly (MF) and consumer-friendly (CF) user-interfaces (UI) leading to a friendly, engaging, perhaps "enthusiastic" sticky (recurring usage) user-experience (UX) for cost-effective non-intrusive consumer targeting and merchant Ad placement provider (APP) services, with "wager optimization" opportunities to garner progressively higher consumer conversion-to-purchase (CTP), resulting in improvements in Merchant Ad expenditure based ROI (return-on-investment), due to progressively improved CTP. However, consumer NW satisfaction based ROI (eg, published list-price reduction) tools are also needed. Seamless integration of these diverse and disjoint requirements is facilitated by employing the principals of gamification. Moreover, there is a need for visiting consumer-buyer (CB) trip/vacation planning tools, wherein seller-merchant's (SMs)"bid" & buyer-consumer's (BCs) "ask" for a broad range of Products & Services, including Activities & Attractions (ie, PSAA), at the "best" (e.g., using "dynamic" loss-leader discounts, cross-up selling), seasonally available price & delivery schedule, integration to arrive at a mutually affordable/constrained price-delivery deal, particularly at destination resorts, to promote/motivate buyer-consumer (BC) visits to brick-mortar (BM) merchant establishments thereby deterring "show-rooming" and facilitate on-premise "up-selling & cross-selling to prospective buyer-consumers (BC). Moreover, BCs have to be further attracted by "sticky" gamification of the buying process and SMs have to be attracted by "sticky" selling process, including bidding on timely multi-channel/Omni-channel (MCOC) advertising slots.

Notation

The following itemizes frequently used symbols to provide a baseline data structure reference for this disclosure, thereby enabling software coders to use one or more of several languages (e.g., Java, Javascript, C, C++, Python, PHP, Scala, . . . ) of their choice, to code the algorithms (i.e., control structures, data structures, indices) disclosed (or referenced to avoid prolixity) herein. This is preferable to providing software listings, because PHOSITA can comprehend the entire architecture and readily make various changes, including logically straightforward alterations (i.e., additions, deletions) to the disclosed algorithm processing sequence easily, while remaining within the scope of this disclosure. Note that in the following, the time-interval discretization of 1.5 minutes/segment (DTOA~74, DTOD~98 and hence TOD based SM bid auction is an illustrative compromise, based on ensuring fairness of: timely wagering (e.g., bid, ad, coupon discount) from competing MSME/LSE merchants, performing bid sorting, auctioning, Ad allocation & Ad transmission to available opt-in buyer-consumer displays in a timely manner. Clearly, a smaller time-discretization interval, selected at the service provider's discretion, will necessitate installation & provisioning of a larger (cloud) server compute & communication capacity and correspondingly increase TEGOBAMA~315-317, 322 based on current technology. Allowable discretization values could numerically be as small as say $\frac{1}{10}$ second or 1 millisecond. However, both the SM & BC decision-making process is often significantly slower (e.g., ~3 minutes). So, MSMEs/LSEs making bid/Ad placement decisions, with limited feedback (e.g., prior conversion-to-purchase history: CTP~237) information, need not be significantly faster or effective, which is comports with the information theoretic bound, as per Shannon sampling rate. Does not pay to "Shanghai" buyer-consumers. Furthermore, the suggested judiciously selected synchronous (Cloud) server cycle time (i.e., 1.5 minutes=90 seconds), used herein for illustrative purposes is my judicious balance between implementation cost, consumer spam reduction and time required for: competing seller-merchant wagering, Ad effectiveness feedback, non-deterministic consumer decision-making & eventual BC conversion-to-purchase (CTP), etc. In summary, this invention discloses systems & methods of utilizing dynamically changing, somewhat unpredictable consumer intent, activity and expressed feelings, to deliver timely, constructive Ad information to the buyer-consumer, on products & services, in a cost-effective and targeted manner, without annoying the consumer with spam Ads and intrusively collecting personally identifiable information (PII) on consumers, absent permission. Novel game playing concepts include, (a) Personalized (personally selected): Ads sent to buyer-consumer's game device display and (b) Non-personalized (selected by Merchant-sellers): select the Ads, after observing and understanding, buyer-player preferences.

Index, Symbol & Comments
 l=registered merchant ID~25
 h=merchant (l)-specific targeted consumer ID~191 [e.g., encrypted by Provider (RDPP) to secure PII]
 r=Provider (RDPP~315-317) single time zone geo-region for Ad (m) delivery (k) seg., to consumer (h)
 k=TOD/DTOD~27/98 time-of-day & segment (seg.) discretization (discr) index
 j=ID (index) for ESTAOD (~30); indexed itemization based on Table I-IV (e.g., NAICS)
 i=TOA/DTOA~26/74 consumer (h)-to-merchant (l) time-of-arrival & segment (seg.) discr. index
 d=DOW (day-of-week) index~150
 w=WOY (Week-of-year) index~160
 mt.=minutes
 m=Merchant (l) collateral inventory of Ads in an indexed array~238
 lb=discretized bid magnitude
 ps=ID for discounted products & Services (P/S)~115/114, offered via Provider (RDPP~315-317)
 dx=response delay to action in terms of a discrete integer multiple of DTOD~98
 sa=Available slots on consumer Ad presentation/display ID itemization~258
 EGOB-AMA=Efficient Gamified Online Bidding-Advertising on Multiple screens & Analytics
 BRM=Buyer Relationship Management (Real-Time Dynamic response based on buyer purchases)
 TQC=Targeted Qualified Consumer (requires expressed or inferred intent to purchase)
 CRM=Consumer Relationship Management (Prior Art)
 BP=Buyer-Players: Consumers, Price Bid
 NB=number of Active Buyers in current (time) segment
 DAB=Daily Active Buyers (24 hour summation)
 DBP=Daily Buyer Play-time (24 hour summation); Personalized Vs Non-Personalized
 DBS=Daily Buyer Search-time (24 hour summation): Personalized Game Icon Search
 DBI=Daily Buyer Iconize-time (24 hour summation): Personalized Game Icon generation
 MAB=Monthly Active Buyers
Index., Symbol & Comments
 MAP=minimum advertised price
 SP=Seller-Players: Merchants, Price Ask
 NS=Number of active Sellers in current (time) Segment
 DAS=Daily Active Sellers (24 hour summation)
 DSP=Daily Seller Play-time (24 hour summation): Seller Auction participation
 DSS=Daily Seller Search-time (24 hour summation): Seller PSAA selection
 DSI=Daily Seller Iconize-time (24 hour summation): Seller PSAA Icon generation
 MAS=Monthly Active Sellers
 RPA=Regional Provider-Administrator
 N=number of distinct icons in a game episode round
 WR=Visible Display Window Rows of Icons
 WC=Visible Display Window Column of Icons MC=Number of Columns
IR=Interconnected Regional
SMS=Text messaging
ONDC=Open Network Digital Commerce (ONDC-India)
TCP/IP=Terminal Control Protocol/Internet Protocol
EINW=Expressed Implied Need Want
Manhattan Distance=actual ground track distance
DPD=Down-payment Deposited by Buyer-Consumer (BC)
PHOSITA=Person-Having-Ordinary-Skill-In-The-Arts
DIY=Do-it-yourself
PBL=Points, Badges & Leader boards (gamification to motivate both Merchants & Consumers)
EI=Expressed/Inferred
(Inter-Net Communication) Protocol=TCP/IP, BEKN, . . .
MSME=micro-small-medium Enterprises;
USA business EBITDA: Micro<$5M; Small<$25M; Medium<$125M
Ad=Advertisement
PSAA=Product-Service-Activity-Attraction
FIFO=First-in/First-out
MAUT=multi attribute utility theory: design of a weighted attribute ranking/selection algorithm Index, Symbol & Comments
  Analytic Processing Algorithms=AI and other Computer algorithmic technology is used to implement
    Analytic Processing: Semantic Search, Machine Learning, Neural Networks, Computer Vision, Data Transformation, NLP (Natural Language Processing, LLM (Large Language Models), Data Mining,
    Data Cleaning, Data Visualization, Histogram/Statistics analysis, Recommendation Engine, ChatBots, Causal AI, . . .
  PERULOOD=Perishable, Excess, Refurbished, Undersold, Loss-Leader, Old, Obsolete, Damaged (PSAA which are PERULOOD are discounted, below MAP, to Buyer-players in a gamified setting)
  MAP="minimum advertised price" to general non-game playing buyer-consumer public
  RNG=Random Number Generator: random selection: without replacement OR with replacement
  COOS=Consumer Opt-out (time) Segment (to delete Ads & ensure consumer-buyer privacy)
  COIS=Consumer Opt-in (time) Segment (allow Ads, preferably germane to buyer's purchasing intent)
  Personalized Game=Game (PSAA) Icons are selected largely by active, registered, Buyer-player.
  Non-personalized Game=ALL Game Icons are selected by active, albeit registered, Sellers-players.
    Non-personalized games are to be deployed in Kiosks or large screen TV or
    Billboard-like game playing displays in public spaces like Shopping centers
    Shopping Malls, including Casino properties
  GCB=Gaming Control Board (regional, typically State-by-State jurisdiction)
Quantity Symbol Index/Span Example/Comment
  Time-of-Day (960 segs/24 hr)~27; TOD (k), k=1, . . . , 1024 e.g., 1.5 mt. seg. (>24 hrs to provide day-to-day overlap).
  Current Time of Day (digital clock)~29; CTOD (k), k=1, . . . , 960 e.g., digital=1.5 mt. (or as small as 9 millisecond increments, subject to available computing resources)
  Delta Time-of-Day segment index~98; DTOD(k), k=1, . . . , 1024 e.g., 1.5 minute (or even as small as 9 millisecond segments, subject to available computing resources).
  Delta-Time-of-Day~98; DTOD (k)=TOD (k+1)-TOD(k); e.g., 1.5 mt (or even as small as 9 milliseconds segments, subject to available computing resources).
  Day-of-Week~150; DOW(d), d=1, . . . , 7; 7 days/week
  Week-of-Year~160; WOY(w), w=1, . . . 52; 52 weeks/year
  Time Zone Fenced I-net Cloud~260; TZIC, r=1, . . . , R
  Regional Digital Ad Placement Provider RDPP (r)~81= (315/316/317), excluding (151+153+318)
  Provider (r) Merchant Bid-Amt Ceiling~121; BAC (r, k), k=1, . . . , 960; e.g., 1.5 mt. (Provider input)
Quantity Symbol Index/Span Example/Comment
  Provider (r) Bid-Amt-Floor~119; BAF (r, k), k=1, . . . 960; e.g., 1.5 mt. (provider input)
  Merchant's~25 ID (seg-by-seg@provider); M(l,k), l=1, . . . , 1, . . . , L registered Merchant M(l) (Merchant=Seller-Merchant=Seller-Player
  Merchant Start-of-day~256; MSOD (l, d, w, k); k=4 AM is k=1@1.5 mt/see, etc.
  Merchant end-of-day~257; MEOD (l, d, w, k); k=3 AM is k=920@1.5 mt/seg
  Merchant (l) Prioritized Ad Network MPAN(l)~153; Video/audio Ads to various device screens
  Brick-Mortar (B-M) Merchant Terms-of-Use: MTOU~216 e.g., PII retention<1 day
  Merchant Functional User Interface~151; MFUI (See TEGOBAMA=FIG.~815 or 816 or 817)
  Dimension~x:40/y:28/z:32; 3-D e.g., Graphical visualization UI (3-D~152)
  CC=Color-Coding~38;
  Merchant User Interfaces MUI: Cartesian~304-307, 311; Polar~303, 308-311;
  Roulette Wheel~312-313; Cards~326
  Merchant User Experience (Metrics) MUX ease-of-use friendly (timely Bid/Ad place),
  informative, attractive (A/V), actionable, efficient
  Quasi-Real-Time (QRT)-wagering~110; QRTW (l, k, j, i); e.g., k=1.5 mt
  Daily Merchant (l) Bid Chip Stack~68 BCS d, w, l
  Merchant Bid (magnitude) Sort/Auction; BSA (k, l)~228; l=1, . . . , L High-to-Low: "Bd"=16, . . . , 0
  Downloaded Coupon [consumer (h)] CDC (k+dd, j, i, h)~234; downloads/segment (k, j, i, h)
  Ad-Repetition-Rate (Merch (l) input) ARR (k, j, l, m)~162 e.g., 1.5 mt.
  Merchant (l) Coupon-Discount schedule CDS (k, j, i)~131; e.g., 1.5 mt.
  Merchant "l" Ad Array (m)~238; MAA (k, j, i, l, m, w, d); m=1, . . . , 32; "m" ads
  Merchant Ad Placement Schedule~239; APS (k-db, j, i, l, m, w, d); M(l)→APS (1, m, . . . )@DTOD(k-db)
  Merchant "l" Bid (bd) @TOD(k-db); BM (k-db, l, bd)~140; bd=0, 1, . . . , 16
  Bid/Ad Win Transmit Pkts (Merch) BAWT (k, j, i, l)~228-230 (RDPP→Ms); e.g. 1.5 mt
  Ad/Coupon/WinTrans Pkt Consumer) ACWT (k, j, i, h)~263 (RDPP~81→TQCs~42); e.g. 1.5 mt
  Wager sort (TOD/TOA); SOWA (k, j, i, l, m)~224 (see FIG. 21~321)
  Alloc Ad to available subsegment~225; ASSA (k, j, i, l, m, w, d)
  Unmet M (l) Wagers over to next seg. UWSO (k, j, i, l)~294

Merchant bid % allocation (in/direct) ESKAPD %~30; h, k, j, I; targeted consumer (h): P/S~115/114
Consumer Emotions E~111; See Table I
Consumer Services S~114; See Table IV
Quantity Symbol Index/Span Example/Comment
 Keywords search (Google, Yahoo, ASK); K~116; Search Engine Optimization (SEO) aid
 Consumer Activity A~112; See Table II & Table III
 Products Offered P~115; See Table IV
 Advertising/marketing/branding (PH); D~113; (h, j, k); Demographic: Age, Gender, Income, 0061]
 Other Merchant Wagers WOM~299; Competing Wagers for Ad slots
 Receive Bid-Ad (Ms→RDPP); RBAC~287 Synchronous QRT process Step 1
 RDPP Sort/Allocate/auction/win queue SAAW~288 """"2
 Short ACWT Pkt (~263) trans.; ACPT~289; (RDPP→TQCs); Sync "3
 Short Ad/Coupon Receive (TQCs) ACRC~290; Sync ""4
 Ad/Coupon Review or Long Ad Reqst ACRL~291; TQCs Ad Rev(A/Sync) 5
 TQCs Visit Brick-Mortar (B/M) CVLD~292; OR Long Ad Review/Decide; (A/sync) "6
 SRCL=Show-Rooming Consumer Loss
 NAICS=North Am. Industry Class System
 Daily BC (h) ID~191; C (k, j, i, h, w, d), h=1, . . . , H; PII is anon/absent
 CUI=Consumer User Interface; e.g., FIG. 1~301 & FIG. 18~318
 Consumer Terms-of-Use CTOU Input (k, d, w): COIS, COOS, EPS, IPS
 Consumer Personally Identifiable Info PII~117 Opt-in minimal acq/store/purge preferred
 Daily Consumer (h) Opt-Out Schedule COOS (h, k)~293; k=1, . . . , 960 akin to DTOD (k)
 Daily Consumer (h) Opt-In schedule COIS (h, k)~109; k=1, . . . , 960 ""
 Consumer h (P/S exclusion in seg k) EPS (h, k, ps)~39; C(h): Excluded P/S (ps)
 Consumer h (P/S desired in seg k) DPS (h, k, ps)~41; C(h): Included P/S (ps)
 Time-Of-Arrival [C(h, l)→M(l)] TOA (h, l, i)~26 e.g., 1.5 mt. segment
 Time-of-Arrival index~26; TOA (h, l, i); i=1, . . . , 960 (12 hrs); e.g., 1.5 mt./DTOA seg.
 Delta Time-of-Arrival~74; DTOA (i)=TOA(h, l, i+1)-TOA (h, l, i)
 Vectored-Manhattan-Time-Of-Arrival VMTA (h, l, i): extension of TOA (h, l, i)~26
 Current Consumer Activity (device) CCA (h, k, j)~112 k=1, . . . , 960
 Activity/Emotion Expressed (text/voice) AEE (h, k, j)~223 k=1, . . . , 960; j=1, . . . , 256
 Activity/Emotion Inferred (compute) AEI (h, k, j)~221; k=1, . . . , 960; j=1, . . . , 256
 Consumer Need/Want N W~61; (h, k, j); expressed/inferred
 C(h) avail Ad Display Device Alloc; MISTKD %~31; (d, w, k, h, sa); multiple display IDs: sa
 Mobile (smart-phone, tablet) MOB~285; 15 Ad slots of 6 sec in each 1.5 mt segment.
Quantity Symbol Index/Span Example/Comment
 IOE (I-net of everything: Cars, Appl.)IOE~286; e.g., 12 Ad slots of 7.5 sec in each 1.5 mt seg.
 Signage (digital): Public In/Out-door SIGN~283: e.g., 12 Ad slots of in each 1.5 mt segment
 TV (Satellite, Cable, IP) TV~281; e.g., 5 Ad sub-slots of 18 sec each 1.5 mt segment
 Kiosk (Café, Casino, Mall) KSK~284; e.g., 10 Ad slots of 9 sec in each 1.5 mt segment
 Device (webTerm, laptop, . . . ) DEM~282; e.g., 6 Ad sub-slots of 15 sec in each 1.5 mt Seg.
 Performance Feedback for Analytics ICOP~268; ROI: TQCs (h)→RDAPP (r)→Ms (l)
 Consumer "h" response to MS"l" Ads ICOP~268; w, d, k, h, l, m; view, coupon, visit, conversion
 (Consumer=Buyer-Consumer=Buyer-Player)
 Inferred Intent mapping IPSM; ESTAOD (~30)☐ Table I-IV (ps)
 Max Number of Ads/Consumer NAD (k, j, i), k, j, i
 Ad Weighted Consumers AWC (k, j, i), k, j, i
 Bid Weighted Merchants BWM1 (k, j, i), k, j, I; #C>#M
 Bid Weighted Merchants BWM2 (k, j, i), k, j, I; #M>#C
 BWM (k, j, i) & BWM1/Consumer N (k, j, i)=Integer #C>#M
 Consumer/BWM2 NN (k, j, i) Integer #M>#C
 NN/8 NNN (k, j, i) Integer #M>#C
 Cumulative Response Delay~(237~231) D (dx); w, d, k, l, h correlate BM to ABS, CDS, etc
 Bid placement advance (T0)~231 -db """""
 Click-Through delay=T1-T0=~(233~231)+dc """"
 AD Download delay=T2-T1=~(261~233)+dd"
 Occupancy delay=T3-T2=~(265~261)+do """""
 Purchase delay=T4-T3=~(236~265)+dp """"
 Revenue delay=~(237~236)+dr """""
 Merchant (l) Occupy Level~297; EOL (k, l)=#C/M (k, l) # consumers(h) on M(l) site
 Delayed Estb. Occupy Level~298; DEOL (k+do, l), k, l #C/M(k, l)
 Conversion-to-Purchase~51; CTP (k+dp, j, i), k, j, i #C/segment (k, j, i)
 Gross-Revenue coupon~245; GRC (k+dr, j, i), k, j, i (e.g., GRC=16 levels/segment)
 Click-Through Consumer (h)/Seg CTC/S(k, j, i, h, l), k, j, i, h, l
 Total Click-Thru Ad per Seg~261; TCAS (k, j, i, h, l, m), k, j, i, h, l, in
 Click-Thru-Consumer (h)-Rate; CTC (k+dc, j, i, h, l, m); k, j, i, h, l, m; #C(h)/seg(k, j, i, h, l, m)
 Gross Daily profit GDP
Quantity Symbol Index/Span Example/Comment
 Net daily Profit NTP
 Ad performance Outcome APO
 Return-on-Investment (generic)~270; ROI
 Prior Bid Amt Tot~271; PBAT
 Prior Conversion Purchase Total~272; PCPT
 Current Bid Amount Total~273; CBAT
 Current Conversion Purchase Tot~274; CCPT
 Prior Shifted Conversion Return~275; PSCR
 Current Shifted Conversion Total~276; CSCR
 Prior Bid Return Ratio~277; PBRR
 Current bid Return ratio~278; CBRR
 Week-to-Week Return Improv~279; WWRI
 Weekly Shifted Return Improv~280; WSR
 Net Transaction Profit; NTP
 Performance Index PI
 Location based system LBS: proximity to B-M Merchants
 Geographic Location GLO: e.g. Global-Positioning-Satellite, Cell Tower triangulation
 Sensor based Velocity (Gyro, Accel, . . . ) SBV
 Complex Event Coincidence CEC: detect confluence of unrelated events to offer P/S Demographics Based System DBS: Use PH (e.g., age, gender income, education, interests)

Indoor Beacon Locator IBL: WiFi and/or RF triangulation

Activity based system ABS: Indoor, Outdoor

ESKAPD~30; Emotion/Service/Keyword/Activity/Product/Demographics

MISTKD~31; Mobile/IoE/Signage/TV(IP, Sat; Cable)/Kiosk (Mall)/Desk (web, . . . )

OPP~400; Omni-channel Programmatic Placement (ESTAOD+MISTKD)

Resorts~470; Collection of Destination Resorts "r"

Monterey Bay~480; Destination Resort with substantial economic growth potential

Summary of Invention

The following outlines a system & method for a digital marketplace, from the perspective of: (a) seller-merchant-player (SP), (b) buyer-consumer-Player (BP) and (c) Regional provider-administrators (RPA), all of whom are geographically dispersed; but within a region. The overall objective is to improve RoI (return on Investment) of all participants, with novel systems and methods disclosures for implementation by PHOSITAs. SPs are provided with a more efficient selling process and system, including an Ad wagering/discounting game. BPs are given a more cost-effective buying process and system, earning a sales price discount by playing games.

The disclosed on-line competitive, but "fair," portal system for sellers-merchants-players wagering on targeted qualified consumers (TQCs~42), meeting particular characteristics (e.g., TOA~26, CCA~112, . . . ). This is implemented with a novel gamified [e.g., casino roulette (wheel-table) like], possibly three dimensional (3D) dynamic TQC~42 visualization based, wager placement Merchant user interface (e.g., MUI~312-314), to deliver an "exciting," "persuasive," "compelling" Merchant-Consumer experience (MCX), thereby fostering-merchants to actively, repeatedly, & "enthusiastically" participate in learning, mastering and using a "wager placement" game, with inherently unpredictable "winning outcome" (e.g., CTP~237), thereby replacing an otherwise tedious, lackluster & somewhat depressing process of selling, which is also lacking in timely feedback.

The disclosed gamified process of quasi-real-time wagering (QRTW~110), by the Seller-Merchants-players falls within the genre of mixed "game-of-skill" (e.g., TQC~42 selection parameters: ESKAPD~30 and MISTKD~31) and "game-of-chance" (e.g., bid auction among competing seller-merchants). Other games in this genre include "Poker," for example. However, the wagering (QRTW~110) has to be timely, but does not, in contrast to the card game "Poker" entail "bluffing."

The disclosed regionally dispersed buyer-consumer-centric time-zone (localized) network based portal system, requires a comprehensively coordinated system architecture to appropriately synchronize the transmission of an array of Ads, based on each Seller-merchant's bid placement on a time (TOD~27) segment-by-segment (DTOD~98) basis, during the day, to each seller-merchant-specific TQCs~42, who have also opted-out, on a daily time segment-by-segment (COOS~293) basis. This process begins with targeted Ad array delivery, the evocation of the potential buyer-consumer's interest, via click-through-per-time-slot (CTTS~258/259) Ad viewing, the coupon offer download (CDS~234), then the buyer-consumer's "visit" (EOL~297), real or virtual, culminating in consumer conversion-to-purchase (CTP~237) and payment/credit reconciliation of the 3 parties, namely the consumers, the seller-merchants and the various provider Ad networks (PANs~167/168: Mobile~285, IOE~286, Digital Signage~283, IP/TV~281, Desk/web~282, Kiosk/Casino~284) in purchasing during the various phases of the buyer-consumer's daily life (e.g., omni-channel: at-home, at-work, commute, leisure, entertainment, . . . ). Note that instead of opt-out (COOS~293) segments, the regional (portal) provider-auctioneer may choose to provide the buyer-consumer the ability to "opt-in" (COIS~109) segment-by-segment (DTOD~98). Moreover, the consumer may be provided the ability to "opt-in" (seller-Merchant product/Service In: MPSI~107) or "opt-out" (seller-Merchant Product/Service Out: MPSO~108) certain seller-merchants and/or products and/or services, again on a TOD~27 segment-by-segment (DTOD~98) basis. In all scenarios, the default input is, either "all-in" or "all-out," as per portal provider's (~152) selected implementation, to reduce data entry by buyer-consumers and seller-merchants, to participate in this mutual "money saving" RoI game.

This "gamification" is accomplished by utilizing the disclosed systems & methods, implementing a more precisely/narrowly (Personally) targeted Ad network, which uses each buyer-consumer's dynamically changing preferences (ESKAPD~30): emotions (self-declared, inferred), activities, location, . . . , to effectively "filter out" irrelevant Ads from merchants and transmit only those "targeted" Ads, which are deemed to be currently germane/responsive, to each opt-in buyer-consumer, thereby facilitating the implementation of a broad buyer-consumer-centric Ad transmission/receipt filter (e.g., spam reduction) and thereby improving CTP~237, by attempting to offer the opt-in buyer-consumer what the buyer-consumer expressly-implicitly needs/wants (EINW).

The disclosed regional provider-auctioneer's Ad networks (PANs~167/168) enables timely user-friendly bidding, on currently available qualified opt-in consumers, by seller-merchants in competition with other "local" seller-merchants. The dynamically bid amount on a discrete segment-by-segment (e.g., 1.5 minute duration DTOD~98) basis is driven by each seller-merchant's marketing insights & preferences regarding consumers, including: (1) time-of-arrival (TOA~26) proximity, (2) current consumer activity (CCA~112), (3) subsequent activity/emotions: inferred/expressed (AEI/AEE~221/223), (4) time-of-day & segment (TOD/DTOD~27/98), (5) corresponding seller-Merchant establishment occupancy level (EOL~297), (6) transmission of Ads to buyer-consumers with no necessity for consumers to disclose their personally identifiable information (PII~117) or for the disclosed system to collect them with individualized tags, (7) Providing seller-merchants with a visually attractive user-friendly interface (UX~151) for TOD/EOL ~27/236 based Ad placement~ and Ad targeting, to further reduce Ad spam, (8) Providing seller-merchants with a simulated "wager gaming" experience while placing Ads, (9) Providing seller-merchants with Ad effectiveness results (analytics) at a rapid rate (e.g., quasi-real-time: 90 seconds), by including timely analytics (feedback) on targeted qualified consumers (TQC~42), who actually responded by a click-through-consumer coupon (CTC) download or a buyer-consumer conversion-to-purchase (CTP~237), as a function of the above seller-merchant preference attributes (CCA~112, AEI/AEE~221/223, TOA~26, EOL~297, TOD/DTOD~27/98). This analytics feedback in-turn enables seller-merchant's to periodically (e.g., week-of-year (WOY~160), day-of-week (DOW~150), Time-of-Day TOD~27, . . . ) revise their PS~232 offers (e.g., discount coupons) and their TOD/EOL~27/236 driven bid amounts on the TEGOBAMA (Timely Exciting Gamified Online Bidding Advertising, Multiscreen and Analytics) ~315 PaaS (Platform-as-a-Service) regional (facility) provider-auctioneer.

The key to acquiring loyal buyer-consumers is to integrate discounted shopping, social sharing, and payment processing. The key to supporting brick-mortar seller-Merchants (e.g., MSMEs) and fostering enthusiasm is to provide them with a rapid informationally updated graphical user interface (GUI), with a "friendly" (i.e., gamified) "look-feel" for a seller-merchant-specific multi-attribute (i.e., ESTAOD~30: emotions, services, keywords, activities, products, demographics) online bid placement facility. The incorporation of a gamified Ad placement bidding system & method makes a hitherto random, tedious, expensive, time consuming, albeit essential, activity into an activity that has a tangible opportunity to be monetarily rewarded (CTP~237) frequently (e.g., Time-of-day TOD~27, day-of-week DOW~150, week-of-year WOY~160, . . . ). The disclosed seller-merchant's (gamified wagering) user experience (MUX) is also enhanced by computationally correlating (e.g., response time-delay D~238), each seller-merchant's preferences, as reflected by their multi-segment (e.g., DTOD~98) bidding, with consequential measured sequence of consumer actions: Ad viewing (via system monitoring), coupon download (via system monitoring), seller-merchant establishment visits by consumers (via merchant-by-merchant proprietary feedback), a timely purchase decision and finally consumer's conversion-to-purchase (e.g., CTP~237 payment), perhaps including making delivery commitments (via seller-merchant's feedback to system). The daily Ad placement bidding strategy and the evolving day-to-day & week-to-week "learning" process of bid optimization parametrically, entails: daily Ad selection (text, audio, video), Ad-by-Ad broadcast time, Coupon discount offers. This may be programmatically automated to recursively optimize the buyer-consumer's conversion-to-purchase (CTP~237) rate by time-of-day TOD~27 driven computing the return-on-investment (ROI~270: 277~280) on advertising expenditures and to enable timely readjusting of these expenditures, by analytically aiding the merchant.

It is therefore an object of this invention to significantly reduce the current level of annoying Ad spam traffic emanating from online advertising networks (e.g., [0012], Adwords (~116): Google, Fiksu, . . . ), to the digital communication device being used (e.g., Mobile~285: smart-phone, tablet; stationary~282: Laptop; Desktop, web; Digital signage~283: indoor, outdoor; Wager Gaming/Kiosk devices~284; IP/TV~281), by providing a superior, albeit alternative, Ad selection & delivery platform, in a more carefully targeted non-intrusive manner, to what the buyer-consumers actually currently want on an opt-in (COIS~109) consumer-by-consumer (~191) basis.

Another objective is to enable each seller-merchant M (~25) to bid on their specific buyer-consumer population (TQC~42), who have opted-in (COIS~109), based on these buyer-consumers possessing certain "characteristics of interest" (qualifications) to the seller-merchant, such as, expressed need (AEE~223), intended activity (AEI~221), convenient travel proximity (i.e., time-of-arrival: TOA~26) to the seller-merchant establishment, without the merchant having to collect or having access to personally identifiable information (PII~117) from the consumer. The disclosed system enables brokering the targeted Ad offers, both among competing seller-merchants and between the consumer & merchants, in a "fair" manner, thereby fostering the trust of both groups, namely merchants and consumers. Note that if no visit to the B-M merchant's M~25 establishment is required, then TOA~26 is effectively equal to DTOA~74 (e.g., 1.5 mt.).

Another objective is to send appropriate (narrowly targeted personalized) Ads, including TOA~26 and time duration (DTOA~74) limited discount coupons, from the seller-merchants to the consumers, delivered in a timely manner, so that the selected/targeted buyer-consumers (TQC~42) are motivated to visit the seller-merchant's premises promptly, to further assess the suitability of the merchant's offers, if necessary/required, and subsequently execute a conversion-to-purchase (CTP~237).

Another objective of this disclosure is to mitigate the "show-rooming" effect, which many brick-mortar (B-M) merchants M~25 are experiencing and suffering from: the consumer-customer comes to the establishment to look over the various items (e.g., P/S~115/114) of interest and the offered prices. Then, the buyer-consumer (~191) searches and visits appropriate Internet websites (e.g., Amazon, EBay, Etsy, . . . ) to make the final purchase selection of a comparable PS (~115/114) and pays accordingly. This mitigation is accomplished by: (a) delivering timely (~253/289) localized Ads (i.e., travel path detour minimization (~235), via timely Ad receipt~232/290), (b) narrowly targeted to each opt-in consumer (ESTAOD~30), (c) offering attractive discounts (~287/234) on a first come-first served (FCFS) basis~236, (d) incentives (e.g., discounts~263) for motivating visiting (EOL~297), browsing, & purchasing (CTP~237) on-site seller-merchant's M~25 establishment, and (d) seller-merchant policy of prompt return and exchange privileges on-site at seller-Merchant M~25 premises.

Another objective of this disclosure is to enable buyers-consumers to efficiently & cost-effectively plan their travel/vacations, using a gamification paradigm. One or more buyer-consumers need to be motivated to place an order for a product and/or service and/or activity and/or attraction (PSAA), by "ask" wagering in a periodic auction or on a random outcome game basis, competing for limited availability PSAA, based on seasonally adjusted "bid" offers from one or more merchants, further dynamically discounted via a game paradigm. E-commerce and other websites do not provide a marketplace, where an array of seller-merchants can interact with many buyer-consumers on the internet, to offer them PSAA of current interest to these buyer-consumers, at dynamically discounted prices, via gamification, thereby motivating and exciting buyer-consumers to convert-to-purchase (CTP), sooner rather than later or never. Moreover, unlike conventional E-commerce, this disclosure focuses on 'generous" E-Promotion to offer prospective buyer-consumers with promotional gifts at zero cost to motivate buyers to CTP of desired PSAA, after going on-site to seller-merchant's brick-mortar locations.

Another objective of this disclosure is to enable a broad array of regionally 'localized," albeit competing seller-merchant hosted on a portal, who are concurrently offering to satisfy buyer-consumer's, expressed and/or inferred PSAA needs/wants (EINW), within a gamified entertaining paradigm.

Another objective of this disclosure is to represent each seller-consumers EINW PSAA into a multi-dimensional graphic icon, with hidden dimensions, such as, embedded multimedia data.

Another objective of this disclosure is to incorporate a chatbot ("shopperbot") to serve as each consumers shopping "companion" in performing a GAI (generative AI) "guided search" to find one or more personalized NW based PSAA merchants. This "shopperbot" helps BC (buyer-consumer) by responds to BC queries regarding their NW and guides BC surf the Internet (e.g., USA: TCP/IP; India: BEKN; . . . ), to assist in finding & choosing (subjectively), the "optimum" NW (e.g., Price, functionality, Delivery) PSAA offerings Another objective of this disclosure is to enable each buyer-consumer to prune multiple seller-merchant icons discovered for a NW PSAA.

Another objective of this disclosure is to enable each BC to organize NW icons in a "shopping bag," using a data base utility.

Another objective of this disclosure is to enable each BC to maintain an earned discount prize coupon bag, docketed to flag digital coupon expiry dates Another objective of this disclosure is to enable an internet regional provider auctioneer (RPA) to recommend a collection of cost-effective PSAA icons, thereby enabling BC to review & select from among RPA recommendation, as an alternative to doing a "guided search" to meet BC's NWs, thereby assembling a icon game display more quickly to start game play rapidly.

Another objective of this disclosure is to enable RPAs scalable distributed cloud servers to concurrently support (a) Several SM (seller-merchants) wagering on DTOA slots to place Ads and set discounts on PSAAs of current interest to BCs, (b) Several BCs, searching for SMs who can meet their NWs, to fill their shopping bag with corresponding PSAA icons, (c) Several BCs, each playing a custom iconized game to earn discount coupons for subsequent submission to appropriate SMs, to convert-to-purchase, (d) provide SMs analytic support to model & execute strategies that recursively increase CTP

BRIEF DESCRIPTION OF THE DRAWINGS

The accompanying drawings, which are incorporated in and form an integral part of this invention specification, illustrating alternate embodiments of the invention and, together with the description, serve to teach the underlying principals and choices imbedded in this invention.

FIG. 1~801: shows an example of a working-consumer's (C~191) time-of-day/current-consumer-activity/time-of-arrival (TOD~CCA~TOA~27-112-26) status, together with a Ad stack (~238) opt-in/out schedule (COIS/COOS~109/293), including activity~112/emotion~111: inferred/expressed (AEI/AEE~221/223).

FIG. 2~802: presents a novel deterministic quasi (e.g., DTOD~98: 1.5 minute TOD~27 segment) real-time-wagering (QRTW~110) graphical Merchant (M~25) user interface (MUI), with a time-of-day (TOD~27) circular time-segmented auction grid, to enable each merchant M~25 to bid on their unique 3D color-coded (~38) clusters of opt-in (anonymous)~109 (COIS) targeted qualified consumers (TQCs~42) for wagering (~140) on selectable TOD (~27) segments, including a coupon discount schedule (CDS~263) incorporated in Ad offers, based on several parameters (e.g., TOA~26, AEI/AEE~221/223, Activities~112, . . . ).

FIG. 3~803: shows an example of a Merchant user-friendly 3D interface (UI~151), using a visually appealing, color-coded (~38), polar cylindrical cake-like TOD-~TOA~CCA slice (e.g., DTOD (~98)=1.5 mt. TOD (~27) segment) wagering (~140/238) GUI (~151) scenario, based on FIG. 2.

FIG. 4~804: shows a particular merchant's (~25) viewpoint of Consumer-Current-Activity (CCA~112) in a Cartesian grid, depicting the various activities that the array of opt-in (COIS~109) consumers (~191) are engaged in and their corresponding Time-of-Arrival (TOA~26) to said merchant FIG. 5~805: shows a magnified version of FIG. 4 showing details of Merchant selectable Cartesian grid zones for periodic (e.g., DTOD (~98)=1.5 mt) bidding on TOD~27 segment-by-segment (quasi-real-time=DTOD~98) with cash/asset wager (fiat currency, virtual currency-Bit coin, . . . )~140 denominated chips for competitive wagering on placement of Ads (~238) to attract merchant-specific~25 opt-in (COIS~109) targeted qualified consumers (TQCs~42).

FIG. 8~806: shows a Cartesian 3-D (dimension) visualization of TOA~CCA~TQC (~26-112-42) example snapshot of statistical variations represented by 2 sigma standard deviation boxes of TQCs~42, over each time segment DTOD=TOD (k+1)-TOD (k); DTOD (~98)=1.5 mt., for example.

FIG. 7-807: shows an example of three Merchants M (~25) wagering on Ad placements (~238) with overlapping time-of-arrival (TOA~27) zones, necessitating conflict resolution of Ad allocation: (a) placement, (b) consumer device spam reduction (max Ads/segment limit), (c) consumer's Ad relevance/preference, based on (d) merchant bid process options (Open: competing bids disclosed; Closed: bids confidential; fairness: max/min bid wager range)

FIG. 8~808: shows a novel three Dimensional (3-D) inverted cylindrical pyramidal cake-like shape to enable visualization of clusters (e.g., 84/85/86 like—not shown) of color-coded (~38) Targeted Qualified Consumers (TQCs~42) in each TOD~TOA (~27~26) segment (e.g., DTOD (~98)=1.5 mt duration), as per FIG. 6, with a corresponding "sliding" wagering table for tokenized wagering with colored denomination chips (not shown) on a Need/Want (N/W~61) basis for targeting qualified consumers (TQCs~42), present in merchant preferred TOA~CCA (~27-112) zones, as per FIG. 5. Fixed marker shows current time-of-day (CTOD~29). Going from top-to-bottom, the 3D inverted cylindrical pyramid is formed by progressively smaller merchant M~25 selected TOA disks (7 circles/ellipses), rotating clockwise (CW) at one revolution/24 hr day (nominal).

FIG. 9~809 is akin to FIG. 3 and FIG. 8, except that the stack of rotating disks with merchant selected TOA are uniformly sized, unlike FIG. 8, thereby magnifying the visualization of TQCs~42 for successively smaller TOAs~26. As in FIG. 8, the corresponding TQC~42 are depicted (not shown) above each TOA~26 disk, enabling the merchant to visualize a TOD~27 based statistical distribution (e.g., 2 sigma color coded cubes) of TQC~42, as per FIG. 6.

FIG. 10~810 shows an example of merchant selectable user interface (UI~e.g., 152) comprised of 6 sectorized attributes/facets and corresponding time-of-arrival (e.g., TOA~26) range segments (DTOA~74).

FIG. 11~811: shows an alternate embodiment of bidding on 6 spectrally color-coded (~38; not colored herein) Cartesian line segments in 3D representing 6 TQC~42 attributes/facets of the consumer's purchasing decision triggers (ESKAPD (~30):Emotions~111, Services~114, Keywords~116, Activities~112, Products~115, Demographic~113).

FIG. 12~812: shows a novel merchant~25 selected multilevel Roulette-like Table with a 3D cylindrical cake-like structure with polar coordinates representing several merchant~25 selected time-of-arrivals (TOAs~26) levels (radial-axis), revolving clockwise (CW) around the vertical z~32 axis, at a "natural frequency" (1 rev/24 hr day). Within the time-of-day (TOD~27) concentric circles/ellipses (angular theta axis) forming a 3D cylindrical cake-like volume, available targeted qualified consumers (TQC~42), selected as per the merchant (~25)-specific wager placement on the bid/Ad (~140/238) wagering table, are depicted in clusters, with spectrally organized colors (~38) representing the numerical ranges of the TOD (~27)-varying TQCs (~42); dense clusters are red, sparse clusters are violet, as per FIG. 6, for example.

FIG. 13~813: shows a novel horizontal plane 2-D Roulette-like Table layout, for bid "chip" (~140) wager placement, independently by each Merchant (~25). Each merchant is wagering against unknown wagers (bids/Ads) by other unidentified competing merchants (WOM). The upper portion shows the largest TOA~26 of interest customized to each specific merchant M~25, with the TOD~27 rotating "roulette wheel" like, at 1 revolution/24 hour day. The lower portion shows the various modes necessary to facilitate the implementation of a Merchant user ("friendly") interface (MUI) by "minimally" trained SME merchants (~25) and their advertisement budget managers.

FIG. 14~814: shows a mode setup dashboard, for functional architecture of attribute selection and bid placement. The top row activates bid setup, animation of TQC~42 history, and performance metrics to be computed. The next level enables selection of DTOA/DTOD~74/98 for each of 6 attributes, wagers, animation parameters, analytics desired, and data entry mode.

FIG. 15~815: shows the overall System Functional Block diagram of TEGOBAMA (Timely efficient gamification online bidding for Advertising, Marketing, and Analytics), incorporating a coordinated time-sensitive sequence of actions: (a) an array of Merchant Bidding Terminals, including past performance analytics (bottom of fig~270), (b) an array of opt-in Consumer Smart-Phone/Web Terminals (middle left), and (c) provider's Auction Servers & system display, to resolve all competing merchant bid placement conflicts, resulting in an opt-in (COIS~109) consumer-specific, queued Ad (~238) FIFO (First In-First Out) buffer, for timely transmission to each "targeted qualified consumer" (TQC~42).

FIG. 16~816: shows a third Party Ad Networks (In-app auction~161/225) and API based Auction Engine~168/169/225 (Web, signage, IOE, IPTV, Casino) connectivity, to the Merchant Ad wagering (Mobile, Stationary, Web) and billing sub-system (~164) of FIG. 11.

FIG. 17~817: shows a more detailed version of FIG. 16, showing connectivity to different consumer terminals via different Ad networks. The upper left is the merchant bidding system with an analytics setup/evaluation mode. The rest FIG. 17 on the right, shows the Internet Cloud interfaces to mobile (~168) & stationary (~169) consumers, merchant server and mobile Ad network APIs (~166), search engine auctioning (~167) and other premium (blind) networks (~167).

FIG. 18~818: shows consumer Smart-phone chat UI (~171) for a Rolodex-like stacked (e.g., up to 16) topic based color-coded (~38) banner advertising area (~170) with a periodic (e.g., DTOD=1.5 mt) Ad update rate, thereby enabling several stackable (~190) ad updates/hour (e.g., up to 40 segments) from competing merchants M~25 (e.g., $1^{st}$ sixteen highest ranked bidders) with periodic receipt and display of "winning" bids for each auctioned TOA~CCA (~26-112) segment.

FIG. 19~819 depicts the overall recursive system processing flow cycle, which begins with each consumer C~191 (1, . . . , 1, . . . , H), who has currently opted-in, (COIS~109) as per FIG. 1, and ends with that consumer's conversion-to-purchase (CTP~237) execution of the (discount coupon~287) purchase offer.

FIG. 20~820, flow-diagrams the communication timing sequence between the (a) Ad bid server (~152) and opt-in (~109) consumers (~191) over a set of time-of-day (TOD~27) segments (DTOA~74) and (b) Ad bid server (~152) and the registered bidding merchants (~25) engaged in Ad placement (~231) and Targeting optimization (~325) to improve conversion-to-purchase (CTP~237).

FIG. 21~821 presents a just-in-time (JIT) sequence of steps (e.g., DTOD~98=1.5 mt. duration): wager-auction-placement (3 Synchronous Server-side segments) & select-visit-purchase (3 unpredictable duration Client-side segments). The small/medium business enterprise (SMEs) merchants challenge is to interactively optimize this, segment-by-segment (DTOD~98: sequence of Bid & Ad (~140/238) placements, to recursively maximize (~270) conversion-to-purchase (CTP~237) in their particular situation, over time.

FIG. 22-822 block diagrams the end-to-end "learning" optimization, e.g., Bid-Ad (~140/238) placement, TQC~42 selection, Coupon Discount schedule~263, P/S~115/114 mix, . . . ) process that a merchant M~25 must diligently exercise to recursively improve ROI (~270) from TQCs~42.

FIG. 23~823 graphically depicts a time sequence of merchant's Bid-Ad (~140/238) pairs for timely transmission of a sequence of different ads (~238), as a function of time-of-day (TOD~27 segment-by-segment~98), ideally based on prior on-site merchant's observations of consumer attributes & prior conversion-to-purchase (CTP~237) behavior.

FIG. 24~824 presents an example of delayed unpredictable (statistically long-tail) conversion-to-purchase (CTP~237) responses by several TQCs~42, for 2 different Bid-Ad (~140/238) placements (see FIG. 23) transmitted 2 hours apart (e.g., 80 TOD~27 segments DTOD (~98) @1.5 mt/seg).

FIG. 25~825 is an example week-to-week return-on-invested (ROI~270) Bid performance analytics, including Bid effectiveness ranking. It also depicts an example 2-hour (i.e., lead "delay "(~db)=80 TOD (~27) segments (DTOD~98) @1.5 mt/seg); time delay D~258 between "winning" Ad placement~231 and corresponding conversion-to-purchase (CTP~237).

FIG. 26~826 tabulates an example ESKAPD~30 (emotions, services, keywords, activity, products, services) tarot/playing card-like deck layout that depicts a unified framework, including a corresponding set of illustrative icons, thereby aiding the individual merchant-player-25, to keep track of their choices and suggest systematic alterations, based on ROI~270 feedback.

FIG. 27~827 graphically illustrates 3 example cases of targeted qualified consumers (TQCs~42) trajectories on a 2-D (dimension) polar grid (TOD~TOA~27~26), in transit to a merchant's (~25) brick-mortar (B-M) establishments. Three radial Manhattan time scale factors (3 hr, 1 hr, ¼ hr), traversed by 3 substantially dissimilar transit times TOA~26 (12 hrs, 4 hrs, 1 hr) are used.

FIG. 28~828 depicts a flowchart that shows that the buyer-consumer can choose whether to play a moving icon based game, akin to FIG. 29~FIG. 32 or buyer-consumer players prefers to participate in a Merchant bid-Consumer ask price auction among competing Seller-Merchants-players and Buyer-Consumer-players (2 sided stock market-like auction), as tersely noted on right side in FIG. 28

FIG. 29~829 functionally shows the communication interconnection and digital interaction between a regional Provider-Auctioneer (RPAs), one of the regional Seller-merchants (SM) and one of the regional buyer-consumers (BCs). The SM has to periodically set discounts for their PSAAs and place a bid (DTOA, payment) to advertise their PSAAs. The BC has to select EINW icons from their shopping bag, and request the RPA to setup the BC game dashboard display, with said selected EINW icons. After which BC recursively plays in a session comprised of game episode rounds and earns icon prizes, which are placed in an icon prize bag, for CTP (conversion-to-purchase) later.

FIG. 30~830 depicts examples of 2 smartphone display embodiments (Matrix: 3×3 & 6×9) of exemplary iconized encapsulated needs-wants (NW) of (a) buyer-consumer and (b) local (regional) Seller-Merchant's inferred advertised (related up/cross sell) icons, for pictorially recognizable Product-Service-Activity-Attraction (PSAA), in a "moving icon" game format, to "earn" a price discount digital coupon, when identical PSAA icons lineup, along a row (for up-down icon motion, or column (for sideways icon motion), FIG. 31~831 depicts a larger screen (eg, tablet) format, akin to FIG. 29, but with variable sized icons, enabling buyer-consumer to earn a price discount coupon for the PSAA, underlying the lined up icons, for playing a game of "moving icons."

FIG. 32~832 shows an illustrative set of icons for planning a vacation across some of Europe: Holland, Austria, Switzerland, and Germany, together with related multimedia: text, graphics, images, Video clip, price, discounts, availability. etc. descriptions, typically "hidden" behind (encapsulated) said visible "thumbnail" icon. This "hidden" multi-media information can be reviewed by buyer-consumer by "clicking" on (or touching) the icons of interest, one-at-a-time.

FIG. 33~833 shows a FSM (Finite State Machine) flow diagram outlining the implementation of one digital "randomly moving icon "game family. Many such games, using artifacts, such as, balls, dice, wheels, including Iconized PSAA (product-service-activity-attraction) can be designed, implemented and deployed to buyer-players by PHOSITA.

FIG. 34~834 shows the search (find-select PSAA)-scrape (get specific data)-iconize (encapsulate data, with buyer-player recognizable thumbnail picture) functionality is implemented.

FIG. 35~835 shows a database-processing architecture in a distributed server-farm or cloud to enable wide-spread buyer-player and seller-player access to buy-sell commerce FIG. 36A~836A illustrates out the 3 bags needed for storing-retrieving icons, namely, a buyer-players "needs & wants" bag of encapsulated PSAA Icons, (1) a Seller-Merchant's icon bag for advertising PSAA, across all active merchants, for EACH buyer-player, (2) at least one shopping bag for each active player-buyer, (3) another bag for said buyer-player to store their "earned" discount coupon "wins." And, how icon bags (1) & (2) are used to setup an iconized game play FIG. 36B~836B illustrates how random number generators are utilized to move the icons in a row or column orientation, stopping them randomly to occasionally display a "winning" pattern at the end of a game episode round, which results in a discount coupon "win," dropped into bag (3), for optionally presenting subsequently to seller-merchant identified in said PSAA coupon "win," to purchase said PSAA at a discounted price.

FIG. 37~837 shows the "profile" view on a smartphone screen display of a set of iconized PSAA selected by a buyer-player, arranged in a 3×3 row-column matrix format.

FIG. 38~838 shows various "deal" examples in iconized format. By clicking the icon, "hidden" details of the underlying PSAA and seller-merchant are revealed, to the buyer-player. If a particular offered deal is unsatisfactory, the buyer-player can delete it and go back to search-scrape-iconize, as disclosed in FIG. 34., to replace deleted icons with other more acceptable PSAA icons.

FIG. 39~839 shows an example mobile phone "moving icon' game display screen. The lower 5 rows, move along 4 columns of depicting various PSAA icon deals. The top row of 4 icons represent a "static icon banner" advertising from seller-merchants, who have previously "won" those spots for a limited period of time, by playing an auction game, supervised by an auctioneer, to be dynamically replaced by other seller-players, who "win" subsequent discrete time-of-day (DTOD) segments. Additionally, Seller-merchants can send SMS messages to said mobile phone, which are edited for relevance to buyer-player's current needs & wants. Buyer Consumers (BCs) in social groups can get together concurrently, via social clubs (eg, FB, Instagram, . . . ) relationships to chat with each other while playing said game.

FIG. 40~840 A/B/C/D collectively disclose a comprehensive flowchart detailing the dynamic interaction between a destination-travelling/vacation-planning BCs with "asks" for PSAA and the array of local merchants there submit to the Provider-Auctioneer (PA), "bids" to deliver, the required PSAA (Product-Service-Activity-Attractions) requested, in a time-sensitive (timely) manner, to interactively resolve mutual (a) price (i.e., ask vs bid) and (b) visit (time-sensitive) scheduling/availability conflicts. Specifically:

FIG. 40A~840A, Flowcharts the buyer/consumer (1, . . . h . . . . H) customized visit planning to destination resort (1, . . . r, . . . R) with germane travel/local seller merchants.

FIG. 40B~840B, depicts the asynchronous buyer-consumer (1, . . . h, . . . H) customized visit planning to destination resorts (1, . . . r, . . . R) with responsive travel to local seller merchants.

FIG. 40C~840C, charts asynchronous consumer group (h) plan payment confirmation and dynamic PRM based game play for discounts (e.g., coupons).

FIG. 40D~840D, shows the synchronous seller-merchant i) PSAA availability DB update and bid (buyer-consumer) vs Ask (seller-merchant) auction.

DETAILED DESCRIPTION

Reference will now be made in detail to the preferred embodiments of the invention, examples of which are illustrated in the accompanying drawings, summarized above. While the invention will be as per the appended claims & equivalents, and/or obvious to PHOSITAs, described in conjunction with the preferred embodiments, it will be understood that they are not intended to limit the invention to these embodiments. On the contrary, the invention is intended to cover alternatives, modifications and equivalents, which may be included within the spirit and scope of this invention disclosure, as delineated by the appended claims & equivalents and/or obvious to PHOSITAs.

Figure 1:
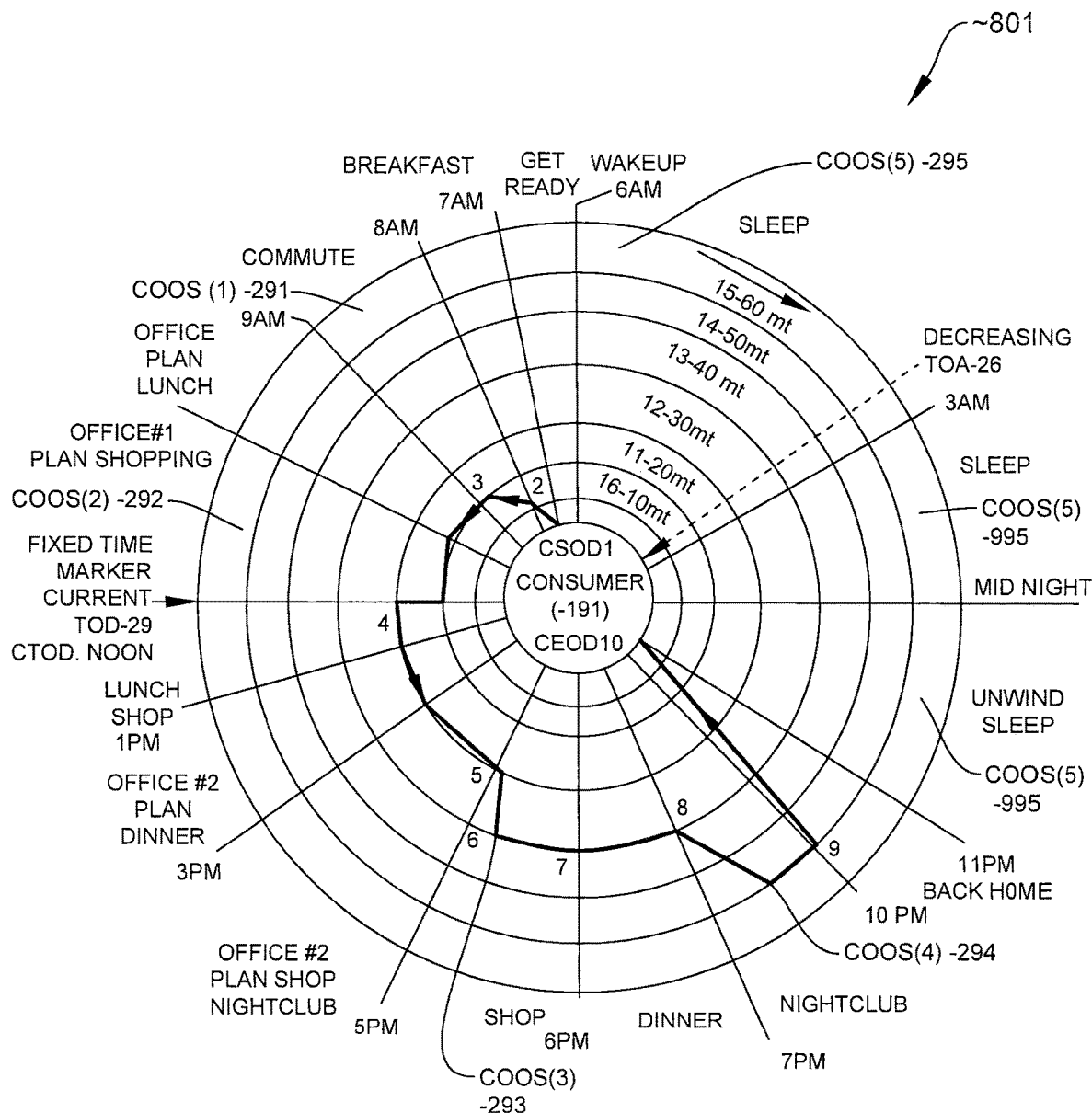

FIG. 1~801, illustrates a polar diagrammed example of a working consumer's activities, during a nominal 24 hour day period, marked-off at one hour, time-of-day (TOD~27) interval (DTOA~74). In this underlying framework example, the consumer gets up (Start-of-Day: CSOD~1) at 6 AM, gets ready by 7 AM, then goes to a coffee shop, leaving for work at 8 AM~2, gets to work around 9 AM~3, leaves for lunch & shopping after 12 PM~4 (noon), then to another office, perhaps a client's office till 5 PM~5, then leaves for nearby shopping~6 and dinner~7, after dinner~8, to a nightclub~9 until 10 PM~9, and finally back home, End-of-Day (CEOD~10). If the consumer had a "significant other," they might rendezvous after 5 PM for shopping~6 and dinner~7, and nightclubbing~8. (Note that, from each merchant's perspective, TOA~26 is each consumer's time-to-arrival, at said merchant's M~25 brick-mortar (B-M) establishment from each consumer's current position, as depicted in FIG. 2~802). These consumer (~191) activities are keyed to: (a) Time-of-day~27 (e.g., 960 incremental (DTOD~98) segments of say 1.5 minutes each×960=24 hour/day), (b) current consumer activity (CCA~112)/needs-wants (N/W~61)/emotion (~111), collectively~75 (c) Time-of-arrival (TOA~26), in this case, is consumer C~191 time-of-arrival (TOA~26) back-home (consumer's perspective), as per the set of concentric TOA circles, at 10 minute intervals from home: 10 mt~16, 20 mt~11, 30 mt~12, 40 mt~13, 50 mt~14, 60 mt~15, based on "Manhattan" (not direct (straight line) path, but consumer's pathway/roadway traversal) distance, comprised of several (straight line) segments, converted to cumulative TOA increments at legal speed, under moderate traffic conditions. The current time-of-day (CTOD~29) of 12 PM Noon is shown on left of FIG. 1, read-off at the fixed time marker. The set of concentric TOA disks rotate clockwise (CW) past this fixed time CTOD marker (~29) at one revolution per "nominal" 24 hour day, including overnight Portal maintenance time.

The novel consumer Opt-out (COOS~293; e.g., COOS (1), . . . , COOS(10), . . . ) data structure enables the consumer to affirmatively decline Ads on a device-by-device (e.g., MISTKD~31: mobile, static), time-of-day TOD~27 segment (DTOD~98) basis. This "respectfully" minimizes Ad receipt by each consumer at inappropriate times, thereby earning the consumers trust and willingness to disclose emotions, needs/wants (N/W~61), preferences, etc, without disclosure of private personally identifiable information (PII~117) to merchants, but enabling consensual targeting. Alternatively the provider can enable the consumer (h) to input a TOD opt-in (COIS~109) schedule: segment DTOD (k). Additionally, the consumer can input EPS (Exclude product/service~39; e.g., Table IV) and/or DPS~41 (Desired product/service), to enable precision targeting & spam reduction, subject to provider discretion & consumer's willingness to provide periodically updated timely (e.g., daily, weekly, . . . ).

The TOA~26 is not per se sensitive to direction of travel. However, if the consumer is in an automobile (or motorcycle, for example), the velocity vector has a magnitude (speed) and an orientation. So, if the consumer overshoots the desired location, a U-turn is required, needing additional time, which is represented by "Manhattan" Vectored-Time-of-Arrival (VMTA). This, in-turn causes a time penalty to be imposed on otherwise acceptable destinations that are "behind" (i.e., requiring a U-turn) the automobile's velocity vector orientation. For the sake of simplicity, TOA is used in the following, because VMTA becomes relevant to assessing location preferences, only after the consumer's automobile overshoots the candidate merchant's establishment. Moreover, if the consumer is on a bicycle/skateboard or on foot (e.g., Street, Mall, Casino property), for example, then the time required to turn around is negligible (VMTA-TOA~26). This concept of VMTA is important because it accommodates a behavioral bias on the part of a substantial number of automobile drivers, who are averse to making U-turns. Therefore they will preferentially select destinations in "front" of them, rather than "behind" them.

The buyer-consumer BC~191 decides to "opt-in" (COIS~109) and/or "opt-out" (COOS~293) in compliance with the TEGOBAMA~815-817 (timely efficient gamification of online bidding for advertising, marketing and analytics) "terms of use" (CTOU), after downloading the TEGOBAMA~815-817 consumer interface device (mobile, fixed) freemium (Provider RDPP~81 defined de-minimis functionality/use by consumer~191 is free) software (see FIG. 1~301 & FIG. 18~318), to consumer's~191 proximate viewable communication/display device (MISTKD~31): Internet terminal (desktop/laptop)~282, smart-phone/tablet~285, ITV (Internet)/broadcast/cable/satellite TV~281, IoT~286, Kiosk~284, signage~283, etc.). The TEGOBAMA~815-817 provider~81 consensually monitors the consumer current activity (CCA~112), Messaging (N/W~61), etc. on each registered consumer's~191 display/communication device (IHSTKD~31) and "infer" the likely subsequent activities (AEE/AEI~223/221). This would cause TEGOBAMA~815-817 provider's servers~81 to assemble selected product/service (P/S~115/114) based Ads~239 from several participating merchants M~25 in "acceptable proximity" (Time-of-arrival TOA~26) to each consumer C~191, whether static or mobile, transmitted (~231) in a "timely" (e.g., <60 minutes) manner to ensure: (a) adequate time (~232) to view the space-saving "stack of banner ads" (~170; e.g., up to say 10 to minimize spam overload), updated say every 1.5 minutes, (b) make a click-through-consumer (CTC~258) selection of one or more ads (~233) from the merchants, (c) consumer discretionarily clicks to view the, possibly multimedia, merchant Ads of duration: 7.5 sec.(short~256) or 30 sec.(long~257), including P/S (~115/114) offer details, (d) tentatively "accept" the merchant's offer by a coupon (unique ID, bar code, etc) download (~234), (e) perhaps "reroute"(~264) to visit the merchant's facility and perhaps present a discount coupon (~236) for conversion-to-purchase (CTP~237). A consumer who does not work in an office setting would have a different TOD~TOA~CCA (~27~26-112) polar diagram. Those consumers who plan their daily schedule in advance (e.g., previous night) would in-turn benefit more from declaring their intent early by "calendaring" (e.g., mobile Smart-phone, Stationary desktop Web) their pre-planned activities (e.g., restaurant visit & preordering), thereby receiving more focused ads, even less spam, better discounts, etc., to their registered secure anonymous freemium TEGOBAMA~815-817 facility account. Indeed, this would be akin to having the consumer making a (tentative) appointment to visit the merchant's establishment (e.g., restaurant) and in return receive preferential treatment, particularly for pre-ordering & appointment-setting. Consequently, the merchant would need to rely less on "block-buster" "sales event" advertising, execution and management of associated crowd-control problems, like those on "Black Friday," etc. Moreover, these oversized "Black Friday" events could be used to persuade visiting "shop-till-you-drop," sometimes almost-fanatical, consumers C~191 to download appropriate app SW from TEGOBAMA~815-817, thereby potentially receiving VIP (preferential) treatment, subsequently, thereby avoiding the holiday "crush."

FIG. 1~301 lays out a full "360 degree view" of an example opt-in (COIS~109) consumer, who needs to be treated with "respect" and "consideration" on a 365 (or more) day-by-day basis, consequently enabling the TEGOBAMA~815-817 system disclosed to be a trustworthy "consumer-centric "(not just the typical merchant-centric) gatekeeper to Ads within each opt-in consumer's view, by mediating interactions with a wide spectrum of merchants and businesses, purveying products & services~115/114 (e.g., retailers, banks, casinos, shopping malls, volume discount stores, leisure/entertainment venues). Consequently, I recommend that the TEGOBAMA~815-817 consumer portal provider (RDPP~81) not maintain consumer PII~117 on a "long term" basis (e.g., more than a day), as a matter of business policy, to engender consumer trust. Indeed, a number of PII~117 proposals are being considered, including one by Wolf & Polonetsky, for example, which will make PII~117 collection increasingly onerous & pose a litigation risk. As a consequence, operational deployments of embodiments cannot afford to ignore emerging legal & ethical implications, under the guise of innovation, because these public policy limitations also preclude the economic viability of said intrusive embodiments (e.g., PII~117).

Whereas, hourly & daily consumer statistics may exhibit similarities in consumer behavior, with other similarly situated hours and days of the year, however this disclosure recommends that to reduce both consumer and merchant liability (e.g., due to mis-appropriation/theft by unauthorized $3^{rd}$ parties to sell consumer lists, identifying individual consumer's PII~117), the individual consumer PII~117 not be gathered and used or. However, note that if a particular consumer exercises a conversion-to-purchase (CTR~237) transaction with a particular merchant M~25, then the merchant and other related $3^{rd}$ parties (e.g., banks, casinos, credit issuers) are able to track that consumer, within their own proprietary data processing systems, presumably with consumer consent, subject to regulatory compliance (e.g., California Business & professional code section 22575-22579).

FIG. 2~802 shows a deterministic quasi (e.g., 1.5 minute interval to support 6 distinct concatenated 15 second Ads) real-time-wagering (QRTW~110), on a time-of-day (TOD~27) auction Grid (960 segments@1.5 mt/segment), to enable each merchant to bid on anonymous clusters of opt-in qualified consumers (TQC~42) for selectable TOD~27 bids, with coupon discount schedule (CDS~263) offers, based on several parameters, including the (a) consumer's estimated time-of-arrival (TOA~26) at each merchant's establishment, (b) current consumer activity (CCA~112), as per Table II and (c) consumer's inferred/expressed intent (AEI/AEE~221/223) regarding future activities, as per Table III.

FIG. 2~802, for illustration purposes, depicts the consumers, from each merchant M's~25 perspective, in terms of their time-of arrival (TOA~26) "idealized" (i.e., non-Manhattan distance) concentric circles (1 hour~16, 30 minutes (mt)~12, 15 mt~18, 7.5 mt~19, 3.25 mt.~20, 1.625 mt.~21, 0.8125 mt (48.75 seconds)~22, to the merchant's M~25 brick-mortar (B-M) facility, from the consumer's C~191 current location. i.e., time bisection rule: TOA (k+1)=TOA (k)/2. The radial lines mark-off a 24 hour day (TOD~27) at 1 hour (hr) interval, akin to FIG. 1~301. Alternatively, the TOA~26 space can be partitioned, at merchant's discretion, into segments of say 2.5 minutes each (not depicted). In this example, TOA~26 segment #1 has a TOA range (<TOA<2.5 minutes), TOA #2 (2.5 mt.<TOA<5 mt.), TOA #3 (5 mt<TOA<7.5 mt), . . . , TOA#576 (1437.5 mt<TOA<1440 mt.=24 hrs=1 day), and so on. Note that, as in FIG. 1~301, the time-of-arrival (TOA~26) is computed using the "Manhattan distance," extracted from a digital map, from the current Geographic Location (GLO) and consumer C~191 on-board sensor based velocity (SBV), to Merchant's M~25 business establishment location. Again, the concentric TOD~27 disk rotates clockwise (CW), with current time-of-day CTOD~29, in the top left of FIG. 2~302, as in FIG. 1~301. The shaded areas in FIG. 2~302, namely ~23 and ~24 are TOD~TOA (~27~26) zones of bidding interest for an example Merchant "l", perhaps based on prior experience of merchant-specific consumer purchasing habits. Such a pictorial bid "wagering table" is intuitively obvious for each minimally skilled Merchant M~25 to grasp. This wagering paradigm makes the merchant more "enthusiastic" and "excited" about placing competing "wagers" on Ad placement and personally experiencing the "thrill" of the resulting ROI~270, such as, CTP~237.

Figure 3:
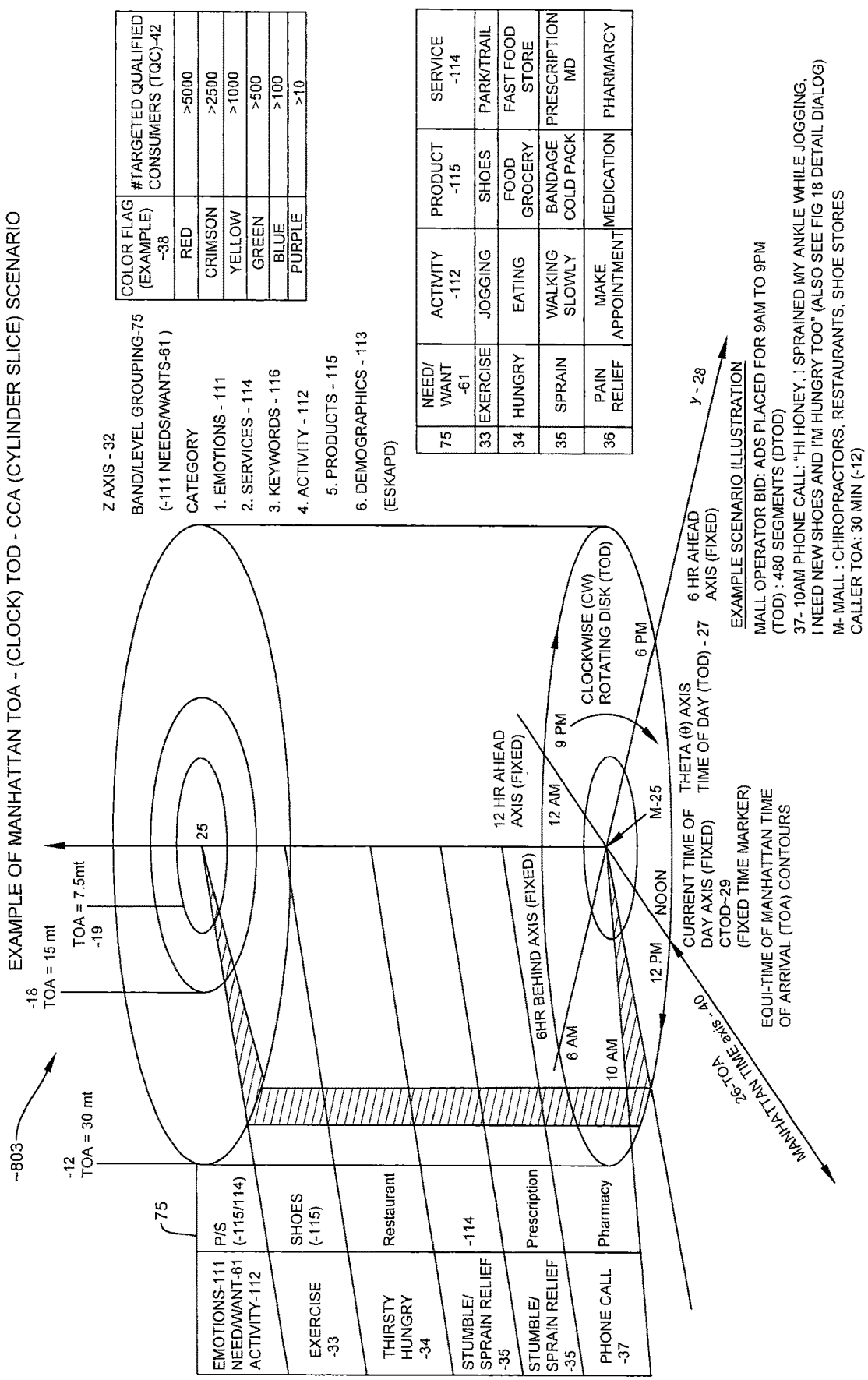

The number of opt-in consumers within each zone can be displayed in the $3^{rd}$ "vertical" z~32 dimension in black and/or with a spectrally color coded basis, as discussed in FIG. 3~803. To ease the 3D visualization, the single CW rotating disk can be recast as a set of stair-step conical 3D pyramid of CW rotating disks with TOA radii of interest customized to each merchant. Alternate circular coordinate embodiments of this merchant "friendly" graphical-user GUI (MUI~151) are presented in FIG. 3~803, FIG. 8~808, and FIG. 11~811. Alternate Cartesian embodiments of the disclosed Merchant "friendly" graphical-user-interface GUI are presented in FIG. 4 (~804), FIG. 5 (~805), FIG. 6 (~806), FIG. 7 (~807), FIG. 15 (~815) and FIG. 21 (~821). I recommend that the Merchant GUI coordinate system be dynamically interchangeable (Cartesian<- - - >Polar), subject to regionally distributed TEGOBAMA portal Providers (RDPP~815-817), on a regionally (r) located merchant-by-merchant discretionary basis.

There are several alternatives to the above parameter selection: TOD~27 & TOA~26 segments, set at the TEGOBAMA~815-817 provider's cloud server array portal (RDPP~81), subject to each participating merchant's discretion, as illustrated in FIG. 2. It is recommended that TOD~26 time segments be sized the same as TOA~26 time segments, ensuring that the 2D TOD~TOA~(26-27) geometric visualization is algebraically consistent. I recommend setting DTOD (~98)=1.5 minutes (at least), because a smaller DTOD~98 is too short (see~FIG. 819 for human decision-making delay & would cause wasteful usage of storage memory, etc.) each (400 segments/10 hr "Merchant-day" or 960 segments/24 hr day). TOA~26 segments should also be 1.5 minutes, which adequately span the day by say 400 segments (=10 hour consumer & merchant day) or a 1024 segments (i.e., 26.2 hr period), subject to merchant~25 & provider~81 (~FIG. 815-817) agreement. Note that the 164 "extra" segments, enable overlapping into the next day's data for data "continuity checks" for smooth day-to-day transitions to be implemented.

This segmentation scheme is based on the overall time it takes a merchant to deliver ads to all targeted qualified consumers (TQCs~42) and in-turn give consumers a minimally "adequate" (e.g., 1.5 mt) time to at least accommodate all the decisions that the consumer~191 needs to make (e.g., FIG. 19-819: receive Ad stack, T0~231; view the Ad, T1~233; download the Discount Coupon, T2~264; determine destination re-routing/execute, T3~265; visit merchant site to look over P/S offered, T4~236, convert to purchase, T5~237), eventually benefiting the merchant and justifying the Ad placement expenditures. Thus, T5-T0~(237-231) provides a quantitative statistical (i.e., different for each consumer) measure of the total response time to Ads delivered (see FIG. 19~819). In other words, for an ad to be effective at a future time, it has to be placed at least T5-T0 "ahead" of the conversion-to-purchase (CTP~237) event. Thus, the statistical distribution of this advance placement random variable, needs to be determined by the provider's tool suite (see FIG. 20~23-820-823) on a merchant-by-merchant M~25 basis. Moreover, all the consumers need to be segregated, in terms of current-consumer-activity (CCA~112) into one of several activity-specific TOD~TOA (~27~26) polar diagrams. A web terminal (see FIG. 8~808, FIG. 11~811, FIG. 15~815, FIG. 16~816), preferably incorporating a wide HD (high-density) screen-based dashboard of these polar (or Cartesian) diagrams will enable each merchant to visualize where the anonymous (no PII~117) consumers-of-interest (i.e., TQC~42) are currently situated and therefore which consumers~191 should be "targeted" to receive the merchant's accordingly customized (e.g., TOA~26 based) discount ads (~63).

Moreover, on-line bidding on consumers also has to be tempered by the current (dynamic) TOD~27 based merchant's brick-mortar (B-M) establishment occupancy level [EOL (~297)=number of consumers visiting a particular merchant's establishment]. There is no benefit to attracting additional consumers, if the establishment is "sufficiently busy" already. Indeed, on major holidays, brand-name retail merchants often have a "dangerously" high EOL. On the other hand, smaller merchants (SMBs) don't/can't benefit, because of their limited Ad budgets. If a merchant establishment is typically "busy" ("high" EOL) at a particular TOD~27, then the Ad bidding capital is better allocated/invested to the typically "less busy" TOD~27 periods. I suggest EOL~297 be segmented into say 16 discrete (not necessarily uniform) levels, as defined on a merchant-by-merchant M~25 basis.

Note that conceptually each current consumer activity (CCA~112), with example categories, as outlined in the FIG. 3~303 description below, requires a separate polar TOD-~TOA (~27~26) plot. Thus, the disclosed TEGOBAMA~815-817 system & process (flow method~319-321) provides the merchant M~25 with the ability to "rapidly" reallocate Ad capital, as a function of TOD~TOA (~27~26), based on previous CTP~237 results. The third (z~32) graphing dimension in FIG. 2~802 (not shown to enhance diagram clarity and minimize clutter) can use a RGB spectrum-based color-coding~38 selection of pleasing (e.g., Red, Green, Blue, Black), albeit distinct, colors to encode the number of consumers in each of the TOD~TOA (~27~26) sectors, engaged in one or more, current consumer activities (CCAs~112), as per each merchant preferences, among those listed in Tables I-IV. For example, TQC=Black for > (greater-than) 2000, Red>1,000 (e.g., Black Friday), Crimson>500, Green>100, Yellow>100, Blue>50, Purple>20 and White>10 customers, with all having the desired CCAs~112 (see Table I-IV).

Within each sector each merchant M~25 independently places their bid (monetary equivalents) wagered BM~140, ranging from say 0 to 32 units of currency (or currency-equivalent asset) units; placement at TOD~27=BM; Ad array AM (m)~238 & Ad placement APS~239, acceptable to RDPP~81, as per MTOU~216, graphically shown on the (z-axis~32) "vertical" (pseudo-3D) of the sector. Note that each merchant can only view their own desired placement "cuboids" in 3D space (TOD~TOA~CCA~27~26-112) and TQC~42 currently therein. Also note that qualified consumers (TQCs~42) is a "computed" quantity, generated at the EGOBAMA~815-817 provider's cloud server facility (RDPP~81). Other parameters input by each merchant to enable the analytics computations include, Ad-bid-schedule (AM/APS/BM~238/239/140), as disclosed in FIG. 22~23-322-323, required Ad-repetition-rate (ARR~162), offered Coupon-Discount-Schedule (CDS~131), # click-through consumers CTC (prior~82), Conversion-to-purchase, CTP (prior~237), merchant's Establishment Occupancy Level, EOL (prior~297), list of Merchant Ads (AM~238), say up to 16 distinct Ads/Merchant~25, to be (randomly or deterministically) selected and transmitted (ACPT~289) to qualified consumers i.e., those meeting the merchant's pre-defined criteria (TOA~26, TOD~27, CCA~112, demographics D~113, etc). In the interest of restricted access to PII~117, we suggest that only the TEGOBAMA~315-317 portal facility provider (RDPP~81 (FIG. 815-817) can view ALL participating merchants, their confidential parameter selections, and perform bid conflict resolution (e.g., # Merchant M~25># Targeted Qualified Consumers TQC~42, in each TOD~27-TOA~26 sector).

FIG. 3~803 depicts a 3D user-friendly bid placement interface with a cylindrical cake-like visualization, improving the user interface (UI) and corresponding user experience (UX) compared to the 2D user interface (UI) in FIG. 2. As before, the merchant 25 is at the center. The concentric TOA radial (R) 26 axis, Angular (theta) axis maps TOD~27 and the vertical axis Z~28, representing "bands/level" groupings are shown. These groupings, include possible consumer: (a) needs~61 (e.g., Thirsty~34), (b) wants~61 (e.g., Martini), (c) activity~112 (e.g., Jogging), (d) products~115 (e.g., Shoes), and (e) services~114 (e.g., Foot Massage). Each merchant has to select and organize/prioritize these "bands/levels" to meet their particular mix of product and service offerings, from a comprehensive list of topical words and phrases, in accord with Tables I-IV, expanded/contracted at the RDPP's~81 discretion and further modified by the Merchant's~25 discretion in selecting consumer~191 targeting attributes (i.e., ESKAPD~30) resulting in identifying the merchant~25 desired set of targeted qualified consumers~42, for Ad(m) selection/placement~238/239.

For illustrative purposes, three distinct TOAs are shown: 7.5 mt~19, 15 mt~18 and 30 mt~12. For example, at 11 AM, a hypothetical jogger's (C~191) bands~75 are noted: exercise~33, thirsty~34, sprain~35, pain~36. The jogger makes a phone call~37: "Hi honey, I sprained my ankle, while jogging. I'm in pain, and hungry and I need new shoes." The ideal situation is having a group of "merchants" in a nearby Mall, with a 30 mt~12 TOA~26. Presuming this mall has previously placed ads, covering the TOD~27 from say 9 AM (MSOD~256) to say 9 PM (MEOD~257). The jogger (C~191) receives ads from several merchants, but the Mall receives the highest ranking, because it is the most convenient "one stop shopping" experience for the consumer. As the corresponding tabular form shows, the "needs/wants" (N/W~61) are translated into implied/inferred activities, and corresponding products and services (P/S~115/114) offers. The consumer can either directly express these needs/wants or indirectly imply them, based on opt-in conversations and texting with others, including RDPP~81. Also see example of FIG. 18~318, itemizing back and forth text messaging, between "jogger Bob and friend Jean," including the stream of "relevant" ads received by Bob in a "timely" manner.

Relatively simplistic UI "dashboard" embodiments, to enable merchants, particularly SMBs, to manage their ad campaign cost-effectively, were disclosed in FIG. 2~802 for merchants~25 and FIG. 1-301 for consumers~191. A more comprehensive situational GUI dashboard~151, is disclosed in FIG. 3~803, with rotatable Cartesian axes, with "cake-like slices" representing the merchant selected TOA~CCA~TQC~(26-112~27) volumes, delineated by spectrally color-coded~38 sectors to specify the corresponding merchant selected bid~140 values. Additionally, the merchant's dashboard display screen will have graphical representation of the input-outcome parameters, as a function of time-of-day (TOD~27), day-of-week (DOW~150), week-of-year (WOY~160), as per FIG. 5~805, FIG. 9~809 and FIG. 14~814.

Figure 4:
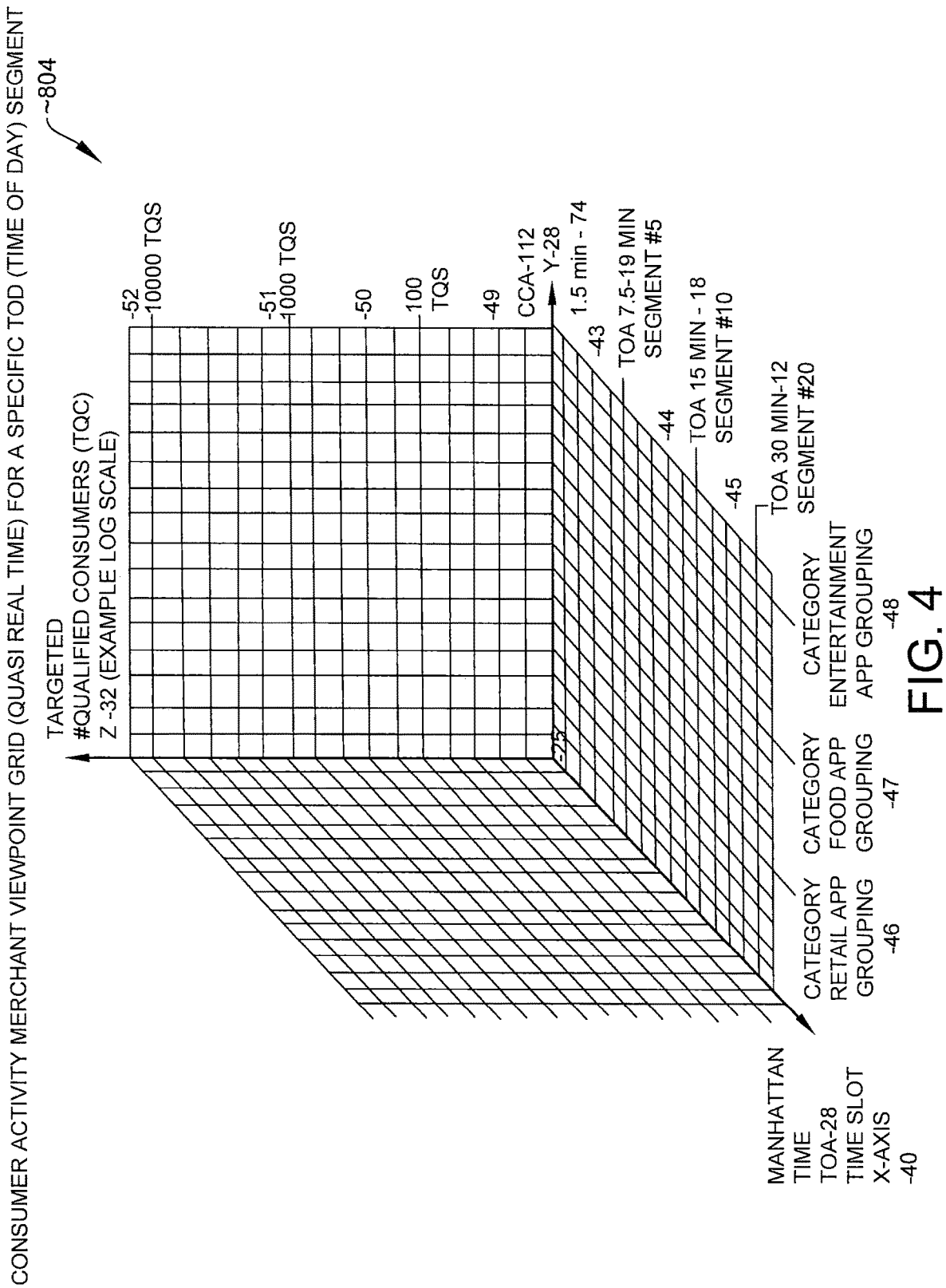

FIG. 4~804 depicts yet another alternative merchant user interface (MUI) in a Cartesian-FIG. 804-807, 311 grid format. Unlike FIG. 2~802 and FIG. 3~803, the presumption, exercised by the merchant~25 is that, TOD~27 is not an essential independent display variable for their consumer targeting purposes and is therefore "suppressed." However, the targeted qualified consumer (TQCs~42) has to be delineated from the pool of continuously changing opt-in consumers~191, in competition with wagering by other merchants WOM~299, targeting the same consumers~191, using the same TOA~26 ranges. Moreover, the display in FIG. 3~803 changes as TOD~27 advances in DTOD=1.5 mt. increments, for example. In FIG. 4~804, competitive bidding~214 is done based on a merchant-specific appropriately dimensioned TOA~CCA~TQC (~26-112-42) "cubes" of FIG. 6~806, not cake-like slices of TOD~TOA (~27~26) of FIG. 3~803.

In FIG. 4~304, the x-axis~40 is "Manhattan" distance based time-of-arrival (TOA~26), which is broken down into distinct time-of-arrival (TOA~26) segments (e.g., 960 TOA~26 segments (DTOA~74)×1.5 minutes=24 hour day): time-interval 0-7.5 mt~43; time-interval 7.5-15 mt~44; and time-interval 15-30 mt~45 segments, for example. The y-axis~28 is the current consumer activity (CCA~112) groupings, via an opt-in smart-phone consumer~191 app activity monitor (e.g., enhanced version as per Table I, akin to implemented disclosed to www.Staytunedapp.com), which is then used to point to a broad variety of consumer-localized-merchant Ads, offering pertinent products and services (P/S~115/114): (1) Retail/Clothes/Shoes~46, (2) Food/Grocery/Alcohol~47, (3) Entertainment/shows/Nightclubs~48. (see Table IV)

To reduce clutter, several other categories (not in any order) of interest to the consumer~191 have not been shown in the FIG. 4~804: (4) Restaurants/Eateries/Bars, (5) Wellness/Gyms/Fitness, (6) Professional services/Physicians/Lawyers/Accountants, (7) Emergency/Police/Ambulance, (8) Household/Cleaning/Yard/Repair, (9) Pharmacy/Hospital/Clinic, . . . ), ideally spanning US Govt. NAICS (North American industry classification system) categorizations (see Table IV).

These are generic (NAICS inspired) groupings. The merchant-users have to pick and organize the y-axis~28 categories to comport with their particular consumer preferences (e.g., TOA~26, TOD~27, needs/wants~61, CCA~112, emotions~111, Demographics (age, gender, income, etc~113). In a mobile/web app, specific merchant locations, meeting that merchant's TOA~CCA~TQC (~26-112-42) "volumetric" criteria would be identified, together with actually offered coupons (ACWT~263) and directions. TOD~27 is important, because consumers (TQCs~42) are being encouraged to visit the merchant's M~25 establishment, "enticed" with downloaded (~234) discount coupons (~131), during typical working hours (MSOD~256 to MEOD~257), to counteract the "show-rooming" effect of consumer~191 diversion to E-Commerce sites, instead of B-M merchant (~25) establishment based CTP~237.

In FIG. 4~804 z-axis~32 is the number (#) of targeted qualified consumers (TQCs~42) in each TOA~CCA (~26-112) zone. Note that each incremental TOD~27 segment requires a three dimensional (3D) TOA~CCA~TQC (~26-112-42) "volume." A logarithmic scale for the number of consumers (~191), within the TOA~CCA~TQC (~26-112-42) "volume" of tens~32, hundreds~33, thousands~34 of TQCs~42 is recommended.

Conceptually, there would be one such three dimensional (3D) visualization for each TOD~27 of interest to each merchant. This data can be presented (MUI~151) to each merchant, as a "fast-time" animation of past TOD~27 history (e.g., holiday vs. workday) of TQCs~42, for visualization purposes, to the merchant-user~25. Note that what is shown on each merchant's display~151, is subject to that merchant's preferences. To minimize clutter, I suggest a 1.5 minute discretization intervals for both TOD~27 (960 DTOD~98 segments/24 hour day) and TOA~26 (400 DTOA~74 segments×1.5 mt=10 hrs). This can be fine-tuned (i.e., dynamically adjusted) by the TEGOBAMA~815-817 platform-as-a-Service (PaaS) provider (RDPP~81), on a merchant-by-merchant M~25 preference basis, subject to TOD~27 & TOA~26, on a segment-by-segment basis (e.g., hourly or quarter-hourly or 1.5 mt or . . . or 100 milliseconds), subject to local/metropolitan/regional (r) conditions & provider (RDPP~81) preferences.

Each merchant~25 allocates their ad~238/239 capital bids~140 periodically (e.g., BCS: daily merchant bid chip stack~68) across all the time-of-arrival (TOA~26) segments (DTOA~74) of interest, after taking into consideration the number of opt-in consumers (TQCs~42) in prior (historical) segments, delineated in terms of the current consumer activities (CCA~112) of interest to the merchant~25, today (TOD~27) and perhaps current day of week (DOW~150), week of year (WOY~160) back. Such a fast-time~77 simulation can be presented to the merchant, using the TQC~42 quantization scheme of FIG. 6~806 and fast-time~141 visualization (e.g., if 1.5 mt→1 sec, then display visualization~141 time: e.g., 16 mt=1 day and ~2 hrs=1 week), of prior TQC~42 history, as per FIG. 8~808, FIG. 12~812, or FIG. 16~816. Such a simulation mode~77 setup is facilitated by the MUI in FIG. 14~814. The merchants~25 are able to develop an "intuitive" "gut feel" on how to allocate limited Ad placement~239 capital~140 (e.g., bids over say a one week period) among the future TOD~TOA~CCA (~27~26-112) segments.

The bid amount~140 could be discretized into bid units ranging from say 0-32, which can be visualized as appropriately spectrally colored~38 denominated cubes in Cartesian 3D space. The TEGOBAMA~815-817 provider (RDPP~81) can set the minimum & maximum bid (to ensure "fairness") for each DTOD~98 segment (960 segments/24 hr day). Thus, merchant-users~25 sees a set of 3 dimensional multicolor~38 TQC~42 cubes (e.g., ~84-86 in FIG. 6~806 in a re-orientable Cartesian grid on their Ad management "dashboard"~151. While the merchant~25 may be tempted into bidding only on the smaller TOAs~26, the prudent merchants will conduct input (e.g., FIG. 23~823 bid/Ad~140/238 placement)-output (CTP~237) "experiments" (i.e., A/B testing) to determine the TQC's~42 "decision-making"/"lead-time," (see FIG. 24~824) for their particular lines of product/service (P/S~115/114) offered. Each transient consumer's total delay D~(237~231), measured in terms of increasing prior: (a) "click-thru-consumers" (CTC~82), (b) "coupon downloads" (DC~234), (c) "enterprise occupancy levels" (EOLs~297), (d) "purchase conversion" (CTP~237), and (e) "gross revenue" (GRC~245). The "input" parameters under the merchant's input control, keyed to TOD~27 are: (a) "ad-placement-schedule" (APS~239), (b) "Merchant bid" (BM~140), (c) "Ad-Repetition-Rate" (ARR~162), (d) "Coupon discount schedule" (CDS~131) offer. Indeed, there is a set of stochastic time-varying "delays" D~(237~231), and delays (db, dc, dd, do, dp, d$), as defined in tabulation of symbols, relating the merchant's inputs (bid/Ad~245) and the Ad performance outcomes (APOs). Consequently, the numeric parameters of the stochastic delay based probabilistic distribution, needs to be computed/modeled/measured using discrete system 'identification/modeling" & "neural network prediction" (see citations) technology, will enable merchants to "shape" their Bid-Ad inputs (see FIG. 23~823) to maximize the desired outcomes (e.g APOs: CTR~237, CDS~131, EOL'297, CTP~237, GRC~245).

Note that the Cartesian representation in FIG. 4~304 is unique for each merchant, unless the competing merchants are: (a) co-located (i.e., identical TOA~26) and (b) select the same CCAs~112. However, the merchants~25 do not receive each others Bid-Ad (~140/238) strategy, nor the personally identifiable information (PII~117) regarding consumers (TQC~42), unless the TQC actually visits the merchant's establishment, presents a (discount) coupon (DC~131) and makes a check/credit card purchase, thereby self-disclosing their PI~117. Moreover, each merchant~25 has a subjective "world-view," based on their selected customized TOA~CCA~26-112 (AEI/AEE~223/221)-TQC~42 "volume scaling and color preferences~38." Only the TEGOBAMA~815-817 provider (RDPP~81) has a comprehensive multi-merchant state-of-the-region (r) view display, because confidentiality/trustworthiness needs to be maintained, with respect to each merchant's~25 Bid-Ad~140/238 strategy vis-a-vis all merchants~25, and vis-à-vis consumers~191.

Typically this wagering table based Ad "buy" is performed by the Ad (campaign) Agency for the merchant~25, because Ad agencies are best suited to evaluate the relative effectiveness (e.g., A/B testing) of Ads~238 produced by them in a merchant~25 sponsored Ad campaign and then rapidly make appropriate Bid-Ad (~140/239) & TOD~TOA (~27/26) sector placement revisions.

Table I itemizes the "emotions" that merchants may be able to satisfy, by delivering product/services (P/S~115/114), after extrapolation to need/want~61 & Industry category (NAICS). Table II summarizes the consumer's activities (participatory, non-participatory). Table III uses "plausible" logic, to predict future activity, based on current activities in Table II.

Figure 19:
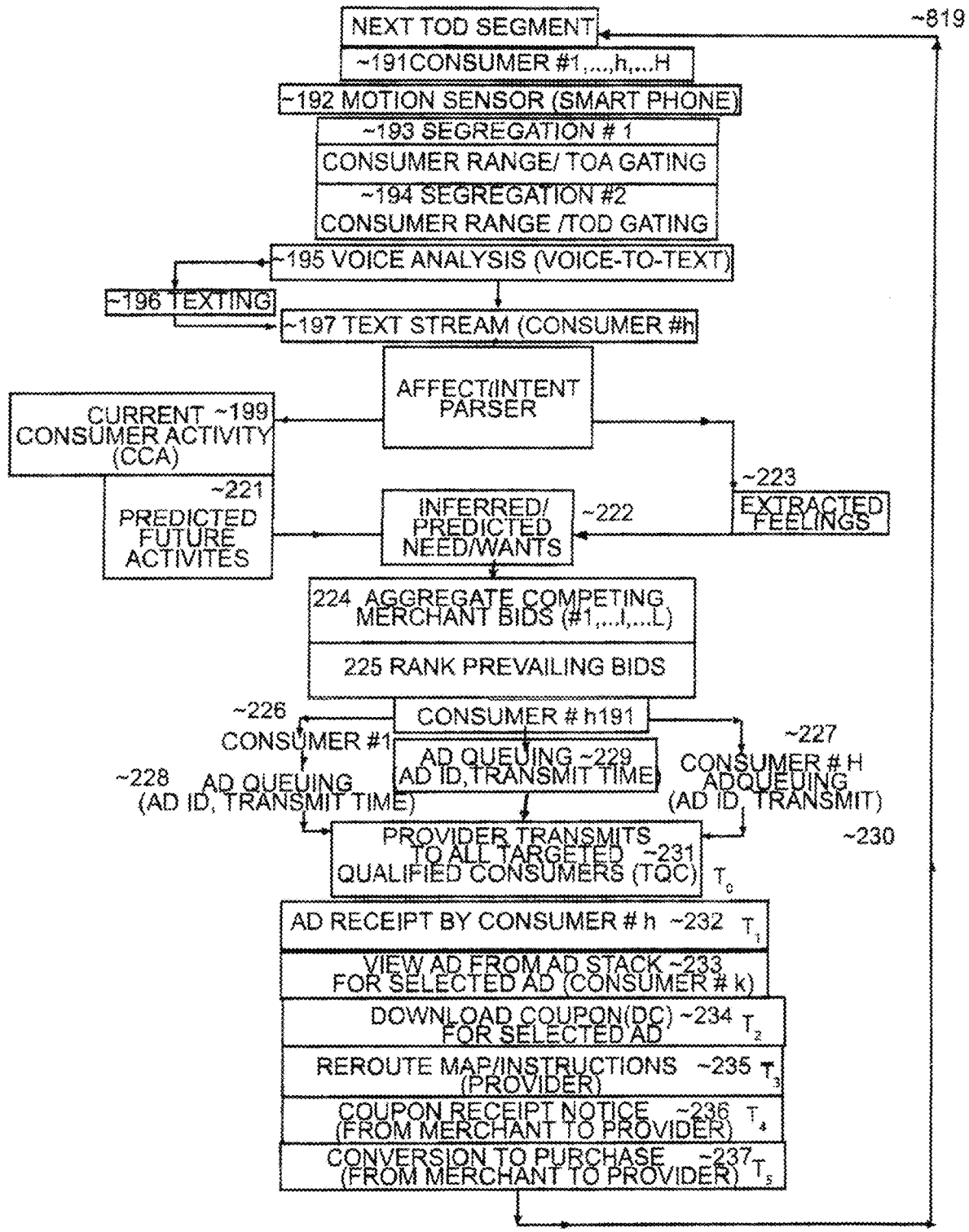

The Overall Logical Sequence (See Flowchart Detailed: FIG. 19~819):

Emotions (Table I) & Activities (Table II)→
→articulated/inferred/predicted Needs/Wants (N/W~61) (Table I)
→Generic Merchant~25 Businesses (NAICS: Table IV)→
→Product/Service (P/S~115/114) of interest (Table I)
→Specific local Merchants (registered)→
→TOA gating (opt-in consumer)→queue up/transmit merchant ads→TQCs Ad receipt→
→TQCs~42 select Ad→TQCs downloads coupon~234→TQCs visit SMBs→TQCs convert→
→TQCs pay→TQCs~25 receives P/S (~115/114)

Terse explanation of above logic sequence: Starting with each opt-in consumer's emotions (inferred/articulated) or activities, Table I translates these into product/services (P/S~115/114) desired by said consumer and the set of merchants who can supply this P/S~115/114. Then, the TQCs~42 are sorted in accord with decreasing TOA~26 of the opt-in consumers. Merchant~25 are ranked on the basis of their bids~140. Ads are queued up~263 on a ranked merchant-by-merchant basis. Ads stack is transmitted (ACWT~245) to each TQC~42 member within each TOA~27 segment. TQCs~42 receive the Ads. TQC selects a particular merchant's ad and downloads TOA based discount coupon. TQC members visit selected SMB/LSE Merchant. Individual consumer~191 makes a purchase (CTP~237) and pays merchant~25 to set delivery of the P/S~115/114. Corresponding processing steps in the disclosed algorithmic processes are noted below.

Algorithm Processing Sequence

The recommended processing sequence to be followed to relate each consumer's directly/implicitly expressed needs/wants (e.g., emotions, activities, keywords/phrases) to merchant's offer-to-sell (e.g., products, services, keywords), to meet consumer's expectations:

(1) Processing Step #1: Each TQC~42 group member Expressed Feelings→
    →Inferred Need/Want (N/W~61)→
    →Generic Industry Category (NAICS)→SMBs meeting criteria
    (Table I is used to construct a look-up-table (LUT) in server-side software)
(2) Processing Step #2: TQCs (opt-in) makes an Ad selection~233/234 among several candidate SMBs/LSEs
(3) Processing Step #3: Server performs LOCAL Search (say, 5 mile radius) on WEB and provides each TQC~42 member directions to SMBs/LSEs, who meets selection (TOA~26, N/W~61, TOD~27, . . . ) criteria. Also see FIG. 34 and explanation thereof.
(4) Processing Step #4: TQCs~42 (opt-in) makes an Ad selection among SMB/LSE candidates
(5) Processing step #5: RDPP~81 cloud Server provides map & directions (261/235) to TQC~42 member to selected merchants~25 who meets selection criterion
(6) Processing Step #6: Server tracks TQC~42 member to ensure progress and issue alerts to SMBs/LSEs and offers TQC member consumer encouragement (e.g., discounts-CDS~231) to go to Merchant's~25 establishment

TABLE I

Example emotions extracted from voice/text, imply needs/wants, which in turn point to generic industry categories (NAICS), to satisfy the inferred needs/wants.

| Emotion | NEED/WANT (NW) | Generic Industry Category |
|---|---|---|
| 1)Hungry | food/drink sustenance | Grocery Stores, Fast Foods, Restaurants, Cafe, Bakery, Ice Cream Shop, Bar, Warehouse Store, . . . |
| 2)Cold | warmth, shelter. | Hardware, Clothing, Utilities, Hospitality, Shelters, Cafe, Indoor, Fire Place, Heated Building, . . . |
| 3)Lonely | Companionship, society | Radio Station, Phone Buddy, Bars, Clubs, Gyms, Social Groups, Organizations, Dating, Political, Hospitality, . . . |
| 4)Angry | Unfair, Calm, Analyze, Resolve | Anger Mgmt./Counseling, Unfairness |
| 5)Frustrated | Analyze: Biz, Personal, Traffic | |
| 6)Stressed | Relax, | |

TABLE I-continued

Example emotions extracted from voice/text, imply needs/wants, which in turn
point to generic industry categories (NAICS), to satisfy the inferred needs/wants.
Emotion NEED/WANT (NW) Generic Industry Category

| | | |
|---|---|---|
| 7) Depressed | Analyze: Biz, Personal | Career, Job, events, Therapy |
| 8) Sad | Analyze: Biz, Personal ? | #4 Loss, Console, therapy |
| 9) Worried | Analyze: Biz, Personal, Fuel Deadline, Weather/Wind | |
| 10) Thirsty | | |
| 11) Doubtful | Analyze: Biz? Personal? | Internet Search, |
| 13) Lethargic | Wake up: Music? Entertain? | |
| 12) Concerned | Analyze: Biz, Personal, Distracted | Internet Search |
| 14) Tired & Sleepy | Rest stop, Relax | Rest area, Parks, Shopping mall, Cafes, Hospitality, Entertainment, Cinema, Fast Food, Bar, Library, Club, . . . |
| 15) Bored | Activity: Entertain, Music | Participatory/Spectator Activity: Table II |
| 16) Discomf- | Analyze: Physical-Temp ?Mental | Restroom, |
| 17) Afraid-Fear | Protection options | Electrical Recharge Stations, Gas Stations, AAA, Tow Services, Mobile Mechanics, Law Enforcement . . . ER Hospital, Crisis Support Help Lines, Hotlines, Psychologists, Shelters, Self-defense, Emergency |
| 18) Pain | Analyze: source? stop pain? | Emergency Care, 911, Mobile RV Clinic, Hospitals, Prof Services, MD/Specialists, Chiropractors, Acupuncture, Drug Store, Massage, Yoga |
| 19) Anxious | Deadline coming up-Prepare Fuel ? Time? | Charge Stations, Service Stations, Hospitals, Drug Store, Meditation, Hotlines, Therapists, Support Groups, Self-help Book stores, Libraries, Wikipedia search, Internet search, Time-extension, Advisory |
| 20) Helpless | Analyze: Biz? Personal ? | Advice, Therapy, Triage |
| 21) Hopeless | Analyze: Biz? Personal ? | |
| 22) Gregariou | Entertainment ? Friends? Talk? | Pamper food, Reward Self |
| 23) Excited | Calm Down ? | Social Media, Self-Improve, Activity: Table II |
| 24) Unacceptable | Analyze: Biz? Personal? Traffic? | Internet Search? |
| 25) Apathy | Analyze: Sleepy ? | |
| 26) Guilty | Analyze: distracted? Biz? Personal? | Therapy |
| 27) Disconnected | Analyze? | |

TABLE II

Consumer Activity Categories (1) Participatory:
(a) Physical Games: Tennis, Ping-Pong, Badminton, Baseball, Football, Soccer, Rugby, Cricket, Boxing, Wrestling, Track, Swimming, Triathlon, County Fairs, Amusement Parks;
(b) Non-Physical (Mental: Cognitive, Feeling) Games: Chess, Monopoly, Checkers, Cards, Dice, Tarot
(c) Outdoor Activity: Walking, Hiking, Jogging, Rock Climbing, Trekking, Camping, Flying, Sailing, Scuba, Swimming, Riding: Horse, bicycle, skateboard,
(d) Indoor Activity: Exercising-Weight lifting, Aerobics, Personal Health
(e) Driving: Motorcycle, Automobile, Off-road vehicle, Launch, Boat, Private Aircraft
(f) Social: Internet, Physical
(g) Educational: Learning, Teaching
(h) Hobbies: Cooking, Art, Crafts, Music, Singing, Dancing , Jewelry, fashion
(i) Health: Researching, diagnosis, treat, recuperate, Coping, Wellness, Nutrition, exercise
(j) Design Services: Fashion-Clothes, Jewelry, Accessories; Engineering-Architecture, Landscaping, Dwellings
(k) Mental: Calculating, Searching, Imagining, Dreaming, Meditating
(2) Non-Participatory (Spectator):
(a) Physical Games: Olympic, Professional sports
(b) Non-Physical (Mental: Cognitive, Feeling) Games: Chess, Monopoly, Checkers, Cards, Dice, Tarot, . . .
(c) Professional Entertainment: Movies, TV, Opera, Music, Concerts, Plays, Ballet,
(d) Traveling (Passenger): Aircraft, Glider, Balloon; Water-Launch, boat; Land-Automobile, Motorcycle

TABLE III

Future Activity Prediction

| Activity Mode | Current Consumer Activity (CCA~112) | Predicted (Future) Activity |
|---|---|---|
| (a) Participatory (e.g., Not In-Automobile) | Physical/Multi-Modal/ Cognitive/Feeling | |
| | Games (Active, Contact) | Relax, Food, Drink, Sleep, Shop, Socialize, Hobbies, Entertainment |
| | Games (Remote Comp-Comm) | Relax, Food, Drink, Sleep, Shop, Socialize, Hobbies, Entertainment |
| | Activities | |
| | Hobbies | Relax, Food, Drink, Sleep, Shop, Socialize, Hobbies, Entertainment |
| | Social | Relax, Food, Drink, Sleep, Shop, Socialize, Hobbies, Entertainment, except Social |
| | Entertainment | Relax, Food, Drink, Sleep, Shop, Socialize, Hobbies, Entertainment, except Entertainment |
| | Information | |
| | Search-Internet | Act on Search Results |
| | Search-Physical | Act on Search Results |
| | Biz Transactions | |
| | Comm/Design | Relax, Food, Drink, Sleep, Socialize, Shop, Hobbies, Entertainment |
| (b) Participatory (In-Automobile) | Driver: Hands-Free | Relax, Food, Drink, Sleep, Socialize, Shop, Hobbies, Entertainment |
| (c) Non-Participatory (e.g., In-Automobile: (d) Remote Comp-Comm) | Cognitive/Feeling/ Physical/Multi-modal (limited) Games (Remote Comp-Comm) | Relax, Food, Drink, Sleep, Shop, Socialize, Hobbies, Entertainment |
| | Activities | |
| | Hobbies | Relax, Food, Drink, Sleep, Shop, Socialize, Hobbies, Entertainment, |
| | Social | Relax, Food, Drink, Sleep, Shop, Socialize, Hobbies, Entertainment, except Social |
| | Entertainment | Relax, Food, Drink, Sleep, Shop, Socialize, Hobbies, Entertainment, except Entertain |
| | Information | |
| | Search-Internet | Relax, Food, Drink, Sleep, Shop, Socialize, Hobbies, Entertainment |
| | Biz Transactions | |
| | Comm/Design (Driver: hands-Free) | Relax, Food, Drink, Sleep, Shop, Socialize, Hobbies, Entertainment |

TABLE IV

Services & Products (North American Industry Classification System)

| Generic Industry Category | Industry Code (NAICS) for Col 3 of Table I |
|---|---|
| Fishing/Hunting/Trapping | 114 |
| Building Construction | 236 |
| Apparel | 315 |
| Plastic & Rubber | 326 |
| Computer/electronic | 334 |
| Appliances | 335 |
| Transportation | |
| Furniture | 337 |
| Merchant Wholesale (durable) | 423 |
| Merchant Wholesale (Non-durable) | 424 |
| Electronic Mkt & agent-Brokers | 425 |
| Retail | 44, 45 |
| Motor Vehicle & Parts | 441 |
| Home & Furniture | 442 |
| Electronics/Appliance Stores | 44 |
| Building/Garden/Supply Dealers | 444 |
| Food/Beverage Stores | 445 |
| Health/Personal Care | 446 |
| Gasoline Stations | 447 |
| Clothing/accessories | 448 |
| Sporting/Hobby/Book/Music Stores | 451 |
| General Merchandise | 452 |
| Misc Store Retailers | 453 |
| Non-Store retail | 454 |
| Transportation | 48, 49 |
| Air | 48 |

TABLE IV-continued

Services & Products (North American Industry Classification System)

| Generic Industry Category | Industry Code (NAICS) for Col 3 of Table I |
|---|---|
| Rail | 482 |
| Water | 483 |
| Truck | 484 |
| Transit/Ground Trans | 485 |
| Scenic/Sightseeing | 487 |
| Postal | 491 |
| Courier/Messenger | 49 |
| Warehouse/Storage | 493 |
| Utilities | 22 |
| Information | 51 |
| Publish (except Internet) | 511 |
| Motion picture/Sound | 512 |
| Broadcast (except Internet) | 515 |
| Internet(pub/Broadcast) | 516 |
| Telecomm | 517 |
| Data Proc/host/related | 518 |
| Other info serv. | 519 |
| Finance/Insurance | 52 |
| Security/commodity investment/trade | 523 |
| Insurance carrier | 52 |
| Funds/Trust/fin vehicle | 525 |
| Real Estate/Rental/Lease | 53 |
| Real estate | 531 |
| rent/lease | 532 |
| lessor (assets except copyrights) | 533 |
| Prof/Scientific/Tech services | 54 |
| Mgmt Serv | 55 |
| Education services | 61 |
| Health care/Social Serv | 62 |
| Ambulance | 621 |
| Hospitals | 622 |
| Nursing/residential care | 623 |
| social assist | 624 |
| Art/Ent/Recreation | 72 |
| Perf Art/Spectator Sport/Relate Ind | 711 |
| Museum/Hist. Site/ | 712 |
| Amusement, ambling, Recreation | 713 |
| Accommodation/Food | 72 |
| Accommodation | 721 |
| Food/Drink | 722 |
| Other Serv | 81 |
| Repair/Maint. | 811 |
| Personal/Laundry | 812 |
| Religious/Civic/Prof. | 813 |
| Private Household | 814 |

Figure 5:
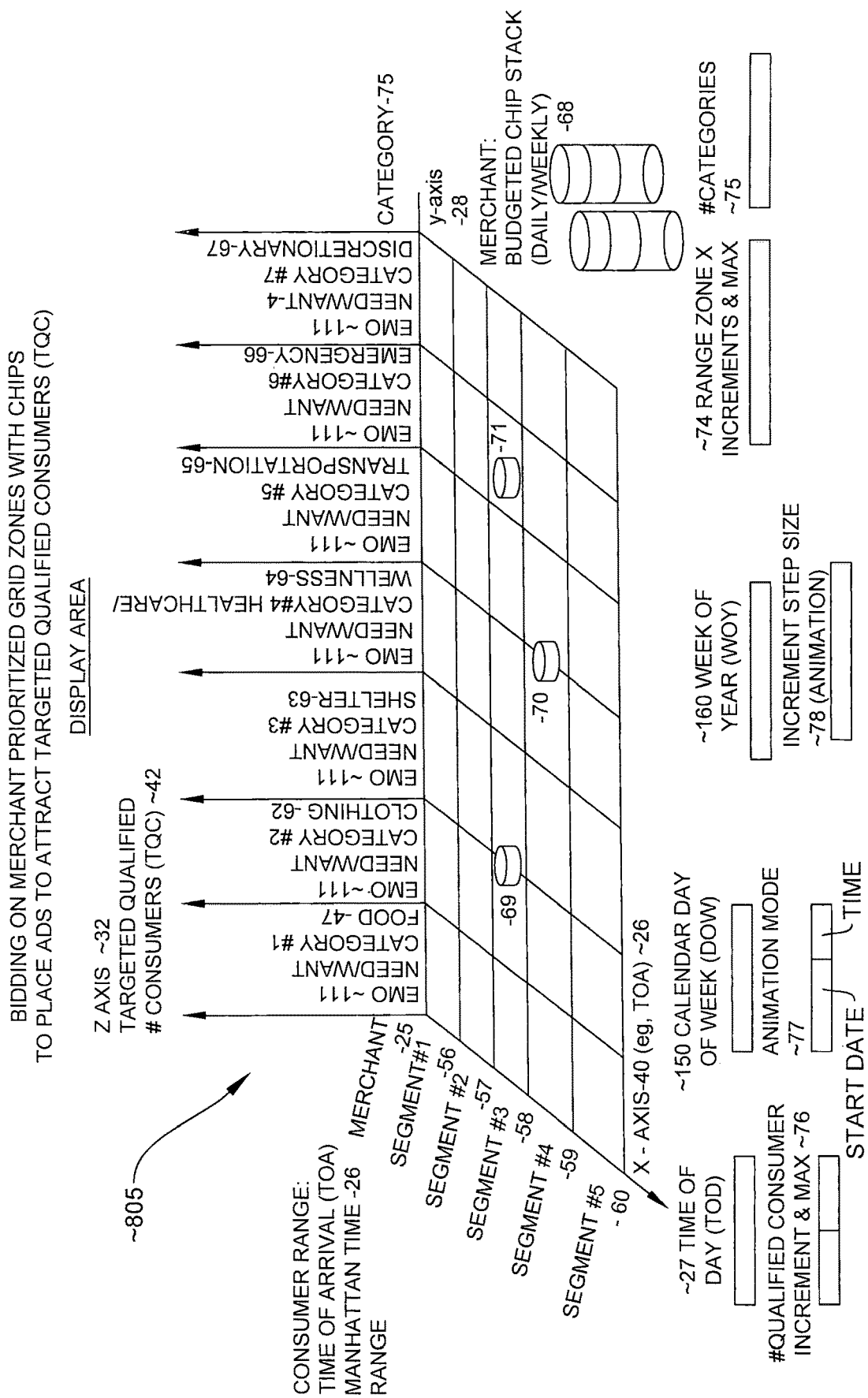

FIG. 5~805 is a "magnified" Cartesian grid version, akin to FIG. 4~804, but showing N/W~61 (needs/wants in place of Activities: CCA~112) details of Merchant selectable zones at a periodic (e.g., 1.5 mt) bidding interval akin to quasi real-time bidding (RTB), with cash (or asset) denominated chips for competitive bidding on Ads placement to attract targeted qualified consumers (TQCs), in need/want (N/W) grid of TOA~N/W areas. The x-axis~53 is segmented into time-of-arrival zones (TOAs), zone #1: ~56, zone #2: ~57, zone #3: ~58, zone #4: ~59 and zone #5: ~60. The y-axis~54 into current consumer activity (CCA~112) groups: food~47, as category #1; clothing~62, as category #2; shelter~63, as category #3; Healthcare/Wellness~64, as category #4; transportation~65, as category #5; emergency~66, as category #6; discretionary~67, as category #7. Within these there would be further partitioning into sub-categories on a merchant-specific basis. I recommend that the US government designated NAICS (North American Industry Classification System) codes (see Table IV) be used in this regard as a standardization scheme, at the highest level of categorization, to ensure consistency broadly across geographic zones internationally. The z-axis~55 maps the corresponding targeted qualified consumers (TQCs~42), as color coded clusters in each TOA~N/W (~26-61) zone.

The available currency chip stack budgeted~68 on say a daily basis (DOW~150), is depicted on the lower right. The merchant bids~140 by placing color-coded~38 chips~69, ~70 and ~71 in the various zones. If a chip straddles 2 zones, then the bid is allocated 50-50, as shown for chip~69, straddling clothing~62 and shelter~63 N/W~61 categories, but having the same TOA~26 zone #3~58.

Additionally, a "dashboard" (~151) is shown, including time-of-day (TOD~27)~72, calendar day-of-week (DOW~150)~73, range zone increments (x-axis) and maximum range (TOA~26 or distance or . . . )~74, N/W(~61) categories (y-axis)~75, and # targeted qualified consumers (TQC~42) color-coded~38 scale increments and maximum~76.

In an "off-line" mode, the merchant can set a start-time (TOD~27) and animate~141 (detailed in FIG. 14~314 setup MUI~) the progression~77 of TQCs~42. The simulation time increment can also be set~78. Such a simulation capability enables the merchant to visualize what the available TQC~42 were over time (TOD~27) in the recent past and place bids~140 accordingly.

Figure 6:
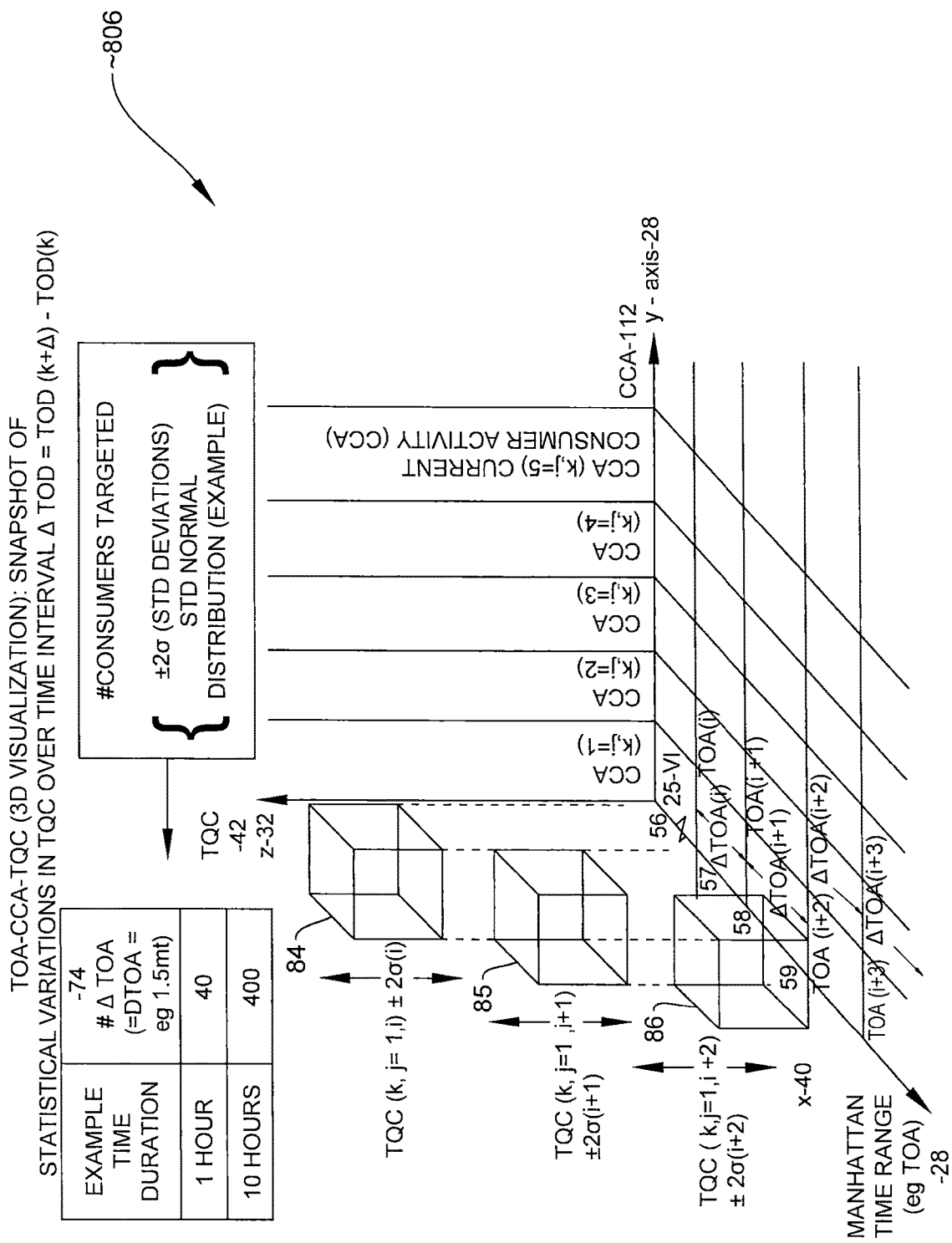

FIG. 6~806 builds on this simulation based visualization capability in the TOA~CCA~TQC (26-112-42 3D visualization) space, by statistically aggregating the clusters, in terms of say a Gaussian distribution model based+/−2 sigma standard deviation cluster cutoff. Note that TOD~27 has not been axially included in FIG. 6~806. Moreover, I believe there is no rational basis for including the distribution tails in the visualization, because this is a statistically-speaking chaotic, non-parametric process. In other words, consumers in the TQC~42 category cannot be "rationally expected" to follow thru in making a purchase (CTP~237). I suggest that consumer (~191) decision-making tends to be largely unpredictable, capricious, chaotic and often impulsive, driven by "impulse"/"gut feel" more than rationality, particularly when PII~117 is not intrusively collected and/or surreptitiously purchased & modeled. Instead I disclose a DOW~150 timely opt-in/out consensual strategy of respectfully enabling/facilitating the consumer's~191 expression their needs/wants (N/W~61), at their discretion.

The origin, in FIG. 6~806, as before is the merchant~25. The x-axis~40 is TOA~26. Three time intervals DTOA~74: i, i+1 and i+2 are shown, wherein DTOA (i)=TOA (i+1)-TOA(i). DTOA (i+1)=TOA (i+2)-TOA (i+1). DTOA (i+2)=TOA(i+3)-TOA(i+2). The y-axis~28 depicts current consumer activity [a subset of Needs/Wants (N/W~61), because CCA~112 is implicitly driven by N/W]. CCA (k, j=1) is consumers in an automobile, in this illustration, as an example. The z-axis~32 is the actual "scatter diagram" of randomly located opt-in consumers (~191) that meet the desired "targeted qualification" parameters, including (but not limited to) TOA~26, CCA~112, N/W~61, etc. Again the purpose of FIG. 6~806 is to enable merchant visualization of the prior consumer activity, to make an informed guess on bidding zones: TOA~N/W (~26-61) in the near-future.

Snapshots showing statistical variations in TQCs~42, with TOD~27 integration over time interval DTOD (k)=TOD (k+1)−TOD(k); DTOD=1.5 mt. (for example), represented by a cube representing a 2 sigma Gaussian fitted deviation, among qualified consumers (TQCs) is shown. At DTOA (i), we have the 2 sigma cube TQC (k, l, i)~84. At DTOA (i+1), we have the 2 sigma cube TQC (k, l, i+1)~85. At DTOA (i+2), we have the 2 sigma cube TQC (k, l, i+2)~86. The interval DTOD~98 is selected on a merchant-by-merchant~25 basis and is likely to be smaller (e.g., 1.5 mt.) during "prime" TOD periods (8 AM-8 PM). And, DTOD could be set to be longer (e.g., 30 mt), during "non-prime" periods. These "cubes" provide insight on the TOD~27 variations in TQC~42, as a function of CCA~112, thereby enabling merchants (or the hired Ad campaign agency) to dynamically adjust their bids (i.e., choices: bid~140 larger or smaller or same) in the next bid opportunity (e.g., 90 sec, . . . , hourly, daily (TOD~27), weekly (DOW~150), . . . ). These TQC~42 cubes can be color coded~38 for the merchant~25 to make them easier to comprehend visually. Instead of cube-like volumes, the PaaS provider (DAPP~81) could implement spherical or ellipsoidal TQC~42 visualization volumes.

Figure 7:
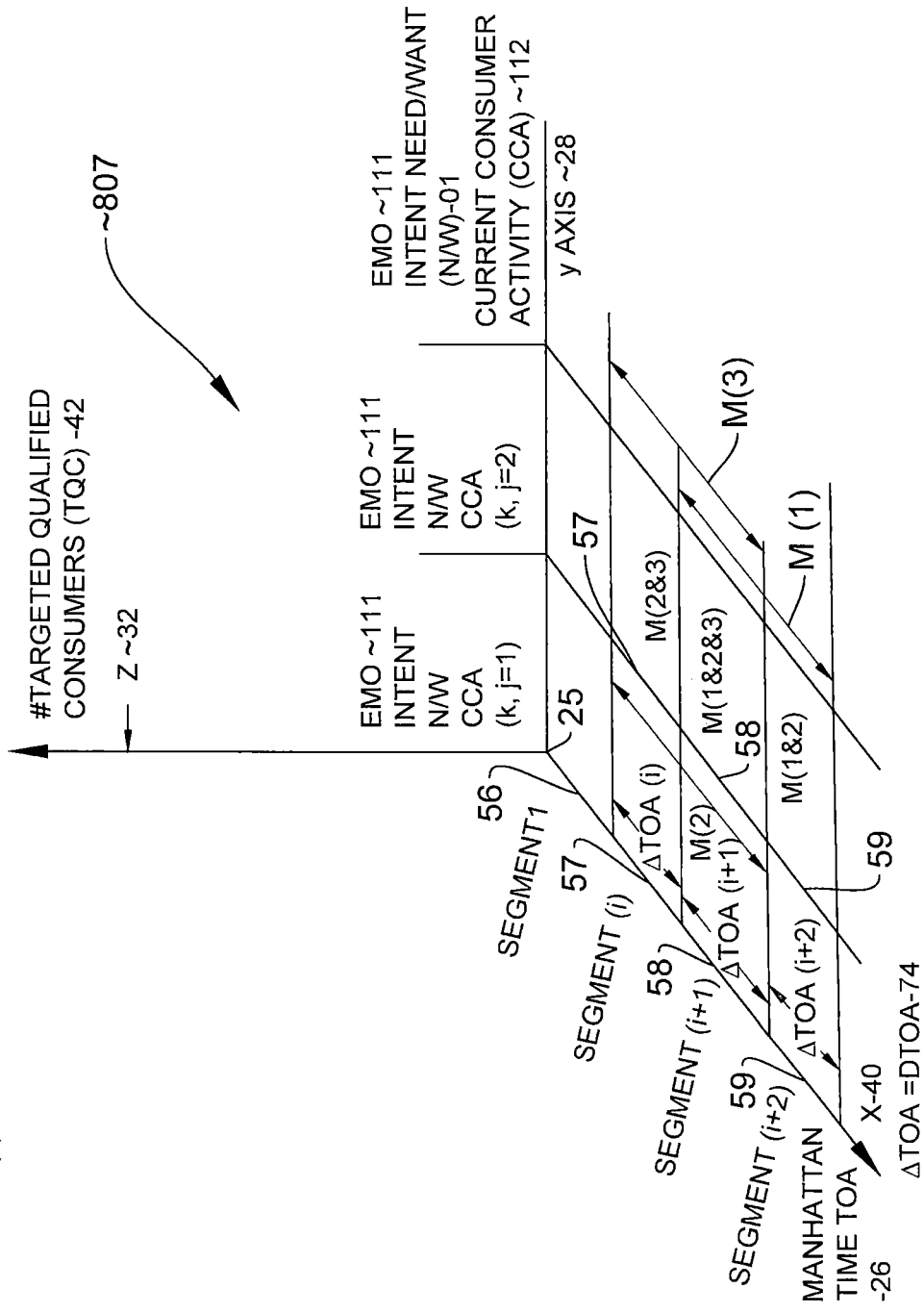

FIG. 7~807 is an illustrative example of three merchants (~87, ~88, and ~89) with respect to each specific opt-in (COIS~109) consumer~191, bidding~140 on Ad placements~239 with overlapping time-of-arrival (TOA~26), thereby creating a need for conflict resolution among competing merchants~25 of: (a) Ad placement~239, (b) spam reduction, (c) Ad relevance, etc. Bid~140 wagering process options include: (1) Open: winning bids, for TOA (i) disclosed, for use by all registered merchants~25 in subsequent bid opportunities starting with TOA (i+1) and (2) Closed: winning bids, for TOA (i), are kept confidential. So that all merchants~25 have to bid on subsequent bid (DTOD segment) opportunities, absent knowledge of prior winning bids, and (3) Bounded: bids are limited to a set of values between max/min bids.

Ad Placement & Impression Delivery Policy Considerations:

(1) Limit (Spam reduction) number of Ads (e.g., 32) per TOD~27 segments-by-segment (DTOD~74), to each registered opt-in qualified consumer (TQC~42)
(2) Balance # Ads, from available Ads AM (k, l, m)~238, sent to each qualified Consumer, TQC (h)~42, against Merchant bids BM (k, j, i, l, m)~140 in each segment
(3) Each TQC (h)~42 gets at most (Spam reduction) 8×AM (k, l, m), for every 4 segment (e.g, 1.5 mt.×4=6 mt)
(4) No M (1)~25 gets more than k=10 segments (15 mt.) Ad impression "exclusivity" (limitation on "capital-rich" merchants)

Auction Alternatives:

The high level auction~214 alternatives are: Open & Closed. I recommend "open" bidding, because "closed" bidding creates the possibility of "insider" information based bidding. Moreover, note that the "bounded" bid algorithm attempts to deter the capital-rich merchants to overwhelm the less rich merchants. Competing interests are also balanced by each merchants Ad Repetition Rate (ARR~162) in the bid wager packet (~239).

I recommend "open" bidding during designated "prime" periods, (e.g., 10 AM-6 PM), to be determined and set by the TEGOBAMA~815-817 PaaS provider (RDPP~81), on a region-by region (r) basis. I also recommend that to ensure fairness, a Bid amount limit be imposed, so that "capital-rich" advertisers-merchants do not "drown-out" others, because having a variety of Ad offers is in the best interests of the consumer~191. Moreover, I recommend that to ensure variety of Ads to each TQC~42 group member, each advertiser-merchant be able to reach each consumer no more that once every 10 bid periods (e.g., 15 minutes). I believe that not enforcing a certain level of fairness and variety, may well result in consumers opting-out completely, because of spam induced annoyance. Note that, for each merchant, if Ad impressions are not actually transmitted by the provider's Ad network (PAN~167-168) and received by the targeted qualified consumers (TQCs~42), then the merchant's bid is refunded or reapplied to bids on future time-of-day (TOD~27) segments (DTOD~98), for subsequent bid-Ad Package (~239) transmission opportunities.

Merchant Conflict Resolution Algorithm

The bid conflict among Merchants arises, because several merchants want "certain" consumers to visit, because this group of consumers meets the specific selection criteria (e.g., TOA~26, CCA~112, TOD~27) of all these merchants. Thus, the underlying conflict resolution algorithm has to allocate each competing (bidding) merchant's Ads, for delivery of Ad impressions to multiple consumers, by a time-deterministic Ad queuing first in-first out (FIFO) buffer for each targeted qualified consumer (TQC~42). The transmission (ACPT~289) of these specific consumer-by-consumer buffers has to be accomplished by TEGOBAMA~815-817 Provider (RDPP~81), precisely at each TOD (k).

There are 3 cases within each TOA~CCA (~26-112) segment (j, i) pair (subject to the merchant's TOD~27 based EOL~297 limitations):

Case #1: Number of bid-weighted Merchants, BW<Number of Ad-weighted Consumers, AWC (j, i)
Case #2: Number of bid-weighted Merchants, BW=Number of Ad-weighted Consumers, AWC (j, i)
(a) Compute bid-weighted competing merchants on segment: BW1 (k)=SUM [M(j, i, l)×BM(l)]
(b) Compute Ad-weighted consumers, AWC (j, i)=SUM [TQC (j, i, l)×AM (j, i, l, m)
(c) Compute BW1 (k)/AWC (j, i)=N ads (integer round up) from AM (j, i, l, m) per TQC (j, i)~42
(d) No repeat Ads in next 10 DTOD~98 segments (e.g., 1.5 mt.×10=15 mt)

Case #3: Number of bid-weighted Merchants, BW> Number of Ad-weighted Consumers, AWC (j, i)
(a) Compute BW2 (k)=SUM [M(j, i, l)×BM(l)]=NN ads (round up to integer),
(b) Compute Ad-weighted consumers, AWC (j, i)=TQC (j, I)×NAD (j, i), as per item (b) above
(c) Compute AWC (j, i)/BW2 (k)=N ads (round up to integer) from AM (j, i, l, m) per TQC (j, i)~42
(d) No repeat ads in 10 DTOD~98 contiguous segments (e.g., 1.5 mt.×10=15 mt)

The computational algorithm for these three cases is detailed by the following pseudo-code sequence:

Case #1 Sub-Algorithm:
(a) for each CCA~TOA (~112~26)=segment tuple (j, i), use integer N,
(b) for each C (j, i)~42, use a random number generator (RNG) with M (j, i)~25 possible outcomes, pointing to corresponding ad BAWT (k, j, i, l) from merchant M (j, i, l) for TOD (i) to C (j, i),
(c) allocate N Ads per TQC j, i),
(d) repeat for all TQC (j, i),
(e) repeat for all (j, i) pairs, 2 DTOD time segs (e.g., 3 mt), before TOD (i)
(f) for each consumer TQC (j, i), queue up the selected ads in FIFO order (g) transmit TQC (j, i) FIFO to TQC (j, i) device ID (smart-phone, web terminal): BAWT~289.

Case #2 Sub-Algorithm:
(a) for each TOA-Activity (~26-112) segment tuple (j, i), use N=1,
(b) for each TQC (j, i), use a RNG with M (j, i) possible outcomes, pointing to corr. Ad from M (i, j), allocate N (=1) Ads per TQC (j, i),
(c) repeat for all TQC (j, i), (d) repeat for all tuples (j, i), 2 DTOD~98 time segments (3 mt), before TOD(i), (e) for each consumer TQC j, i), queue up the selected Ads in FIFO order, (f) transmit TQC (j, i) FIFO to TQC (j, i) device ID (smart-phone, web terminal).

Case #3 Sub-Algorithm:

If there are more merchants, M~25, than opt-in qualified consumers, TQC~42, thereby creating a merchant Ad competition & potentially serious consumer span problem:

(a) for each TOA-Activity segment pair (j, i), compute M (j, i)/TQC (j, i), use integer NN.

Figure 8:
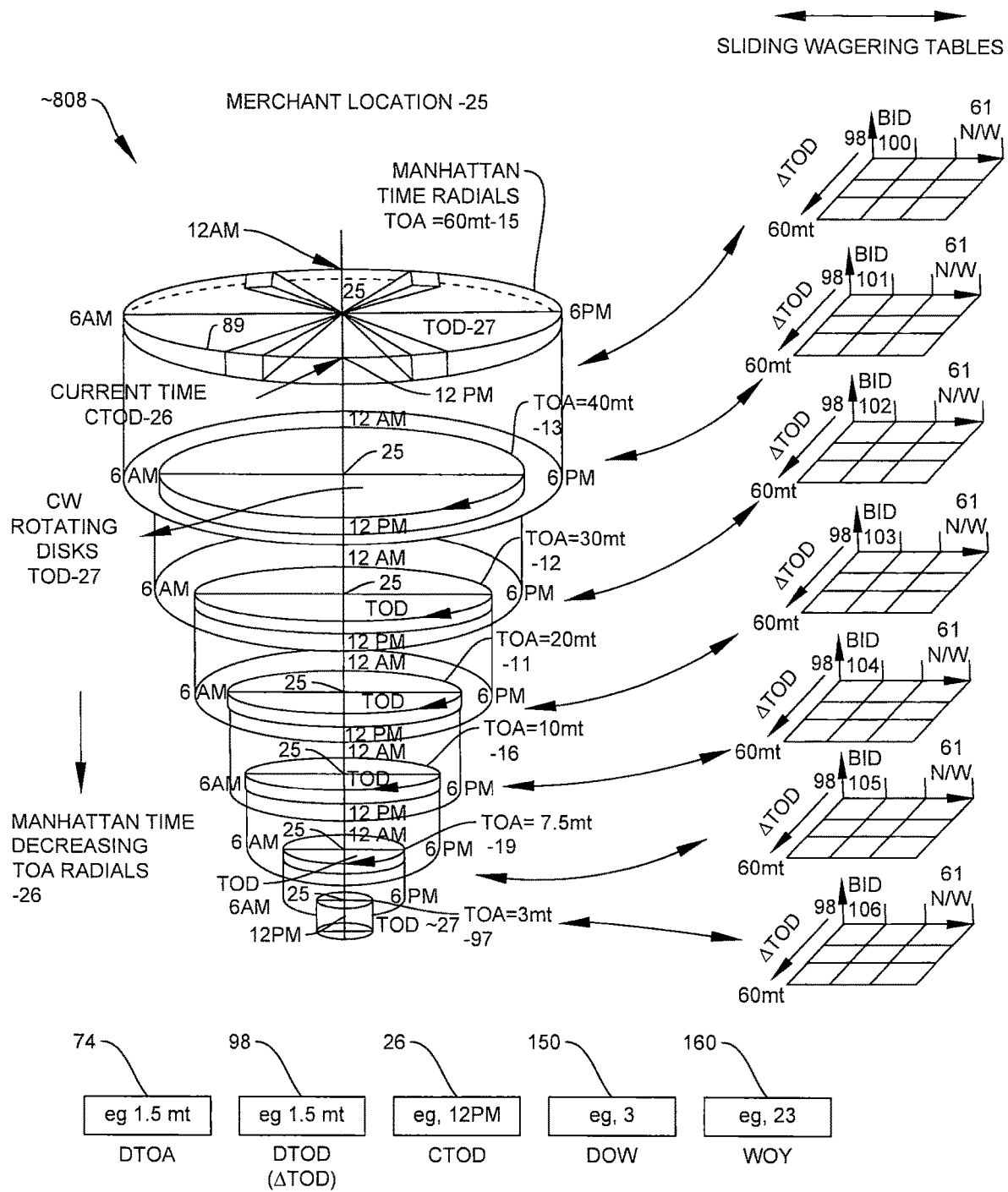

Other Related Cases:

Case (b1) NN<9; for each M (j, i), use RNG with TQC (j, i) possible outcomes, pointing to TQC (j, i) to whom ad from M (i, j, l) is allocated, (c1) repeat for all (j, i) tuples, NN times 2 DTOD time segments (3 mt) before TOD (i), (d1) for each consumer TQC (j, i), queue up the selected Ads in FIFO order (e1) transmit TQC (j, i) FIFO to each TQC (j, i) device ID (smart-phone, web terminal), OR, Case (b2) NN>8; compute NN/8=NNN and round down, (c2) for each M (j, i), repeat case (b1), NNN times, (d2) for each consumer TQC (j, i), queue up the selected ads in FIFO order (e2) transmit TQC (j, i) FIFO to each TQC (j, i) device ID (smart-phone, web terminal).

all TOA ellipses; this figure shows CTOD~29=12 PM, as an illustration. Next to each TOA, there is a corresponding rectilinear bid table, akin to FIG. 6~306, with a "sliding" merchant selectable delta time-of-day segment (DTOD~98), for say the next 180 minutes (e.g., 3 hours look-ahead bidding: 240 DTOD segments of 1.5 mt each) shown on the x-axis 40. The y-axis~28 depicts the merchant selectable Need/Want (N/W~61) categories, to enable merchants bidding with chips, which are of color-coded~38 denominations, on targeted qualified consumers (TQCs~42). The merchant can move the visible portion of the look-ahead bid table back and forth with a touch screen (or mouse) "sliding" functionality, to place bids on an entire day (960 segments) or longer, as implemented by the TEGOBAMA~815-817 RDPP~81. The merchant can also minify (pinch down) or magnify (pinch-out) a particular portion of the bid tables, in a touch-screen mode. Note that the corresponding Z-axes are distinct (i.e., 100, 101, 102, 103 104, 105, 106) for each TOA bid-Ad table respectively on the right side, because each merchant's~25 bid amount, on their "confidential" bid table, iconized as the # chips bid~140, is most likely different for each TOA segment (e.g., DTOA=1.5 mt duration). I recommend a "sliding" DTOD~98 range of 1 week (7 days @960 segments/day), but the visible portion for an embodiment of FIG. 8~308, is recommended to be the next 60 minutes (40 DTOD segments of 1.5 mt each), as noted above. Note that continuously progressing TOD~27 is shown at the bottom of FIG. 8~08, as CTOD~29.

TABLE V

Targeted Qualified Consumers (TQC): DTOD (k) & N/W-CCA (j) & TOA (i)

| Time Merchant Segment (ID, DTOD) | | Opt-in TQC Bid-weighted/limited Merchants (BW) Ad-Weighted & Ad-Weighted Consumers (AWC) | | | |
|---|---|---|---|---|---|
| DTOD | ID = 1; ID = 1; ID = L | AWC | BW > AWC | BW = AWC | BW < AWC |
| 1 | M (1,1); M (1,1); M (L,1); | AWC(1) | BW1 > AW1; | BW1 = AW1; | BW1 < AW1 |
| 2 | M(1,2); M (1,2); M (1,3); | AWC(2) | BW2 > AW2; | BW2 = AW2; | BW2 < AW2 |
| ... | 960 M (1,960); BW960 = AW960; | M (1,960); BW960 < AW960 | M (L,960); | AWC(960); | BW960 > AW960; |

FIG. 8~808 is constructed by "telescoping" a variant of FIGS. 1-3 (~301-303) into a novel virtual 3 dimensional (3-D) parabolic stratified (bowl-like inverted pyramid) shape to enable visualization of clusters of color-coded~38 Targeted Qualified Consumers (TQCs~42) in each TOD-~TOA (~26-27) segments (e.g., 1.5 mt), as per FIG. 6~306, with a corresponding "sliding" bid wagering table for tokenized bidding with colored denomination chips on Need/Want (N/W~61) table targeted qualified consumers (TQCs~42), present in preferred TOA~CCA (~26-112) zones, as per FIG. 5~305. Current time-of-day (CTOD~29) remains stationary, but is highlighted. Going from top-to-bottom, the 3D bowl is formed by TOA~26 circles/ellipses, which are progressively smaller clockwise (CW) rotating TOA~26 disks, rotating at the "natural" frequency of 1 revolution/24 hr day (nominal), with end-of-day (EOD~297) correction/reset, if required.

FIG. 8~808 the several DTOA~74 segmented zones (e.g., 1.5 mt), are delineated along a vertical axis by: TOA=60 mt (~15), TOA=40 mt. (~13), TOA=30 mt (~12), TOA=20 mt. (~11), TOA=10 mt. (~16), TOA=7.5 mt. (~19) and TOA=3 mt. (~97), for example. Each of the TOD "ellipses" representing constant TOAs are centered on each distinct merchant 25. Clearly, Current TOD (CTOD~29) is identical on The inverted stratified bowl-like TOD~TOA (~27~26) of FIG. 8~808 needs to be replicated 6 times for bidding based on the 6 distinct Ad placement criteria targeting qualified consumer (TQC~42) attributes identified herein, which have not been concurrently utilized previously. This would require moving back-forth on a multi-screen display to place bids. However, if a merchant (e.g., SME) has a "severely pruned" list of parameters, encompassing all 6 attributes/facets of consumer interest, then a single display screen may be adequate, as per FIG. 3~803 and FIG. 4~804, for example.

These 6 attributes/facets of the (impulsive) consumer decision-making process, emanating unpredictably from the consumer, which are of interest to bidding merchants [MSMEs=micro-small-medium enterprises, LSEs=large scale ent.)] are: (a) E: emotions~111, (b) A: activities~112, (c) D: demographics~113, (d) S: services~114, (e) P: products~115, (f) K: keywords/phrases~116, can be compactly organized; collectively referred to as ESKAPD~30. Two distinct embodiments are depicted in FIG. 9~809 or FIG. 10~310, to minimize the above mentioned 6-way replication, with the proviso that merchants~25 are primarily interested in motivating consumers to buy and are not concerned about time-of-day (TOD~27) or time-of-arrival (TOA~26), at which the targeted qualified consumers (TQCs~42) are to receive the Ad. In other words, the merchant wants to bid on the DTOA~74 segments spanning TOA=30 mt to 12 mt (for example) and segments (TOA=30 mt to TOA=18 mt), then the TEGOBAMA~815-817 provider~81 system transmit Ads accordingly, to targeted (opt-in) qualified consumers~42, located within merchant's-start-of-day (MSOD~256) & merchant's-end-of-day (MEOD~257).

Figure 9:
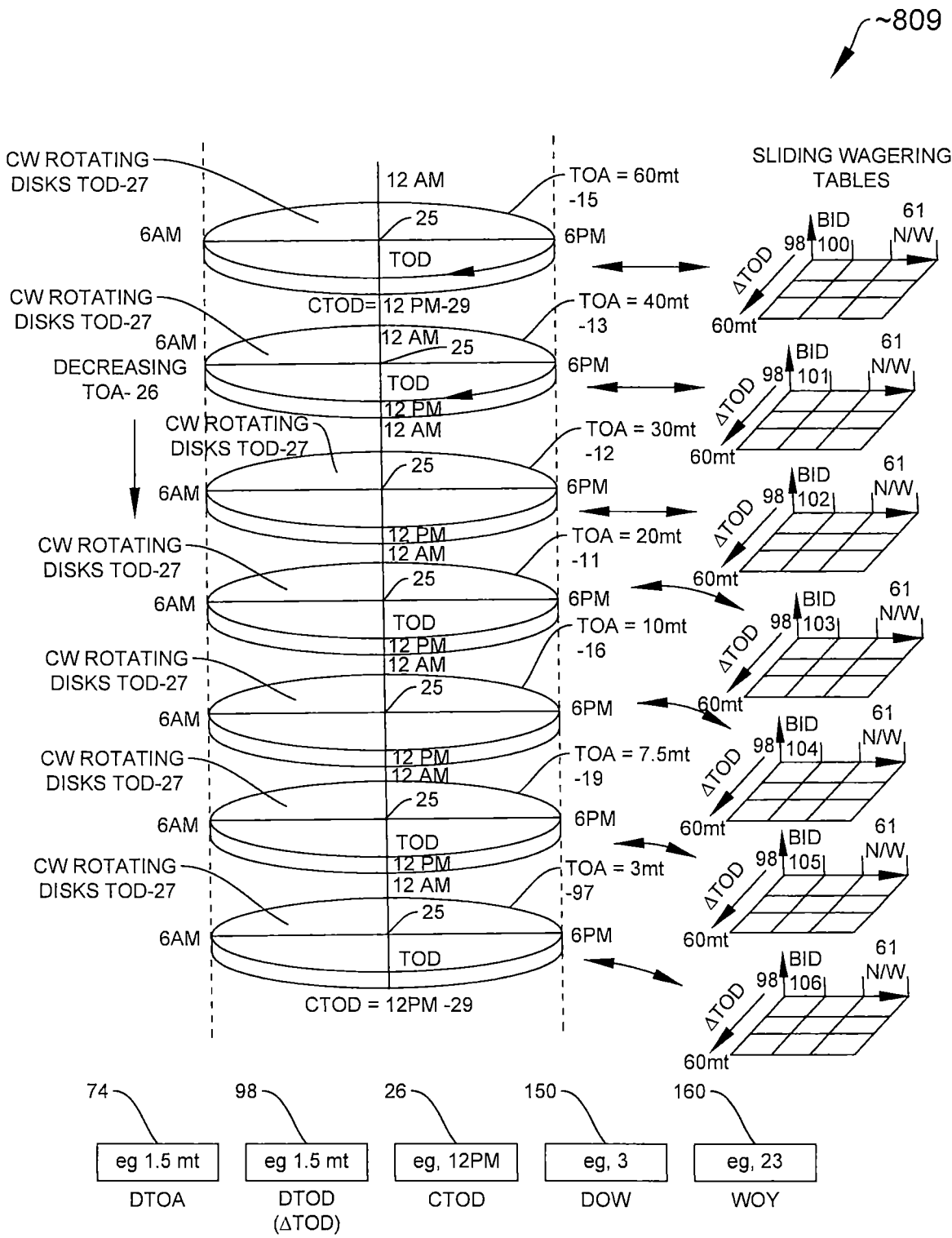

FIG. 9~809 is akin to FIG. 8~808, except that the stack of rotating TOD~27 disks with merchant selected TOA~26 are "identically" sized. As in FIG. 8~308, the corresponding TQC~42 are depicted (not shown) above each TOA~26, enabling the merchant to visualize a TOD~27 based statistical distribution (e.g., approximated by 2 sigma color coded~38 cubes) of TQC, as per FIG. 6~806.

Figure 10:
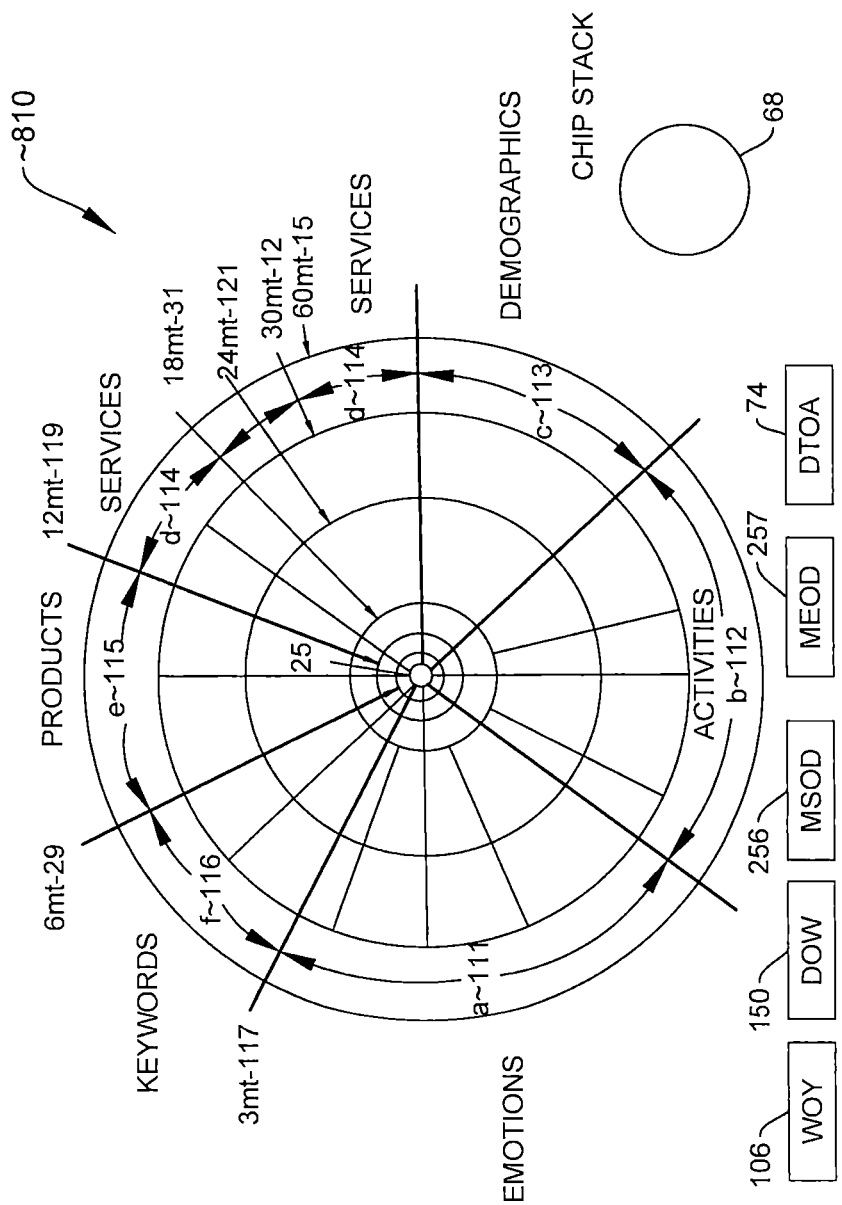

FIG. 10~810, depicts a bid wagering table with a bid region made up of concentric circles, partitioned into 6 facets, representing 6 decision-making attributes. The radial axis represents TOA (3 mt~97; 7.5 mt~19; 10 mt~16; 15 mt~18; 20 mt~11; 30 mt~12; 60 mt~15), akin to FIGS. 2 & 3. But unlike FIGS. 2 & 3, TOD~27 is suppressed from this bid table, because in this embodiment, it is not deemed to be important by the merchant selecting this bidding modality. The merchant can place chips or place bid amounts numerically, on the table via a touch-screen or keyboard input interface. Moreover, the merchant can specify several TOD~27 segment (e.g., Restaurant: 11 AM to 2 PM; 5 PM to 9 PM) too, if required.

Figure 11:
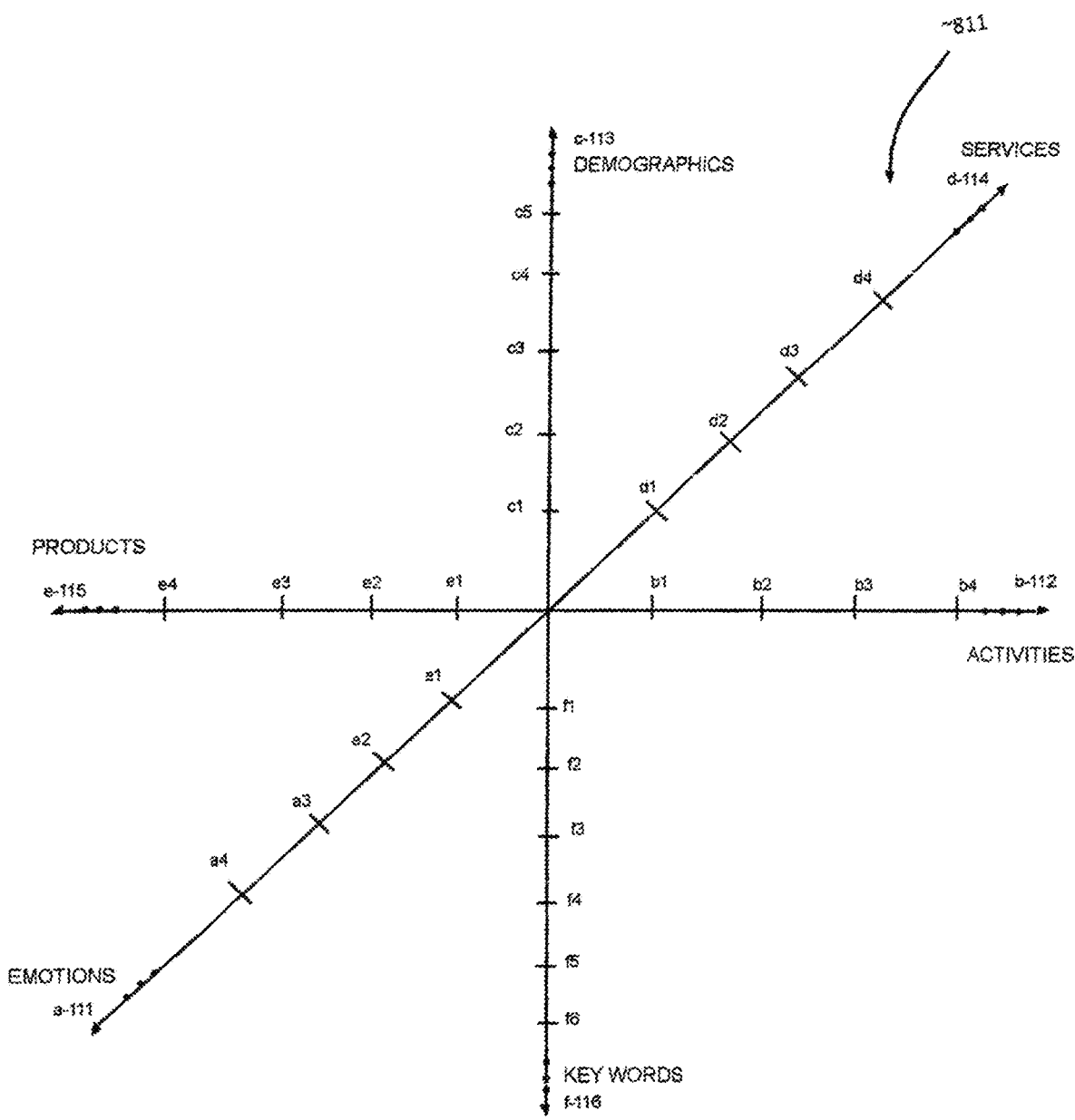

FIG. 11~811, enables merchants who are visually more "comfortable" (user-friendly merchant preference) with a Cartesian grid to place bids in a three dimensional (3D) bidding grid on 6 distinct axes, representing the 6 distinct facets of the consumer's criteria, as depicted therein. Each of the axes is partitioned into segments to represent all the distinct decision attributes of interest on that axis. The segments are attractively colored coded, based on a standard spectral color chart. Within each segment, the normalized bid amount (e.g., 0 to 31 units) can be numerically shown. However, if there are several TOA/TOD (~26/27) segments of interest to the merchant, then the UI depicted in FIG. 2~802 must be concurrently employed with FIG. 10~810.

Figure 12:
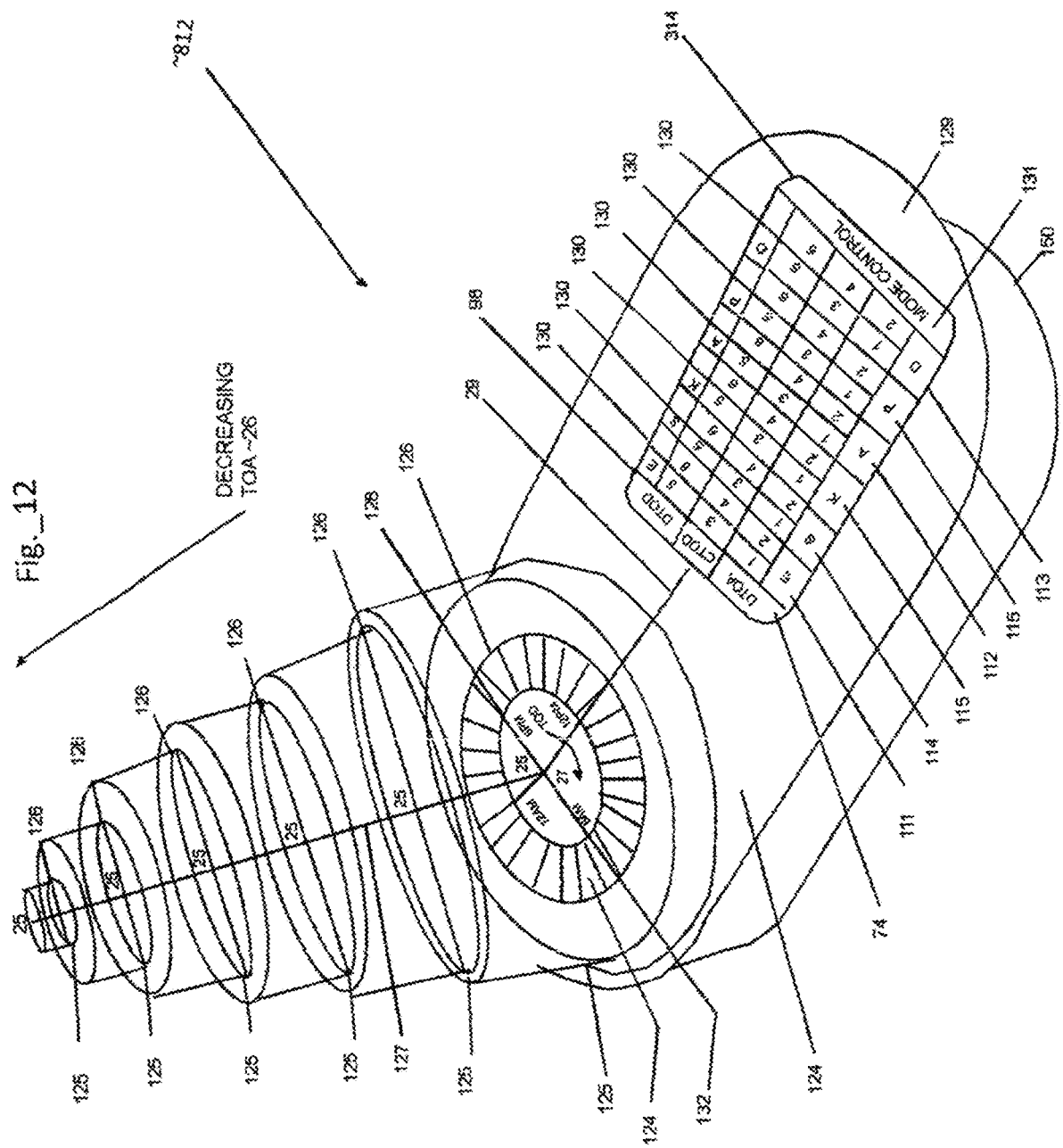

FIG. 12~812, depicts a merchant selectable multilevel (TOD~27-TOA~26) "virtual" Roulette-like casino game~124 bid table with a 3D layered cake-like structure~125 (akin to the disk-cylinder~FIG. 809 and disk-bowl-FIG. 808 being inverted layered cake), with decreasing TOA~126 going upward to the apex of the inverted bowl. The casino gaming-like "color scheme" and Roulette-wheel look-feel (Merchant User Experience: MUX) is motivated by the goal of fostering merchant (~25) "enthusiasm" to learning and actively participating, in an otherwise tedious merchant unfriendly bidding process, as in prior art merchant-user interfaces. The table color~129 is ideally green, the continuously clock-wise (CW) revolving~127 roulette wheel with a twenty-four hour revolution period. Time-of-day (TOD~124) hourly sectors are ideally colored red and black alternatively. The numbers on the bid table itself are also alternately colored red, black, green, etc.~130, akin to the color~38 schemes found in casinos. The radial (range) coordinate axis on the 3D dome structure~125 represents several decreasing time-of-arrivals (TOAs~26) levels (decreasing radial-axis)~126, around the vertical z axis, representing the merchant~25, akin to FIG. 9~309. This embodiment is the preferred alternative to a multi-screen multi-attribute display embodiment of FIG. 8~808 & FIG. 9~809. Within the time-of-arrival (TOA~26) concentric circles/ ellipses (angular theta axis) forming the layered dome-like 3D volume, the available opt-in targeted qualified consumers (TQC~42) are selected, as per the merchant-specific bid placement on the bid table. TQC~42 clusters are depicted in, spectrally graded but visually distinct, colors~38 representing their density; densest clusters are red, sparsest clusters are blue, for example. Note that the current time-of-day (CTOD~29) point remains fixed, at the lowest point of the fixed circle around the rotating wheel. The rotating roulette wheel representing the circular/elliptic theta axis in this embodiment is a "look-ahead" 24 hour "future time" axis (one revolution of the roulette wheel=24 hour=1 day), with the invariant (fixed) CTOD~29 (current time-of-day) at the lowest point, representing "right now" (e.g., 12 PM). On the diagonally opposite side of this fixed CTOD~29, is twelve hours ahead~128 (e.g., 12 AM). Between these two on the circumference is 6 hours ahead~132 (e.g., 6 PM). TOD~27 disk clock dial is the clock-wise (CW) rotating wheel.

If CTOD~29, displayed above the attribute numbers on the bid table, just below the rotating wheel, is deemed to be adequate by the merchant, because the merchant's primary business objective is to attract consumers to view, comprehend and respond favorably (eg, buy) to Ads, at any/all (i.e., 24 hours) time-of-day (TOD) values, then the circular/radial theta axis need no longer be used for bidding on future times, but instead can be used to designate the 6 possible attributes, noted above, as 6 equal angular theta sectors of, say sixty (60) degrees each, akin to FIG. 9, within the dome embodiment of FIG. 11. However, the 6 sectors do not have to be of equal magnitude in their angular theta extent. Moreover, a similar angular sectoring scheme can be used to represent the 6 attributes in FIG. 8~808, yielding yet another useable embodiment of FIG. 8~808, subject to the provider's and their merchant's visualization preferences.

Figure 13:
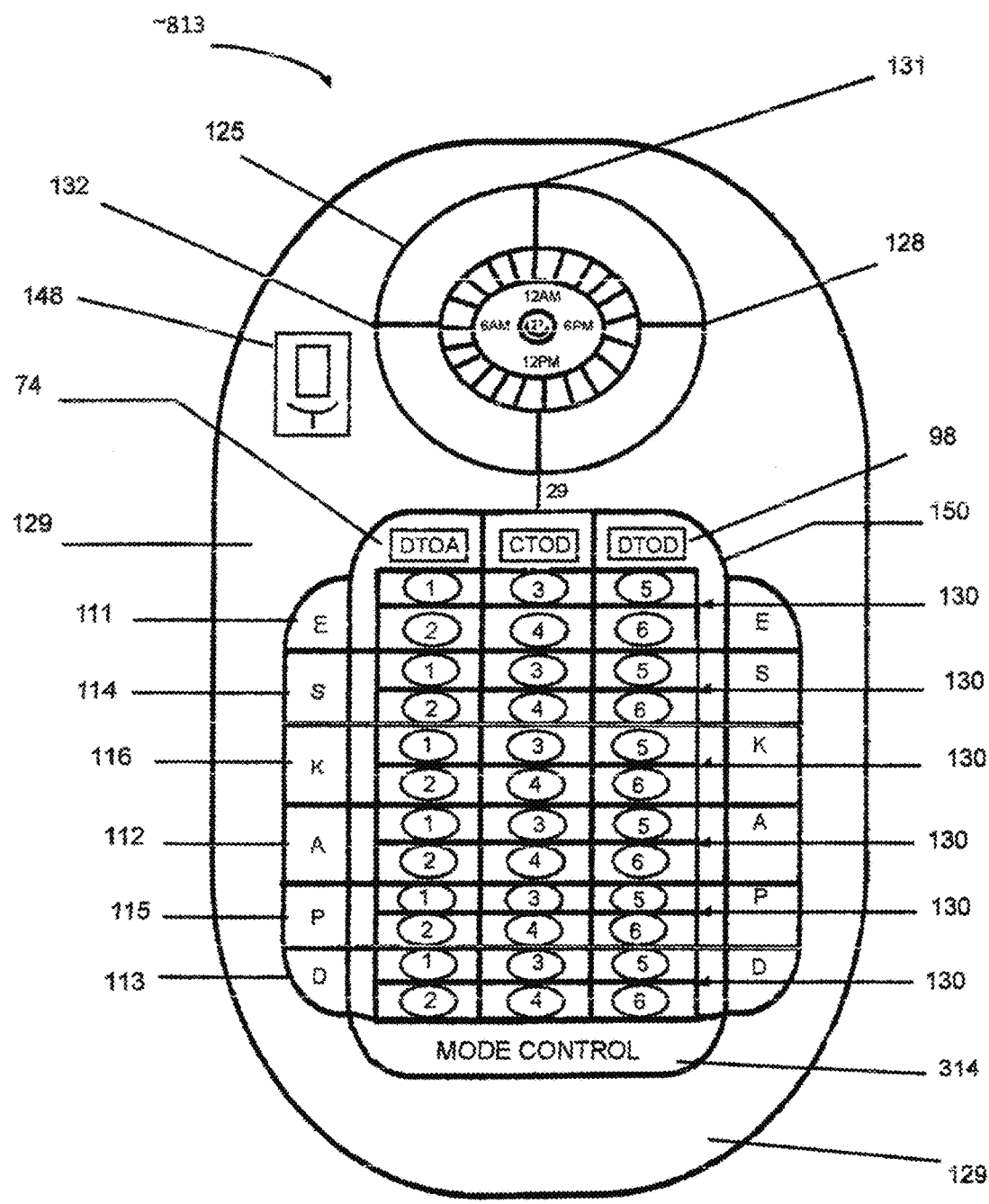

The wagering table of FIG. 13-813, details the bid portion 129 of the roulette-like table of FIG. 12~812, with the integrated the inverted bowl with all the previously discussed attributes/facets: (a) E: Emotions 111; (b) A: Activities 112; (c). D: Demographics 113; (d) S: Services 114; (e) P: Products 115; (f) K: keywords/phrases 116, along the length of the wagering table; collectively ESKAPD~30. Each of the attributes (a, . . . , f) in FIGS. 11-811 and 12-812 are in turn grouped into 6 specific, albeit distinct, categories. So, more categories can be accommodated in groups of 6 at a time, visibly selectable on the touch-screen~149 and moved to the next/prior set of 6 categories by a left/right flick of the finger, for example.

At the upper part of the table, but below the fixed rim~125 and rotating "roulette-like" wheel~126, which denotes evolving time TOD~27, the delta time-of-arrival (DTOA~74), current time-of-day (CTOD~29) and delta time-of-day (DTOD~98) are displayed. DTOA~74 and DTOD~98 are merchant~25 selected segment values, whereas CTOD~29 is evolving "local time" (i.e., wall clock), as per time zone, and is therefore not a selectable variable: "it is what it is."

Figure 14:
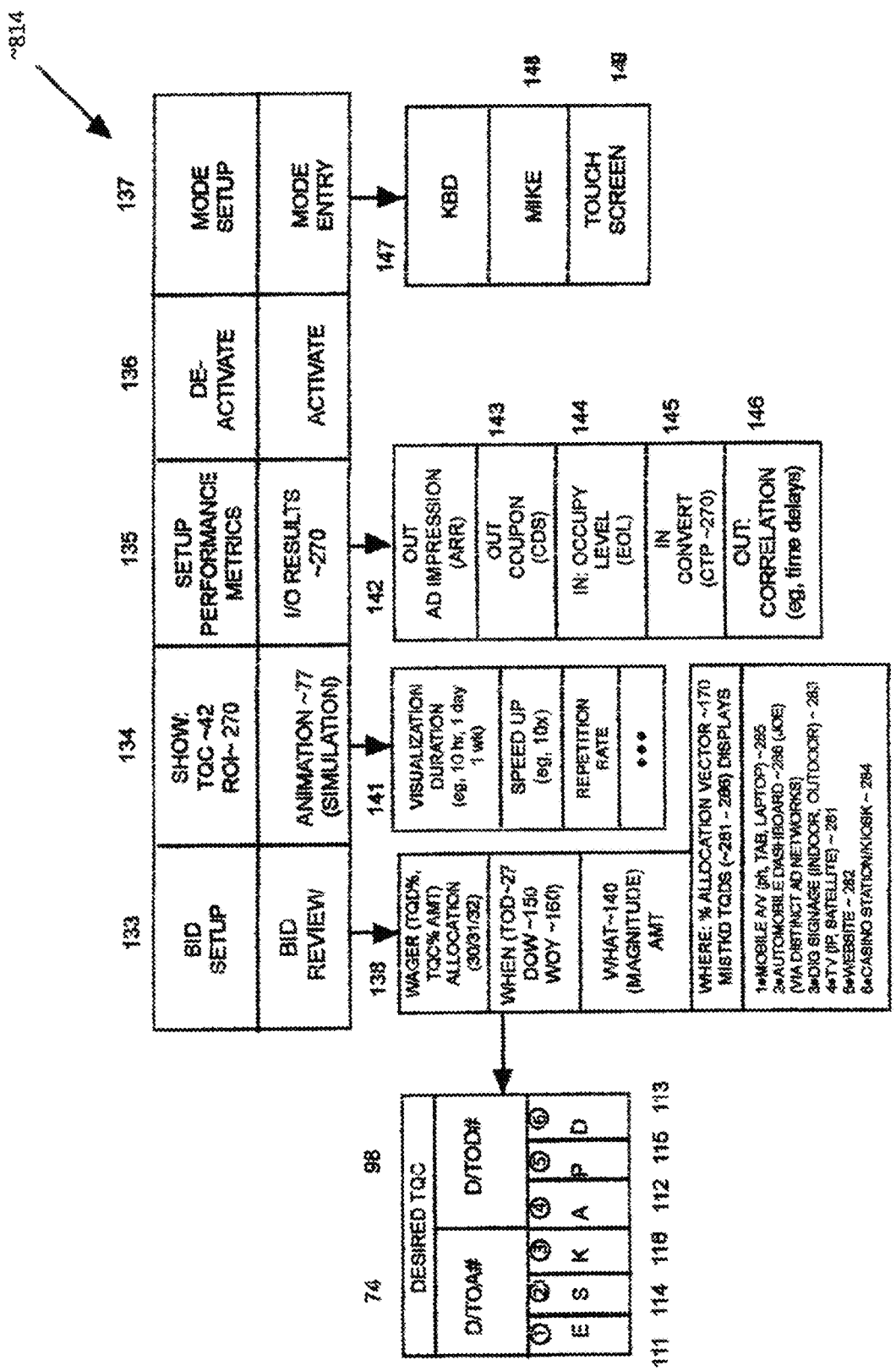

FIG. 14~814: Mode setup~137/activation~136 inputs can be entered by the merchant~25 via touch-screen~149, keyboard~147, or microphone~148, necessary to facilitate the implementation of a user-friendly mode control interface MFUI~151 by minimally trained SME merchants~25 and their advertising executives: (a) Wager setup/review~133, (b) TQC~42 & ROI~270 history animation~77, including visualization/speedup, etc~141, (c) Wagering~138, including ESKAPD~30 attributes & MISTKD~31 Ad display allocation, (d) performance metrics (I/O parameters)~135 [e.g., periodic (e.g., daily DOW~150) merchant~25 inputs:

EOL~297 input~144, coupon download DC~234 input~143, conversion-to-purchase~51 input~145; Output: TQC/ROI history animation~77, I/O delay (dx=231, . . . 237) correlation~146, current bid return ratio CBRR~278, etc]. A PHOSITA can devise MUI setup interfaces, perhaps other than drop-down menus, in the spirit of this example teaching.

Figure 15:
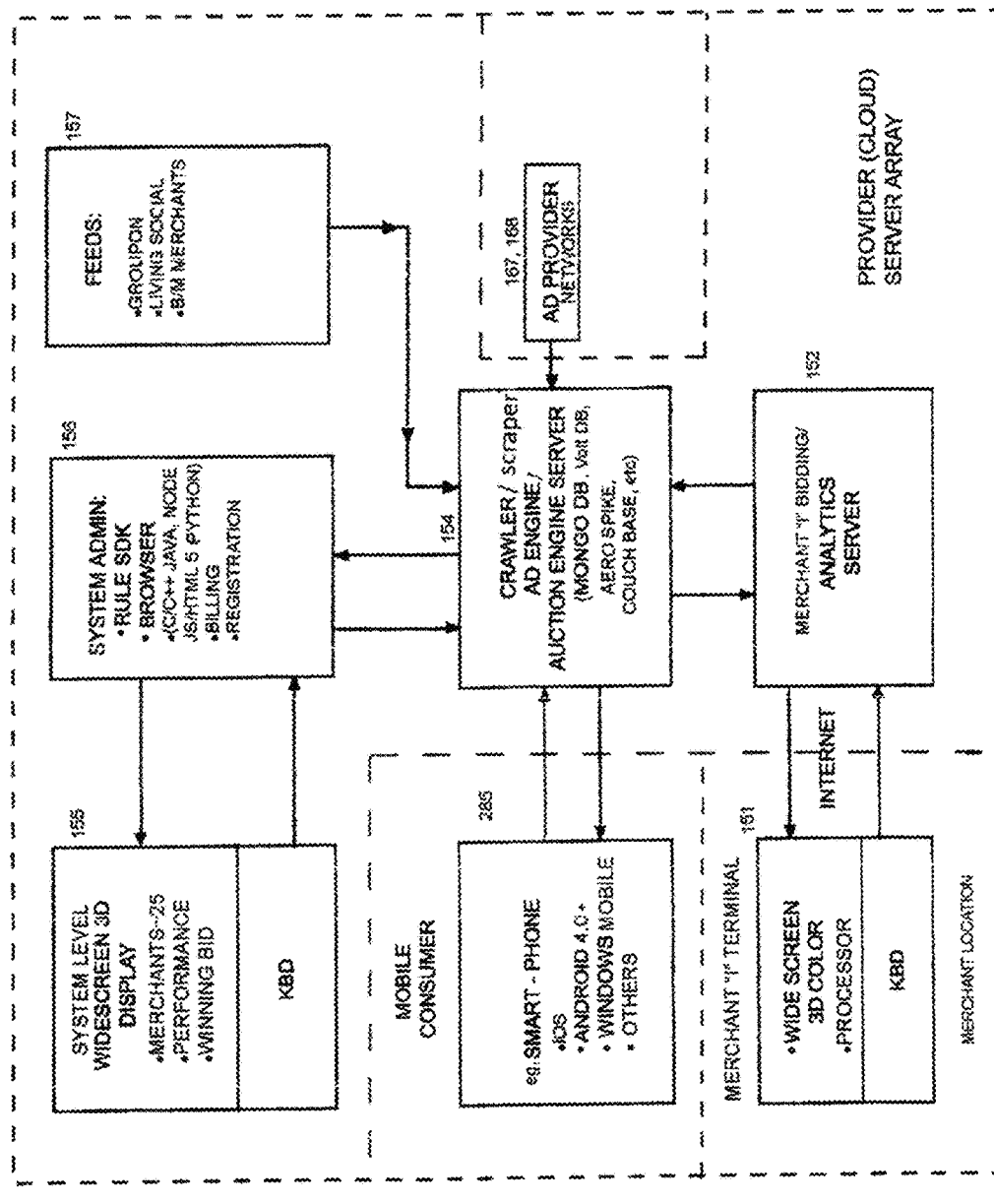

FIG. 15~815 is a comprehensive System Block diagram of TEGOBAMA (Timely Exciting Gamified Online Bidding for Advertising, Marketing and Analytics) with a time-driven sequence of actions: (a) the lower left block represents an array of individual Merchant Bidding "Thin Terminal" based dashboard 151 (TOA~CCA~TOD~26-112~27) based bidding (Bd~140), Ad delivery schedule (~238), from which a status "dashboard" is computed, as per FIG. 3~803 and/or FIG. 2~802, together with associated analytics. The lower middle depicts the servers~164, which periodically (e.g., every 20 TOD periods=30 minutes) deliver the bid response results, in terms of, click-through-rate (CTR?), of Visiting Consumers with downloaded coupons (DC~234), conversion-to-purchase (CTP~51) and related analytics (~270), to enable fine-tuning of subsequent Ad/segment wager packet~239, via the Internet. The middle left depicts an array of Consumer facing devices & displays (e.g., Smart-Phones, Tablets, Web Terminals, Signage, Kiosks, . . . ) for Ad receipt (display-audio/video, discount coupon (DC~234) download: e.g., 2D barcode captured via paper coupon, phone camera, . . . ), which the consumer reviews and clicks-through (CT) to the selected Ad P/S (~115/114) site of interest. The center of the FIG. 4~304 depicts the cloud server farm~154, which is used to host the auction Server (fast execution algorithms; interfaces-merchant, consumer; timing), enabling the management of the auction among the competing merchants, and accordingly queue up (FIFO: First in-first out) and delivers ads from competing merchants to each candidate consumer. The specific Ads delivered to each consumer are ones that are likely to persuade consumers, who hopefully click-through (CTR?) to examine a more detailed Ad, to download a discounted offer coupon (DC~234), as per coupon discount schedule (CDS~131) to actually visit the Merchant's brick-mortar (B-M) establishment and purchase products & services (P/S~115/114), at an attractive, perhaps time-limited discount, in a timely consumer commute-convenient manner.

The top left block FIG. 15~815 shows the RDPP (~81) system administrator's situation/status display 155. This "global" display pictorially depicts the number of consumers (i.e., TQCs~42) in different CCA~TOA (~112~26) segments at each TOD (24 hours=960 DTOD segments of say 1.5 minutes each). Note that each merchant needs to set an allowable max occupancy level (actual: EOL~297) for each TOD~27 segment, on say a weekly basis, accounting for holidays observed by consumers, thereby enabling a logically meaningful Ad bidding strategy (see~239 in FIG. 23~323) and subsequent performance analytics (~270 in FIG. 25~825) to be rapidly executed (<1.5 minutes=1 DTOD~98 segment).

The TEGOBAMA~315 system administrator's (RDPP~81) display~155 also shows how many consumers got Ads from each merchant~25, based on the merchant's bid. To minimize "spam," I suggest that each selected consumer (TQC~42) gets no more than say 10 new ads, during each 15 minute TOD~27 period (10 DTOD~98 segments of 1.5 mt each), during 8 AM-8 PM TOD~27. Moreover, I suggest that each consumer ought to receive no more than 8 Ads from the same merchant in any 24 hour (960 segments) period. Specific segmentation decisions are of course subject to, each TEGOBAMA service provider's (DAPP~81) preferences, driven by market demand of the "local merchant" community, within each time zone. The top middle of the FIG. 15~815 depicts the system administration servers~156, which enables overall system control, including parameter re-setting from the baseline (e.g., TOA=1.5 mts increments; TOD=1.5 minute increments, CCA=8 groups with 8 sub groupings below; AEI/AEE=8). The top right of FIG. 15~815 depicts the live $3^{rd}$ party feeds~157 from other shopping groups, such as, Groupon, LivingSocial, etc., as well as, "local" registered merchants (e.g., B-M: brick-mortar).

Figure 22:
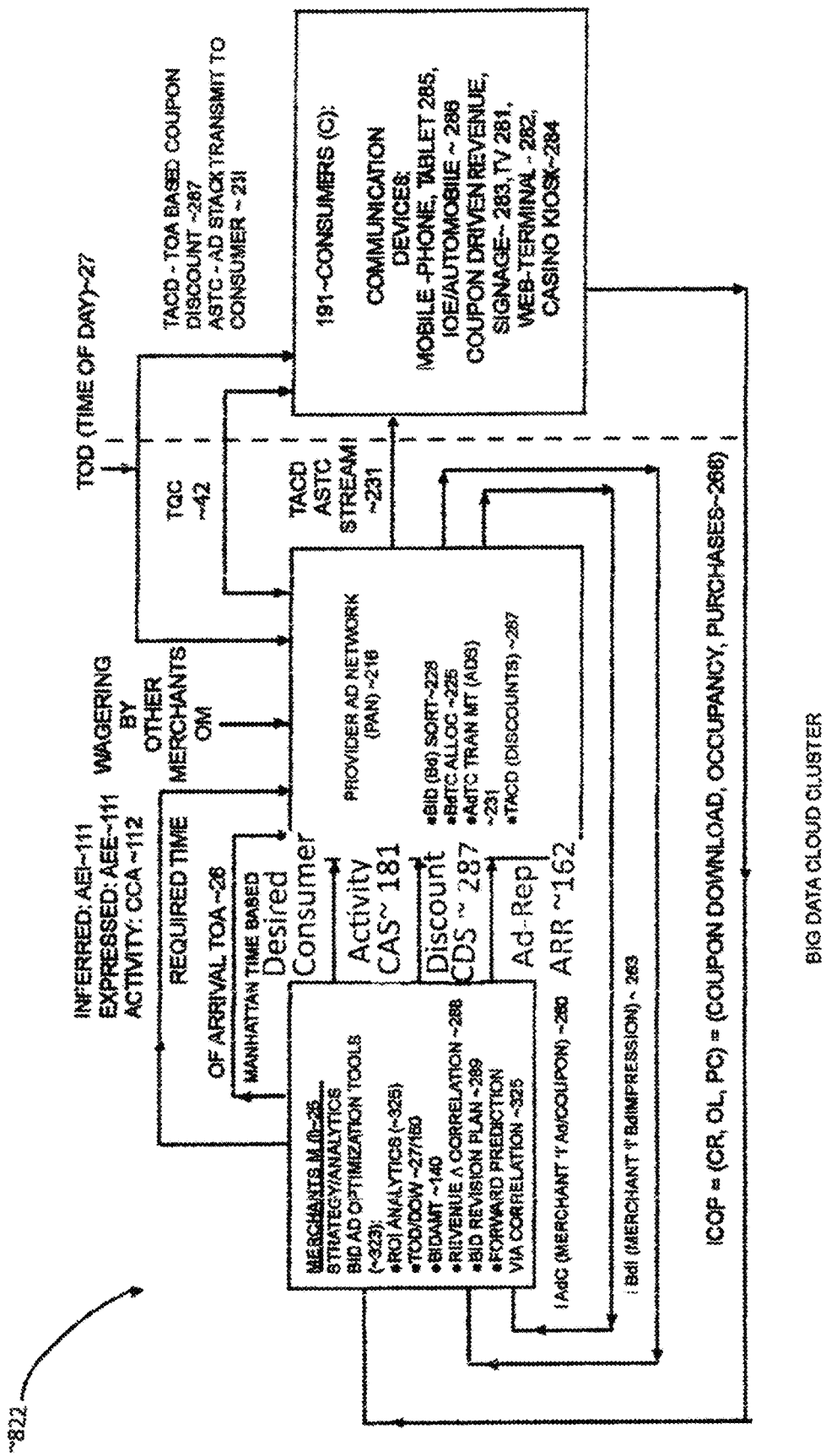

I suggest that there be a regional cloud server facility (RDPP~81), as per FIG. 15~17~315-317 & interconnected to the consumer, as per FIG. 22-322, physically located in each major (say, # of Consumer~191=1M<population<10M) metropolitan (metro) area, across the nation union (e.g., USA, EU, India, PRC, . . . ), with a database containing a localized set of registered merchant-users, with an out-of-area backup cloud server, to facilitate fault recovery/tolerance. A distributed set of decoupled cloud servers is also needed to communicate with local mobile consumers, via their carrier's cell towers, efficiently, while reducing vulnerability to a cyber attack on a provider's (DAPP~81) server to maintain database access (e.g., opt-in consumers~191, registered merchants~25), in a timely manner.

The local time zone (PST, EST, CST, . . . ) based TOD~27 periods can be subdivided on the basis of typical consumer buying activity: (a) 6 AM-8 AM, (b) 8 AM-11 AM, (c) 11 AM-6 PM, (d) 6 PM-8 PM, (e) 8 PM-10 PM, (f) 10 PM-2 AM, (g) 2 AM-6 AM. For example, period (g) 2 AM-6 AM, will typically have a significantly lower number of actively participating consumers (i.e., CCA=inactive/opt-out mode). So, the TEGOBAMA provider (DAPP~81) is likely to charge the advertising retail merchant less for ad delivery during this "slow" period. However, competitive merchant demand could drive this cost/ad unit up, because there are a limited number of consumers~191 and there is a limit on the number of Ads to the actively participating consumer, if an anti-spam policy has been articulated in the RDPP's TOU. Merchants~25 could "experiment" and "discover" whether bidding for and offering higher discounts, during these or other "low activity" periods, consistently brings in more consumers (e.g., increases EOL~297), at a lower cost per consumer visit to the brick-mortar (B-M) establishment. The consumer does not have to show up at these TOD~27 periods, but could be enabled to download a coupon (DC~234), set an appointment, place an order for the next available day or more convenient DTOD~98 time segment. In other words, the merchant establishment does not have to be open for the consumer to review and accept purchase offers, resulting in conversion to a purchase (CTP~51). Moreover the provider's Ad impressions, CTR (~?), and rate of conversion are likely to come at a successively increasing cost schedule to the merchant.

The middle left of the FIG. 15~815 represents the consumer smart-phones, which receive the stacked banner ads from TEGOBAMA provider (RDPP~81). Controls are provided to scroll through the 16 stacked ads from merchants, using a vertical up/down arrow on the left of the banner. A particular Ad is selected with the horizontal arrow symbol, as per FIG. 18~818 below. This selection typically results in more detailed information to be displayed, re the merchant offer, perhaps including say, a 9 second slot for a multimedia video Ad display. Note that each 1.5 mt Ad segment can accommodate 10 such video Ad slots.

The bottom left of the FIG. 15~815 shows the widescreen merchant's bidding display~151, located at each Merchant's facility. This shows the merchant's perspective in the Cartesian format, as per FIG. 4~5 (~804/805) or the polar plot of FIG. 2~3 (~802-803).

The center of FIG. 15~815 has the auction engine~154 which allocates the available consumers to each of the merchants based on the merchant's bid. The auction engine resolves the competing bids in conflict on the given group of consumers in each TOA~CCA(AEI, AEE) group.

The server side processing sequence begins by assigning an anonymized ID to each smart-phone equipped consumer, who has opted-in~109 (or opted-out~290) to receive relevant ads based on their preferences at the beginning of each segment (e.g., 1.5 minutes duration=DTOD~98), beginning at the start-of-day (local time zone: 3 AM). These consumers are then sorted for each active registered merchant on the basis of their preselected: (1) TOD~27 zones, (2) TOA~26 zones, (3) comprehensive preferences (ESKAPD~30 based bids (Bd~140): (a) E: Emotions~111, (b) A: Activities~112, (c) D: Demographics~113, (d) S: Services~114, (e) P: products~115, (f) K: Keywords~116.

For each active merchant~25, these qualified consumers (TQCs~42) are then sorted in terms of the TOA~26 in ascending order. The corresponding ads from each merchant to be transmitted to each consumer are queued up in a first-in first-out (FIFO) buffer for transmission. This consumer FIFO queuing is done for merchants. The final step before transmission is to merge all the FIFO queues for each consumer, to ensure that no consumer is getting "too many" (e.g., 10 per merchant, 9 second ads/per 1.5 mt. TOD~27 segment) ads in each time segment. If there are more ads cumulatively queued up per consumer, then this "conflict" among merchants has to be resolved by an auction as described below. Essentially, the ads have to be distributed across all the delineated targeted qualified consumers (TQC~42) available, without overburdening consumers (primary criterion) with Ads and giving as many merchants as possible an opportunity to present Ad impressions to consumer. Moreover, merchants~25, who bid a larger amount all the time, can "shutout" the smaller bidder. In the interests of fairness, this situation ought to be mitigated by limiting the merchants placing higher bid amounts to a certain maximum number of ads, on a TQC~42 basis, over a preset TOD~27 duration (e.g., TOD=15 mts=10DTOD seg.), as a matter of regional provider (RDPP~81) policy. Nor should each consumer be getting the same set of Ads from the same set of merchants in multiple time (DTOD~98) segments, separated by less than the Ad provider's threshold (e.g., 20 DTOD=30 minutes), as a matter of each regional (time-zone based) provider's (RDPP~81) policy.

Figure 16:
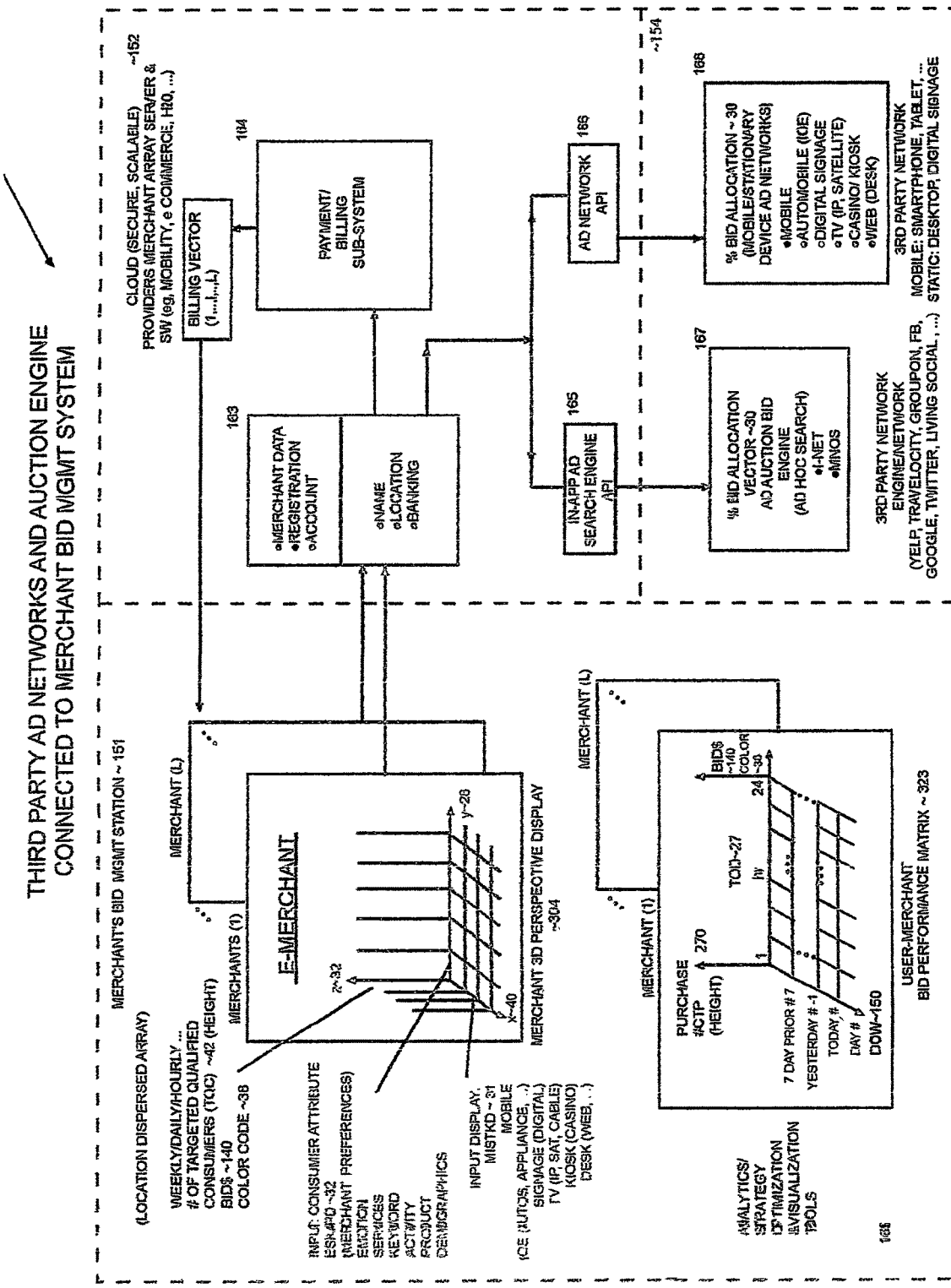

FIG. 16~816 depicts an augmented version of FIG. 15, namely, third (3rd) party Ad Networks and Auction Engines connectivity based scheme implemented via an APIs based Architecture add-on to Merchant Placement System. The upper left of the figure depicts the merchant's bid management station~151, which displays a 3D graphic perspective (x~40: available displays MISTKD~31; y~28: consumer attributes ESKAPD~30; z~32: #TQCs~42 and/or bids~140), using a mouse and/or touch-screen, as per FIG. 5~305. The upper right shows Merchant array server~152, comprised of an accounting system~163, and a placement billing subsystem~164 on a merchant-by-merchant~25 basis. The accounting system in turn invokes the appropriate search engine (SE) APIs (application program interface)~165 and merchant (l)-Prioritized Ad network~166 APIs, collectively MPAN (l)~153. The bottom of the figure shows these APIs being invoked over the Internet to drive the $3^{rd}$ party Ad auction engines (e.g., Google)~167 and mobile Ad networks~168/169, as per merchant~25 bid allocation MISTKD~31 & ESKAPD~30 driven opt-in consumer~42 display selection. The merchant bid allocation strategy can be subjectively (e.g., gut-feel, experience, gamble, . . . ) multichannel (i.e., bid~140 to maximize short-term decision-making, such as, CTP~51, for each channel) and/or omni-channel (bid to optimize seamlessly across all channels to foster long term brand loyalty to broadly increase consumer (TQC~42) life-time value (CLTV), as a function of TOD~27, TOA~26, DOW~150, WOY~160, and associated merchant designated TQC~42 delineation parameters. The TEGOBAMA architecture suggests that merchants not use intrusive PII~117 (e.g., tracking cookies) to monitor consumers.

Figure 17:
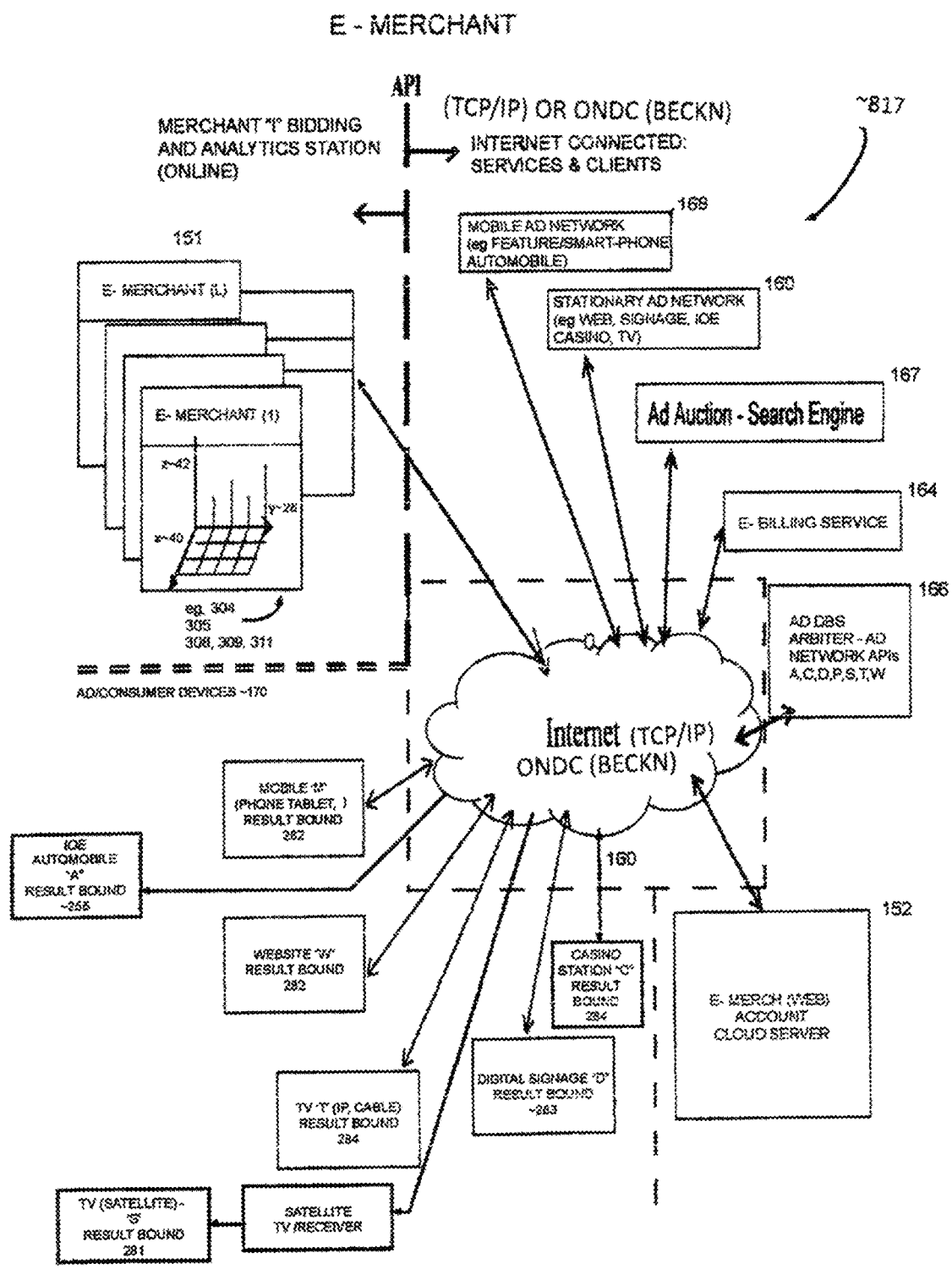

FIG. 17~817 is yet another depiction of the TEGOBAMA system architecture, akin to FIG. 15~16-815-816, showing an "E-Merchant" (l) distributed system architecture. The upper left is the bidding and analytics setup/evaluation~151 module, with a set of 3D depictions of parameters of interest customized by each merchant, wherein axis: x~40; y~28 & z~32. Candidate display embodiment disclosed include, 303-306, 308-309, 312-313. PHOSITAs can devise other display embodiments akin to these. The right half of FIG. 17~317 shows the regional time-zone fenced Internet Cloud TZIC~260 interfaces to mobile consumers, merchant server array~154, mobile ad network APIs~168, Auction engine~167. The lower right quarter of FIG. 17~317 depicts the broad variety of consumer facing~280 display devices (e.g., IOE/Cars "I"~286, mobile Tablet/phone "M"~285, IP&cable TV/Satellite TV~281 "T", Desktop/Website~282, Digital signage~283 "S" (fixed, bus, train, . . . ), kiosk/casino "K"~284) allocated for each merchant, as per their MISTKD %~31 bid allocation, across consumer facing web/mobile Ad networks, as per their prioritized MPAN (l)~153 arbitration unit~166.

Integrated Analytics

After a few months of operation, most merchant know which calendar days/weeks (DOW/WOY~150/160) were profitable and which were not. However, the disclosed cloud server based TEGOBAMA~815-817 facility (RDPP~81) enables systematic logging of these Ad performance outcomes (APO vector data), such as, cost-per-customer (CPC?), Life-time-value (LTV?), conversion-to-purchasing (CTP~51), gross-daily-profit (GDP~?), cash-register based gross-hourly-profit (GHP~?), together with TOD~27 based EOL~297, to facilitate the correlation (time, location, activity, . . . ) between the TOA~26 based Ad bid schedule (ABS~239) effectiveness, Ad repetition rate (ARR~162) effectiveness, alternate Ad content ranking (ACR~), alternate coupon discounting strategies (CDS~131), EOL~297 improvement and APO. This analytical cross-correlation process provides quantitative guidance into how to modify the wager package ABS~239 (i.e., bid amount BM~140 @TOD~27 placement time, Coupon discount~131, Ad ID~238, ARR~162) to improve LTV/CTS~51

Typically, establishment occupancy levels (EOL~297) tend to have a significant statistically chaotic and therefore unpredictable component. However, the disclosed integration of Ad bidding strategy (ABS~239: e.g., coupon discounting schedule CDS~131, BM~140) and EOL~297 and APO vector, keyed to calendar TOD~27, over several weeks, months, seasons and years, facilitates significantly improved statistical modeling to improve the MSME/LSE business profitability (bottom line). For example, for retail merchants, consumer~42 EOL~297 typically goes up during 11:30 AM to 2 PM and 5 PM to 8 PM for many businesses. But, this information may not be helpful in devising a consumer targeting strategy to raise EOL~297 and CTR~51, particularly for MSMEs. Each MSME/LSE has to "discover" their own unique optimum strategy, by automated and/or manual "experimenting" (e.g., A/B testing) with predictive "data analytics" algorithms with parameters under their control.

Typical analytics includes discrete time (TOD~27) series based statistical "model fitting" (e.g., system identification) of inter-relationship among: TOA~26, ABS~239 (e.g., ARR~162, CDS~131), EOL~297, CTP~51, etc. Then discrete correlation analysis is performed to "identify" lagged (time delayed) relationships between inputs: [(TOA~26, CCA~112, ABS~239, (CDS~51, ARR~162, . . . )] and outcomes (APOs: GDP~?, GHP?, EOL~297, . . . ). There are several off-the-shelf statistical software modeling tools (e.g. "R"), as part of data analytics algorithms available to perform this required modeling & correlation analysis, even on "Big Data" sets.

One of the enabling innovations here is to consistently/ systematically DISCRETIZE ALL input/outcome parameters, including conversion of hitherto unavailable/unused parameters (ABS~239, EOL~297, APO), to a "standardized" uniform time scale (e.g., DTOD=1.5 minutes), which can be encompass days, weeks, months, years, decades, thereby enabling a "discrete feedback control" based strategy to be implemented, manually or automatically. Example merchant input control parameters include ABS~297 (e.g., CDS~131, ARR~162). Example output parameters include CTP~51, APO. Significant unknowns that each merchant needs to "measure," based on their physical location and day-of-week (DOW~150) & week-of-year (WOY~160), as a result of a correlation analysis are the time delayed output response of the discrete output variables (e.g., CTS~51) to the discrete input variables (e.g., ABS~239). Measurement of these delays will in turn enable merchants to periodically (e.g., daily DOW~150) place their Ad bid package (ABS~239) in a timely and optimum manner to (a) improve advertising [e.g., Audio (music, verbal)-Video-Text], to maximize conversion (CTP~51), thereby improving ROI~270 (return-on-investment) on Ad related expenditures. An integrated software tool, from www.snapstudioplus.com, can be utilized to produce digital Ads costeffectively, from raw merchant multimedia content, attractively & explicitly depicting their product and services (P/S~115/114), for example.

Figure 18:
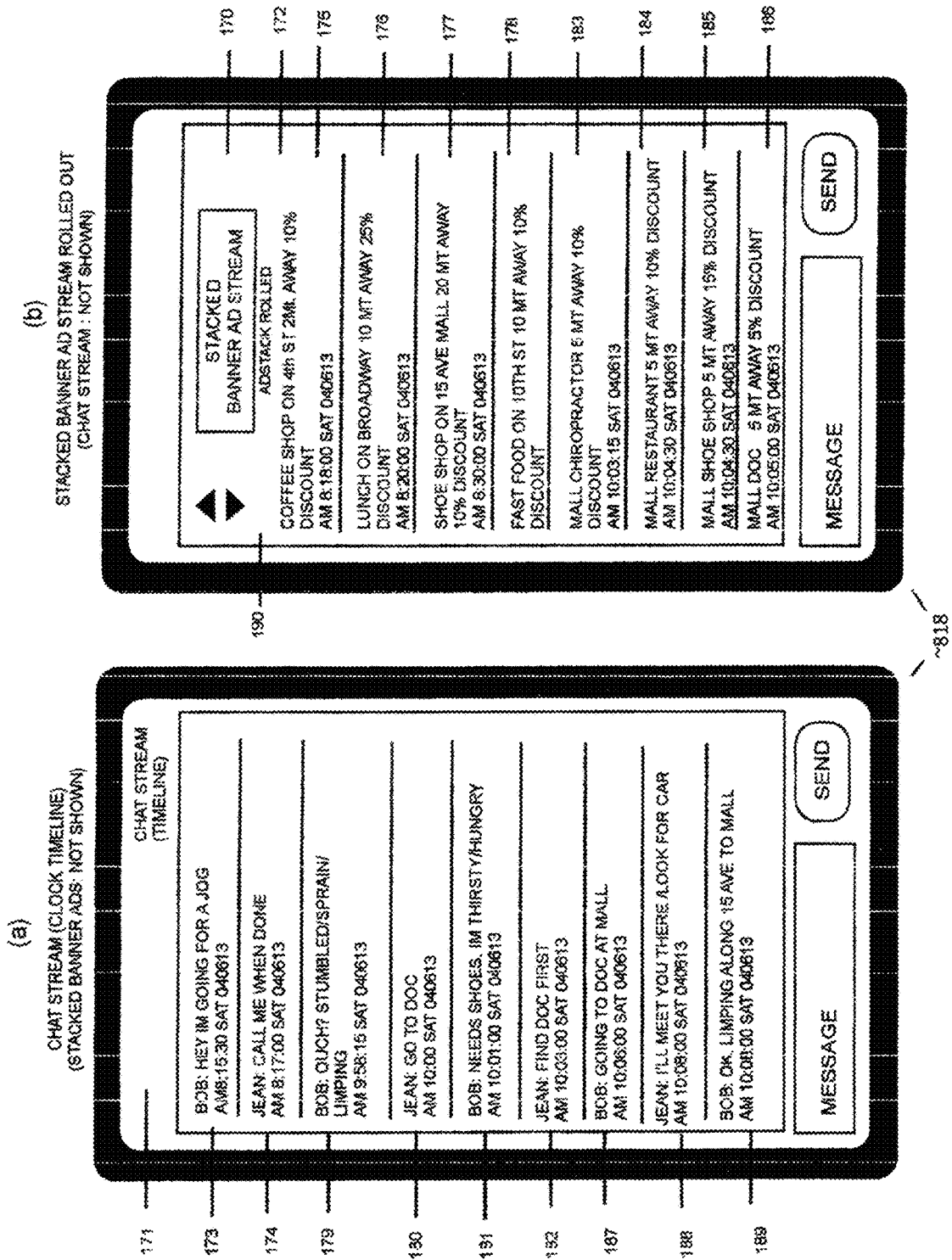

FIG. 18~818 presents an example Consumer Smartphone, with UI comprised of a chat stream~171 on the left and a stacked (e.g., up to 16) banner advertising stream~172 on the right side with a periodic (e.g., 1.5 mt) Ad update rate, thereby enabling Ad updates every 1.5 mts. (e.g., up to 40 Ad updates/hour) from merchants (e.g., up to 16 distinct offers) with "winning" bids for auctioned TOA~26 segment-74 slots, for each of the 960 TOD segments (DTOD)/day. The top banner area of the size limited screen of about 48 characters is reserved for a banner ad display in a "stacked" colored format to give an attractive 3D look-feel. The suite of color~38 could be used represents NAICS industry group (see Table IV). The time stamped banner ad stream received~175-178 and ~183-186, shown on the right side would in practice, be displayed entirely in the banner area ~172, but have been shown in an unstacked manner to enable ease of reading & understanding. Banners are are organized and can be cycled with a Rolodex-like circular scheme, by the opt-in consumer~42, using the up/down arrows~190 and a particular Ad is down-loaded for a more detailed viewing by the opt-in consumer~42, using the arrow symbol on the right side~170, for example. Alternatively, instead of up/down control arrows~190, the banner ads can be moved left/right with a finger-flick, on top of the banner.

When the consumer "selects" a banner Ad, for a more detailed viewing, it will take up a larger portion of the screen area, in a user selectable background or foreground mode, perhaps including a short video (e.g., 9 to 30 seconds), driven by consumer's banner Ad selection. Other information that needs to be provided to the consumer on-demand includes, a down-loadable discount coupon (DC~234), merchant's phone #, map directions (e.g., Google, Yahoo, Microsoft, Yelp, . . . ), guiding the consumer to the merchant's most convenient/nearest location, etc. The consumer can tentatively accept the offer, by actually downloading the coupon (DC~234) and subsequently visiting the merchant's site within the merchant-set "allowed" time period, before the coupon offer expires. Then, the consumer can make a purchase, perhaps receiving additional credits or discounts, for an on-site visit. Another screen area is set aside for opt-in consumer~42 texting and voice input analysis, including express/implied intent extraction (CCA/AEE/AEI~112/223/ 221). This information is transmitted back to the TEGOBAMA~815-817 provider RDPP~81 to delete those ads that are likely to be considered by the consumer to be spam. It is not in the interest of the provider~81 or the merchant~25, to annoy the consumer with spam. At the same time, the consumer~42 is interested in receiving timely, relevant and attractive offers, without having to disclose their personally identifiable information (PII~117).

The left side of FIG. 18~818 presents a descriptive example use-case, as a set of time-stamped stream of "chat" messages. Bob, an opt-in consumer-jogger, texts his friend Jean, "I'm going for a jog"~173 at (@) local clock time 8:15:30 AM on Sat Apr. 6, 2013. Jean, not necessarily opted-in, replies, "Call me when done"~174 @8:17:00 AM on Sat Apr. 6, 2013. Bob, being self-declared opt-in, also gets an Ad from a coffee shop nearby~175, as shown on FIG. 18(b), on the right-side of the page. Later there are several Ads re lunch~176, shoe shop~177, Fast food~178. Bob, the jogger, presumably ignores these Ads. Sometime later, The RDPP~81 server~242 parses (Opt-in) Bob's text/voice message stream, to extract ESKAPD~30 based meaning & intent, as per Table I-IV, as quantitatively (range of: TOD~27, TOA~26, etc) & qualitatively (e.g., P/S descriptive offers, coupons, . . . ), as designated by registered merchants~25 "nearby." Bob texts Jean re his stumble/ sprain~179. Jean responds~180. Bob responds~181. Jean responds~182. A chiropractor from a nearby Mall sends Bob a "timely" Ad ~183. Mall restaurant also sends an Ad~184. Mall shoe shop sends Ad~185. Mall doc sends a "timely" Ad ~186. Consequently, Bob makes a decision and notifies Jean~187. Jean agrees ~188. Bob responds ~189. This client message time sequence, as per FIG. 17~317, was also previously depicted from a RDPP~81 system server~242 perspective in FIG. 3~303, and made available to those merchants whose P/S~115/114 (as per table I-IV) are responsive to TQC's~42 inferred needs/wants~112, etc.

The registered merchant is charged by the provider RDPP~81 for this timely Ad delivery service (freemium business model). Additional compensatory charges are warranted, if Bob actually shows up and services are rendered by the Chiropractor, MD, Shoe shop, Restaurant, etc. The TEGOBAMA~815-817 provider~81 is typically paid on a sliding scale for the consumer impressions (ARR—Ad repetition rate~162 selected by merchant), number (#) of click-through-to-Ads (CTAs?), number of coupon downloads (DCs~234) and Conversion-to-Purchase (CTPs~51). Additionally, each registered merchant, directly or indirectly (Ad Agency) has to pay charges for: TEGOBAMA~815-817 registration/setup, Ad array~238 storage, Ad placement wagering (ABS~239), etc.

FIG. 19~819 depicts a system level structured data/information flow diagram (Consumer-Merchant-Provider~42-25-81). This figure depicts the overall recursive (e.g., every DTOD~27 segment) system flow cycle, which starts with consumers who have opted-in~191 and ends with their conversion to a purchase (CTP~51) execution. At compute step #1 with each opt-in consumer~191 for a TOD~27 driven opt-in consumer array (1, ... h, ..., H)~191, the smart-phone sensor provides geolocation (GLO) & velocity (SBV) in compute step #2~192. This is used to determine consumer TOA~26, resulting in "segregation" #1, with respect to each merchant (1, ... 1, ... L) in compute step #3~193. This "sorting" results in deleting those opt-in consumers that are, outside the merchant "l" specified DTOA/DTOD segment Ad placement and other criteria (ESKAPD~30). A consumer segregation #2 is performed to ensure that merchant "l" DTOD window is satisfied in compute step #4~194, because many merchants are not typically open for business 24/7. Targeted Qualified Consumers (TQCs~42) opt-in voice~195 & text~196 communication is then assessed (e.g., parsed) in compute step #5~197, to determine current consumer activity (e.g., CCA~112) in compute step #6~199 and future activity prediction (AEI~221), based on consumer opt-in affect/intent message parsing in compute step #7~198, which also provides expressed feelings (AEE~223). This analysis is aggregated across all consumer~191 (l, . . . h, . . . H), to construct a segregation #3 of need/wants categories (N/WC~112) in compute step #8~222, for that particular DTOD~194 and DTOA, as per compute step #3~193. These TQC~42 conceptually form a 3D volume at the current time-of-day CTOD~29, akin to FIG. 6~806).

In compute step #9a~224 the registered group of merchants competitively bidding on a segregated group of consumers (TQCs~42), as previously depicted in FIG. 7-807, is preferentially sorted & aggregated in compute step #9b, in accord with their bids directed toward each prioritized MPAN~153. At this point, all merchants, who have bid on this particular TQC~42 volume participate in an auction~214, using one of the auction schemes detailed earlier (see para 128-139), as per the discussion pertaining to FIG. 7-307. In compute step #9c, the prevailing bids are ranked~225. Then they are sorted, in compute step #10a, on an individual TQC basis: TQC #1~226/Ad stream~228, ..., TQC #h~191/Ad stream~229, ..., TQC #H~237/Ad stream~230. The Ad streams are transmitted to all TQCs~42 by the DAPP~81 provider~231?Compute step #10b generates a TQC-by-TQC stream of comprising AD ID~238 and corresponding transmit slot in the DTOD segment~239 ?

Subsequently, Ads are received~232 by TQC #k, k=1, ..., kmx. Some of these Ads are viewed~233 and some coupons are downloaded~234. Each TQC~42 is provided with directions to corresponding merchant~235. When TQC arrives at corresponding merchant and presents discount coupon, merchant in-turn notifies Ad provider~236. Subsequently merchant notifies provider, if/when conversion to purchase (CTP~51) occurs.

Figure 20:
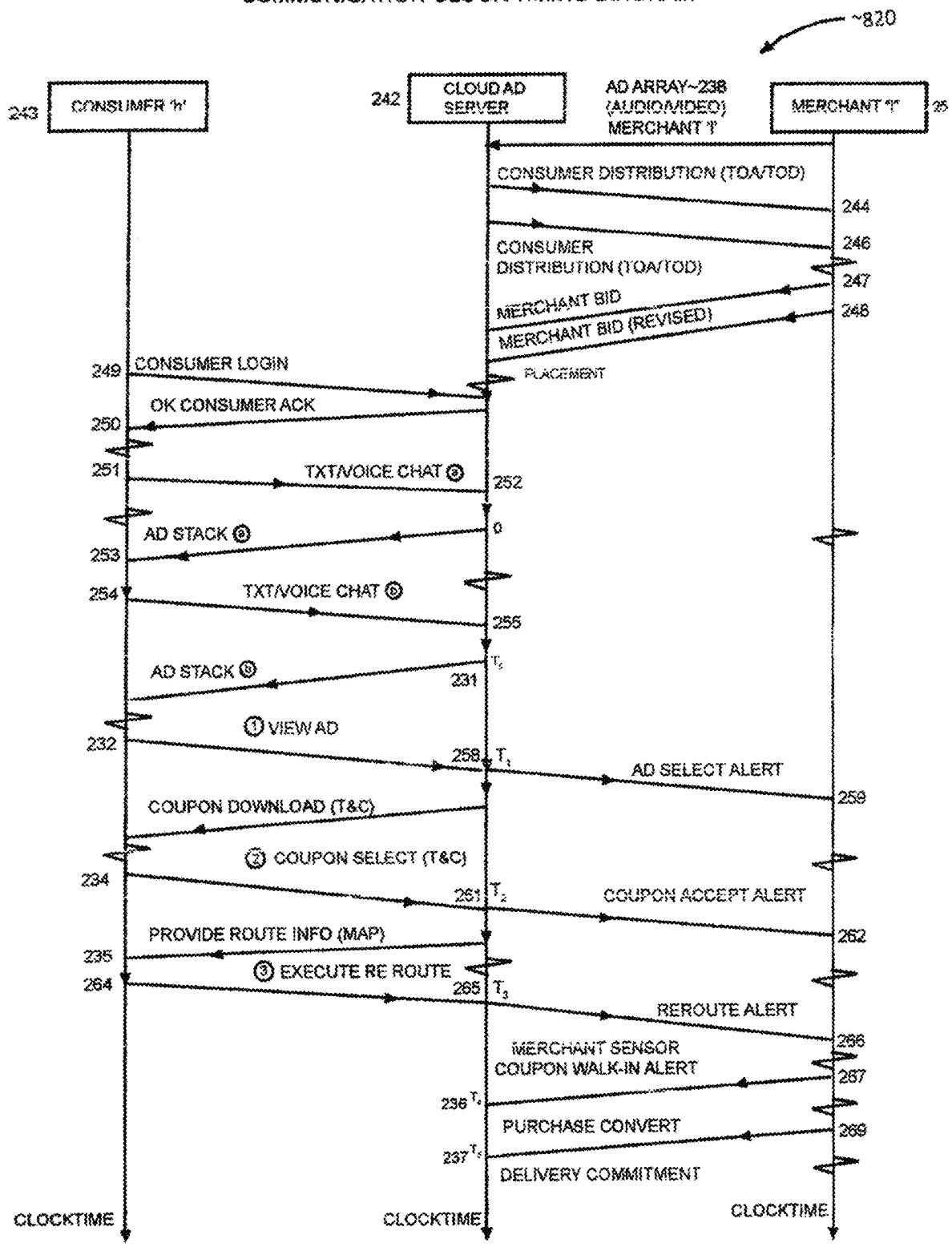

FIG. 20~820: shows the interactive communication timeline (TOD~27) between (a) the RDPP~81 Ad bid server~242 (middle column of figure), (b) an example opt-in consumer "h" (left side column of figure)~42 and (c) the registered bidding merchant "l" (right side column of figure)~25. Specifically, FIG. 20~320 depicts the timing diagram [increasing linear time axis (TOD~27) which goes from the top, down the page, to the bottom]"quantitatively" relating the communication messaging between the time segment (DTOD~98) varying opt-in consumer array (1, . . . , h, . . . , H)~42, compute load based cloud-based server array ~81 and registered Merchant array (1, . . . , 1, . . . L)~25. Note that the total time elapsed between time point~244 to time point~237, depicted in FIG. 20~320, is approximately at least seven (7) DTOD~98 segments (e.g., 1.5 mt each), as further detailed in FIG. 21~321.

The communication process, depicted in FIG. 20~820, begins with each registered merchant~25 uploading at (@) time point~244 their Ad array to the provider's DAPP~81 Ad server. The Ad server repeatedly downloads~245, ~246 the distribution (TOD~27; TQC~TOA~CCA cube=84, 85, 86, in FIG. 6~306) of the opt-in consumers~42, at the current TOD~27 segment and a merchant selected # of prior TOD segments, thereby enabling the merchant to visualize the distribution (FIG. 6~306) of consumers on the circular time axis (TOD~27) roulette table wheel-dome display of FIG. 11~311, for example. Note that the current time CTOD~29 is "too late" to place a wager package~239, because of the inherent time delay (see FIG. 24~824), between an Ad placement, bid auctioning & Ad transmittal, as detailed in FIG. 21~821. However as noted in FIG. 14-814, fast-time simulation/visualization~141 of prior CTP~51 is available to each merchant~25 to provide bid guidance to merchants. This visualization in-turn enables the merchant to place bids~247, ~248 on a TOD~CCA~TOA (~27-112~26) basis, "adequately" in advance of current time CTOD~29, using the "exciting" roulette table wagering platform depicted in FIG. 12~812.

The right side of FIG. 20~820, shows the consumers opting-in~42 at local time~249 and their preferences being acknowledged~250 by the provider server. Subsequently, the consumer engages in text/voice chat with cohorts~251. This stream is received and analyzed~252 by the server and an Ad stack is transmitted to each TQC~253, as detailed in FIG. 19~319. The TQCs~42 select/review Ads @time~254 and continues chatting @time~255. Additional targeted Ads are sent to the consumer @time~231 (T0). When the consumer @time~257 selects/reviews an Ad, the appropriate merchants are notified @time~259 about the selected Ad by the server @time~233 (T1). Sometimes the TQCs~42 downloads coupons~234 @time~243 and selects an Ad @time~260 and acceptance is conveyed to server @time~261 (T2) re the merchants offer. The appropriate merchant is notified @time~262, by the server~242. And, the server also provides the TQC~42 with routing map information~263 to get to the merchant from the consumers~42 current location@time~235. If the TQC~42 chooses to head for the merchant @time 264, then the merchant is notified @time~266, received by the server @time~265 (T3). In turn the merchant notifies the RDPP~81 Server-242 @time~267 provider server @time 234 (T4) that the TQC~42 has presented the coupon~234. Subsequently the merchant also notifies @time~269 the Provider RDPP~81 server~242 that the TQC~42 has executed a conversion to purchase~51 @time~237 (T5).

As per FIG. 19~819 & FIG. 20~820, subject to TQC~25 opt-in informed consent, the TQC decision times (T0, T1, . . . T5) are measured, analyzed and provided as feedback to the registered merchants~25, as indicators of analytic effectiveness measures of alternate Ads (text, video, audio-voice/music; duration; repetition rate), as well as attractive functionality, resulting in conversion-to-purchase (CTP~51), for a particular product or service (P/S~115/114). These feedback of decision times enables merchants~25 to rank and "optimize" their Ads (content, duration, repetition rate), thereby enabling improvement of their P/S (functionality, price, discounts) and Ad conversion-to-purchase (CTP~51) based return-on-investment (ROI~270).

Figure 21:
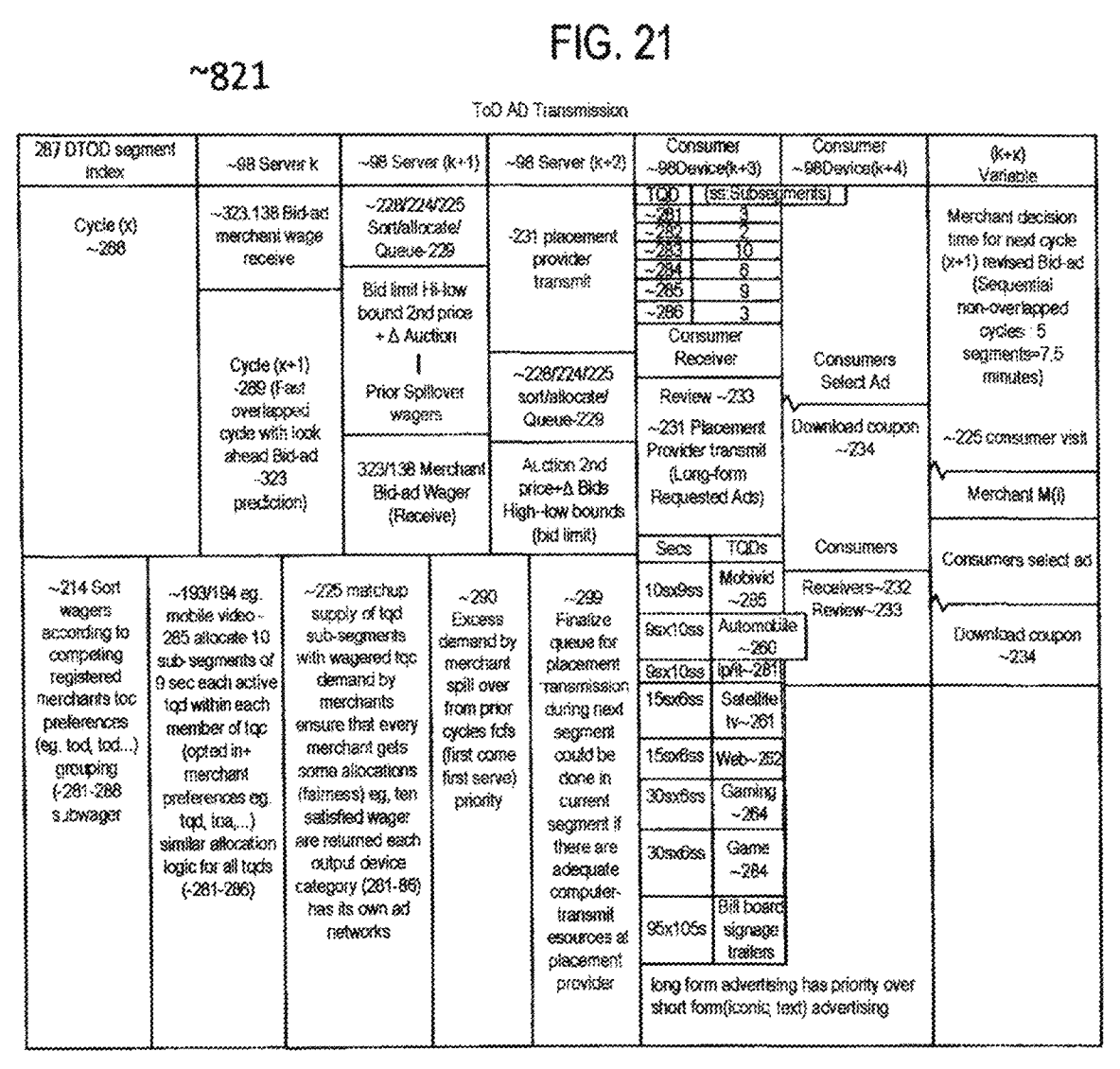

FIG. 21~821 presents a "quasi-synchronous" [RDPP~81 server~242 processing is synchronous, but the consumer-client~42 response/decision (P/S selection, . . . , CTP) is typically asynchronous] process timing diagram, comprised of a just-in-time (JIT) sequence @current (CTOD~29) time of the incremental steps—Cycle #(X): process step DTOD "k" (e.g., each step of 90 second=1.5 minutes duration): (a) a synchronous server~242 driven 3 DTOD segment process (i.e., "wager-auction-placement"), followed by (b) an unpredictable consumer (TQCs~42) driven process (i.e., "select-visit-decide"), sometimes resulting in conversion-to-purchase (CTP~51), as per the time-stamped downloaded discount coupon~234, received from the consumerTQC~42 sent by the merchant~25, thence reported to the RDPP~81 server~242. A bid placed by merchant~25 during segment "k," unpredictably could results in CTP~51 at "pseudo"-segment "k+5" or much later, as illustrated in FIG. 24~824, as a "time-delayed" "long tail" statistical distribution, based on several factors (e.g., TOD, TOA, P/S, needs/wants, . . . ), for each specific merchant~25 paired with each consumer TQC~42, having set membership in an associated cube-like array (see FIG. 6~806) of TQCs~42, previously "segregated," based on said merchant's~25 pre-specified ESKAPD~30 "segregation" parameters.

In other words, each Micro/small/medium enterprises (MSMEs) merchant's "exciting" periodic activity (e.g., daily DOW~150, weekly WOY~160, . . . ) is to interactively optimize the CTP~51, on a DTOD~98 segment-by-segment sequence of Bid & Ad placements (e.g., FIG. 12~14-312-314) by said merchant~25, to recursively "learn" to maximize CTP~51, in each said merchants~25 particular ESKAPD ~30 situational "mix" (e.g., establishment location, TOD, TOA, P/S offerings, discounts, . . . ).

The top third of FIG. 21~821, left to right, shows the discrete time sequence of indexed DTOD~98 segments: k, k+1, k+2, k+3 . . . Two synchronous rows of the sequence of events, that occur in these segments of say, DTOD=1.5 minute duration, have been depicted: cycle (X) and cycle (X+1). These "cycles" are similar except that the lower row is offset to the right by one (+1) column (index: k, k+1, k+2, K+3, . . . ) of DTOD=1.5 minutes each. Thus, the server~242 portion of the processing (k, k+1, k+2, k+3) are synchronous, cycle-to-cycle, with a one DTOD~98 time segment offset (e.g., 1.5 mt.), whereas, the subsequent consumer driven segments, in each cycle are typically not (i.e., k+4 & k+5 are asynchronous). However, the end-to-end graphically depiction of FIG. 21-821 is synchronous (index k to index k+5), for ease of illustration & comprehension. Note that the 1.5 minute DTOD duration is also for illustration purposes. Each provider~81, at their discretion, can allow each of the registered merchant~25 their customized segmentation (DTOD) in a 24 hour (TOD) day and 7 day week (DOW) and 52 week year (WOY), to be partitioned into segments of different duration, to comport with each merchant's particular business schedule (e.g., holidays, work-day hours, . . . ). For example, 6 AM-10 PM (14 hours) can be say 1.5 minutes/segment and 10 PM-6 AM can be 6 minutes/segment, as a negotiated contractual agreement, between each merchant~25 and provider (RDPP~81).

In the upper row, @DTOD segment k (step 1)~287 (RBAP), each merchant "confidentially" places their wager (Bid-Ad~239, see FIG. 23~823), as per FIG. 8~308 or FIG. 9~809 or FIG. 12~13~812-813 or FIG. 16~816, "hidden" from other merchants, who are typically competing against each other, for overlapping (e.g., same) TQCs~42. In segment k+1 (step 2)~288 (SAAW), the provider~81 performs a sort/allocate/auction/queue across all wagering merchants~224/214/225/228~230 [e.g., $2^{nd}$ best bid+delta (Milgrom), conflict resolution (Para 125-133), perhaps after limiting the highest and lowest acceptable bid], and allocates the available merchant-by-merchant TQC~42 slots, as per Ad networks~165/166, in accord with merchant-by-merchant set priorities MPAN~153 to corresponding "winning" merchants. Note that, as per FIG. 21-321 table in bottom third, each DTOD segment for each TQC is further partitioned into several slots. For example, TV~281 (5 distinct merchant Ad slots of 18 sec each), Web/Desk/Laptop~282 (6 distinct merchant Ad slots of 15 sec each), Signage (digital)/billboard (roadway, railway, bus)~283 (12 distinct merchant Ad slots of 7.5 sec each), Kiosk/Gaming~284 (10 distinct merchant Ad slots of 9 sec each), Mobile/Tablet Video 285 (15 distinct merchant Ad slots of 6 seconds each) for each TQC~42 member's display device, predicted to be available in the future: CTOD (~29)+D (~231-237)

Figure 23:
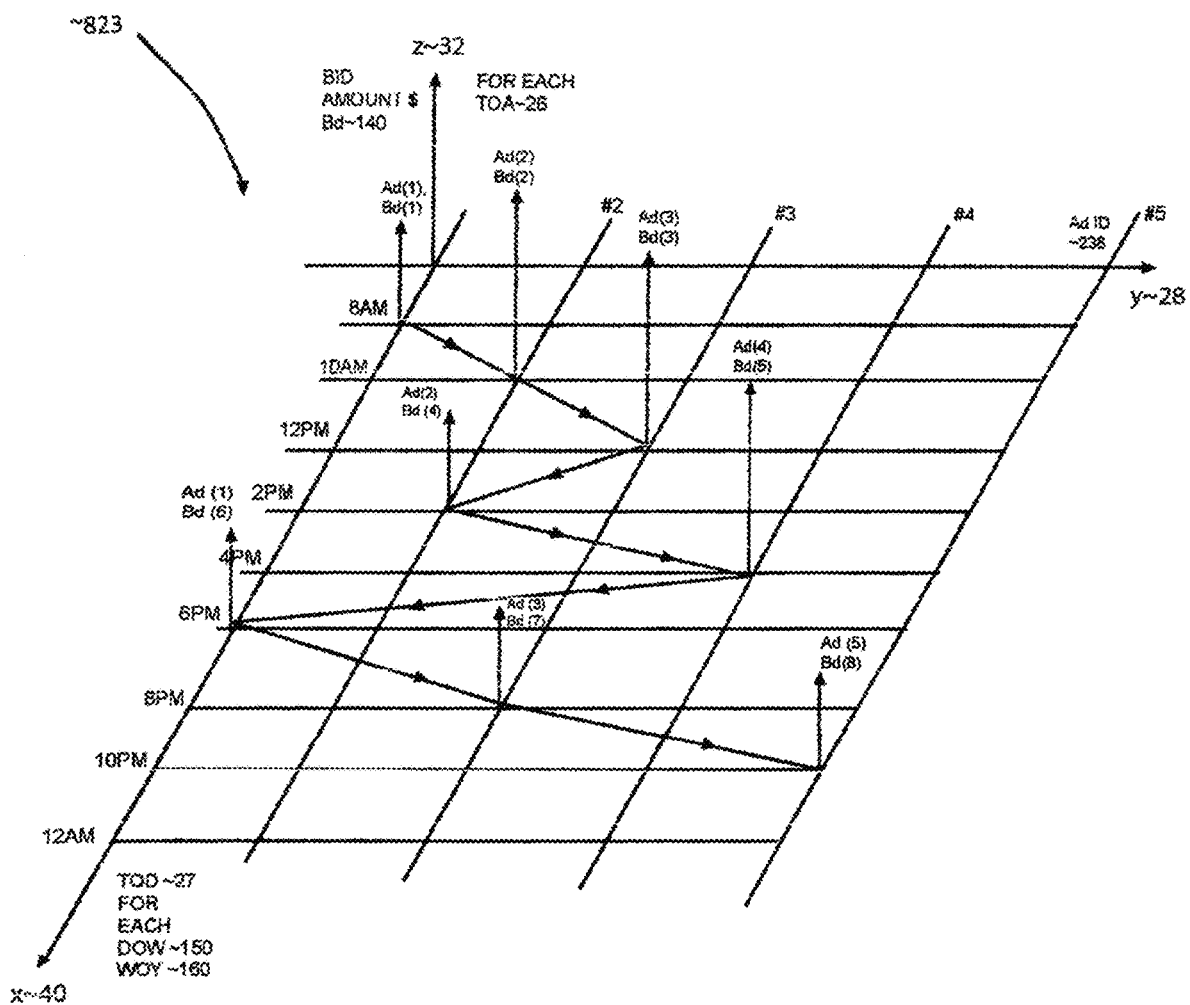

These post-auction "winning" slot allocations are assembled and transmitted in segment k+2 (step 3)~289 (ACPT), as per FIG. 23~323. The unsatisfied ("losing") bids "spill-over"~294 into the next cycle (X+1), depicted in middle row of FIG. 21~321. TQCs~42 (i.e., opt-in consumers) receive the Ads in segment k+3 (step 4)~290 (ACRC). Note that the consumer can review both the currently received Ads~233 and previously received Ads (i.e., received during prior cycles, but not yet discarded by the undecided consumer) organized in a space efficient display banner Ad stack (see Froloff application Ser. No. 13/068, 146), as per right side top of FIG. 18~318, on a mobile handset, for example. Note that the tables in the k+3 segment column of FIG. 21-321 lists all the possible consumer display modalities~281-286, predicted to be available, to the merchants competing at the auction. In segment k+4 (step 5)~291(ACRL), the consumer selects and downloads~234 the Ad/discount Coupon offer. In segment k+5 (step 6)~292 (CVLD), the consumer may accept the offer, including a "detour" (~264-266) to the B-M merchant's establishment. Note that segments k+4 (step 5)~291(ACRL) & k+5 (step 6)~292 (CVLD) are typically not synchronous, contrary to the "convenient" graphical depiction in FIG. 21~821, because of the consumer's unpredictable/uncertain (statistically) evaluation (offer)/purchasing decision-making process.

In the lowest third of FIG. 21~821, under segment k+2 (step 3)~289 (ACPT), details of the "auction process" are provided, in an "exploded" view. This "auction process" includes bid sorting~224, on a TQC~42 basis, using Merchant-by-merchant preferences (TOA, TOD, ESKAPD, . . . ). The merchant may choose to partition their total wager within a segment, by breaking it into "subwagers" on each sub-segment (slot)~193/194, based on TQDs (total qualified devices TQD~231=Mobile+Desktop+Signage+Kiosks+TV) available in the current Bid-Ad segment k (step 1)~287 (RBAP), as per FIG. 23~823. Note that the provider RDPP~81 "knows" the geo-location (GLO) and current device in-use (as per functionality~165/166 in FIG. 16~816), as disclosed by the Opt-in consumer. But the TQC's personally identifiable information (PII) is not disclosed to any of the merchants, signed-on to use this disclosed "quasi real-time wagering" (QRTW~110) Provider~81 service. Clearly, in the present context, "real-time" is defined by the segment duration (i.e, 1.5 minutes). From the time segment k (step 1)~287 (RBAP), in which the merchant places a wager (Bid-Ad), to the future time segment k+5 (step 6)~292 (ACRL), where the consumer takes decisive action (detour~262~264 to selected merchant's establishment and/or CTP~51 order placement) is at least 4 DTOD segments=6 minutes, in the present graphical illustration of FIG. 21~821. And in-fact it could even be an order-of-magnitude (e.g., 2 hours=80 DTOD segment) later (see FIG. 23~823 & FIG. 24-824).

FIG. 22-822 brings all these subsystems together, by presenting yet another big-data cloud based TEGOBAMA system level block diagram, for optimizing the sequence of Bid-Ad placements by small/medium enterprises (SMEs), to recursively "learn," to maximize conversion-to-purchase (CTP~51) and thence Return-on-investment (ROI~270). On the left side performance analytics~325 is computed, as an outcome of bid optimization & visualization, as per FIG. 15~815. This requires the bid amount (e.g., $$) and merchant feedback regarding (re) week-of-year (WOY~160), day-of-week (DOW~150) and time-of-day (TOD~27) establishment occupancy levels (EOL~297) and actual conversion-to-purchase (CTP~51) results. This in-turn enables bid and Ad effectiveness quantization, as a function of TOD/DOW/WOY~27/150/160. Consequently, the merchant can "rationally" (i.e., using quantitative data: CTP~51, etc.) revise the next set of Ad IDs~238, Ad-Bid schedule~239, and corresponding bids~140, to improve ROI~270. This tool suite also enables merchants to perform recursive A/B testing & effectiveness evaluation & optimization of the content in the repertoire of Ads (text, video, audio-voice/music), keyed to the mix of products/services (P/S~115/114) being offered for sale in conjunction with, perhaps limited time validity, discounted coupon~234.

An observation attributed to John Wanamaker, US department store merchant/marketing maven (1838-1922), "Half the money I spend on advertising is wasted; the trouble is I don't know which half." This disclosure attempts quantitatively to significantly reduce the uncertainty of effectiveness of Ads, on a merchant-by-merchant, M (1) basis, mindful of suitable & available consumers (TQC~42). Moreover, Advertising association of America noted that 23 Billion out of 88 Billion spend by Merchants is fake/wasted Ads.

The middle block (~815-817, but exclude 151& 318) in FIG. 22-322 depicts the merchant provider's Ad network, prioritized on a merchant-by merchant basis (MPAN & servers~153), which begins by sorting & ranking (~228~230) the bids of all competing merchants, on say a 1.5 mt DTOA~74 segment-by-segment basis. For example, a 10 hr merchant workday duration, MEOD (~257)-MSOD (~256), requires 400 segments@1.5 mt/segment. Then, opt-in consumers~191 are allocated (ASSA/SOWA~225/224) to each bidding merchant in a manner "fair to all" merchants (e.g., every merchant is given at least one transmission slot/DTOD, even at a minimal bid level) and "not irritating" consumers with spam (e.g., limit 10 distinct Ads of 9 sec each, merchant Ad stack (Ad ID~238) per DTOA (~98) segment, limit each merchant's Ad repetition (ARR~162) to each customer once per 8 DTOD segments of 1.5 mt each=12 minutes), resulting in an Ad-to-consumer (AdTC~263) transmission packet@TO (~231). Note that AdTC potentially has a distinct coupon discount (CDS~131), subject to predicted TOA of the consumer (~42) to each merchant (~25). This is a 3-dimensional transmission allocation process with (a) ranked merchant bids (~228~230) on the 1st axis, (b) available opt-in qualified consumers (TQC~42) on the 2nd axis, and (c) TOA segment based coupon discounts (CDS~131) on the $3^{rd}$ axis, for each TOD segment (DTOD~98).

The right side of FIG. 22-822, itemizes the various opt-in consumer's (TQC~42) available targeted (ISTKD~31) communication devices (TQDs~258) display, enables the consumer to review the Ads received (text, video, audio-voice/music, rich text; long Ad~257; short Ad~256) and select coupons of interest for download (DC~234). Then, the consumer has to decide "asynchronous" to place an order at their discretion, remotely or on-premises of the merchant's (~25) P/S (~115/114) offer. Otherwise, the consumer rejects the offer and moves on to the next offer of interest. Upon receipt of order and agreed-to payment, merchant can deliver product/service (P/S) face-to-face or by shipment. Note that retail B-M merchants selling P/S can utilize discounts "strategically" (e.g., below competitor's price offer) to minimize the E-commerce driven "show-rooming" effect. Moreover, the consumer can buy the product by placing an order via the Internet, from the B-M merchant at a better price, to have it drop-shipped to meet the consumer order.

The lowest part of FIG. 22-822, shows the information feedback loops: (a) ACWT~263 the downloaded merchant coupons, (b) BAWT~224/225 the merchant Bid-Ad winners (these are "pruned" down to bid winners), and (c) ICOP (k)~268, comprising purchasing CTP~51, occupancy (EOL~297), coupon download (DC~234). These feedback data enables the Provider (DAPP~81) to compute merchant-by-merchant performance analytics (e.g., revenue/bid correlation~275, wager/bid revision~277, forward prediction~279/280)

FIG. 23~823 graphically depicts an example time sequence of merchant 1's wagering sequence (i.e., bid-Ad content: Bd-Ad) amount for timely transmission of different ads, as a function of time-of-day (TOD), ideally based on prior on-site observations of consumer demographics & conversion-to-purchase (CTP) behavior. The x-axis is time-of-day (TOD~27), the y-axis is Ad ID~238, the Z-axis is Bid Amt (Bd)~140. The $1^{st}$ bid Bd (1) @8 AM-9:59 AM, results in an Ad Repetition Rate (ARR~162) of 1000 impressions/hr for Ad (1) per unit of Bd(1). Finally, $8^{th}$ bid Bd (8) @10 PM-12 AM, results in an ARR (8) commensurate with Bd (8), for Ad (5). Different Ads are selected for transmission by merchant T at each TOD of interest, based on prior knowledge/guesstimate of consumer conversion-to-purchase (CTP~51) history, as per merchant T.

FIG. 24~824 presents an example of input bid impulse & output conversion-to-purchase (CTP~51) responses for 2 different Ads transmitted 2 hours (80 TOD segments) apart. The example illustrates that there is a measurable time delay T5 (~237) minus TO (~231), between time of Ad receipt input (~231) and time of conversion-to-purchase (CTP~51) notification (~237). The example also graphically illustrates that the CTP~51 response varies as a function of both time-of-day (TOD~27) and the attractiveness (e.g., rich media content, graphics, animation, . . . ) of the particular Ad from the array of available Ads(ID~238). Collection of this type of TOD~27 based information enables computation of Bd~140 & Ad~238 effectiveness analytics, based on discrete time domain response prediction, via prior data based "system identification" math modeling. These discrete time models measured over a period of time, by each merchant T, in-turn will consequentially enable predictive analytics (e.g., Bd~140 revision and input (~239) optimization, by relating output CTP (~51) to input (ABS~239: AdId~238, Ad Receipt time~232) quantitatively.

FIG. 25~825 presents an example of week-to-week (WOY~160) return-on-wager "investment" performance analytics, including TOD~27 bid effectiveness ranking. It also illustrates that an example 2 hour time delay, for example, between Ad receipt~232, review~233, coupon download~234 and conversion-to-purchase (CTP~237), results in different values for ROI performance measures (~278~280). From the left, the $1^{st}$ column (col), is day-of-week (DOW~150), $2^{nd}$ column is prior bid amount total (PBAT~271) day-by-day for the prior week-of-year (WOY~160). $3^{rd}$ column is prior conversation-to-purchase total (PCPT~272) day-by-day. 4' column is current bid amount total (CBAT~273), day-by-day for current WOY. $5^{th}$ column is current conversion purchase total (CCPT~274) day-by-day for current WOY. So, Col 1-5 is input data for analytics on a day-to-day basis, shown in col. 6-11. Higher resolution data on a segment-by-segment basis can also be collected and similarly analyzed on a big data cloud server.

FIG. 25~825 Col 6 computes prior shifted conversion return (PSCR~275) day-by-day for the prior week, by dividing each hour-by-hour conversion by the "corresponding" previous hour-by-hour bid amount, e.g., 2 hours earlier for each day of the prior week. This delay between ad receipt & purchase conversion~51 was previously illustrated in FIG. 23-323. Similarly the current shifted conversion return (CSCR~276) was computed day-by-day for each day of the current week (DOW~150) as noted in column 7.

Prior bid Return ratio Col 8 (PBRR-277) is computed as Col 3 (PCPT~272) divided by Col 2 (PBAT~271) on a day-to-day (DOW) basis. Current Bid Return Ratio Col 9 (CBRR~278) is computed as Col 5 (CCPT~274) divided by Col 4 (CBAT~273) on a day-to-day (DOW) basis.

Week-to-Week (WOY) Return improvement Col 10 (WWRI~279) is computed as Col 9 (CBRR~278) divided by Col 8 (PBRR~277). The "hidden" variable here is the current week's daily Ad Bid, based on the prior week's results. After modifying the current week's bid, based on "gut feel," intuition, etc., the merchant needs to assess, if there was an improvement week-to-week (WOY), as quantified on a daily (DOW) basis in Column 10.

Week-to-Week (WOY) Shifted Improvement Col 11 (WSRI~280) is computed as Col 7 (CSCR~276) divided by Col 6 (PSCR~275). This is different from Col 10 in that conversion time delay, in this example, a fixed 2 hrs, is accounted for. In the most general, non-stationary statistical, case this time-delay is likely to be a function of many parameters, including time-of-day (TOD). This is referred to as hetroskedasticity (e.g., http://www.investopedia.com/terms/h/heteroskedasticity.asp). From a pragmatic perspective more precise modeling is warranted, only if, the product and/or service being sold is of a sufficiently high monetary value (e.g., $100+) and the TQCs~42 behave more predictably (i.e., low statistical variance).

In this illustrative example, as per FIG. 25~825, the totals of column 2 is 116.5 & col 4 is 116. However Col 3 is 108, and col 5 is 157.5. This shows that the current bid in Col 3 was over 45% more effective than the prior bid in col 2 measured in terms of bid capital ROI, for this particular 2 week period. Note that FIG. 23~823 shows the cumulative daily and weekly bids and not details of the hourly bids on a daily basis. To avoid prolixity, bid changes for a particular hour in a week (DOW) compared to a similarly situated hour in the prior week (DOW~1) are not shown herein. However, in practice this input (bid~140)/output (purchase data~237) must be analyzed, to measure the ever-changing consumer response (CTP~51) to each of the Ads (via A/B testing: content quality, duration, . . . ) in the merchant's library (MAA~238) and associated coupons discount (CDR~234) offers, delivered periodically (ARR~162) on a DTOD segment-by-segment, hour-of-day (i.e., 40 segments/day), day-of-week (DOW~150) and week-of-year (WOY~160) basis, thereby enabling wager bid input adjustment for the next bid period (DTOD #) based on prior bid results, via A/B testing.

Based on the above disclosures the generic, interactive algorithmic multi-attribute utility procedure recommended, for periodic (daily) execution by each merchant on their station~151 is:

Maximize: Daily PI (DTOD #, DTOA #),
  over all valid DTOD (e.g., 18 hrs=720 segments) & DTOA (e.g., 6 hrs=240 segments)
Minimize: Daily Bids (Alpha, Beta)
Subject to: Daily BAWT (Ad ID #, Alpha, Beta, DOW, WOY, TQC Parameters: ESKAPD, MISTKD)
Subject to: Daily APS (Alpha, Beta, CDS, DC, ARR, DOW, WOY, TQC param: ESKAPD, MISTKD)
Wherein PI=Perf. Ind.=Sum (CTP) OR Sum (CTP)(BAWT) OR Sum (CTP)(BAWT)(NTP) OR . . .
Wherein Alpha & Beta are the (median) bid attribution DTOD #& DTOA #, for each CTP
Wherein Alpha=DTOD # Minus (−) median Delay D & Beta=DTOA # Plus (+) median Delay D
Wherein TQC Param keyed to (DTOD #, DTOA #) include one or more of: CCA #, N/W #, P #, S #, AEI #/AEE #, Key Words #, Demographics # (gender, age), CTP & NTP are periodically (e.g., daily) input by each registered merchant.

This "integer programming" Max/Min optimization, of a merchant-by-merchant performance (cost) function, subject to (noted) constraints, is a numerical discrete time-domain "gradient" (e.g., trend) based Bid-Ad schedule (~239) optimization problem. Various off-the-shelf mixed-integer algorithm packages (eg, interior point, Minotaur) are available. Each merchant (or their Ad agency) needs to solve this optimization in a periodically, "timely" (e.g., one (1) hour ahead of anticipated CTP~51) manner, for their selected set of TQC parameters, in order to subsequently place "timely" (e.g., daily) Bids & Ads on a 24/7 DOW/WOY basis, in competition with other merchants, particularly those in close proximity, to capture the attention of the available opt-in consumers TQC (~42). The degree of "programmatic automation" provided to the merchant depends on those offered by the selected service provider (RDPP~81). However, for many MSMEs wagering (e.g., bidding), based on "gut feel," on a Roulette wheel-like visualization, such as that disclosed in FIG. 12~14-812-814 may be able to garner adequate CTP~51 on a limited budget, perhaps without hiring expensive $3^{rd}$ party consulting help.

A/B testing experiments are driven by TEGOBAMA: (a) input signal "shaping" comprising parameters, such as, TOD/TOA, desired TQC (ESKPD/MISTKD), MAA/ARR, DOW/WOY, etc., (b) Output performance feedback, comprising parameters, such as, GTV, NTP, CTP, ROI, etc., and (c) Internal parameters, such as, decision delays (D, db, dc, dd, do, dp, dr), responsive TQCs, etc. Discrete system dynamic models can be constructed from data collected, under this data structure. These models can then be used under similar future conditions (DOW, WOY, TOD, TOA) to predict TQC buying behavior. Moreover, a learning neural network formulation can be utilized to process incoming data to provide the merchant with timely predictive decision support analytics.

It cannot be over-emphasized that consumer purchasing actions often tend to be impulsive, unpredictable, and chaotic, on a minute-by-minute basis. This observation implies that "gradient"/trend information extrapolation from prior time periods, several hours/days/weeks ago, to the present time period (TOD/TOA/DOW/WOY) of interest, may not be extrapolate-able. Consequently, the merchant bidding process is often a "gamble." Analytical optimization methods, particularly those based on "deterministic" behavioral math models are unlikely to provide useful wagering guidance, particularly due to diverse & changing (time-varying) consumer tastes & interests.

Moreover, the disclosed system & method are respectful of consumer privacy, when consumer ID # based demographic data are excluded from the Target Parameter list above. If consumers are, by design, not tracked by cookies, etc. and are not assigned a "permanent" (e.g., more than 24 hrs) ID #, then TQC~42 information is substantially anonymous and transient. Indeed many consumers and regulators prefer such a cloud-server~242 implementations. Risk of private information cyber-theft and provider (RDPP~81) liability is also minimized.

FIG. 26-826 tabulates an example FADSPK card deck layout wagering paradigm, which depicts a unified framework, including a corresponding set of illustrative icons, thereby aiding the individual merchant-player to keep track of their choices and suggest systematic alterations, based on ROI feedback. Column 1a of FIG. 26 itemizes 13 selected Emotions (E)~111, to mimic the fact that there are 13 cards in a playing card suite. Refer to Table I for a more comprehensive list of Feelings. Column 1b shows the corresponding iconic representation of each emotion listed therein. These icons can be depicted by other caricatures and enhanced by colors of the spectrum, to make them more memorable and visually appealing to the merchant. Similarly, Col 2a itemizes Activities (A)~112 and 2b the corresponding icons (not shown). Col 3a demographics (D)~113 and 3b the corresponding icons (not shown). Col 4a Services (S)~114 and 4b the corresponding icons (not shown). Col 5a Products (P)~115 and 5b the corresponding icons (not shown). Col 6a Keywords (K) ~116, which are a catchall for all possible English language words relevant to the products & services offered on a merchant-by-merchant basis, and 6b the corresponding icons (not shown).

The seller-merchant's learning process begins with the selection of subjectively the most "appealing" (e.g., exciting) user experience (UX), selected from that depicted in FIG. 4~7 (~804-807) or FIG. 8 (~808) or FIG. 9 (~809) or FIG. 12~13 (~812-813) with FIG. 3 (~803) superimposed as a repeated layered cylindrical cake-like pyramidal structure. The merchant can separate out the TQCs based on their presence during the prior 24 hours, in the cylindrical staircase structures, as a function of a set of TOAs selected on a merchant-by-merchant basis. This enables the merchant to place wagers mindful of TOAs where the available TQCs are as a function of a 24 hour prior day TOD.

Server based big data analytic software (SW) are available to aid machine learning (ML), with/out neural networks (NN) algorithm implementation. "R" can be used for Statistical analytics implementation. Tabula SW based Visualization techniques can be used to illustrate "bundle" of TQC trajectories. The underlying operating SW can be Hadoop based.

Figure 27:
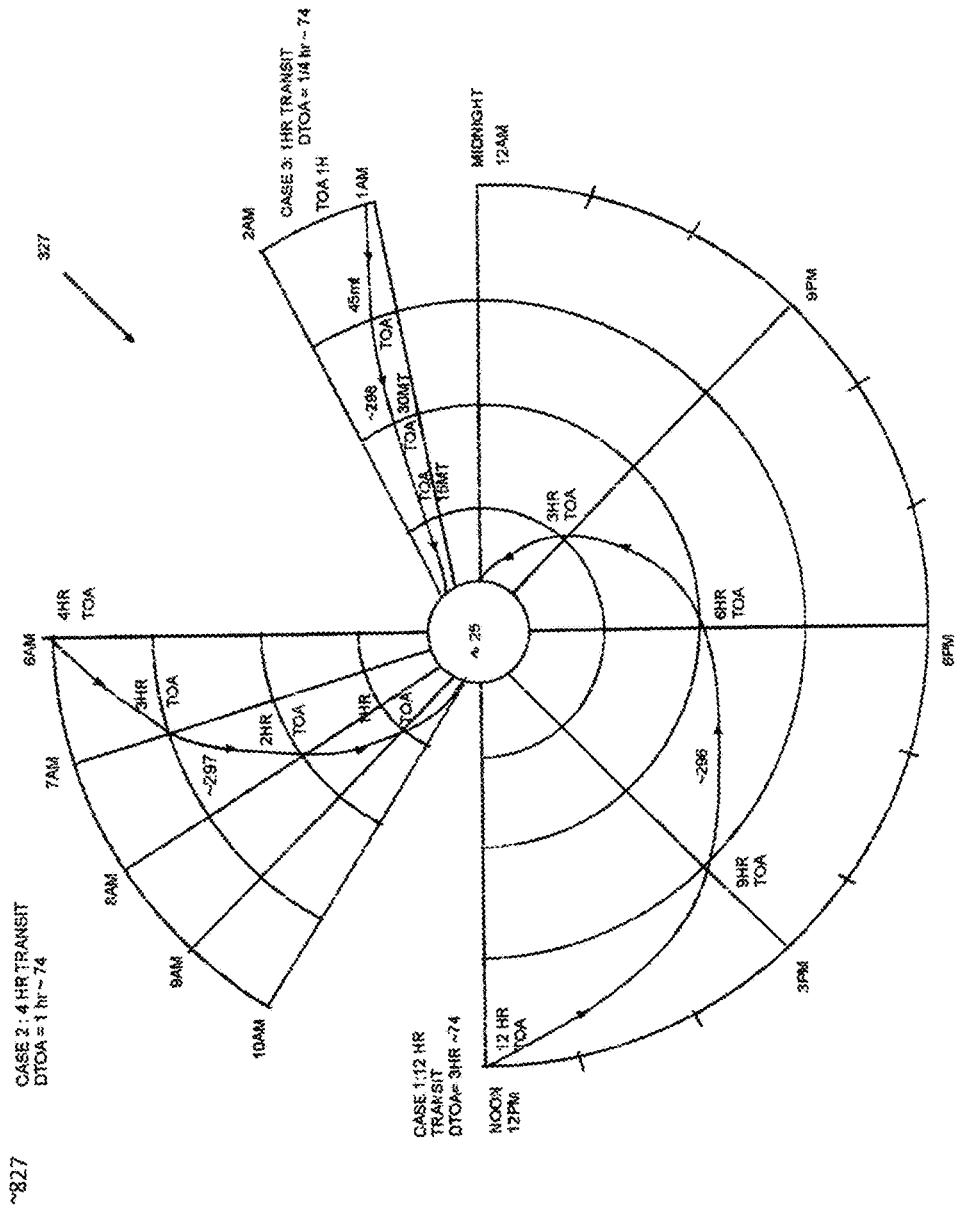

FIG. 27-327 graphically illustrates 3 example cases of targeted qualified consumers (TQCs) trajectories on a 2 dimensional polar grid (TOD~TOA), in transit to a merchant's (25) brick-mortar establishments. Three TOA radial scale factors (3 hr, 1 hr, ¼ hr), driven by 3 substantially dissimilar transit times (12 hrs, 4 hrs, 1 hr) are used. This is a "relatively" flattened version of these cylinders, akin to FIG. 3 (~803), to form a roulette revolving wheel-like structure. In this scenario, the "merchant" (~25) is a collocated cooperating collection of Mall shops (e.g., a particular Casino property). Case 1 depicts a TQC, who will arrive at midnight (12 AM) at the merchant's brick-mortar establishment with say a 12 hour transit time, starting at noon (12 PM) from current location. This TQC might be transiting on a multi-modal transportation system (e.g., Train, Plane, Bus, Cab, . . . ). TQC can view Advertisements on one or more viewable devices (smart-phone, signage, . . . ), to persuade TQC to make a product and/or service selection, leading to a purchase (CTP). To persuade this TQC, the "merchant" has to be able to present attractive offers on one or more (transit stage driven) of this TQC's device(s), starting at Noon, perhaps repeatedly thereafter, without annoying (e.g., invoking COOS functionality) TQC, to ensure that this TQC does not "stray" to another "merchant's" establishment (e.g., casino property) instead. The offers could be a whole collection of products & services (e.g., hotel room, nightclub entertainment, late supper, . . . ). Case 2 depicts a TQC with a 3 hour transit, arriving for a 10 AM business conference or tradeshow. This individual is likely to need registration tickets and perhaps a brunch. Case 3 depicts yet another TQC arriving at 2 AM with a 1 hour transit. This could be a night guard wanting to purchase a snack, soft-drinks and/or medication for a headache, at one of several stores; preference subject to predictive advertising offers received. Note that TQCs are preferred Buyer-Consumers.

The ratio of TOA to TOD determines the shape of the trajectory. When a large number of TQCs are transiting to a large number of merchants, as can be expected in a large metropolitan region, those headed (e.g., GPS based directional vector) generally toward each merchant, can be spectrally color-coded, to highlight the prospective TQCs to be persuaded by attractive offers in a timely manner. The trajectory display will look like a "bubble chamber" tracking sub-atomic particles or an air-traffic controller's display. Similar annotation techniques are recommended to separate the "wheat from the chaff." Moreover, color-coding and usage of clustering techniques, as disclosed in FIG. 6 (~806), is essential to de-cluttering this polar situational display to be superimposed on the 3 dimensional scalable virtual Roulette wheel depicted in FIG. 12 (~812) and 2 dimensional scalable virtual Roulette wheel-table depicted in FIG. 13 (~813).

The challenge for each Seller-merchant (~25) is to setup appropriate consumer situational (e.g., TOD segments, TOA segments) and qualification (e.g., FADSPK, display devices, short-form/long-form advertising) and wager placement segment(s) (e.g., TOD, TOA), in advance to ensure that (a) Preferred TQCs are more likely to be able/willing/eager to execute a expeditious conversion-to-purchase (CTP), than not, and (b) TQCs who are not likely to execute a timely CTP, based on prior statistical outcomes, are discreetly dis-incentivized.

After personally experiencing the numerous superimposed de-cluttered "trajectories" of "unpredictable" TQCs, over a period of time and the corresponding CTP/ROI outcomes, each merchant will most likely develop a "gut feel" for (1) what wager bids win auctions against competing merchants, which tends to be a "zero-sum differential game," (see Bryson and Ho; Gelb) with "energy/control authority" limitations (e.g., bid amount/segment, cumulative bid amount/DOW), (2) what "persuasive" offers (e.g., TOD/

DOW/WOY based short-form and long-form advertising content, device modalities, . . . ), lead to a statistically favorable likelihood of promoting TQCs purchasing (i.e., CTP) and consequently improving each merchant's advertising budget return-on-investment (ROI). This is a merchant-by-merchant "learning" process leading to "game play" mastery. (see Yu Kai Chou)

This disclosure recommends respecting the buyer-consumer's~191 privacy, by not necessarily soliciting, collecting or using, the TQCs personally identifiable information (PII). I believe that this will in-turn earn the consumer's trust & loyalty. However, a PH collection exception may exist, if demographic and location data is collected & correlated across several days & archived by the portal provider and then made available to merchants. This is a portal RDPP~81 provider's discretionary issue, constrained by evolving Federal, State and local legal regulations.

In this disclosed gamification paradigm, the "life-time-value" (LTV) of TQCs is "measured," analytically modeled and compared, in terms of time-varying statistical distribution characterization parameters, such as, median, mean, standard deviation, long-tail, quartile segmentation, maximum likelihood, cross correlation, conditional probabilities, heteroskedasticity (e.g., time-varying variance & mean), stochastic instability, recursive estimation, fuzzy frontier optimization, etc.

Each Seller-merchant (~25) has the discretion of enlisting the guidance and support from their advertising agencies and campaign managers. However, this disclosure teaches a system and method for fostering the active participation of each merchant (i.e., MSME, LSE) to cost-effectively manage their own digital advertising strategy to improve profitability, cetris paribus (all else being equal).

Summarizing the Seller-merchant's overall "gaming" user experience (MUX): during the "discovery" stage, the novice merchant-player "learns" the "card" or "roulette"-like wagering game, using one TQC preference at-a-time (e.g., Emotions~111). Then, two preferences Emotions~111 & Activities~112 concurrently and so on, until all 6 "levels" can be concurrently integrated into the merchant-player's proficiency in making rapid TQC~42 selection parameter (TOD~27, TOA~26, ESKAPD~30, MISTKN~31, ABS~239 . . . ) decisions. This is akin to attaining rewards for conventional game level design. However, instead of relying wholly on conventional points, badges and leaderboards (PBLs), to motivate game playing, the pay-in wagers~239 and pay-out conversions (e.g., CTP~51) is denominated in consumer's currency, which is akin to gaming at licensed casinos (Ref:U.S. Pat. No. 8,123,618), without requiring the provider RDPP~81 to have a gaming jurisdictional license. Thus, no gaming license is required in providing on-the-job "excitin"g entertainment to the merchant~25. The portal provider~81 can publicize PBLs organized with an NAICS (See Table IV) based categorization.

Note that at each level, ESKAPD~30 the merchant has to traverse the entire process of placing Wagers (Bid, plus short-form Ad, plus Device preferences) on each TOD~27 segment (DTOD~98) with a corresponding TOA~26, plus (discount) offer, for an entire work day (e.g., 10 hours). Then, report the CTP times, plus transaction amounts (which can be automatically transmitted back to the (cloud) servers~242, from the merchant's cash registers. Using the server computed analytics (e.g., ROI, purchase decision response delay, . . . ), the informed merchant repeats the earlier process periodically (e.g., daily), attempting to improve ROI.

Having experienced the chain of events from wager placement to ROI, the seller-merchant develops a "gut" feel for the preferences (e.g., TOD, TOA, ESKAPD, display devices, Ad data types/duration, . . . ), which result in CTP with a high probability for the offered product and service mix, with the corresponding discounts, based on the "predicted" visit & occupancy (dwell time) at the brick-mortar (BM) establishment. Note that in "gamification" parlance, TQCs are an unpredictable time-evolving "scarce resource" to be "captured." The reward is near-term (CTP~51) & longer term (e.g., brand recognition/loyalty) driven ROI.

This quasi real-time wagering (QRTW~110) discrete feedback TEGOBAMA~815-817 system, together with the discretionary control (e.g. ESKAPD~30) profile gives the seller-merchant a sense of ownership, personal empowerment and enthusiastic participation in their gamified setup choices~314. Having gone through all the stages noted in earlier, aided by server (e.g., portal)~242 computed analytics~270, the merchant will be motivated to achieve "mastery" over Ad "wager" decision-making, to operate an optimally profitable business. And, the merchant will have thereby enjoyed the attendant fun and "excitement," of playing an "evergreen" (i.e., Y. K. Chou's game concept: 'forever" evolving, requiring active continuous player-merchant~25 participation), cash wagering game (i.e., gaming), without the need to visit a licensed casino. This is an attractive & novel mixing of work & play for the merchant.

Thus, the interactive gaming process and system disclosed above is as follows: (1) Buyer-Consumer selects games to "win' selected PS discounts, (2) popular socially "sticky" games are downloaded anytime/anywhere, via I-net (Internet) to consumer's BYOD (Bring Your Own Device) or at a kiosk or cyber-café or hotel/motel/bed-breakfast facility or home or wherever, (3) Freemium Business model: Play a set of games for free (e.g., 8) games per day. Then "pay-to-play" & earn more P/S discounts & points to buy virtual/promotional P/S, (4) Discount coupons earned are presented to seller-merchants on-site to buy pre-selected P/S at attractive discounts, (5) Each seller-merchant selects their discount schedule daily, perhaps based on prior day's sales, for example, via their Internet (I-net) connected digital devices, (6) B-M seller-merchants pay the RDPP (gaming provider): (a) a fee (e.g., 1%) for promotional advertising and E-coupon download to consumers, and (b) an additional fee (e.g., 1%) upon actual purchase payment by the buyer-consumer, at B-M establishment or remotely via the merchant site at the Internet portal marketplace, for example, as a service monetization business model.

The prior sections disclosed embodiments of systems and methods to enable advertising promotional selling by competing seller-merchants/purveyors, both (a) brick-mortar (BM) and (b) E-commerce based providers, of their suite of products & services (PS), on a (1) region-by-region basis, if the order placing buyer consumers are "local" and/or (2) buyer-consumers, who are "far away," but are able & willing to place an order remotely (e.g., E-commerce), and/or make a E-payment, and delivery without the compelling need to visit the BM (brick-mortar) seller-merchant(s), to personally evaluate the purchased object first.

Typically each casino property has a collection of seller-merchants, akin to regional Malls and shopping centers, co-located on their property, including the whole gamut of PSAA, including restaurants, bars, music shows, large theater based themed entertainment. The casino management has a financial motivation (eg, rent received) from seller-merchants (SM) operating their PSAA related business on Casino property for the benefit of co-located hotel guests public visitors. The critical difference is that casinos are directly regulated by the local gaming control board (GCB), whereas merchant-sellers dealing with commercially legal PSAA are not.

All the PSAAs, can be segregated into NAICS codes or alternatively into say a simplified open-Network-digital-commerce ONDC-like set of 32 categories of interest to buyers-consumers (BC): (1) Grocery, (2) Food & Beverages, (3) Fashion, (4) Beauty & personal care, (5) Home & Kitchen, (6) Garden & outdoor items, (7) Baby care, (8) Electronics & Appliances, (9) Toys & Games, (10) Sports & sporting equipment, (11) Agriculture/Farm produce/Agriculture Output, (12) Agriculture Input, (13) Hardware & Industrial Equipment, (14) Health & Wellness (Products), (15) Medical & Lab supplies, (16) Chemicals, (17) Automobile parts & components & automotive supplies, (18) Fiber & Yarns, (19) Alloys, Metals, & Metal Products, (20) Office Stationery & Supplies, (21) Building & Construction supplies, (22) Books & Stationery, (23) Pets & Pet supplies, (24) Health & Wellness (Services), (25) Financial & Legal Services, (26) Repair, maintenance and At-Home services, (27) Education & (skill) Training, (28) Freight & Logistics services, (29) Telecomm services, (30) Travel, Tourism and entertainment services, (31) Alcohol, Tobacco, & Firearms (ATF), (32) Gambling (cash & equivalents in and/or out). Note that most USA E-Commerce vendors (e.g., Amazon, E-Bay, . . . ) are in a "walled gardens" from a buyer-consumer perspective. Whereas, the ONDC architecture represents an "Un-walled" garden, enabling a buyer-consumer anywhere in India, to peruse-buy PSAA offered by any Seller-Merchant anywhere in India.

For example, within category #30, one can have subcategories associated with Arcade gaming devices, which is an entertainment services. Other activity/attraction (AA) devices, include those at an amusement park/boardwalk, such as Ferris Wheel, Bumper cars, etc. The above example of 32 categories can be iconized & displayed, as an 8×4 Matrix on a consumer-buyer's (CB's) smartphone display screen to enable said CB to select and "drill-down" to locate a PSAA in an attempt to satisfy CB's self-expressed needs/wants (NW), selecting from alternate PSAA from a "guided search" on the Internet, unlike the "walled garden" search from Amazon, Ebay, etc. Note that the same icon can be replicated into multiple "distinct" icons by assigning a different discount rate to each (eg, 10%, 20%, . . . ), subject to associated SM consent.

Figure 28:
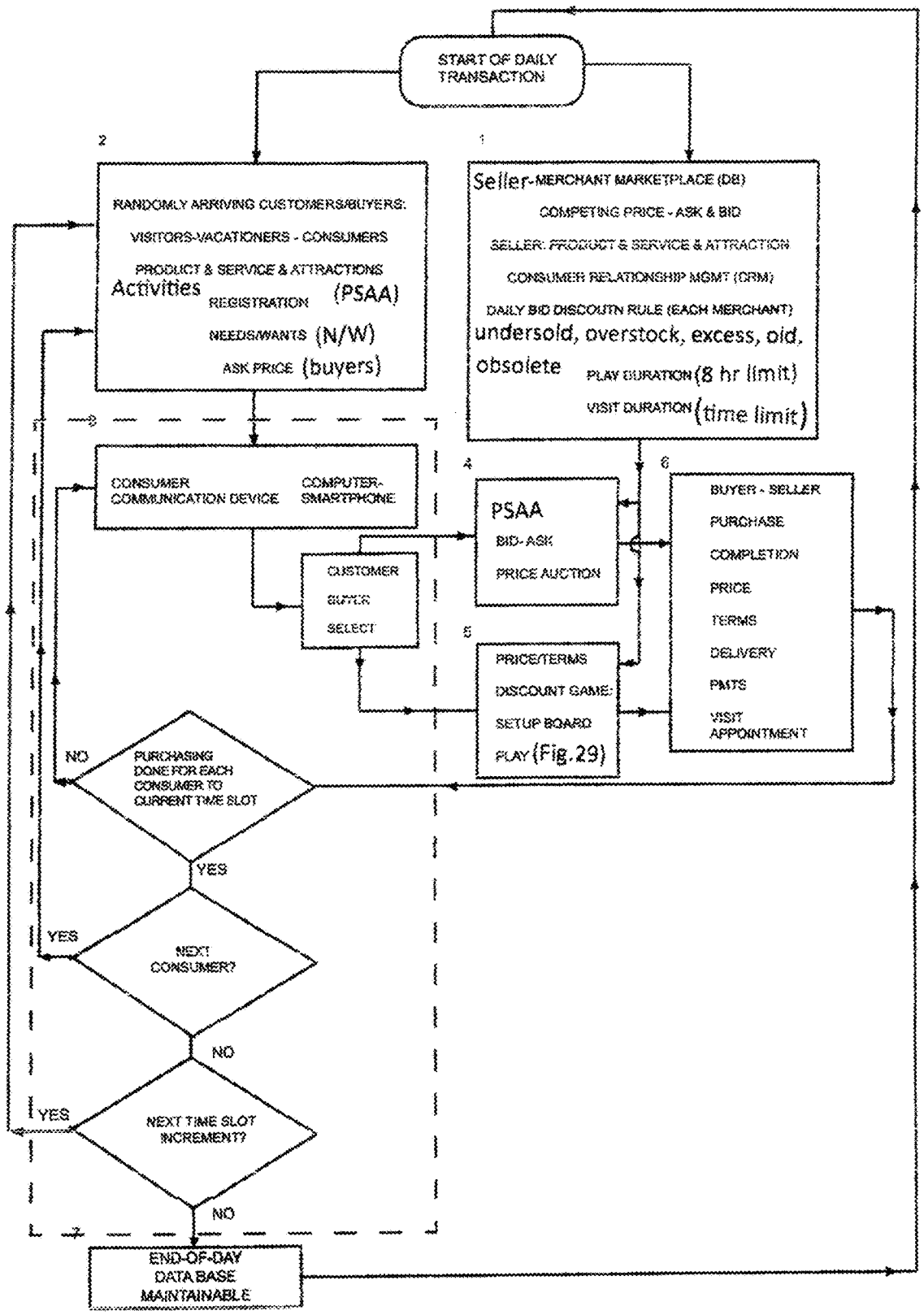

FIG. 28~828 depicts the locally competing seller-merchants interacting with buyer-consumers, the sell (Bid) and buy (Ask). Starting with a daily transaction, on the left-side, buyer-customers arrive at random times. They could be vacationers-consumers-visitors, seeking products-services-activities-attractions (PSAA). Ideally, they register and express/imply their needs/wants (EINW) and they offer an "ask"ing price. On the right side of FIG. 28~828, the seller-merchants respond with a competitive selling price and employ "consumer relationship management" (CRM) to persuade buyer-consumers to convert-to-purchase (CTP). The right side, shows 2 modes: an auction mode (Bid-Ask), using an algorithm akin to a 2-sided stock/securities trading and a Discount mode, using a gamified reward paradigm. Buyer-consumers can use various digital devices (MIS-TKD), but mostly mobile smart phones. To complete a transaction (CTP), the parties have to agree on several factors, noted in FIG. 28~828, on the right side.

Figure 29:
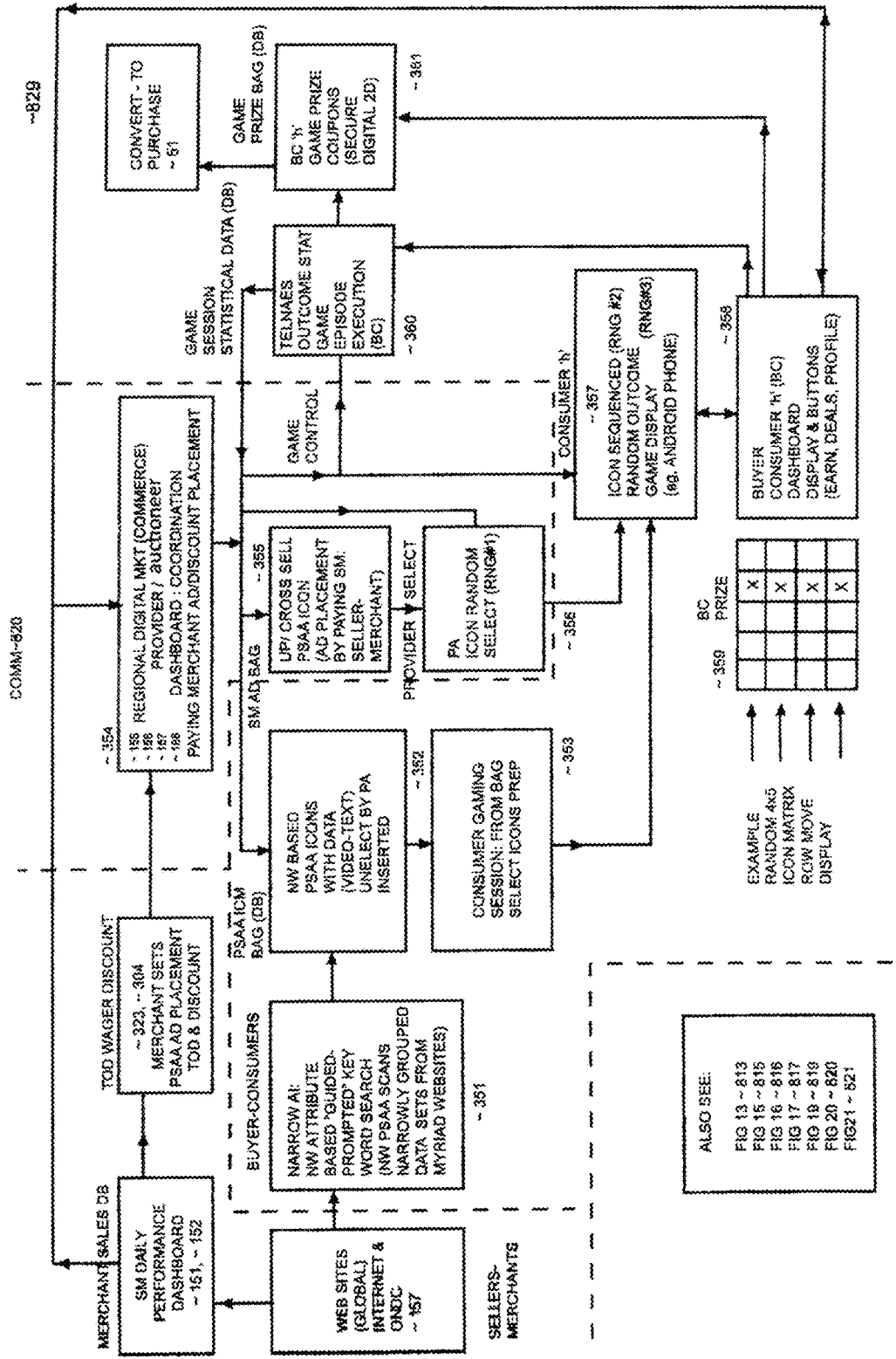

FIG. 29~829, depicts the buy-sell process, disclosing details of the gamified process. This figure is an amalgamation of several figures described earlier, as noted. On the left, buyer-consumers visit seller-merchant sites to search-select-extract PSAA data (narrowly scraping), based on their EINW. This data is encapsulated into an icon, which is placed in a buyer Consumer PSAA "Shopping bag." Concurrently, the seller-merchant assembles a "advertising bag" that includes PSAA the SM wants to sell on a consumer personalized basis, if possible, for each buyer consumer. Using these two bags the regional provider-auctioneer (RPA) constructs a personalized game display of icons, by dipping into both bags. If only the seller-merchant bag is used, then the iconized game is non-personalized.

In the game embodiment shown at the bottom of FIG. 29~829, the Icon game is a row-column collection of icons, akin to a casino slot machine, Except, the icons can (a) move row-wise also, rather than just column-wise and (b) the collection of icons is customizable on a player-by-player basis, by using Icons selected by the player, reflecting their current EINW. Each game episode round may randomly (e.g., see Telnaes patent) result in a reward win, in the form of a purchase discount offer, ideally less than the MAP (minimum advertised price). There is no cash in-out in this game. The discount earned by playing the game and winning is received, when buyer-player submits discount coupon to seller-player, to purchase the PSAAs, as per the coupon.

The embodiment disclosed in FIG. 29~829 are versions with NO cash-in or cash-out for the BP. If Regional Provider-Auctioneer (RPA) wants to enable cash-in to enable BC (eg, Consumer) to pay for the PSAA purchases, using $3^{rd}$ party credit sources, appropriate soft-buttons, and PSAA delivery by $3^{rd}$ party transportation modalities, then appropriate App code can be added to the BC's smartphone app, enabling seamless wireless connection to a bank/credit card and PSAA delivery sources, acceptable to the BC.

The mobile app can also be deployed on Casino property, both Native American and non-Native American, in a non-cash or cash mode. The latter being subject to local Gaming Control Board (GCB) approval. In the cash-mode, an appropriate credit card would be debited to play and credited, if the BC "earned" the current game on their smart phone. The Casino property owners could also authorize the co-located PSAA stores to include their PSAA as rewards from playing the game. The entire mobile game concept can be extended to progressive gaming, akin to progressive slots, thereby enabling multiple buyer-consumers to play, within social groups or anonymous progressive slot-like groups, subject to GCB authorization, particularly if the RDPP (~81) is allowed a cash-out mode.

In yet another embodiment, visitors/tourists on Las Vegas Boulevard in Las Vegas, NV, for example, could also play the "Icon game" on-the-street and be persuaded/motivated to visit a particular casino property, because they had just "earned" a discounted dinner, at a casino on-premise restaurant or bar. Various issues concerning gaming on Casino property were disclosed in U.S. Pat. No. 8,123,618, which is hereby made a part of this disclosure.

When cash-gaming (ie, gambling) is to be enabled off-casino property, most of the game software is not downloaded and installed on the BC's smartphone. Instead only the minimal code is needed to (a) display the moving icons on the smartphone game screen, (b) the BC's means to "click" on the icons, edit icons, push soft-buttons are included, and (c) control means for the game session (start, stop, etc) is downloaded & installed by the BC on BC's (smartphone based) gaming device. The rest of the Mobile App code, particularly the critical (tamper-proof) random number generators (RNGs), which determine the game outcome, are installed on the Casino-controlled/managed secure tamper-proof cloud server, subject GCB authorization.

Figure 30:
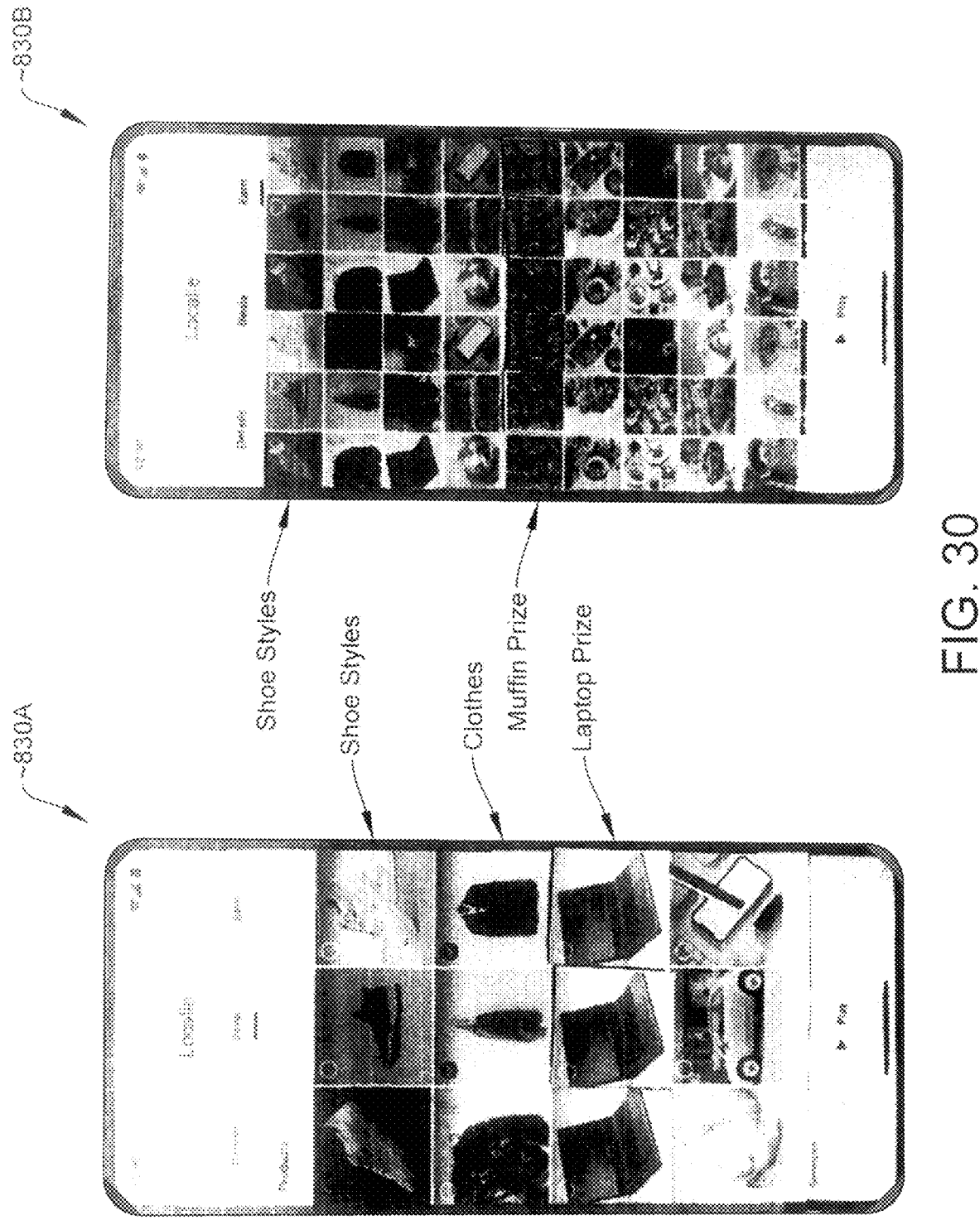

FIG. 30A~830A, depicts an example embodiments: 12 visible icon (3 columns×4 rows) and FIG. 30B~830B depicts 54 icons (6×9) based random gaming display layouts, which are "customizable," for each game episode, in each game-play session~445, as per FIG. 28C~828C, by each buyer-consumer (BC) to represent said BC's expressed/inferred needs-wants (EINW). These 12 icons=12 "Ad placement slots," in each BC's gaming display, for periodic bid auctions, by competing Sellers-Merchants (SM), subject to each BC's consent in terms of comporting said BC's NW.

In a preferred embodiment each of 3 columns (vertical (column) icon movement) or each of 4 rows (horizontal (row) icon movement) has 32 icons, which rotate accordingly, providing 32×3=96 or 32×4=128 icon positions. Note that only 3×4=12 icons are visible to the BC, as per FIG. 29A. So, each CB is invited to select say 8 icons, based on their NW, from their "shopping bag." And, 16 PSAA Icons are randomly selected by the Internet (TCP/IP or BECKN) regional provider-administrator (RPA) to competing wagering Seller-merchants, who have similar and/or different PSAAs, compared to the 8 icons selected by the BC. Additionally each row (horizontal icon motion) or Column (vertical icon motion) has 4 jokers and 4 clowns. Jokers are anti-icons and Clowns are morphing icons. A discount is "earned," on a PSAA, when a row has identical icons (vertical motion) or a Column has identical icons (horizontal motion).

In another embodiments, PHOSITA can functionally arrange say a 5×5 visible icons, as follows: $1^{st}$ column on left is Food items (NAICS #445), $2^{nd}$ column is Kitchen appliances (NAICS #336), $3^{rd}$ column is Jewelry items (NAICS #448), 40 column is say Mobile accessories (NAICS #334), and $5^{th}$ column is say Furniture (NAICS #337), offered by TOA based "local" merchants. Note that each column has say 32 icons, of which 27 are not visible to the BC. A multiplicity of such "customized" NW based games can be concurrently presented to the consumer-buyer's playing entertainment. Other games using playing cards (ie, 52 icons instead on playing card symbols), multiple dice (ie, each has 6 icons) and roulette wheel (ie, 38 icons instead of numbers) can also be concurrently presented, as disclosed in U.S. Pat. No. 8,123,618 incorporated herein by reference.

The BC smartphone App Code processing sequence, to implement this functionality, with say a Samsung Android .apk, using KOTLIN language, for example, is comprised of the following steps: (a) BC (Buyer-Consumer) selects a category from list say in [260], which might include their expressed Needs/Wants (NW), one-at-a-time, (b) BC sequentially selects "search prompt" inputs to any equal artificial intelligence (AI) tool, from Open AI (ChatGPT), Google (BARD), Microsoft, etc., from a predefined list of prompts, corresponding to item (a) and its PSAA attributes (eg, if BC is buying soap, is it for (1) dishwashing? or (2) clothes washing? or (3) body washing? And is it scented? What is the Price range? What is the Color? (c) a search is launched, via Internet for myriad (registered) seller-merchant's offers for finding PSAA satisfying attributes of (b), (d) the discovered list of sellers-Merchant-sellers (MS) offering said PSAA is pruned to say top five, based on a "merit vector" comprised of: (1) PSAA cost, (2) Manhattan distance to Seller-Merchant (SM), (3) travel time (TOA) to SM, (4) PSAA availability at said MS, (5) delivery date from said SM, (6) payment methods (card, cash, merchant credit) accepted by said SM, (e) system iconizes top choices from say 5 down to 2 choices, perhaps with BC-aided selection, or a BC weighted attribute ranking process, as per multi-attribute utility theory (MAUT) methodology, (7) System inserts say 2 corresponding icons into the BC's "shopping bag," from which BC subsequently selects icons to enable regional-provider-auctioneer's (RPA) system, to construct the (mobile) icon display screen, akin to FIGS. 30a-830a (3 column×4 rows) and FIG. 30b-830b (7 column×7 row Tablet), thereby enabling BC to "earn" discount (coupons), which can be a significant cost reduction (ROI incentive) for said BC to convert-to-purchase (CTP) of PSAA. Note: the icons in FIG. 30a and FIG. 30b are self-explanatory pictorial thumbnails of typical PSAAs, purchased by consumers.

For illustration, example self-explanatory thumbnail icons, drawn from vacation-travel choices in Europe, with encapsulated text data exposed, are shown in FIG. 32. Iconizable examples include packaged tour in Germany, Holland, Switzerland and Austria.

Figure 31:
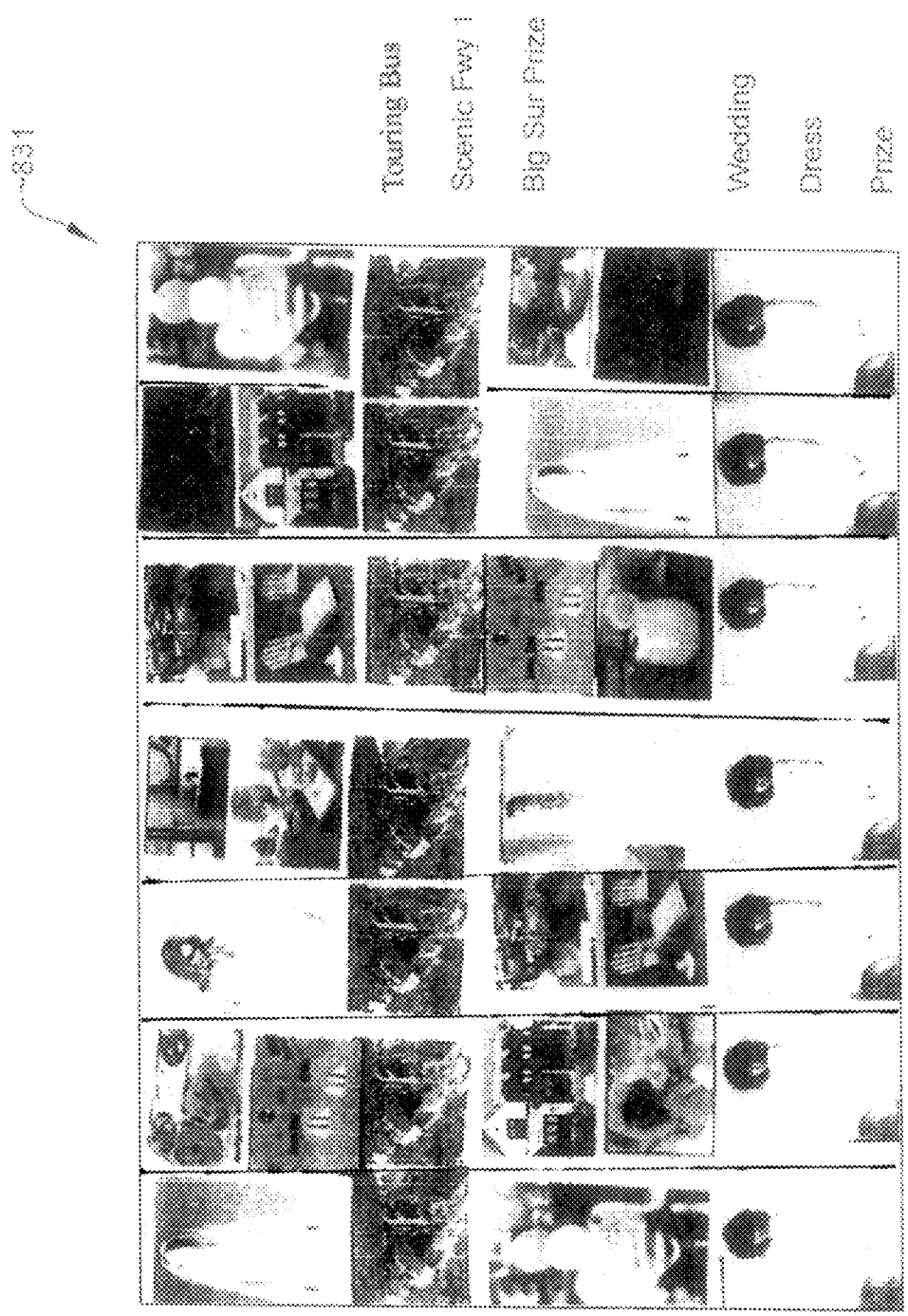

In one candidate (partially) personalized embodiment, buyer-consumer BC selects say up to 8 PSAA icons from said "shopping bag" is shown. The regional provider-Auctioneer's (Cloud server) system adds 24 additional icon from said provider-auctioneer's collection of "competing & Ad paying" sellers-merchants (SM), who have somewhat related PSAA offerings, making up a total of say 32 icons. The provider's system then replicates these 32 icons into several randomly sequenced linked-list of 32 icons each, to generate say a 3×3, or 5×5, or 7×7 matrix of icon loops, based on said provider's & CB's choice, thereby completing the construction of a PSAA icon game playing display, akin to FIG. 30 or FIG. 31.

In another embodiment of "moving icon" game be presented as a say a 3×3 or a 4×4 or a 5×5 or a 6×6 or a 7×7 or an 8×8 matrix, based on display size and legibility of the PSAA icon matrix. Matrix size is a subjective tradeoff between Icon visualization, attractiveness & matrix size.

The following outlines an end-to-end algorithmic/data flow from the 3 perspectives, namely Buyer-Consumer (BC), Seller-Merchant (SM) and the Regional Provider-Auctioneer (RPA) sub-Systems:

(A) Buyer-Consumer (BC) Subsystem:
  (1) Buyer-consumer (BC) starting Display #1 is 8×4 Icon matrix representing all 32 PSAA Categories, as per [0268],
  (2) Each BC has to select one or more of these categories, one-at-a-time to find Seller-Merchants (SM) that satisfy each of said BC's PSAA Needs/Wants (NW),
  (3) Using a "guided search" on the Internet, BC fills their "shopping bag" (SB) with at most 32 PSAA icons.
  (4) These 32 (=8×4) PSAA icons are Display #2 to said BC "click-on for acceptance or deletion/addition of this matrix of Icons, which the regional Provider-Auctioneer (RPA) eventually uses to form the "icon game" display.
  (5) BC selects at most 8 icons from their "shopping bag," for the game and "submits" them to RPA
  (6) if BC selects less than 8 icons, then RPA "duplicates" BC selected icons to make up a total of 8 repeated NW icons.
  (7) When the Regional Provider-Administrator (RPA) completes the processing step B.1 of assembling a set of 32 (8×4) PSAA icons, this Display #3 is presented to the buyer-consumer (BC), to enable BC to view their selected 8 icons, as well as the 16 PSAA icons selected (randomly) by the regional Provider-Administrator (RPA) system, by "clicking" on each icon to "peruse"

the details. And approve the set of 32 icons, for the game "session," limited to say 8 hours of "play" time per day. Icon "peruse" time is to be excluded.

(8) After BC "hits" the game episode "start" button on control panel and views moving icons, which stop moving in say 9 seconds (Casino fast version) or say 18 seconds (Non-Casino slow version).

(9) If the icons line up horizontally (for vertically moving casino-like icons) or vertically line-wise, (for horizontally moving non-casino icons) or diagonally, then BC receives a "winning" token, convertible to cash or a PSAA coupon at a discounted price (if it's a GCB authorized casino scenario) or "earns" PSAA coupon, at a discounted price (non-casino scenario),

(10) Say, in a (recommended) 4×4 "icon game" display matrix: Each Consumer's "earned coupons are saved in their "won coupon bag" by the Regional Provider-Auctioneer (RPA) system. Buyer-Consumer (BC) select which of these coupons to present to the appropriate seller-merchant (SM), via electronic means or physically, by visiting the said seller-merchant's brick-mortar (B-M) establishment, to convert-to purchase (CTP) and increase said SM foot-traffic, and enabling "up-selling" and "cross-selling" by the said merchant-seller.

(B) Regional Provider-Auctioneer (RPA) System:

(1) RPA accepts these 8 icons from BC to "construct" a building block (BB) Display #3 consisting of 32 (=8×4) icons by ADDING 4 Jokers ("No-Win" or "Null PSAA" icon), plus 4 Clowns (i.e., icon equivalent to a "wild card"), plus 16 Seller-Merchant Advertising icon bag, which are randomly selected from a predefined merchant advertising bag of at least say 128 (related: Up-sell, Cross-sell) PSAA icons, thereby "assembling" a set of 32 icon "building blocks" (BB) for the finalized "Icon Game" (IG) display in the current game session.

(2) This BC display #3 is used by RPA to "construct" 8 linked lists (for a 4×4 icon matrix) of randomized icons, consisting of 32 icons each, to enable row or column movement, mutually exclusive. This is to ensure that the Telnaes algorithm is applicable for setting "win" outcome probabilities, thereby ensuring that the number (#) of "wins" is adequate to hold the buyer-consumer's interest in playing the icon game, to "win" (earn) rewards, namely PSAAs of interest, at a discounted price.

(3) The "visible portion" of these linked-lists is an Icon game (IG) "snap shot" in an ever changing display "window," which the BC sees when the "icon game" (IG) icon linked lists (LL) movement is activated."

(C) Seller-Merchant (SM) Player Subsystem:

(1) Each SP partitions their PSAA offerings in the form of multiple PSAA icons for EACH of the 32 categories, as per Display #1 (same as A.1 above)

(2) EACH of these PSAA icons in EACH of these 32 categories of PSAA have a corresponding discount. Indeed, multiple icons can be created with each having a different discount (20%, 40%, 60%, 80%). This facilitates icon "duplication", as needed in A.6 above. If PSAA icons "lineup," as per A.9, a coupon is "earned" (or "won"), at the highest % discount icon level, in said identical icon "lineup" with different % discounts.

(3) At the end-of-day, EACH SM needs-to-know: (a) how many of their coupons were earned for each offered PSAA?(b) at what time-of-day (TOD)?(c) Consumer's Time-of-Arrival delay (ie, how far did consumer travel to make purchase?). This data motivates SM to purchase specific PSAA Icon Ads and place them, by "wagering" (paying RPA for "informed" multimedia Ad placement, within the icon), bidding on an auction, because there are other competing merchants offering similar PSAA to same consumer), at the most "promising" (statistically speaking "maximum likelihood") time segments (ie, specific TOD window), from SM's perspective.

(4) Each SM needs to visualize daily, weekly, & monthly, the CTP statistics and DAC (daily active consumers) and MAC (monthly active consumers), visiting SM's B-M establishment and/or website, on a PSAA-by-PSAA basis, for SM to understand what is selling? And what is not? Thereby enabling the "informed" setting/modifying of discounts, by said SM, within EACH PSAA icon, akin to a "loss-leader" strategy. So, if a particular PSAA is not being sold (particularly if it is perishable items) or is over-selling over a period of several days, said PSAA can rationally be discounted to a greater/lesser extent, by said MS, thereby achieving time-varying quasi real-time optimization.

It is noted that there are 3 parallel asynchronous processing algorithms, namely, (A), (B) & (C), as per the embodiment disclosed in [0284]. A finite-state-machine (FSM) can be defined to interconnect/coordinate these 3 asynchronous processing loops by inserting appropriate "wait" states, etc., to effectuate recommended overall synchronous operation. AFSM can be formulated, to ensure a well-structured coding implementation, in an operational environment. Note that the recommended (minimal) DTOD increment is 1.5 minutes (ie, 90 secs), and the recommended duration of (a) GCB a licensed cash paying "icon game" episodes is say 7.5 secs., and (b) Non-cash "icon game" is say 15 secs.

FIG. 33-833 provides details on a finite state machine (FSM) underlying the entire icon game setup process. Our implementation uses the Google Android Firestore database, for buyer-players (users). The "bundle" of coupons on a user-by-user basis are stored in a "shopping bag" for subsequent selection by the buyer-consumer (BC). Details regarding each coupon, such as, underlying PSAA, seller-Merchant (SM), location, distance, price discount offered, usage video clip, etc. are also "encapsulated" and stored in the Firestore DB. Search button extracts these parameters, while narrowly scraping the seller-merchant site.

FIG. 34-834 outlines the "search-select (narrowly scrape)-iconization" process. As noted we currently use Google Shopping API implemented in Python by SerpAPI, which enables scraping. In a production version we will write our own version. The param "num" is used to set a limitation of 30 results. After scraping, Kotlin (JSON) is used to store iconized coupons in a list structure. Only coupons meeting search conditions (e.g., price, distance, . . . ) are retained.

Figure 35:
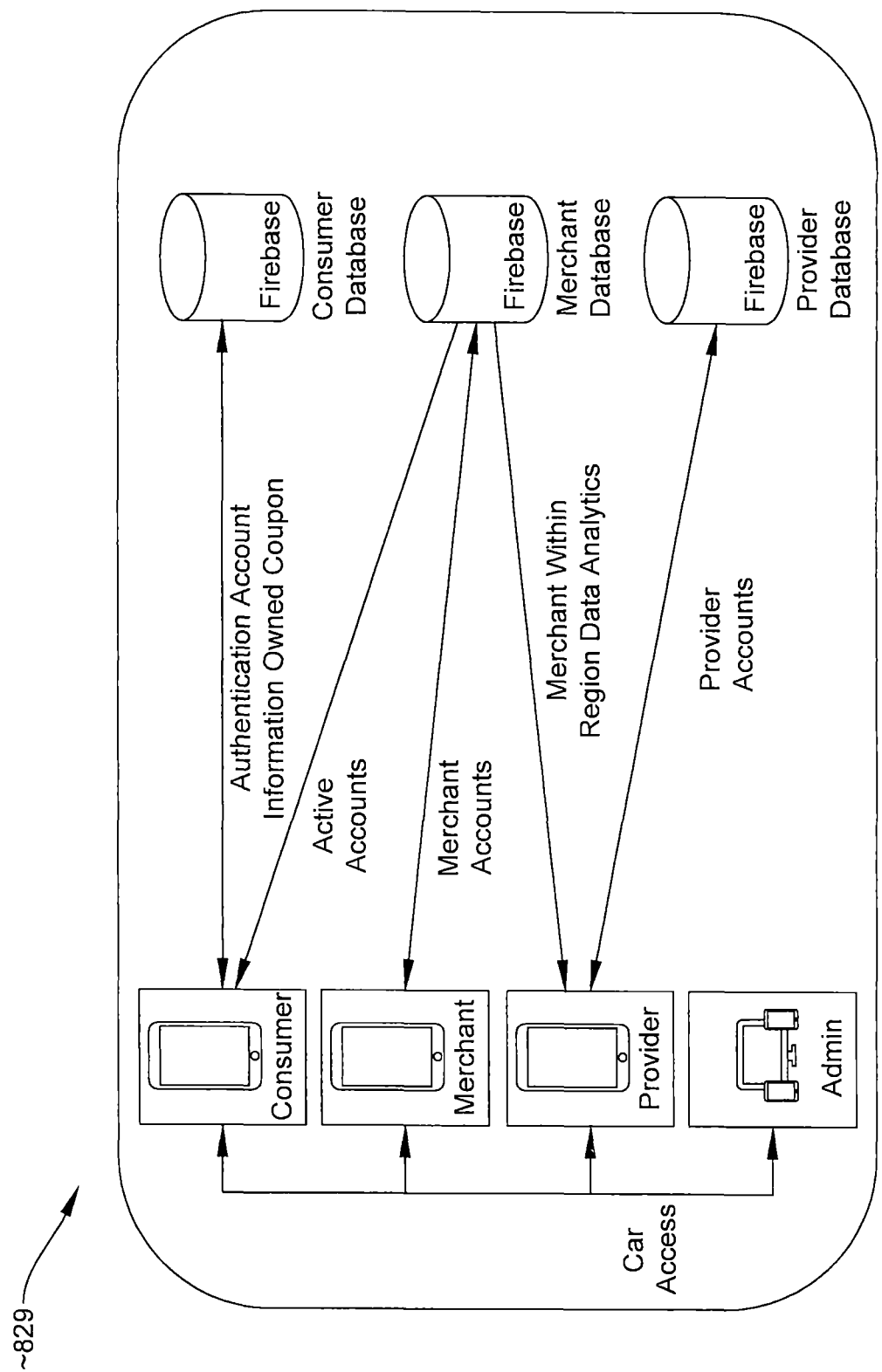

FIG. 35~835 outlines the storage and processing architecture on Google Cloud, covering Seller-Merchant, Buyer-consumer, and regional provider databases. Required processing is done by various modules including buyer-consumers (BC), seller-merchants (SM), and regional provider auctioneer (RPA).

FIG. 36A~836A outlines the random outcome game icon motion algorithm, which is our simple variation of Telnaes algorithm to set the PSAA icon "win" outcome probabilities. We start with Ad icon bag for a plurality of merchants, and NW shopping icon bag for a plurality of consumers to create a matrix of icons with 4 rows×4 columns. In practice, PHOSITA has to set the number of rows and columns. Then there is a "earn" step, and random shuffle" step. Each of the 4 columns of 32 icons each is shuffled "differently" to achieve random icon sequences, between the columns. Then, a random value from 0 to 79 is chosen.

Figure 36B:
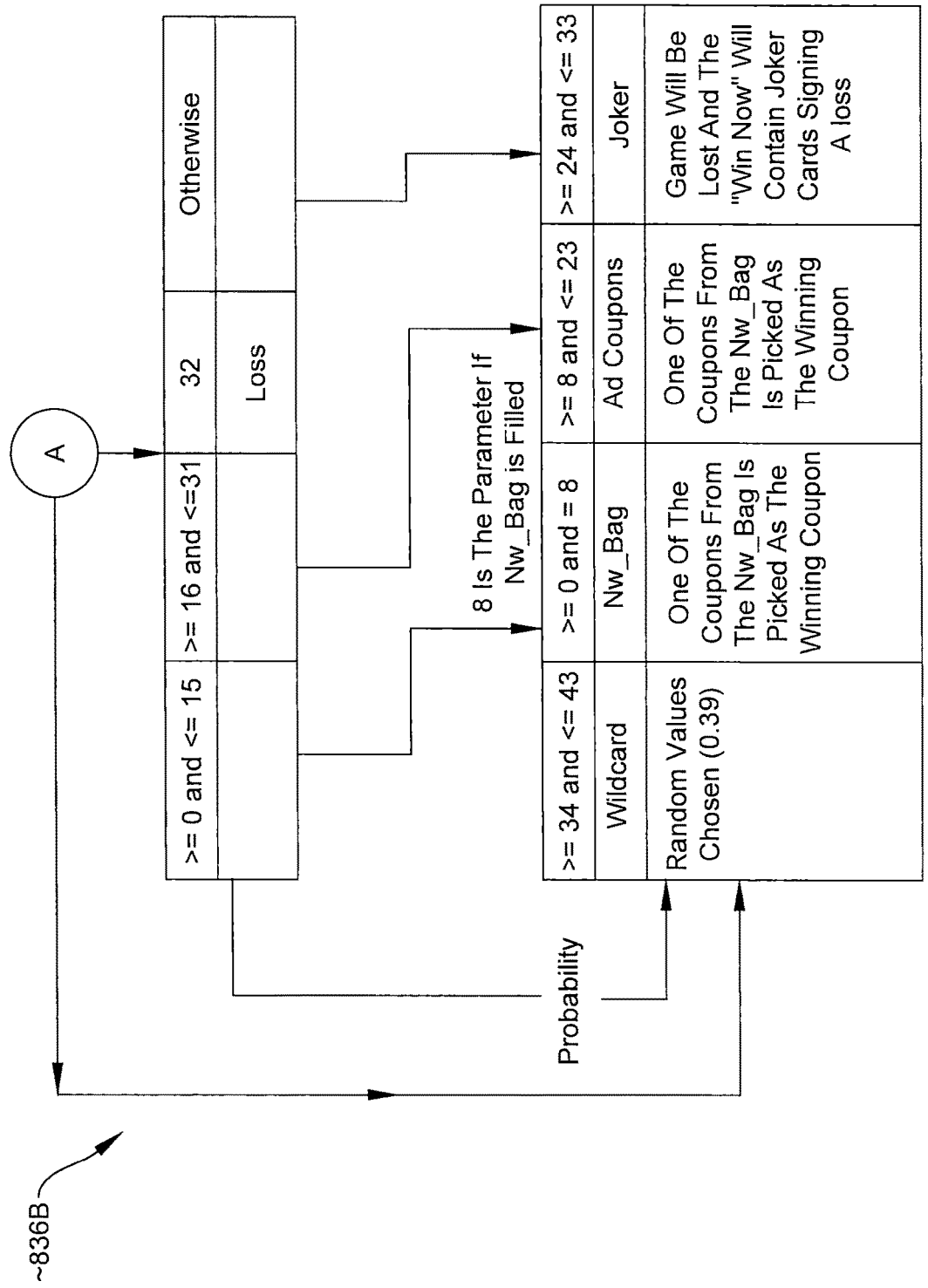

FIG. 36B~836 uses this value to pick one icon from one of 4 bins, namely, Wild card, NW shop bag, Ad coupon bag and Joker. This determines the eventual stopping location of the icons. For example, we could setting the Chance of consumer-player NW coupon win at 10%; Chance of Ad coupon win is set at 20%. So, 70% of the game episode rounds would be "no win." These probabilities are subjectively set by RPA and Seller-merchants (SM). Various other algorithms can be designed by PHOSITA. There is no compelling reason to use an algorithm comporting with Telnaes. However, GCB will insist that, when there is cash-out to buyer-consumer (BC), as a part of using this game playing reward paradigm, it a gambling game.

FIG. 37~837 shows self-explanatory results of coupon win after several game episode rounds of play. Clicking on a coupon icon provides player with further details on the icon.

Figure 38:

FIG. 38~838 shows the deal screen which shows various coupons which could have been won, with details of the PSAA can be viewed by clicking visible portion of the thumbnail pictorial icon.

Figure 39:
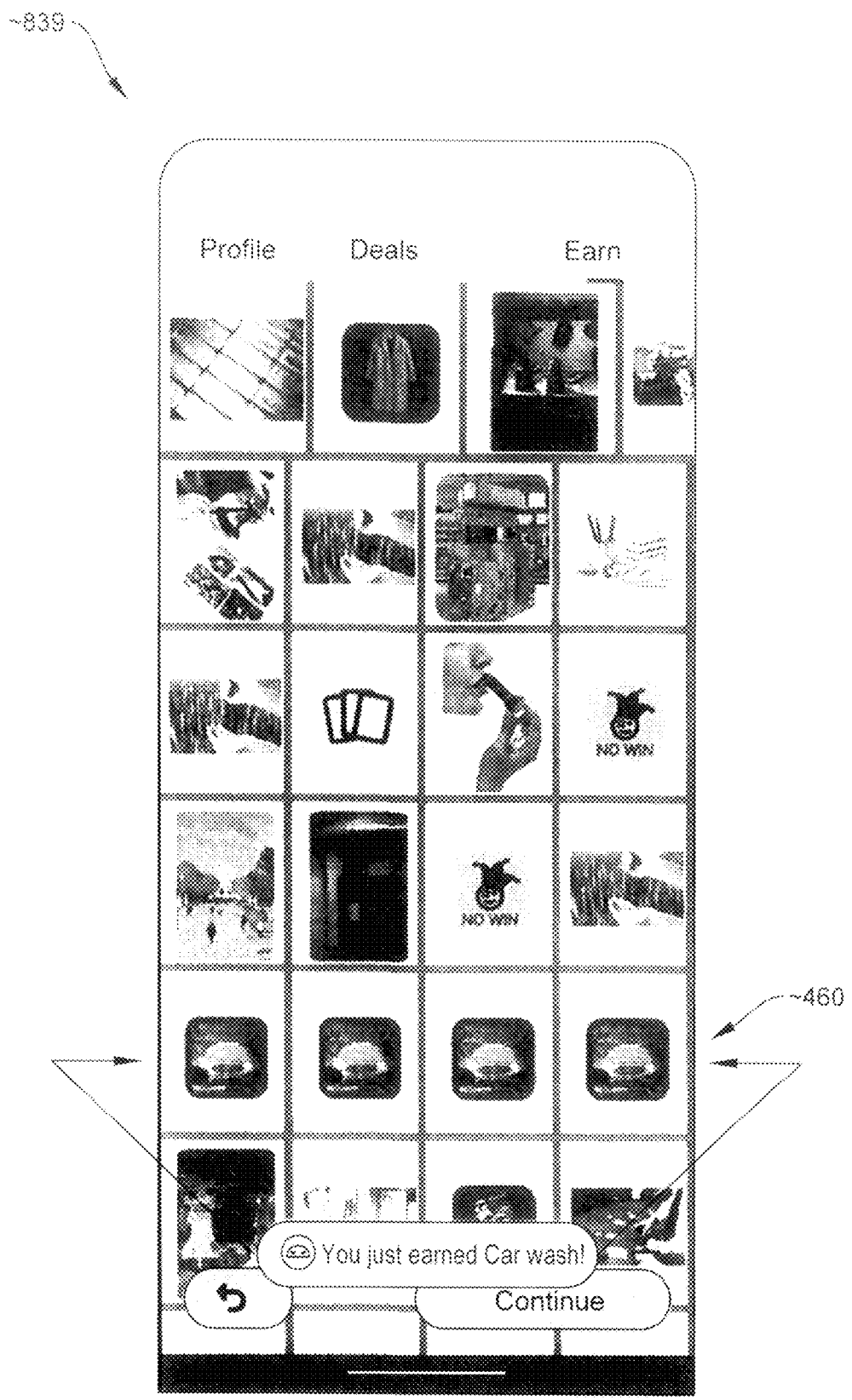

FIG. 39~839 shows the shows the visible 5 rows×4 column matrix of icons, which moves along columns. Note that there are 32 icons in each vertical reel of icons. A win is declared when all icons in any row are identical. Various other geometries of icons can be pre-set to be a winning geometry by the RPA. Here the player has won a car wash at a discounted price. The top row of static icons are merchant stackable banner advertising, contributed by winning merchants, after winning a bidding auction, administered by the regional provider-auctioneer (RPA). These Ad icons are visible for a limited time period, based on which DTOD segments were won by that particular Seller-merchant.

Figure 40B:
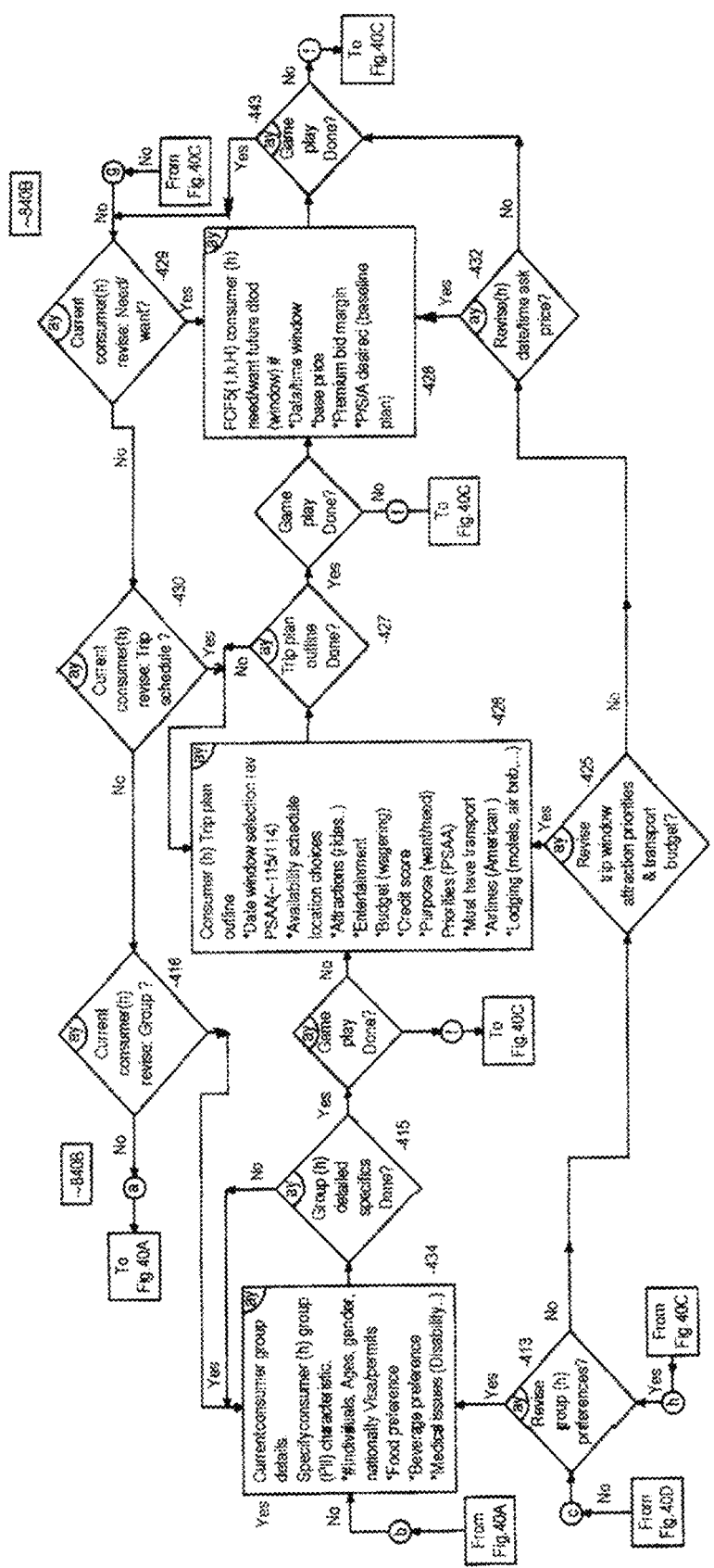
Figure 40C:
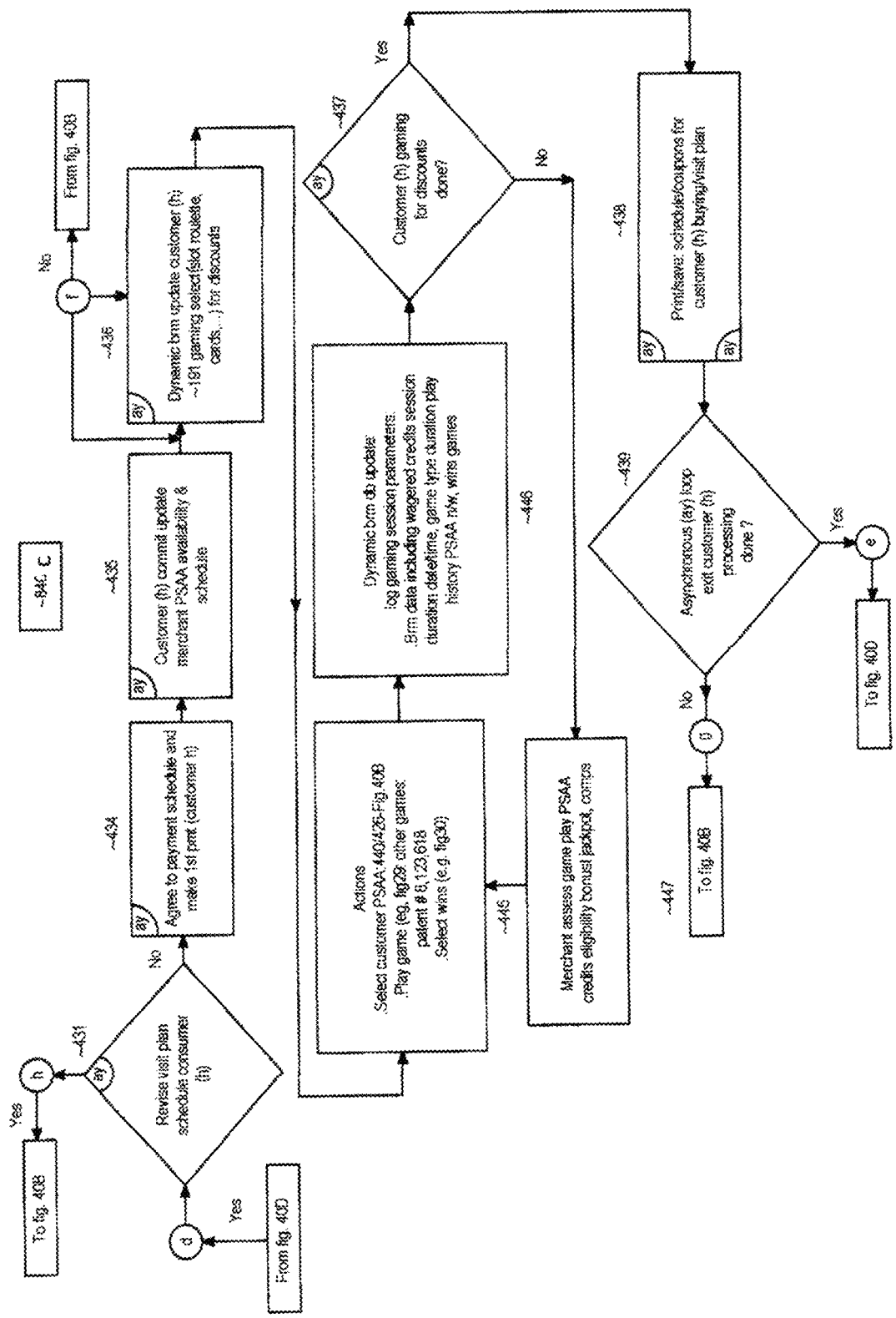
Figure 40D:
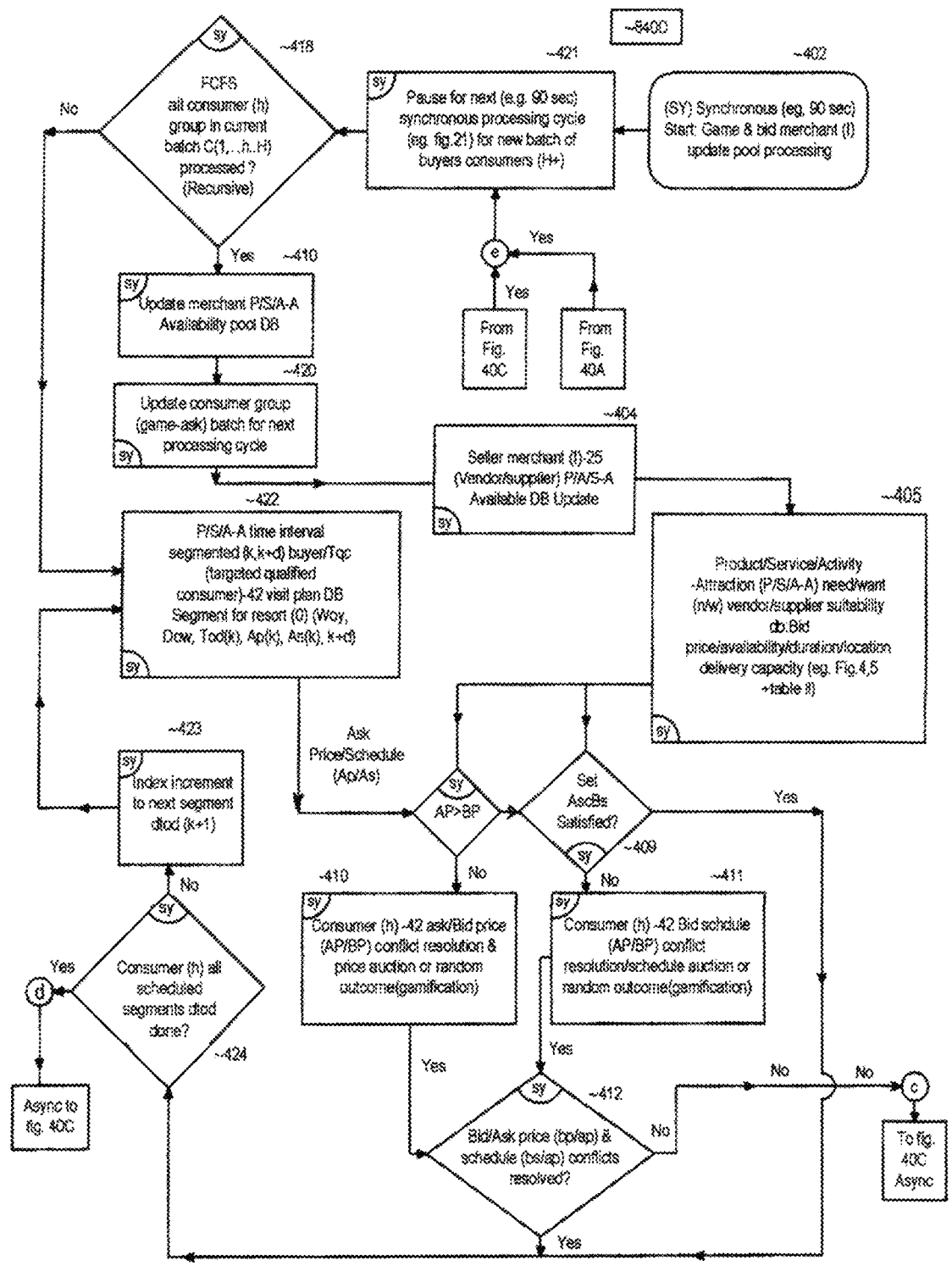

The bottom middle of FIG. 40A~840A, the entry point for asynchronously (AY) participating consumer array group "h"~401 and the top right of FIG. 40D~840D, the entry point for Synchronous (SY) merchant array member "l"~402 are shown. In FIG. 40A~840A, If the "canned"/pre-designed vacation offers (not shown) are unacceptable, then consumer group "h" updates their visit plan starting in module~403, including their priorities and correspondingly in FIG. 40D-840D, each merchant "l" updates their PSAA availability database (DB), including discretionary pricing revisions~404, and excludes previously committed time slots and unavailable PSAA, already promised to prior consumers. In FIG. 40D-840D, the merchants perform the PSAA database (DB) update~406, as per the framework disclosed in FIG. 4~804, FIG. 5~805 and table I.

In FIG. 40D-840D the software module~408 determines whether the PSAA ask price for consumer "l" is greater than corresponding bid price from any of the merchant (l, . . . , l, . . . M). if so, merchant "l" commits to deliver to consumer "h," provided the time slot schedule AS (WOY, DOW, TOD-a to TOD-b) desired (need/want) by the consumer "l" is in fact available, comporting with the bidding merchant "l" available schedule BS~409. Price & schedule conflict resolution is accomplished by gamification (price/schedule auction, random outcome gaming, as per U.S. Pat. No. 8,123,618, which is made a part of this disclosure), in modules~411, ~412, as shown. If conflict cannot be resolved, consumer "l" must revise group preferences~413 or consumer's AA priorities, including transport time/ b5udget~425 or date (DOY)/time (TOD) and ask price~432, as per FIG. 40B~840B. However, if there is no price or schedule conflict for consumer "h" in module~412, then module~424 in FIG. 40D-840D, determines whether all scheduled time segments DTOD (k) are completed for consumer "h" ? If not, module~423 increments the time index DTOD (k+1) and continues the plan commitment process~422 to resolve (consumer) ask vs. (merchant) bid conflicts in price~408 & schedule~409. However, if all schedule segments are done~424, then consumer "h" proceeds to a visit plan (price, schedule, etc) review & confirmation~433 in FIG. 40C~840C.

If dissatisfied, Buyer-consumer "h" goes to modules 413, 425, 432 in FIG. 40B~840B sequentially to input revisions to plan. If satisfied, consumer "h" agrees to a payment schedule and makes $1^{st}$ (down) payment~434. On receipt of payment, such a commitment to consumer "h," requires all committing merchants "l" to revise their PSAADB~435. Buyer-consumer (CB) saves plan details & discount coupons~436 in a "shopping bag." Consumer "h" exits this customized vacation-travel planning process~437 in FIG. 40C~840C. However, consumer "h" can continue to play (~445) & win (random outcome) discount game credits (~447) offered by merchants, in an attempt to reduce the total price of the consumer "h" travel vacation plan. The "dynamic" buyer relationship management (BRM) database (DB) logs each CB's gaming parameters, including session date/time/duration of play for each game type, customer expressed needs & wants (NW), PSAA earns a price discount (%), down-payment deposited (DPD) and sets up the corresponding merchant schedule to contact CBs.

Regarding transport time & cost budgeting~425, which is an important component of vacation trip planning~426 in FIG. 40B~840B, the underlying transportation means are evolving. Specifically, a number of entities will be offering driver-less cars, within the next decade, including Uber/Volvo, Tesla, Ford, GM, Google, Apple, . . . Car rental agencies, such as, Avis, Hertz, Budget, are anticipated to follow this emerging trend. Vacationer's usage of these driverless vehicles will in turn facilitate a better prediction in planning/budgeting of the driving time & subsequently actually meeting of the same, to arrive "on-time" for a vacationing group going from attraction-activity (AA) "a" to attraction-activity (AA) "b," and is therefore recommended. Moreover, "driverless" or not, $3^{rd}$ party driven or self-driven, I disclose that a customizable App be imbedded in the automobile computing environment or on the travelling group's personal computing device, to enable an Apple "Siri-like or Amazon Alexa-like or Google-voice, as a talking "travel-vacation tour guide" App, to enrich the buying/vacationing group's experience, for each leg of their travel, in their selected transportation vehicle.

Going back to FIG. 40A~840A, visit plan/BRM module~403 wherein Buyer-consumer "h" starts with a baseline plan, as per [233] above, and modifies it~405. When this plan registration has been done~407, the Buyer-consumer continues inputting details, rather the play discount games, as identified in modules 414, 426, 428, in FIG. 40B~840B. Further plan revisions are enabled optionally, as per modules 416, 430 and 429 of FIG. 40B~840B.

After a time pause~421 is inserted to align execution with the next synchronous (SY) processing cycle, set by Portal ISP, to start, say every 90 seconds, Module~418 of FIG. 40D-840D, ensures that all consumers have been recursively processed. Then, PSAA availability/pricing DB~420, for all merchants~419, is synchronously updated for the next periodic batch of consumers. This begins the merchant DB update~404, and bid price/availability~406 process step.

If the buyer-consumer (BC) is on a travel-vacation planning task, and game play session time (excluding trip planning time) exceeds, say one hour, the BC ought to be eligible to receive additional promotional bonuses~447 "gifts," which are selected by the PSAA seller-merchants and Cloud ISP game regional providers-auctioneer, at their discretion, cognizant of the buyer-consumer's expressed implied needs/wants (EINW). These "gifts" from SM to BC are justified, as yet another attribute of the disclosed BRM (Buyer Relationship Management) process to "endear" the SM to the BC, thereby fostering loyalty.

A novel comprehensive embodiment example for promoting destination resorts to consumers planning their prospective visit/vacation is now disclosed: the prior merchant-side competitive "bid" to sell interested consumers PS is now extended to also encompass consumer-side competitive "ask" for products & services & activities-attractions (PSAA), during each specific consumer's budget & time-constrained holiday/vacation/visit schedule, particularly to destination resorts.

Prior sections disclosed, several novel features/concepts, which are also germane for "ask"ing vacationing consumers~191, from the prior "bid"ding merchant~25 perspective. For example, FIG. 1~801 disclosed several functions & related definitions, not limited to, but including consumer opt-out segment (COOS~293), consumer activity CCA~112, time of day TOD~27, consumer start of day CSOD~1, end of day~10, personally identifiable info PII~117, etc. FIG. 2~802 disclosed merchant bidding~140 based on DTOD~98, color coded~38 chip based wager bidding, etc. FIG. 3~803 disclosed Time of Arrival TOA~26, Need/Want~61, and categories (ESKAPD~30; Emotions~111, Services~114, Keywords~116, Activity~112, Products~115, Demographics~113). FIG. 4~804 discloses two primary (x~40, y~28) Cartesian display axes TOA~26 and activities~112, together with a secondary (z~32) axis TQC~42, further elaborated in FIG. 5~805, showing wager bid chip~68 placement. FIG. 6~806, shows an evolving statistical TQC~42 grouping. FIG. 8~11 (~308 to ~311) depicted alternate merchant bid display tables; corresponding consumer "ask" wagering tables can be "constructed," as required by PHOSITA. Moreover, consumer "ask" wagering versions, as per FIGS. 12, 13, 14 (~812, ~813, ~814) are envisaged. FIG. 16~816 depicts the Merchant's "bid" wagering/mgmt, display; reciprocally, a consumer's "ask" wagering/mgmt. display architectures (interactive display/UI implementation versions: desktop, tablet, mobile, . . . ) can be architected by PHOSITA, as required, based on disclosures herein (see FIG. 18~818 for related example of mobile display/UI). Furthermore, consumer "ask" versions of 22 & 23 (~822, ~823) merchant version can also be "formulated/constructed" by PHOSITA, as needed by a particular overarching design embodiment. All these possible "reciprocal" figures, from a "consumer perspective," are not illustrated herein to minimize prolixity.

The North American destination resort~470 (e.g., Las Vegas~471, Los Angeles~472, San Francisco~473, San Diego~474, Hawaiian islands~475, Seattle~476, Victoria~477, Lake Louis/Bamf~478, Lake Tahoe~479, Monterey Bay~480, . . . ) promotional "business development" scenario, necessitates, both: (1) merchants-sellers (MS) to compete against each other on price & delivery terms & conditions (T&Cs) on similar P/S offers, and (2) consumer-buyers (CB), who have a time-sensitive scarce PSAA (i.e., "A-A"=Activities-Attractions) also need to compete against each other, to secure a T&C commitment from merchant-providers. Moreover, PSAA (e.g., transportation, housing, entertainment, shopping, activities, attractions—entertainment, scenic, social) must be delivered by the merchant and received by the vacationing consumer, in a particular time sequenced order, as per their custom individualized vacation-travel itinerary. Competition over scarce resources & conflicts are resolved by ask (visiting buyer-consumers (BC) & bid (seller-merchants (SM) based gamification, among merchants based on dynamic price adjustment and among consumers based on dynamic schedule adjustment, over a game lasting over multiple time-periods (WOY, DOW, TOD).

For example, Monterey Bay~480 "Activities"-"Attractions" (i.e., "AA" of available amenities PSAA) include, but are not limited to: (1) outdoor activities: land-State Parks-birds, wetlands, . . . ; hiking, camping, nature/beach walks, narrow gauge train, redwoods, zip lining, bicycling, golf, tennis; water-kayaking, swimming, surfing, sailing, whale watching, fishing, scuba diving, snorkeling, wind surfing; sky-parasail, parachute, glider, helicopter, plane, amusement park-boardwalk rides, wharfs-shopping, local cruises, . . . ; un/guided tours-historical, ecological, . . . , (2) indoor—restaurants, bars, night clubs, opera, plays, museums, aquariums, art galleries, shops, spa, massage, manicure, apparel, bowling, . . . , (3) related Amenities—hotels, motels, bed & breakfast, AirBnB, . . . , (4) transportation related—rental car, taxi, Uber, Lyft, airlines, tour bus/van, . . .

Viewed from a "higher" economic development perspective, at a national level (e.g, within USA: California vs Florida) and at an international level (e.g., USA vs. Mexico vs Canada vs . . . ), each resort is competing against other resorts, to secure purchase order commitments from prospective (globally situated) vacationers, who typically have limited (annual) consumer budgets. Consequently, governmental tourism promotion departments (e.g., local, state, Federal/national) also need to get involved, by participating in this promotional "gaming" activity to assure the economic health of their geographic region. Indeed, this is a global competition for the (vacationing) consumer, individually and in a group (e.g., family), framed as a gamification paradigm, to generate consumer "excitement" and motivation, and consequentially loyal (active & repeated) participation.

From the perspective of a vacationing consumers (or "cohesive" vacationer group) "h," the following sequence of interactions can be enabled with a vacation planning portal based web site with specific consumer group inputs (1) # vacation/visit days (WOY/DOW-a to WOY/DOW-b), including preferred arrival time TOD/DOW & location (airport, hotel, . . . ) and departure time TOD/DOW & location, (2) # individuals in vacationing consumer group demographically, (3) acceptable/target cost budget. Then consumer group "h" review: (4) system response: predefined detailed baseline plans, including merchant offered amenities (PSAA) and corresponding PSAA item-by-item breakdown of price quotes for each vacationing group "h," (5) selects most acceptable plan based on PSAA selected & price, (6) If no acceptable plan, then revises vacation: (a) location~470, (b) dates, (c) # of individuals, (d) desired sequence of PSAA and (e) cost, Finally, (7) if a "reasonably" acceptable plan & schedule & cost is bid by the coterie of merchants, then consumer group makes required down payment and proceeds to a "gaming" mode to "win" additional discounts (see U.S. Pat. No. 8,123,618) for selected PSAA offers on selected dates, (8) If discounts are "won"/"earned," the balance of the due payment remaining/scheduled is revised accordingly, by this mobile web based gaming system. (9) typically the consumer group "h" is required to pay the amount due, on a payment plan, before being invited to play-for-discounts and actually embarking on the planned vacation trip.

Moreover, if the consumer group's prospective vacation plan requires major revisions or customizations to the offered baseline (canned/preplanned) vacation plan, as delineated in the above sequence of interactions, then the required dynamic sequence of interactions, among both: (a) the competing merchants "bidding" for schedule slots (DOW/TOD) & price and (b) competing consumer groups ("asking" for schedule slots (DOW/TOD) & price, are detailed in FIG. 40. This set of 4 figures integrates the portal ISP's web-based synchronous (SY) software actions, with the vacation planner's asynchronous (AY) actions, by seamlessly integrating gamification of the buying/vacationing group's planning activity & timely delivery of merchant's PSAA offers, to satisfy said buyer/vacationing group's schedule & price based PSAA needs/wants (NW).

The asynchronous (AY) processing loop is made compatible with the synchronous (SY) processing loop, by inserting a dynamically determined time pause duration (shown in FIG. 40D~840D), at the transition of the asynchronous (AY) processing loop, to time-align it with the next synchronous (S) processing loop. All the synchronous (SY) modules are executed at a fixed time recursion interval optionally set (e.g., 90 seconds), by the portal independent service provider (ISP), to process randomly arriving consumer's registrations in batches synchronously (SY).

Many of the conventional Brick-Mortar (BM) travel agencies (e.g., TravelMasters) have recast themselves by hiring outside "independent contractors," who were previously "do-it-yourself" (DIY) "vacation travelers." Credit card companies (airlines issuers, . . . ) also maintain a list of members, eligible for "special discount rates." These DIY individuals, plan & execute "customized" vacation-travel for themselves and their 'affinity" groups (Winery, Foodie, Cooking, Art, History, Science, Safari, . . . ), at "special discounted rates," previously negotiated with their travel carrier (e.g., airline, cruise line, tour bus, automobile, train, . . . ) & overnight stay (e.g., Casino, Hotel, Motel, AirBnB, . . . ) vendors. The following [309-313], outlines the construction of a icon game board for buyer consumers.

PHOSITA can implement yet another embodiment consisting of 36 visible icon (eg, 6 columns×6 rows of Ad placement segments) on a (random) gamified display board layout, for a buyer-consumer (BC) "h" wanting to go on a scenic vacation travel, comprising activities-attractions (AA), pre-selected by buyer-consumer (BC) selected in say, two Western European cities: $1^{st}$ set of three Columns on left are candidate AA (Activities & Attractions) offered, in and around say London, $2^{nd}$ set of three column are candidate AA offered, in and around say Paris. In this scenario, BC is deciding, whether to go on a vacation-travel trip to London or to Paris, subject to BC's pre-specified set of calendar dates and budget. The final BC selection AA would be based on discounts earned by BC among the pre-selected AA of interest to BC. Note that various buy-sell "tradeoffs" discount games, such as this London vs Paris "tradeoff," can be setup by the IRPA portal, and/or Vacation Travel seller-merchant (SM), and/or $3^{rd}$ party resellers/game designers, and/or a "discount travel" focused buyer-consumer (BC) group or a DIY (do-it-yourself) individual.

In another embodiment, the BC does not have to play games (slots, cards, dice, board, wheel, . . . ) to earn discounts. Instead, the buyer-consumer (BC) can: (a) drill-down to review details of all 36 icon choices offered by seller-merchants (SMs), (b) "drill-down" by "clicking" on the gaming display screen, to peruse icons-of-interest, on their desktop, portable, tablet, smart-phone, public kiosk, etc., (c) "drill-down" BC to initiate a CTP decision by depositing a down-payment (DPD) to "reserve" iconized PSAAs. BC "Clicking" on icons of interest, to "drill-down" enables the PSAA offering seller-merchant (SM) to also advertise attractive features of SM's icon. Note: Seller-Merchants have to bid on and timely win icon Ad (periodic) auctions to have their game appropriate PSAA icons placed on each active BC's gaming display board, at the discretion of the portal ISP & consent of said BC.

In the embodiment described above, the B can drill-down on the (seasonally) offered "London vs Paris" activities-attractions (AA) array of MS's iconized offers. For example, the $1^{st}$ row/$2^{nd}$ column could represents one SM's iconized Ad for London "Theatre," from $155 per person with current (seasonal) choices: Book-of-Mormon, Les Miserables, Mamma Mia, Matilda the Musical, Phantom of the Opera, The Lion King, and Wicked. The $5^{th}$ row/$5^{th}$ column represents another MS's iconized Ad for the famous Paris Moulin Rouge Cabaret, a 3 hour adult show, offered for $239 per person. Each BC has to take into account the duration of each activity planned & commute time to avoid over committing.

In yet another embodiment example, SMs could present the iconized depiction of hotels located in the London & Paris area respectively. The Buyer-Consumer (BC) proceeds to "discount gaming" on these displays to select an appropriate hotel for the pre-selected dates. Then, BC proceeds to a icon display of airlines (not presented herein to avoid prolixity) that enable BC to book transportation means (air, sea, rail, bus, auto, . . . ) from BC's starting address. In this illustrative example the BC may "unpredictably" decide to visit either London or Paris, based other hitherto undisclosed factors (personal contacts, . . . ), thereby over-riding potential (discounted PSAA) savings in cost & time, achieved via gaming for Activities-Attractions (AA), as offered in embodiment outlined above. At any rate, CB is entertained by the PSAA gaming & gains greater familiarity regarding offered PSAAs, by simply clicking on each icon, to review the underlying descriptions, compare selling merchant's terms & conditions (T & Cs), & associated costs (money, time).

In another embodiment example, SM offers London 3 star ($259 per person+$99/extra night) and 4 star ($335 per person+$139/extra night). Then, drilling-down on say the $3^{rd}$ row/$1^{st}$ column icon, which represents an Ad for "The Wesley," a 4 star hotel near Euston Station in London. This 2017 renovated Georgian townhouse features quirky and colorful room décor. A short stroll to the Roman Baths and main shopping streets. Moreover, say MS offers Paris 3 star ($325 per person+$135/extra night) and 4 star ($375 per person+$159/extra night). Furthermore, BC learns by drilling down on say $5^{th}$ row/$5^{th}$ column icon, which represents say an Ad for "Relais St. Charles," a 3 star, modest but cozy, hotel, which offers light rooms in contemporary style; close to Eifel Tower in a cosmopolitan area.

In stark contrast, to "conventional" casino & casual gaming, this disclosed "iconized PSAA" gaming paradigm": (a) displays categories, organized in columns (or rows or in random order) of iconic Ads. The specific "iconized PSAA" Ads are selected by each BC, reflecting said BC's expressed/inferred NW, (b) the icon discount earned by BC is determined by a pair of RNGs to select the winning row-column icon, which is then high-lighted, at the end of each game, together with the competing merchant's offered (deterministic or random) discount % earned. At the end of each game, the BC archives "winning" discounted icons in BC's personal data base (DB) residing on the ISP's portal. At the end of each gaming session, or thereafter, the BC deletes iconized Ad offers that do not comport with said BCs evolving vacation-travel plan, to progressively "finalize" BC's plan (travel dates, PSAA CTP dates, Costs, deposits).

A random roll of a pair of electronic dice, computer simulated (by ISP's portal) or real (merchant's premises), can be used to pick the "winning" icon in a 6×6 icon matrix of AA choices. An additional pair of dice (or a $2^{nd}$ roll of the 2 dice, previously used for icon selection) can be used to represent the discount % offered to the CB. For example, a second roll, yielding: $1^{st}$ dice=6 & $2^{nd}$ dice=6, can be designated to be a maximum achievable discount "win" of 66% on the icon listed price, of the PSAA depicted by said icon. PHOSITA can devise other game based random "win" selection schemes and icon arrangements.

The seller-merchant offer is selected from among several competing merchants supplying a product/service (P/S) "equal to or better than" that depicted by each said icon. The particular merchant is dynamically selected, based on said merchant "winning" a timely bid auction among competing merchants, as previously disclosed and illustrated by FIGS. 4, 5, 15, etc. Subject to statutes & regulations in effect in each buyer's jurisdictional domicile, responsive sellers can initiate "just-on-time" (JIT) buyer communication management (BCM), which an important subset of buyer relationship management (BRM), as soon as said buyer's expressed/implied (EI) need/want (NW) are logged by the portal ISP, thereby enabling seller's to make "special" offers. However, all offers are filtered for responsiveness & ranked in terms of price & payment terms, to ease the buyer's selection process among a plurality of responsive seller-merchants.

Each seller-merchant's offer may require the BC to make, a (perhaps non-refundable) down-payment to "reserve" an "option," to subsequently exercise said option, to actually buy the discounted PSAA, during BC's vacation-travel plan. Moreover, the ISP can grant BC's P information access to the merchant-vendors, who have received a down-payment for a particular PSAA. And, the seller-merchant is entitled to message the BC, via email/text/phone to improve the post-game offer, including up-selling the BC, at anytime thereafter. Payment triggered messaging is an attribute of BRM, enabling the merchant to CTP the BC, including up-selling & delivery at the Seller-merchant's B-M location.

Other iconized PSAA game display layouts, designed/implemented by PHOSITA, provided with the approval of the Cloud server based portal ISP, can include multi-city multi-day packaged tours, incorporating appropriate travel modalities: train (Amtrak, Europass, . . . ), bus (Grayhound, . . . ), cruise ships (Princess, . . . ), air (PSA, Delta; Expedia, . . . ), automobile (Hertz, Uber, . . . ) and selection of appropriate casinos (MGM, . . . ), hotels (Hilton, . . . ), motels (Motel 8, . . . ), others (AirBnB, . . . ) accommodations motivated, via BC selected gaming paradigms (e.g., slots, cards, dice, wheel, . . . ). Note that the "dynamic" gaming display iconic layout of the "play scenario" (e.g., game display) are selected by the ISP and customized (NW icon selection), driven by each BC's current vacation-travel focus, expressed in terms of Needs/Wants (NW) of said vacationing travel individual and/or group.

Foregoing descriptions of generic and specific embodiment examples of this disclosed invention have been presented for purposes of illustration and description. They are not intended to be exhaustive or to limit the invention to the precise forms disclosed, and obviously many modifications, combinations, and variations are possible in light of the above teaching. The exemplary embodiments were chosen and described in order to best explain the principals of the invention and its practical application, thereby enabling PHOSITA, to best utilize the invention and various embodiments with various modifications, as are suited to the particular use contemplated by them. It is intended that the scope of the invention be defined by the Claims appended hereto and their legal equivalents I've disclosed a digital commerce marketplace for buyers (consumers) & sellers (merchants), playing games, digitally interconnected (eg, TCP/IP, BEKN, . . . ) and managed by a facilitator (eg, regional provider-auctioneer). Each of the seller-merchants in the marketplace maintain an iconized collection of product-services-activity-attractions (PSAA) offerings, which are searchable (findable) with a "guided search" on the Internet by the buyer. Alternatively, the SM's website is scraped for a specific PSAA based on BC's expressed NW. So, PSAA are scraped by buyer-consumers, using scraping APIs, using AL tools as required, based on buyer-consumer's currently expressed implied needs/wants (EINW), in terms of a subjectively weighted optimum parameter "vector" consisting of: (a) PSAA functionality/utility, (b) payment terms & conditions, (c) timely delivery commitment, (d) adequate after-purchase maintenance & support & return policy, and (e) "net" price, which is determined by playing an "icon game" to "earn" a "discount coupon," thereby reducing the original open-market published list-price. Based on prior sales performance, each Seller-Merchant wagers on available daily time-of-day slots (DTOD), to place iconized ads, competing against other sellers, who have similar PSAA, which the buyer-consumer's search has discovered. The buyer reviews the details, including video, of the seller-merchant's offerings by "clicking" on the icons, to "prune" the number of icons in their "shopping bag." The facilitator coordinates the activities of each buyer & seller to (a) consummate a transaction, embodied as a list-price "discount coupon" and maintains each seller's iconized PSAA inventory & each buyer's NW based "shopping bag(s)" (eg, "bucket list": daily, weekly, monthly, . . . ) and "earned" "coupon bag(s)." Each of these PSAA coupons in said "coupon bag" are then optionally presented by the buyer-consumer to the appropriate seller-merchant, remotely or by an on-site visit, to the appropriate seller-merchant's B-M establishment, by receive corresponding PSAA at a "persuasively" discounted price, resulting to a Conversion-to-purchase (CTP). When CTP occurs the RPA and game vendors are justifiably paid a fee.

I claim:

1. A method, performed by at least one processor, of providing games on a networked software-based marketplace for buyers and sellers, coordinated by a service provider-auctioneer (SPA), the method comprising:

generating buyer games to be played with one or more game artifacts selected from a mutually non-exclusive group consisting of: playing cards, moving wheels, rolling dice, moving reels, and moving balls;

generating one or more buyer interfaces enabling interaction with an Artificial Intelligence (AI) Chatbot, to aid buyers in ranking, selection, and textual interaction to discover products-services-activities-attractions (PSAAs), offered by the sellers;

generating one or more buyer interfaces enabling selection of a background audio music channel, during PSAA search, PSAA selection, PSAA iconization, and buyer game play;

for each of the plurality of participating buyers, transforming selected PSAA data into an iconized structured encapsulated multi-media text-audio-graphics-video-image (SEMTAGVI) representations to represent the selected PSAA data;

generating one or more buyer interfaces enabling each of the plurality of buyers, based on an analytic algorithm with semantic search functionality, to discover PSAAs satisfying each of the buyer's intent, expressed and implied needs and wants (EINW), from one or more seller sites:

generating one or more buyer interfaces enabling each of the plurality of buyers, based on a set of prompts provided by the analytic algorithm, to query for PSAAs within each category at each of the one or more seller's sites, and/or within a selected Manhattan-distance zone, to locate candidate PSAAs satisfying said buyer's EINW;

generating one or more buyer interfaces enabling each of the plurality of buyers, based on an editing algorithm, to prune a plurality of matching sellers, who are selling PSAAs satisfying each of the plurality of buyer's queries, subject to each of the plurality of matching seller's terms and conditions;

scraping, using an application program interface (API), PSAA related data, corresponding to PSAAs satisfying each of the plurality of buyer's queries, from each corresponding selected seller's site;

encapsulating said scraped PSAA related data as pictorial thumbnail icons with SEMTAGVI attributes, wherein the SEMTAGVI attributes are drawn from a group comprising: (a) specific functional features of each said PSAA, (b) purchase terms and conditions, including time-limited price discounts from a minimum advertised price (MAP) offered by said selected seller, (c) transaction taxes to-be-paid, (d) delivery options and (e) dispute resolution procedures;

storing, by the SPA, respective pictorial thumbnail icons into each buyer's respective EINW based PSAA shopping bag in a database maintained by said SPA;

storing, by the SPA, a histogram representing all buyer's EINW-based time-cumulative PSAA demand during each work day;

generating one or more seller interfaces enabling participation of sellers in an auction game to dynamically select timely (a) PSAA discounts, (b) discounts earn frequency and (c) seller advertising on participating buyers' digital game playing device displays;

generating a graphical buyer display interface comprising one or more first pictorial thumbnail icons of the pictorial thumbnail icons, the one or more first pictorial thumbnail icons each being selectable;

displaying the generated one or more graphical buyer interfaces comprising the one or more first pictorial thumbnail icons on a first buyer's digital game playing device display;

in response to selection of one of the one or more first pictorial thumbnail icons by the first buyer, modifying the graphical buyer interface to further display corresponding SEMTAGVI attributes encapsulated in the selected pictorial thumbnail icon for review by the first buyer;

generating one or more buyer interfaces enabling a plurality of participating buyers to play games to benefit from the sellers selling PSAAs; and personalizing games played by respective ones of the plurality of participating buyers with SEMTAGVI representations corresponding to PSAA data selected by each respective buyer.

2. The method as claimed in claim 1, further comprising, registering the sellers, with the SPA in the networked software-based marketplace;

generating one or more seller interfaces enabling interaction with an AI Chatbot, to aid sellers in product ranking, product selection, and textual interaction to discover advertised prices and discounts offered by other seller's competing PSAAs;

placing advertising by each seller using an analytic algorithm and based on the histogram representing all buyer's EINW-based time-cumulative PSAA demand during each work day;

initiating a competitive sellers pay-to-play synchronously recurring auction bid game for winning advertising placements during discrete time-of-day (DTOD) segments on one or more buyer's digital game playing devices;

placing, selected multimedia advertising, on at least one of a plurality of participating buyer's digital game playing device displays;

participating with other sellers, in an auction of the DTOD segments to win stackable icon banner advertising placement, on one or more buyer's digital game playing devices;

paying for one or more selected future time-of-day segments, seller advertising placed on digital game playing devices of the buyers, who have previously selected PSAAs from said seller during prior DTOD segments for game play;

advertising stackable static iconized PSAAs, during DTOD segment times won by a seller, and placed, by the SPA, on one or more buyer's digital game playing device displays; and displaying an advertisement of said stackable static iconized PSAAs, on buyer's digital game device displays.

3. The method as claimed in claim 1, further comprising, paying a fee by the sellers to the SPA, for submitting icons to advertise PSAAs selected by said sellers for inclusion, on each buyer's digital game playing device display, by said SPA;

submitting PSAA advertising of each seller's icons, held in each seller's advertising collection bag, segregated specifically based on each buyer expressed preferences, by the SPA;

excluding seller icons selectively, for inconsistency with each said buyer's intent, EINW, during each said buyer's game session;

wherein icons in each seller's respective advertising collection bag are further excluded randomly, from seller's submitted icons for advertising PSAAs by said SPA;

said exclusion process continues until remaining icons in seller's advertising collection bag are less than the maximum numerical limit of icons accommodatable in buyer's digital game playing device display on a buyer-by-buyer basis, engaged in playing a multi-game session; and excluding on a randomized basis, seller submitted icons exceeding maximum icon numerical limit on buyer's digital game playing device display.

4. The method as claimed in claim 2, further comprising, receiving SMS banner advertising messages on each buyer's digital game playing device;

said SMS banner advertising messages are intercepted, parsed and deleted for non-relevance to buyer's intent with an analytic parsing algorithm;

determining inconsistent SMS banner advertising messaging by sellers with said buyer's purchasing intent;

deleting intercepted SMS banner advertising messages, to minimize the number of buyer's SMS banner advertising messages; and ensuring the number of stackable SMS banner advertising messages to each buyer are periodically limited by random deletion, using an analytic algorithm driven by a random number generator (RNG), before forwarding said stackable SMS banner advertising messages to said buyer's digital game playing device displays.

5. The method as claimed in claim 3, further comprising, providing each seller whose PSAAs have been selected, with corresponding anonymized buyer related data, excluding personally identifiable information (PII), by the SPA, at each DTOD segment;

anonymizing buyer related data from an attribute group consisting of: (a) each said PSAAs selected, (b) Manhattan-distance based range data histogram, from said seller to each buyer, selecting said PSAAs and (c) total number of qualified buyers (TQB), in said DTOD segment, selecting said PSAAs;

comparing each seller's submitted icons, for banner icon advertising, for relevance to each buyer's selected icons;

deleting, by the SPA, seller submitted icons that are inconsistent with intended theme of said buyer selected icons, in each said buyer's digital game playing device display;

optimizing auction bid investments by sellers, using DTOD referenced anonymized buyer personally identifiable information (PT) data, to minimize said auction bid investment;

maximizing buyer's conversion-to-purchase (CTP), by further discounting minimum advertised prices (MAPs), for said selected PSAAs, represented by said icons;

searching each seller's own data site, for PSAAs to satisfy said seller's needs and wants (NWs) to sell PSAAs to reduce inventory of perishable, or excess, or refurbished, or undersold, or loss-leading, or old, or obsolete, or damaged (PERULOOD) or related PSAAs for whatever reason, mutually non-exclusive;

setting buyer-benefits by each seller, including pricing discounts on seller's PERULOOD PSAAa in sellers inventory; improving each sellers return-on-investment (ROI) by utilizing narrow causal artificial intelligence (cAI) based conversion-to-purchase (CTP) predictions;

setting additional coupon discount on minimum advertised prices (MAP), in buyer selected PSAAs icons, based on periodic buyer predictions; and bidding on available DTOD advertising segments, based on periodic predictions.

6. The method as claimed in claim 5, further comprising, accepting bids made by registered sellers to the SPA;

wherein bidding occurs in a DTOD segment "k" to win future time segments for placement of advertisement, on buyer's digital game playing device displays, as specified by bidding registered sellers;

wherein outcome of an auction game in segment "k" are posted to all registered sellers in a next DTOD segment "k+1";

wherein each auction game outcome is based on an algorithmic computation, selected by the SPA, from a group consisting of: second-best-bid, or open auction, or max-min limited fair segment slot allocation, or bid amount winner ranking, with overlapping bid resolution, mutually exclusive;

wherein each auction game has one or more winning bidders, based on their usage bid of short form or long form advertising, for a selected TQB buyers;

wherein winning at each auction, enables sellers to request the SPA, to transmit short-form and long-form advertisement content onto one or more active buyer's one or more digital game playing device displays in next DTOD segment "k+2" and thereafter;

wherein preferred buyer's digital game playing device displays are in a cluster of the TQBs among all active buyers, from each seller's perspective; and wherein DTOD segment integer index "k" is incremented by one time-unit at a time, from start of a predefined working day to a preset maximum at end of said predefined working day, thereby segmenting the predefined working day into an integer set of bidding points on each DTOD segments.

7. The method as claimed in claim 3, further comprising, wherein personalizing games played by respective ones of the plurality of participating buyers comprises generating, on a buyer's digital game playing device display, a personalized user interface (UI) comprised of a finite plurality of digitally simulated row-wise or column-wise digital spinning reels, mutually exclusive;

wherein each digitally simulated spinning reel is populated with a finite plurality of icons;

wherein said icons are sized to fit on said buyer's digital game playing device display;

wherein said icons represent said buyer selected PSAAs;

wherein each said buyer visits said seller, physically or virtually, mutually exclusive, to redeem previously earned PSAA promotional discount coupon wins, earned by said buyer playing said game;

wherein said digitally simulated spinning reels stop randomly, based on an analytic algorithm, to randomly display a pattern of icons, whereby said buyer wins PSAA promotional discount coupon when there is a winning pattern of icon; and wherein said winning pattern of icons, is predesignated by the SPA to be a column for row-wise icon motion or a row for column-wise icon motion or any other predefined pattern of icons, not mutually exclusive, visible on said buyer's digital game playing device display.

8. The method as claimed in claim 2, further comprising, accessing a digital network by registered buyer's and registered sellers with Internet TCP/IP protocol or with a wide-area open network for digital commerce (ONDC) BECKN protocol or any other protocol, mutually exclusive, enabling a geographically dispersed set of buyers and sellers to be digitally networked;

wherein digital network access is via regionally dispersed digitally interconnected gateways, managed by SPAs; and said gateways have algorithmic computational means for quasi-real-time conversion among different protocols.

9. The method as claimed in claim 3, further comprising, extracting from each buyer text and voice utterances, to discern said buyer's EINW, comprising intent attributes selected from a group consisting of: emotions expressed, services offered, keywords targeted; activity ongoing, PSAA offered; demographics desired (ES-KAPD);

prompting an analytic algorithm, using input attributes to activate an analytic semantic search function, enabling each buyer to discover acceptable PSAAs offered by seller sites;

enabling each seller to place and transmit, long and short time duration advertisements, by bidding on and winning corresponding selected one or more DTOD segments; and receiving advertising on each buyer's digital game playing device displays;

wherein the digital game playing devices are selected from a group consisting of: Mobile telecommunication devices, Internet-of-Everything (IoE) devices, billboard Signage, Television, Kiosk, tablets, laptops, desktops, and other personal devices (MISTKP).

10. The method as claimed in claim 1, further comprising, enabling each buyer, based on Jan analytic algorithm, to rank a plurality of sellers supplying mutually substitutable PSAAs in a 2-dimensional matrix of terms and conditions;

said terms and conditions are drawn from a group consisting of: (a) discounted price from MAP, (b) payment modalities, (c) delivery modalities, (d) PSAA warrantees, (e) estimated Manhattan distance of a respective buyer to each of said plurality of sellers, (f) dispute resolution; and enabling each buyer to select at most two sellers and their corresponding PSAAs, satisfying EINW of said buyer.

11. A system for providing a gamified digital commerce marketplace in a networked system for buyers playing a game to win promotional discounts from sellers playing an auction game to win advertising placed on a buyer's digital game playing display, coordinated by a service provider-auctioneer (SPA), comprising:

at least one processor configured to:
generate one or more buyer interfaces configured to enable buyer game play with one or more game artifacts selected from a mutually non-exclusive group consisting of: playing cards, moving wheels, rolling dice, moving reels, and moving balls;

generate one or more buyer interfaces configured to enable interaction with Artificial Intelligence (AI) Chatbot, to aid in search, ranking, selection, and textual interaction to discover products-services-activities-attractions (PSAAs) offered by sellers;

generate one or more buyer interfaces configured to enable selection of a background audio music channel, during product search, product selection, product iconization, and game play;

for each of the plurality of participating buyers transform buyer-selected products-services-activities-attraction (PSAA) data into iconized structured encapsulated multi-media text-audio-graphics-video-image (SEMTAGVI) multi-attribute icons, representing said buyer-selected PSAA data;

personalize games played by respective ones of the plurality of participating buyers with SEMTAGVI multi-attribute icons corresponding to PSAA data selected by each respective buyer;

wherein a game episode is initiated by a buyer's processor on a digital game playing device, and wherein said at least one processor generates said game episode, said game episode comprising randomly moving SEMTAGVI multi-attribute icons selected by said buyer displayed in at least 2-dimensions on said buyer's digital game playing device display;

wherein a game episode play can earn coupons for discount purchase, representing selected PSAA data when a SPA-predefined pattern of icons occurs;

wherein generating said game episode comprises randomly moving SEMTAGVI multi-attribute icons, randomly stopping movement on said buyer's digital game playing device display based on a pre-selected game stopping algorithm of the SPA, thereby forming an icon pattern, on the digital game playing device display;

wherein said buyer can submit said coupon to a seller from the sellers, listed on said coupon, to purchase pre-defined PSAAs priced at a discount, paying at most a seller's minimum advertised price (MAP), as per terms and conditions stated in said coupon;

generate one or more buyer interfaces configured to enable discovery of PSAAs, based on an analytic algorithm with semantic search functionality, from one or more seller sites, satisfying a buyer's intent, expressed and implied needs and wants (EINW);

generate one or more buyer interfaces configured to enable each of the plurality of the buyers, based on a set of prompts provided by the analytic algorithm, to query for PSAAs within each category at each of the one or more seller's sites, and/or within a selected Manhattan-distance zone, to locate candidate PSAAs satisfying said buyer's EINW;

generate one or more buyer interfaces configured to enable each of the plurality of the buyers, based on an edit algorithm, to prune a plurality of matching sellers, who are selling PSAAs satisfying the plurality of buyer's queries, subject to each of the plurality of matching seller's terms and conditions;

use an application program interface (API) to scrape PSAA related data, corresponding to PSAAs satisfying each of the plurality of buyer's queries, from each corresponding selected seller's site;

to encapsulate said scraped PSAA related data as a pictorial thumbnail icons with SEMTAGVI attributes, wherein the SEMTAGVI attributes are drawn from a group comprising: (a) specific functional features of each said PSAA, (b) purchase terms and conditions, including time-limited price discounts from minimum advertised price (MAP) offered by said selected seller, (c) transaction taxes to-be-paid, (d) delivery options, and (e) dispute resolution procedures;

store a respective pictorial thumbnail icons into each buyer's respective EINW based PSAA shopping bag in a database maintained by the SPA;

store a histogram representing cumulative buyer EINW-based PSAA demand for all buyers, accumulated during each work day;

generate one or more seller interfaces enabling participation of sellers in a competitive auction bid game to dynamically select timely (a) PSAA discounts, (b) discounts earn frequency and (c) seller advertising on participating buyers' digital game playing device displays;

generate a graphical buyer display interface comprising one or more first pictorial thumbnail icons of the pictorial thumbnail icons, the one or more first pictorial thumbnail icons each being selectable;

display the generated one or more graphical buyer interfaces comprising the one or more first pictorial thumbnail icons on a first buyer's digital game playing device display; and in response to selection of one of the one or more first pictorial thumbnail icons by the first buyer, modify the graphical buyer interface to further display corresponding SEMTAGVI attributes encapsulated in the selected pictorial thumbnail icon for review by the first buyer.

12. The system as claimed in claim 11, wherein the at least one processor is further configured to:
generate one or more seller interfaces configured to enable the sellers registered with the SPA in the software networked marketplace to initiate a pay-to-play auction game for winning advertising placements in discrete time-of-day (DTOD) segments;
generate one or more seller interfaces enabling interaction with an AI Chatbot, to aid sellers in product ranking, product selection, and textual interaction to discover advertised prices and discounts offered by other seller's competing PSAAs;
selectively place advertising by each seller using an analytic algorithm and based on the histogram representing cumulative buyer EINW-based PSAA demand;
wherein selected multimedia advertising is placed by a seller's processor on at least one of a plurality of participating buyer's digital game playing device displays;
wherein each seller's processor is configured to pay an auction bid fee, to the SPA, for participating with other sellers, in an auction of DTOD segments, to win stackable icon banner advertising placement, on one or more buyer's digital game playing device displays, in one or more selected time-of-day segments, placed on digital game playing device displays of buyers who have previously selected PSAAs from said seller during prior DTOD segments;
wherein stackable static iconized PSAAs advertising during DTOD segments won by seller is placed, by the SPA, on buyer's digital game playing display device displays, during said DTOD segments previously selected and won in an auction, by sellers; and
wherein said static iconized PSAAs with discounts are advertised on buyer's digital game display device displays.

13. The system as claimed in claim 11, wherein the at least one processor is further configured to:
generate one or more seller interfaces configured to enable payment of a fee by the sellers to the SPA, for submitting encapsulated icons to advertise PSAAs selected by said sellers for inclusion, on each buyer's personalized digital game playing device display, by said SPA;
deliver icons submitted by sellers for advertising PSAAs, to each seller's advertising bag, segregated specifically for each buyer by the SPA;
de-select icons, for non-relevance to each said buyer's EINW, during said buyer's multi-game session; and
exclude randomly, icons in each seller's advertising bags, a separate one for each buyer, to ensure that remaining icons in seller's advertising bag, are less than the maximum numerical limit of icons accommodatable in corresponding buyer's digital game playing display on a buyer-by-buyer basis.

14. The system as claimed in claim 11, wherein the at least one processor is further configured to:
receive SMS banner advertising messages at each buyer'digital game playing device display;
wherein said SMS messages are intercepted, parsed and deleted for non-relevance to buyer's EINW, by an analytic parsing algorithm;
delete SMS messages inconsistent with said buyer's purchasing intent, before displaying the SMS banner advertising messages; and
randomly delete on a periodic basis, based on the analytic algorithm and to mitigate excessive message load, stackable SMS banner advertising messages to each buyer, before forwarding said stackable SMS banner advertising messages to said buyer's digital game playing device display.

15. The system as claimed in claim 11, wherein the at least one processor is further configured to:
enable the SPA to process, at each DTOD segment, buyer's preferences;
provide each registered seller whose PSAAs are selected by one or more buyer's, with anonymized (non-PII) buyer related data from a group consisting of: (a) PSAAs selected, (b) a Manhattan-distance based range data histogram from said seller to each buyer, for selected PSAAs and (c) total number of prospective buyers, in said DTOD segment selecting said PSAAs;
compare each seller's icons submitted for banner icon advertising, for consistency with each buyer's selected icons and delete all seller submitted icons, which are inconsistent with EINW of said buyer selected icons, in each corresponding buyer's digital game playing device display;
optimize auction bid investments, using DTOD referenced historical anonymized data, to minimize said auction bid investment, and maximize buyer's conversion-to-purchase (CTP), by further discounting minimum advertised prices (MAPs), for said selected PSAAs, represented by said icons;
search seller sites for PSAAs to satisfy said seller's needs and wants (NWs) to sell PSAAs;
reduce inventory of perishable, or excess, or refurbished, or undersold, or loss-leading, or old, or obsolete, or damaged (PERULOOUD) or related PSAAs for whatever reason, mutually non-exclusive, thereby satisfying said seller's selling needs and wants (NW);
set buyer-benefits including pricing discounts on PERULOOD PSAAs in their inventory; and
improve return-on-investment (ROI) by utilizing narrow causal artificial intelligence (cAI) based conversion-to-purchase (CTP) prediction to periodically set: (a) additional coupon discount on minimum advertised prices (MAP), in buyer selected PSAAs icons and (b) bid on available DTOD advertising segments.

16. The system as per claim 11, wherein the at least one processor is further configured to:
enable the SPA to accepts bids, by registered sellers;
accept bids for each DTOD segment "k" to win future segments for placement of advertisement, on buyer's digital game playing device displays, as specified by bidding sellers;
post outcome of an auction game in segment "k" to all winning sellers in next DTOD segment "k+1";
compute each auction game outcome with an algorithm, selected by the SPA, from an algorithm group consisting of: second-best-bid, or open auction or max-min limited fair segment slot allocation, or bid amount winner ranking, with overlapping bid resolution, mutually exclusive;

wherein each auction has one or more winning bidders, based on their bid of short form or long form advertising, corresponding to each of their selected buyers;

wherein a processor associated with the SPA, upon notification of winning bids at each auction, transmits short-form and long-form advertisement content onto one or more digital game playing device displays, of active buyers in next DTOD segment "k+2" and thereafter;

engage active registered buyers in (a) searching for PSAAs, or (b) encapsulating selected PSAA data into icons or (c) personalizing their digital game playing device displays with selected encapsulated icons, or (d) playing a game episode round, not mutually exclusive;

wherein the preferred buyer digital game playing device displays are in the seller's cluster of targeted qualified buyers (TQBs) among all active buyers; and wherein DTOD segment integer index "k" is timely incremented by one time unit, from start of work day to a preset maximum at end of work day, thereby segmenting a nominal work day into bids placement points on an integer set of DTOD segments.

17. The system as claimed in claim 11, wherein the at least one processor is further configured to:

display, when personalizing games played by respective ones of the plurality of participating buyers, a limited group of icons, representing PSAAs, selected by a respective buyer, and a plurality of sellers;

size said icons to fit on corresponding buyer's digital game playing device display;

enable said buyer to select and play said icon game with row-wise or column-wise motion, mutually exclusive; and, spin digital reels of encapsulated icons, which stop randomly, based on one or more SPA-selected random outcome algorithms, to display a earning pattern of icons, whereby said buyer wins said coupons;

wherein said earning pattern of said icons on said display, is predesignated by the SPA to be a column for row-wise icon movement or a row for column-wise icon movement or any other predefined pattern of icons pre-selected by the SPA, not mutually exclusive, visible on said buyer's digital game playing device display; and wherein said buyer can visit one or more sellers, physically or virtually, n*t mutually exclusive, to redeem earned coupons, executing purchase of the PSAAs, represented by said coupons.

18. The system as claimed in claim 11, wherein the at least one processor is further configured to:

provide network access to registered buyers and registered sellers with Internet TCP/IP protocol or a wide-area open network for digital commerce (ONDC) BECKN protocol or any other protocol, not mutually exclusive, enabling a geographically dispersed set of buyers and sellers to be digitally networked;

wherein digital network access is via regionally dispersed digitally interconnected gateways, managed by SPAs; and wherein said gateways have algorithmic computational means for quasi-real-time conversion among different protocols.

19. The system as claimed in claim 11, wherein the at least one processor is further configured to:

extract with an analytic algorithm, each buyer's expressed-implied, text and voice utterances, needs and wants (EINWs) comprising the buyer's intent attributes selected from a group consisting of: emotions expressed, services offered, keywords targeted, activity ongoing, PSAAs, demographics desired (ESKAPD);

wherein said attributes are used in analytics based algorithmic prompts, for input to an analytic semantic search functionality, enabling said buyer to discover acceptable PSAAs offered by seller sites;

wherein a processor at each seller, correspondingly selects and places with the SPA, to be transmitted by the SPA and to buyers, long and short time duration advertisements, by bidding on and winning corresponding selected DTOD segments;

transmit advertising data from the SPA, to digital game playing devices selected from a group consisting of: Mobile Devices, Internet, Signage, Television, Kiosk, tablets, laptops, desktops, and other Personal devices (MISTKP); and receive advertising on each buyer's digital game playing devices.

20. The system as claimed in claim 11, wherein the at least one processor is further configured to:

execute an analytic algorithm to enable each buyer to rank a plurality of seller supplying mutually substitutable PSAAs, in a 2-dimensional matrix of terms and conditions, including (a) discounted price from MAP, (b) payment modalities, (c) delivery modalities, (d) PSAA warrantees, (e) estimated Manhattan distance of said buyers to each of said plurality of sellers, (f) dispute resolution; and enable a down-selection to at most two sellers and their corresponding PSAAs, satisfying EINW of said buyer.

* * * * *